US012061429B2

(12) United States Patent
Kinukawa et al.

(10) Patent No.: US 12,061,429 B2
(45) Date of Patent: Aug. 13, 2024

(54) HEATER, HEATING DEVICE, AND IMAGE FORMING APPARATUS

(71) Applicant: CANON KABUSHIKI KAISHA, Tokyo (JP)

(72) Inventors: Tatsuya Kinukawa, Kanagawa (JP); Yutaka Sato, Tokyo (JP); Sho Taguchi, Kanagawa (JP); Tomoo Akizuki, Kanagawa (JP); Yuki Oshima, Kanagawa (JP); Osamu Sasaoka, Kanagawa (JP); Masafumi Maeda, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/960,476

(22) Filed: Oct. 5, 2022

(65) Prior Publication Data

US 2023/0116189 A1 Apr. 13, 2023

(30) Foreign Application Priority Data

Oct. 11, 2021 (JP) ................................ 2021-166594
Oct. 15, 2021 (JP) ................................ 2021-169368
(Continued)

(51) Int. Cl.
*G03G 15/20* (2006.01)

(52) U.S. Cl.
CPC ..... *G03G 15/2053* (2013.01); *G03G 15/2064* (2013.01)

(58) Field of Classification Search
CPC ........... G03G 15/2017; G03G 15/2053; G03G 2215/2003
See application file for complete search history.

(56) References Cited

U.S. PATENT DOCUMENTS

2001/0032835 A1* 10/2001 Murooka ............. H05B 3/0095 219/388
2002/0011476 A1 1/2002 Otsuka
(Continued)

FOREIGN PATENT DOCUMENTS

JP S56159990 U 11/1981
JP H10275671 A 10/1998
(Continued)

OTHER PUBLICATIONS

JP 2021131466 English machine translation, Akizuki et al., Sep. 9, 2021 (Year: 2021).*
(Continued)

*Primary Examiner* — Thomas S Giampaolo, II
(74) *Attorney, Agent, or Firm* — ROSSI, KIMMS & McDOWELL LLP

(57) ABSTRACT

A heater includes: a substrate; an insulating layer that is provided on the substrate; and a heat generating element that is provided on the insulating layer, and in a case where a region including a center of the substrate is defined as a first region, a region on a side closer to one end portion than the first region is defined as a second region, and a region on a side closer to the other end portion than the first region is defined as a third region in a transverse direction that is orthogonal to a longitudinal direction of a surface of the substrate on which the insulating layer is provided, the first region is a plane, and the second region and the third region are bent from the first region in a thickness direction of the substrate that is orthogonal to the longitudinal direction and the transverse direction.

20 Claims, 81 Drawing Sheets

(30) Foreign Application Priority Data

| | | |
|---|---|---|
| Oct. 25, 2021 | (JP) | 2021-173937 |
| Nov. 9, 2021 | (JP) | 2021-182608 |
| Nov. 19, 2021 | (JP) | 2021-188855 |
| Jun. 30, 2022 | (JP) | 2022-106472 |

(56) References Cited

U.S. PATENT DOCUMENTS

| | | | | |
|---|---|---|---|---|
| 2005/0036809 | A1 | 2/2005 | Fukita et al. | |
| 2011/0150543 | A1 | 6/2011 | Fujiwara et al. | |
| 2014/0086648 | A1 | 3/2014 | Maruyama et al. | |
| 2015/0078768 | A1 | 3/2015 | Yamaguchi | |
| 2017/0253019 | A1 | 9/2017 | Hayashi et al. | |
| 2019/0286028 | A1* | 9/2019 | Furuichi | G03G 15/2053 |
| 2020/0257223 | A1 | 8/2020 | Kikuchi | |
| 2021/0263454 | A1 | 8/2021 | Ikegami et al. | |

FOREIGN PATENT DOCUMENTS

| | | | |
|---|---|---|---|
| JP | 2001222180 | A | 8/2001 |
| JP | 2001223063 | A | 8/2001 |
| JP | 2001324886 | A | 11/2001 |
| JP | 2001356623 | A | 12/2001 |
| JP | 2002015839 | A | 1/2002 |
| JP | 2004111122 | A | 4/2004 |
| JP | 2005043741 | A | 2/2005 |
| JP | 2005049839 | A | 2/2005 |
| JP | 2007232819 | A | 9/2007 |
| JP | 2011095549 | A | 5/2011 |
| JP | 2012078631 | A | 4/2012 |
| JP | 2014066851 | A | 4/2014 |
| JP | 2015084082 | A | 4/2015 |
| JP | 2019128564 | A | 8/2019 |
| JP | 2019164996 | A | 9/2019 |
| JP | 2019179143 | A | 10/2019 |
| JP | 2020129078 | A | 8/2020 |
| JP | 2021012295 | A | 2/2021 |
| JP | 2021131466 | A * | 9/2021 |
| KR | 1020080097343 | A | 11/2008 |

OTHER PUBLICATIONS

Extended European search report issued in European Appln. No. 22197302.7 mailed on Feb. 6, 2023.

* cited by examiner

HEATER, HEATING DEVICE, AND IMAGE FORMING APPARATUS

BACKGROUND OF THE INVENTION

Field of the Invention

The present invention relates to a heater used in an image forming apparatus such as a copy machine, a printer, or the like using an electrophotographic system or an electrostatic recording system. Also, the present invention relates to a heating device for a fixing device with the heater mounted thereon, a glossing device that improves a gloss value of a toner image by re-heating a fixed toner image on a recording material, or the like. Moreover, the present invention relates to an image forming apparatus including the heating device.

Description of the Related Art

As a heating device mounted on a printer or a copy machine based on an electrophotographic system, there is a general configuration including a heater that includes a heat resistor on a substrate, a film that moves while coming into contact with the heater, and a pressurizing roller that forms a nip portion with the heater via the film. As a substrate used in a heater of such an apparatus, a substrate made of metal may be used in terms of strength against a thermal stress as in Japanese Patent Application Laid-open No. H10-275671.

SUMMARY OF THE INVENTION

An object is to develop a heater including a substrate made of metal.

In order to achieve the above object, a heater according to the present invention comprises:

a substrate that is thin and long and is made of metal;

an insulating layer that is provided on the substrate; and a heat generating element that is provided on the insulating layer, wherein in a case where a region including a center of the substrate is defined as a first region, a region on a side closer to one end portion than the first region is defined as a second region, and a region on a side closer to the other end portion than the first region is defined as a third region in a transverse direction that is orthogonal to a longitudinal direction of a surface of the substrate on which the insulating layer is provided, the first region is a plane, and wherein the second region and the third region are bent from the first region in a thickness direction of the substrate that is orthogonal to the longitudinal direction and the transverse direction.

Further features of the present invention will become apparent from the following description of exemplary embodiments with reference to the attached drawings.

DESCRIPTION OF THE EMBODIMENTS

Hereinafter, a description will be given, with reference to the drawings, of embodiments (examples) of the present invention. However, the sizes, materials, shapes, their relative arrangements, or the like of constituents described in the embodiments may be appropriately changed according to the configurations, various conditions, or the like of apparatuses to which the invention is applied. Therefore, the sizes, materials, shapes, their relative arrangements, or the like of the constituents described in the embodiments do not intend to limit the scope of the invention to the following embodiments. Examples of an image forming apparatus to which the present invention can be applied includes a printer, a copy machine, and the like using an electrophotographic system or an electrostatic recording system, and a case in which the present invention is applied to a laser printer will be described here.

Example 1

(1) Image Forming Apparatus 100

Figure 1:
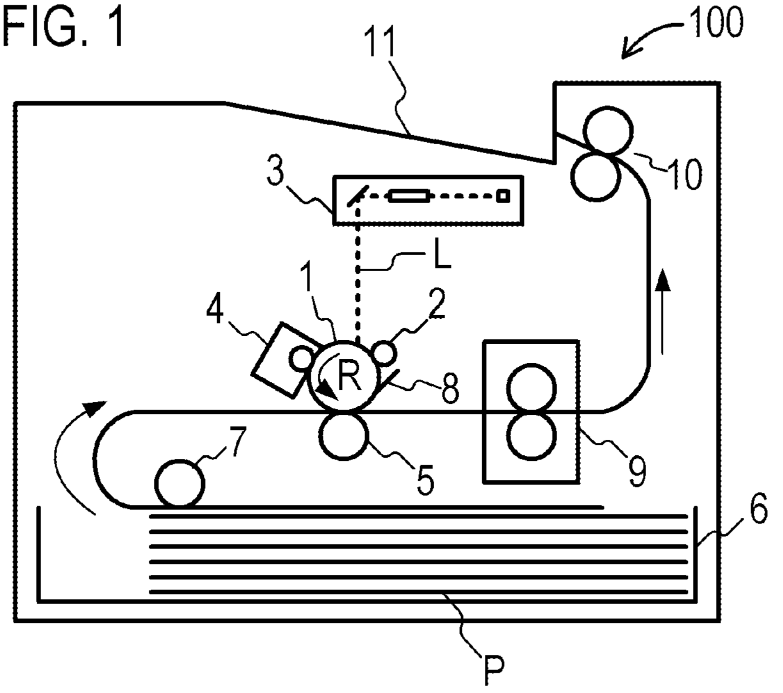
FIG. 1 is an overview configuration diagram of an image forming apparatus according to Example 1.

FIG. 1 is an overview configuration diagram of an image forming apparatus 100 using an electrophotography recording technique in Example 1. First, a configuration and operations of the image forming apparatus 100 will be described.

An image forming operation of an image forming portion of the image forming apparatus 100 will be described. If the image forming apparatus 100 receives a printing instruction from an external device or the like, a scanner unit 3 emits laser light L in accordance with image information toward a photosensitive member 1. The photosensitive member 1 charged with a predetermined polarity by a charging roller 2 is scanned with the laser light L, and an electrostatic latent image in accordance with the image information is formed on the surface of the photosensitive member 1. Thereafter, a developing device 4 supplies a toner to the photosensitive member 1, and a toner image in accordance with the image information is formed on the photosensitive member 1. The toner image on the photosensitive member 1 is moved to a transfer position formed by the photosensitive member 1 and a transfer roller 5 with rotation of the photosensitive member 1 in the arrow R direction and is transferred onto a recording material P supplied by a pickup roller 7 from a cassette 6. The surface of the photosensitive member 1 that has passed through the transfer position is cleaned with a cleaner 8.

A fixing device 9 that serves as a fixing portion performs fixing processing on the recording material P with the toner image transferred thereon with heat and a pressure. Thereafter, the recording material P is discharged to a discharge tray 11 by a discharge roller 10.

(2) Fixing Device 9

Next, a configuration and operations of the fixing device 9 will be described. In this example, a tensionless-type film heating-system fixing device 9 is used as an example of the heating device. The fixing device 9 in this example is a device in which an endless belt-shaped (or a cylindrical) film is used as a heat-resistant film, at least a part of a perimeter of the film is always kept free from tension (a state in which no tension is applied thereto), and the film is driven to rotate by a rotation driving force of a pressurizing member.

Figure 2:
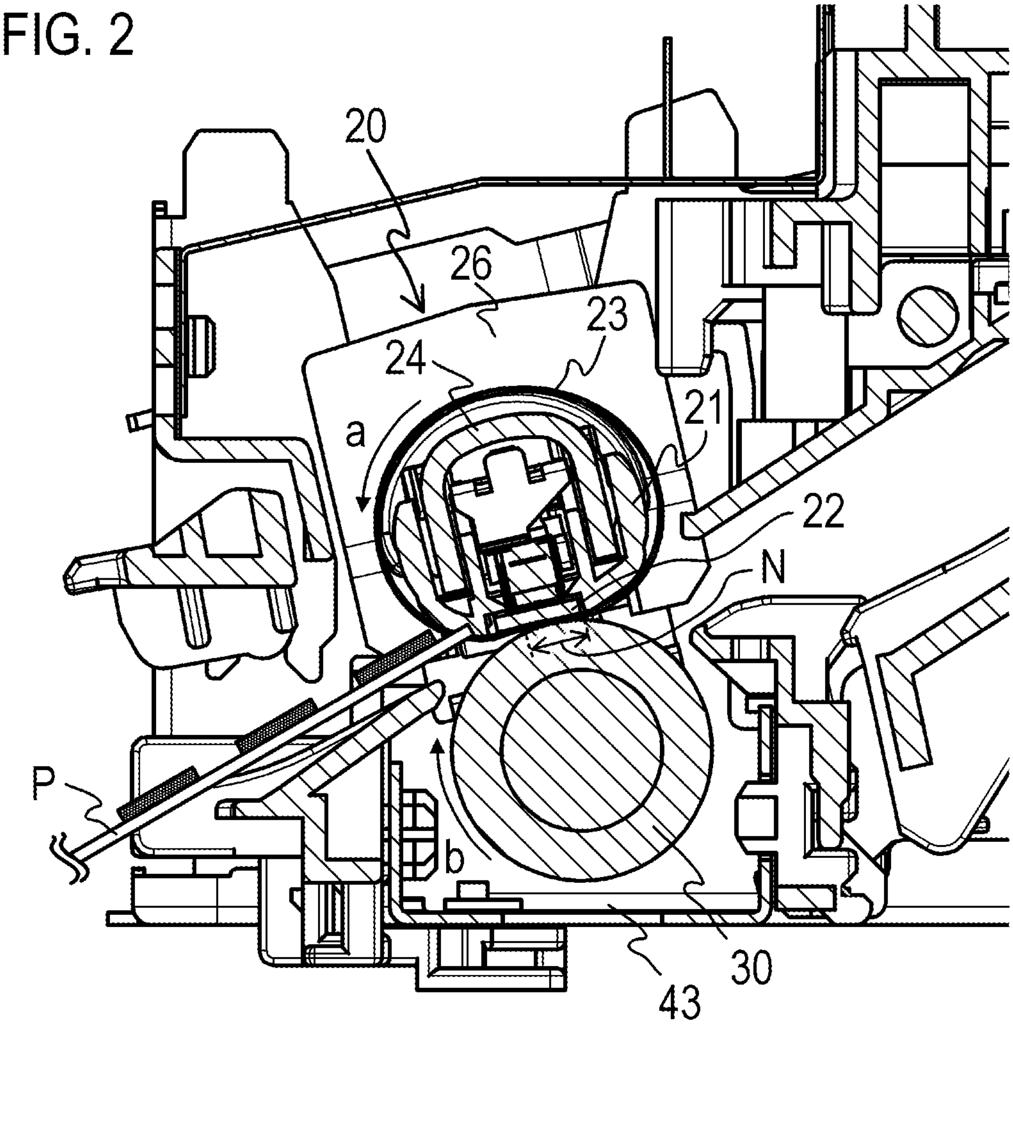
FIG. 2 is a sectional view of a fixing device according to Example 1.
Figure 3:
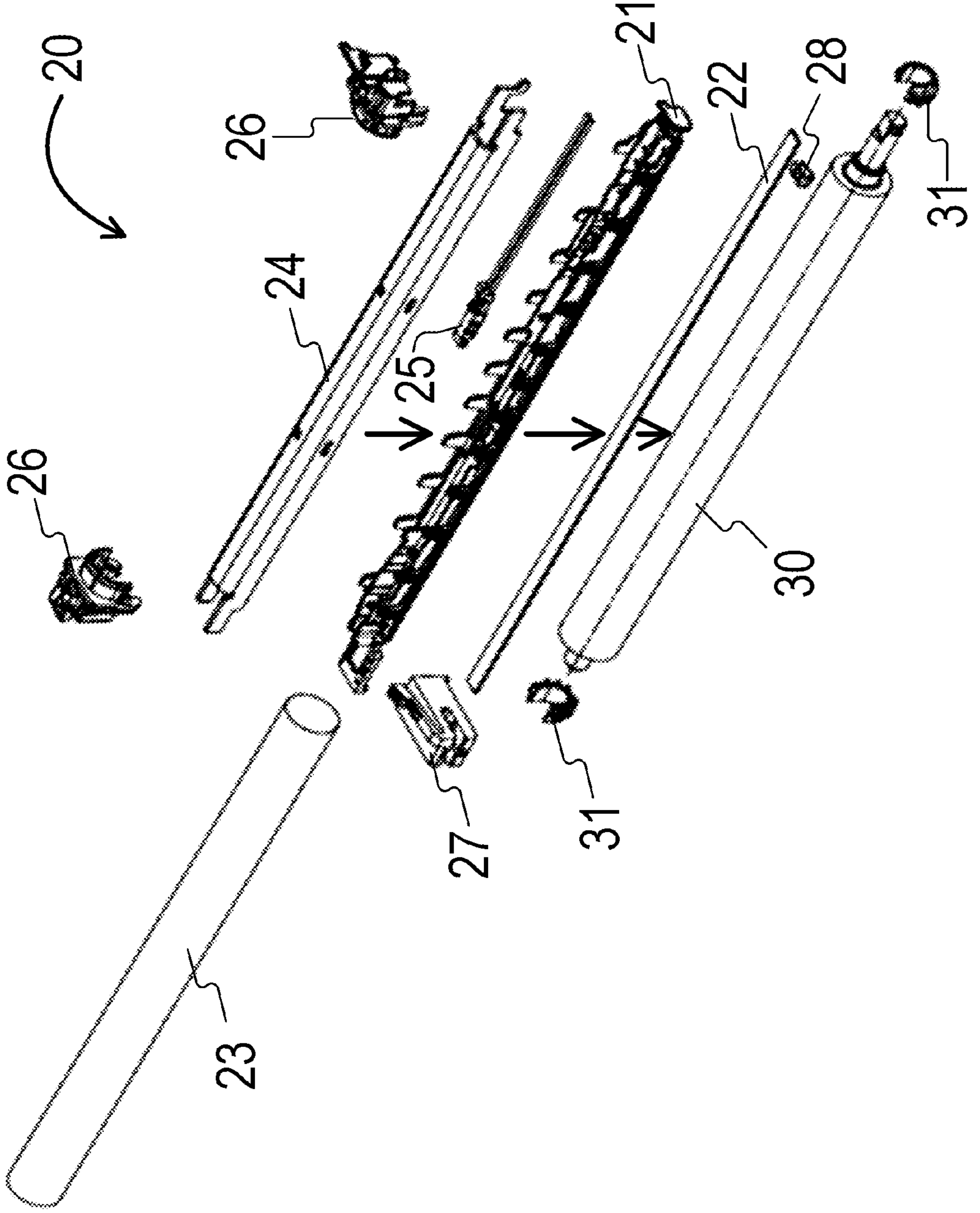
FIG. 3 is an exploded perspective view of a film unit according to Example 1.
Figure 4:
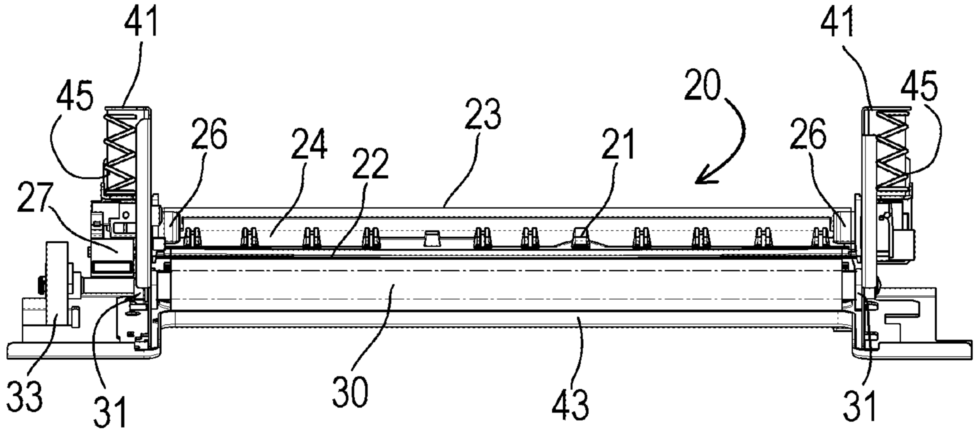
FIG. 4 is a front view of the fixing device according to Example 1.

FIG. 2 is an overview sectional view of the fixing device 9 in this example and illustrates a state in which a recording material P with a toner image formed thereon is conveyed to the fixing device 9. Also, FIG. 3 is an exploded perspective view of a film unit 20 used in the fixing device 9. FIG. 4 is a schematic diagram of the fixing device 9 in which a part of a film 23 is not illustrated in order to illustrate an internal structure of the film unit 20.

A configuration of the fixing device 9 will be described with reference to FIG. 2. The fixing device 9 in this example includes a tubular film 23 that serves as a first rotating body, a heater 22 that heats the film 23 in an internal space of the film 23, and a pressurizing roller 30 that serves as a second rotating body that forms a nip portion N with the heater 22 via the film 23. The fixing device 9 further includes a heater holder 21 that supports the heater 22 and guides rotation of the film 23 and a reinforcing member 24 that reinforces the heater holder 21. The film 23 is driven and rotates in the arrow a direction by the pressurizing roller 30 receiving a motive force from a motor, which is not illustrated, and rotating in the arrow b direction.

The film 23 is a tubular rotating body. The thickness of the film 23 is preferably at least about 20 μm and not more than 100 μm to secure satisfactory heat thermal conductivity. In a case in which the film 23 is a single-layer film, it is preferable to use a material such as polytetrafluoroethylene (PTFE), tetrafluoroethylene-perfluoroalkyl vinyl ether (PFA), or PPS as a base layer. In a case in which a composite-layer film is used, it is preferable to use a material such as polyimide (PI), polyamidimide (PAI), polyether ether ketone (PEEK), or polyether sulfone (PES) as a base material. Moreover, it is suitable to configure the composite-layer film using a material such as PTFE, PFA, or tetrafluoroethylene-perfluoroalkyl vinyl ether (FEP) as a release layer with which the surface of the base layer is coated. Also, a film obtained by using pure metal or an alloy of SUS, Al, Ni, Cu, Zn, or the like with high thermal conductivity in the base layer and performing the aforementioned coating processing and coating with a fluorine resin tube on the release layer is also suitably used.

The film 23 in this example is a composite-layer film in which the base layer is made of PI to have a thickness of 60 μm and is coated with a release layer made of PFA with a thickness of 12 μm to achieve a balance between both abrasion of the release layer due to paper feeding and thermal conductivity. The length of the film 23 in the longitudinal direction is set to 240 mm. The axial direction of the cylindrical shape of the film 23 will be referred to as a longitudinal direction below.

The heater holder 21 is a support member that is provided in an internal space of the film 23 and supports the heater 22. The film 23 is loosely fitted onto the heater holder 21, and the heater holder 21 also has a guide function of guiding rotation of the film 23 while keeping slide contact with an inner circumferential surface of the film 23. Since the heater holder 21 is required to have heat resistance and rigidity, it is preferable to use a liquid crystal polymer resin or the like with high heat resistance and excellent strength as a material of the heater holder 21. As the heater holder 21, a molded article of a heat-resistant resin such as polyphenylene sulfide (PPS) or a liquid crystal polymer, for example, is used.

The heater 22 includes at least a thin and long plate-shaped substrate made mainly of metal, a resistance heating element that generates heat in response to power distribution, an insulating layer that insulates the resistance heating element from the substrate, and a glass coating layer that protects the heat generating element. A detailed configuration of the heater 22 will be described later.

A thermistor 25 that is a temperature detection unit abuts a second surface on the side opposite to a first side of the substrate on which the resistance heating element is provided in the thickness direction that is orthogonal to the longitudinal direction and the transverse direction of the heater 22. Power distribution to the heat resistor is controlled in accordance with the temperature detected by the thermistor 25, and the temperatures of the heater 22 and the film 23 are managed. In other words, a change in temperature of the film 23 is detected by the thermistor 25 via the heater 22 in this example.

The pressurizing roller 30 includes a core metal of a material such as iron or aluminum, an elastic layer of a material such as silicone rubber, and a release layer of a material such as PFA. A drive gear 33 (see FIG. 4) is attached to one end of the core metal of the pressurizing roller 30 in the longitudinal direction, and the drive gear 33 receives a rotation drive force from a drive means, which is not illustrated, and causes the pressurizing roller 30 to rotate.

The reinforcing member 24 is a member that is made of metal such as iron and maintains the strength to prevent significant deformation even with a pressure of pressurizing the heater holder 21 to the side of the pressurizing roller 30 (the side of the second rotating body). The heater 22 is pressurized by a pressurizing means, which will be described later, on the side of the pressurizing roller 30 via the heater holder 21 and the reinforcing member 24. A region where the pressurizing roller 30 and the film 23 are in close contact through the pressurization is the nip portion N (as a pressure-contact region).

Next, details of the film unit 20 constituted of components such as the film 23 will be described with reference to the perspective view in FIG. 3. First, the heater holder 21 has substantially a gutter-shaped sectional shape that is orthogonal to the longitudinal direction, and the reinforcing member 24 is fitted to the inside of the gutter shape. A heater receiving groove is provided in the heater holder 21 on the side facing the pressurizing roller 30, and the heater 22 is fitted into the heater receiving groove and is fitted at a desired position. The film 23 is fitted onto a perimeter outside the heater holder 21 with which the aforementioned components are assembled with a margin.

Both ends of the reinforcing member 24 in the longitudinal direction stick out from both ends of the film 23, and the film unit 20 is assembled by a flange 26 being fitted to each of both ends of the reinforcing member 24.

A power supply terminal of the heater 22 also sticks out of one end of the film 23 in the longitudinal direction, and a power supply connector 27 is fitted thereto. The power supply connector 27 comes into contact with an electrode portion of the heater 22 with an abutting pressure and produces a power supply path. Also, the heater clip 28 is formed of a metal plate bent into a C shape and holds an end of the heater 22 at the heater holder 21 with its spring property.

Next, a configuration of the fixing device 9 will be described in further detail with reference to FIG. 4. In FIG. 4, a part of the film 23 is not illustrated such that the heater holder 21 and the heater 22 provided in the internal space of the film 23 are visually recognized. The flange 26 located at both end portions of the film 23 restricts movement of the rotating film 23 in the longitudinal direction.

The film unit 20 is provided to face the pressurizing roller 30 and is supported by a top plate-side casing 41. The film unit 20 is supported by the top plate-side casing 41 to be freely movable in the pressurizing direction, and movement thereof in the longitudinal direction is restricted. A pressurizing spring 45 is attached to the top plate-side casing 41 of the fixing device 9 in a compressed state. The pressing force of the pressurizing spring 45 is received by both end portions of the reinforcing member 24 in the longitudinal direction via the flange 26. The reinforcing member 24 is pushed on the side of the pressurizing roller 30 with the pressing force of the pressurizing spring 45, the entire film unit 20 is pressed on the side of the pressurizing roller 30, and the nip portion N is thus formed.

A bearing member 31 is provided to axially support the core metal of the pressurizing roller 30 and receives a pressing force from the film unit 20 via the pressurizing roller 30. In order to rotatably support the core metal of the pressurizing roller 30 that is heated to a relatively high temperature, a material with heat resistance and excellent slidability is used for the bearing member 31. The bearing member 31 is attached to a bottom-side casing 43 of the fixing device 9.

(3) Heater 22

Figure 5:
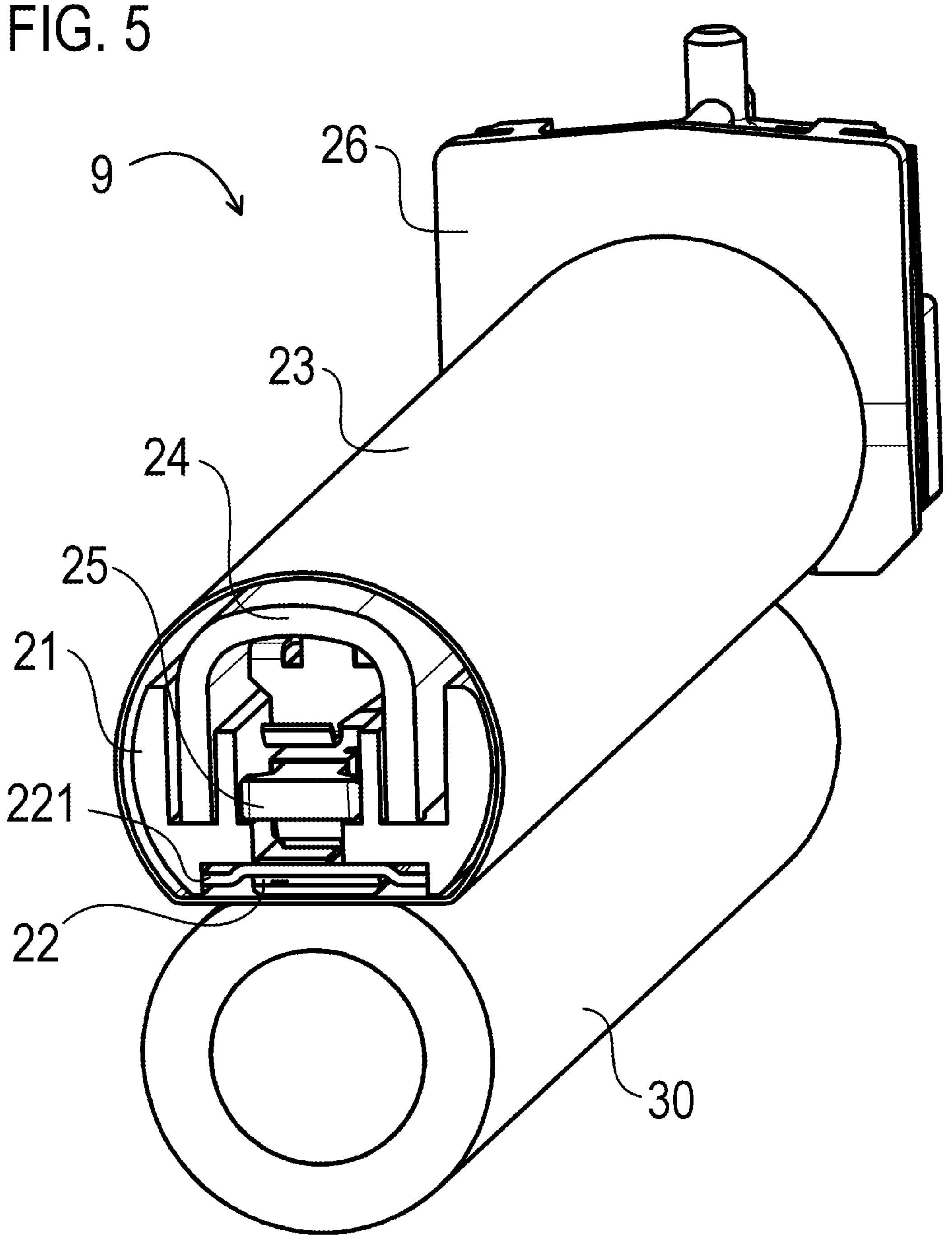
FIG. 5 is a sectional perspective view of the fixing device according to Example 1.
Figure 6A:
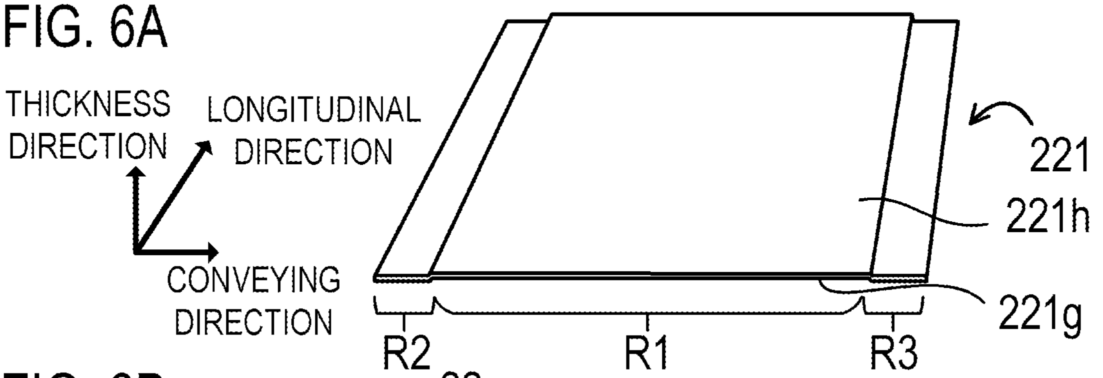
FIGS. 6A and 6B are respectively a perspective view of a substrate and a sectional view of the fixing device according to Example 1.
Figure 6B:
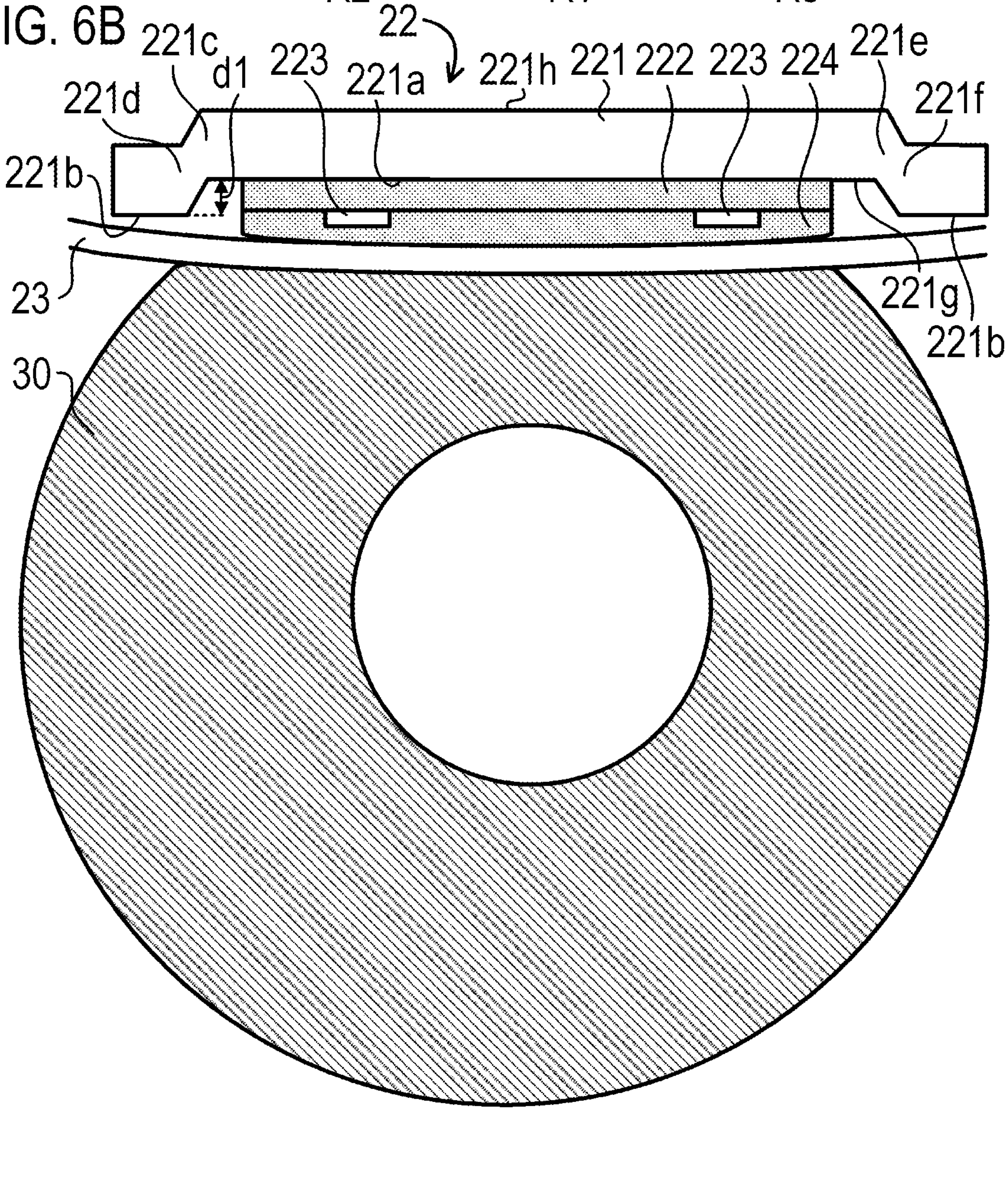

Next, a material, a manufacturing method, and the like for configuring the heater 22 in this example will be described using FIG. 5 and FIGS. 6A and 6B. FIG. 5 is a perspective view illustrating a section of the fixing device 9 provided with the heater 22 in this example. FIG. 6A is a perspective view illustrating a substrate 221 of the heater 22, and FIG. 6B is a sectional view of the fixing device 9 illustrating a part near the heater 22.

The heater 22 includes a thin and long plate-shaped substrate 221 made mainly of metal, a heat generating element 223 that generates heat in response to power distribution, an insulating layer 222 that insulates the heat generating element 223 from the substrate 221, and a protective layer 224 that protects the heat generating element 223. A surface which includes the insulating layer 222 and the heat generating element 223 provided thereon and faces the pressurizing roller 30 via the film 23 out of the surfaces of the substrate 221 is defined as a first surface 221_g_ (front surface), and the surface on the side opposite to the first surface is defined as a second surface 221_h_ (rear surface) for convenience.

(3-1) Substrate 221

As a material used for the substrate 221, stainless steel, nickel, copper, aluminum, or an alloy containing such a material as a main material is suitably used. Among these, stainless steel is most preferably used in terms of strength, heat resistance, and corrosion. The type of the stainless steel is not particularly limited and may be appropriately selected in consideration of necessary mechanical strength, a linear expansion coefficient in accordance with formation of the insulating layer 222 and the heat generating element 223, easiness of obtaining a plate material in the market, and the like. In one example, martensite-based stainless steel and ferrite-based stainless steel of chromium-based stainless steel (400-based) have relatively low linear expansion coefficients from among others and are thus suitably used because the insulating layer and the heat generating element are easily formed with them.

The thickness of the substrate 221 may be determined in consideration of strength, a heat capacity, and heat dissipation performance. Although a thin thickness of the substrate 221 leads to a small heat capacity and is thus advantageous for quick starting, a problem such as distortion is likely to occur when the heat generating element is heat-molded if the thickness is too thin. Since the heater has a thin and long plate shape, in particular, deformation into an arch shape with the center portion in the longitudinal direction on the side on which the heat generating element is formed included as a projecting apex is likely to occur. On the contrary, although a thick thickness of the substrate 221 is advantageous in terms of distortion when the heat generating element is heat-molded, an excessively thick thickness is disadvantageous for quick starting due to a large heat capacity. A preferable thickness of the substrate is about 0.1 mm to 2.0 mm in a case where a balance of mass production, cost, and performance is taken into consideration.

For the substrate 221 in this example, a ferrite-based stainless steel plate (SUS430:18Cr stainless steel) with a width of 10 mm, a length of 300 mm, and a thickness of 0.1 mm is used as a material. A characteristic shape and molding method of the substrate 221 according to the present invention will be described later in detail.

(3-2) Insulating Layer 222

Although the material of the insulating layer 222 is not particularly limited, it is necessary to select a material with heat resistance in view of the temperature in actual use. As a material, glass or polyimide (PI) is preferably used in terms of heat resistance, and selection of a specific powder material in the case of glass may be appropriately performed without damaging the properties of the present invention. A heat conductive filler with an insulating property and the like may be incorporated as needed.

It is generally preferable that a heater used in an image forming apparatus have a dielectric strength of about 1.5 kV. Therefore, the layer thickness of the insulating layer 222 may be secured in accordance with the material in order to obtain the dielectric strength performance of 1.5 kV between the heat generating element 223 and the substrate 221.

Although the molding method of the insulating layer 222 is not particularly limited, it is possible to smoothly mold the insulating layer 222 by a screen printing method or the like in one example. When an insulating layer of glass or polyimide (PI) is formed on a substrate, it is necessary to appropriately adjust the linear expansion coefficients of the substrate and the insulating layer material such that cracking or peeling does not occur in the insulating layer due to a difference between the linear expansion coefficients of the materials. In this example, an insulating layer glass paste is applied to the substrate 221 made of stainless by screen printing, the resulting object is dried at 180° C. and is then baked at 850° C., and the insulating layer 222 is thereby formed. In this example, the insulating layer 222 with a layer thickness of 50 μm is formed on the first surface 221*g* of the substrate 221.

(3-3) Heat Generating Element 223

The heat generating element 223 is connected to a power supply electrode, which is not illustrated, power is distributed to the heat generating element 223 by the power supply connector 27 supplying power to the power supply electrode, and the heat generating element 223 generates heat in response to power distribution. The heat generating element 223 is obtained by printing a heat resistor paste obtained by mixing a conductive component (A), a glass component (B), and an organic binding component (C) on the insulating layer 222 and baking the heat resistor paste. If the heat resistor paste is baked, the organic binding component (C) is burnt and disappears, the components (A) and (B) remain, and the heat generating element 223 containing the conductive component and the glass component is thus formed. Here, silver-palladium (Ag·Pd), ruthenium oxide ($RuO_2$), or the like is used alone or in combination as the conductive component (A), and it is preferable to obtain a sheet resistance value of 0.1 [Ω/□] to 100 [kΩ/□]. Also, there may be no problem if other materials are contained in addition to (A) to (C) described above as long as the amounts are very small and properties of the present invention are not damaged. Here, it is necessary to select a material that is softened and melts at a temperature that is lower than the melting point of the substrate 221 and to select a material with heat resistance in view of the temperature in actual use, for the aforementioned heat resistor paste.

The heat generating element 223 in this example is formed by the heat generating element paste obtained by using silver-palladium (Ag·Pd) as a conductive component and additionally incorporating a glass component and an organic binding component. After the heat generating element paste is applied to the substrate 221 with the insulating layer 222 provided thereon by screen printing, the resulting object is dried at 180° C. and is then baked at 850° C., and the heat generating element 223 is formed on the side of the first surface 221*g* of the substrate 221. The heat generating element 223 after the baking has a thickness of 15 μm, a length of 220 mm, and a width of 1.1 mm.

(3-4) Power Supply Electrode and Power Conduction Pattern

The power supply electrode and the power conduction pattern are provided for the purpose of supplying power to the heat generating element 223. The power supply electrode and the power conduction pattern, which are not illustrated, contain silver (Ag), platinum (Pt), gold (Au), a silver-platinum (Ag·Pt) alloy, a silver-palladium (Ag·Pd) alloy, or the like as a main constituent. The power supply electrode and the power conduction pattern are formed by printing the paste obtained by mixing the conductive component (A), the glass component (B), and the organic binding component (C) on the substrate 221 with the insulating layer 222 provided thereon and baking it, similarly to the heat generating element paste.

(3-5) Protective Layer 224

The protective layer 224 is a layer that is provided on the insulating layer 222 to cover the heat generating element 223 to protect the heat generating element 223 and secure slidability with the film 23. As a material, glass or polyimide (PI) is preferably used in terms of heat resistance, and a heat conductive filler with an insulating property or the like may be incorporated as needed.

The protective layer 224 is formed on the insulating layer by a protective layer glass paste being applied to the heat generating element 223 by screen printing, drying the resulting object at 180° C., and baking it at 850° C. The layer thickness of the protective layer 224 in this example is 50

(4) Shape of Substrate 221

As illustrated in FIG. 6A, the substrate 221 in this example is a member that is longer in the longitudinal direction and is made of metal, and the insulating layer 222 and the heat generating element 223 are provided at a center-part planar portion 221*a*. In this example, the substrate 221 is long in the same direction as the longitudinal direction of the film 23. Also, the substrate 221 has a shape bent over the entire region in the longitudinal direction. Hereinafter, the shape of the substrate 221 of the heater 22 will be described in detail.

The substrate 221 is bent such that an end portion side in the transverse direction that is orthogonal to the longitudinal direction approaches the side of the pressurizing roller 30 in the thickness direction at the center-part planar portion 221*a* of the substrate 221. In addition, an end-side planar portion 221*b* that is substantially parallel with the center-part planar portion 221*a* is provided at both ends of the substrate 221 in the transverse direction such that it is located on the side closer to the pressurizing roller 30 (the side closer to the heat generating element 223) than the center-part planar portion 221*a* is. In this example, the substrate 221 is molded by drawing-press, and a drawing depth d1 of the substrate 221 corresponding to the amount of level difference between the center-part planar portion 221*a* and the end-side planar portion 221*b* is 50 μm.

The shape of the substrate 221 will be described in more detail. The substrate 221 includes four bent portions that are bent over the entire regions in the longitudinal direction. The substrate 221 includes a first bent portion 221*c* that is bent on the side of the pressurizing roller 30 on the side of one end in the transverse direction located on the upstream side in the conveying direction of the recording material P and a second bent portion 221*d* that is bent on the upstream side in the conveying direction on the side closer to the one end than the first bent portion. The substrate 221 further includes a third bent portion 221*e* that is bent on the side of the pressurizing roller 30 on the side of the other end, which is the side opposite to the one end, located on the downstream side in the conveying direction of the recording material P and a fourth bent portion 221*f* that is bent on the downstream side in the conveying direction on the side closer to the other end than the third bent portion. In this example, the end-side planar portion 221*b* includes the second bent portion 221*d* and the fourth bent portion 221*f*, and the second bent portion 221*d* and the fourth bent portion 221*f* have planes that are parallel with the center-part planar portion 221*a*. In other words, since the substrate is formed by bending a flat plate material a plurality of number of times, the center-part planar portion 221*a* and the end-side planar portion 221*b* are provided substantially parallel to each other with specific amounts of level difference.

A region on the center side including the center-part planar portion 221*a* of the first surface 221*g* on which the insulating layer 222 is provided is defined as a first region R1, a region on the side of one end portion with respect to the first region R1 is defined as a second region R2, and a region on the side of the other end with respect to the first region R1 is defined as a third region R3 in the transverse direction of the substrate 221. At this time, it is possible to state that the second region R2 includes the first bent portion 221*c* and the second bent portion 222*d*, and the third region R3 includes the third bent portion 221*e* and the fourth bent portion 221*f* instead in this example. In other words, the first region R1 of the substrate 221 is a plane, and the second region R2 and the third region R3 are bent from the first region R1. Also, each of the second region R2 and the third region R3 includes a part of the end-side planar portion 221*b*. A bending strength of the substrate 221 in the thickness direction is improved as compared with a simple flat plate shape by providing such a plurality of bent portions.

Note that the aforementioned bending does not always mean that the substrate is formed by performing bending processing such as drawing pressing on the plate material. For example, it is possible to obtain an effect of improving responsiveness to a decrease in amount of warpage and a change in temperature of the film, which will be described later, even with a configuration in which a substrate is provided by forming a similar shape by means such as casting or cutting. In other words, although the substrate is molded using drawing pressing as a working method by which it is possible to expect easiness of working and the effect of improving strength of the substrate due to plastic working in this example, the method of molding the substrate is not limited to plastic working.

(5) Effects and Advantages

In order to check effects and advantages of the present invention, an evaluation test including comparative examples was carried out. The amounts of warpage of the heaters, adjusted temperatures at which fixing was able to be achieved, and loadability were evaluated under conditions of this example and the comparative examples.

Figure 7A:
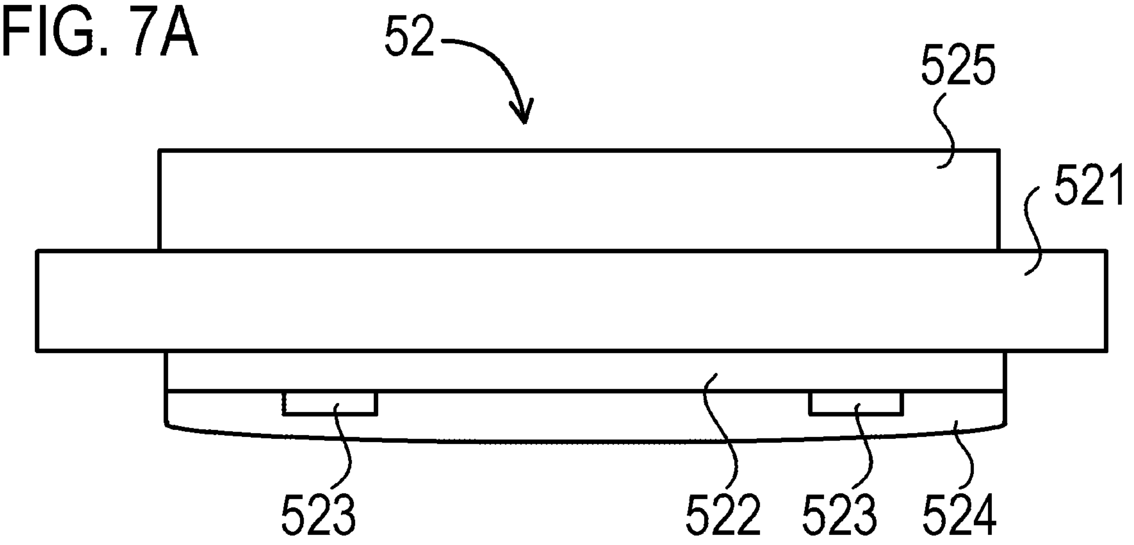
FIGS. 7A and 7B are schematic views of a heater according to a comparative example.
Figure 7B:
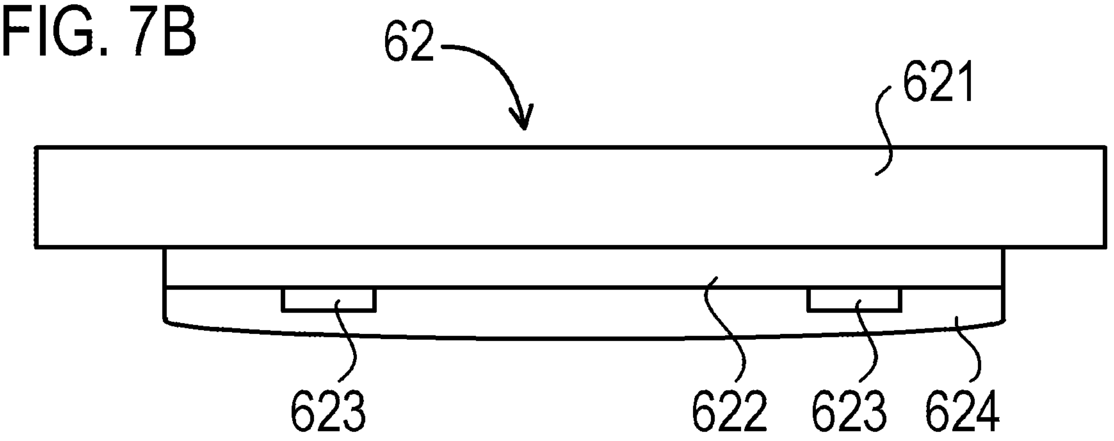

The evaluation test was carried out using three types of heaters in this example and two comparative examples. FIG. 7A is a schematic view illustrating a configuration of a heater 52 in Comparative Example 1, and FIG. 7B is a schematic view illustrating a configuration of a heater 62 in Comparative Example 2. In Comparative Example 1, a flat plate-shaped substrate 521 on which no molding working had been performed was included, an insulating layer 522, a heat generating element 523, and a protective layer 524 were provided on the front surface side of the substrate 521, and an insulating layer 525 of the same material as that of the insulating layer 522 was also provided on the rear surface side. In Comparative Example 2, a flat plate-shaped substrate 621 on which molding working had not been performed was included similarly to Comparative Example 1. In Comparative Example 2, an insulating layer 622 was provided only on the front surface side of the substrate similarly to this example, and a heat generating element 623 and a protective layer 624 were provided thereon. The other configurations such as the thicknesses and the lengths in the longitudinal direction of the substrates in Comparative Example 1 and Comparative Example 2 are similar to those in Example 1.

For measurement of the amounts of warpage of the heaters, the heaters were disposed on a horizontal platform such that the front surfaces of the substrates with the heat generating elements provided thereon became upper surfaces, and the heights of the projecting apexes at the center portions of the heaters in the longitudinal direction on the rear surface side from the platform were defined as the amounts of warpage. Since it is possible to assemble the heaters with the heater holders along the heater holders with satisfactory operability if the amounts of warpage were not more than 3 mm, the amounts of warpage within a range of 0 to 3 mm were evaluated as passing (OK) the test.

As a test for evaluating the adjusted temperature, the heaters were left in a stopped state in which standby temperature adjustment was not performed for about one hour, and 250 papers were fed in a single-sided feeding manner from a cold state. As a recording material in this test, Xerox Vitality (75 g/m$^2$, LTR) was used. A solid black pattern of printing a toner on the entire surface as a printing rate pattern was used to calculate the adjusted temperature. A lower adjusted temperature was better for the fixing device in terms of energy saving and power saving.

As a test for evaluating loadability, the heaters were left in a stopped state in which standby temperature adjustment was not performed for about one hour, and 250 papers were fed in a double-sided feeding manner from a cold state. As a recording material in this test, Xerox Vitality (75 g/m$^2$, LTR) was used. The loadability was evaluated on the basis of the number of pieces of recording material that could be loaded after the papers were fed to the discharge tray 11. The number of loadable pieces is affected by the degrees of curling of the recording material, and the amount of curling of the recording material increased while the number of loadable pieces decreased in heaters or fixing devices that gave excessive heat to the recording material.

Table 1 shows main configurations and results of evaluating the amounts of warpage and assembling properties when the heaters were molded, fixability, and loadability in this example and the comparative examples. The assembling properties was shown as OK when the amounts of warpage were not more than 3 mm and as NG otherwise.

TABLE 1

| | Total thickness of insulating layer (front surface side) and protective layer [μm] | Substrate drawing depth [μm] | Thickness of insulating layer (rear surface side) [μm] | Heater evaluation: Amount of warpage [mm] | Heater evaluation: Assembling property | Fixability and loadability evaluation: Adjusted temp. [° C.] | Fixability and loadability evaluation: Number of pieces of loadable recording material [pieces] |
|---|---|---|---|---|---|---|---|
| Example 1 | 100 | 50 | 0 | 2.8 | OK | 190 | 200 |
| Comparative Example 1 | 100 | 0 | 100 | 0.1 | OK | 200 | 50 |
| Comparative Example 2 | 100 | 0 | 0 | 11.0 | NG | 195 | 100 |

In Example 1, the amount of warpage of the heater 22 was 2.8 mm, and the assembling property was not problematic. Also, the adjusted temperature was 190° C., and the number of pieces of loadable recording material was 200 pieces.

In Comparative Example 1, the amount of warpage of the heater 52 was 0.1 mm. As a result, it was found that warpage was able to be curbed by the insulating layer 525 being provided on the surface on the side opposite to the surface on which the heat generating element 223 was formed thereon as well.

However, the adjusted temperature in Comparative Example 1 was 200° C., which was higher than that in Example 1, and the number of pieces of loadable recording material was 50 pieces, which was also a result that was smaller than that in Example 1. Since sensitivity of the thermistor 25 detecting a change in temperature of the film 23 was degraded due to an influence of a heat resistance of the insulating layer 525 in Comparative Example 1 as compared with Example 1, the adjusted temperature increased, the curling of the recording material also further increased, and the number of loadable pieces decreased. In other words, it was not possible to achieve a balance between both curbing of warpage of the heater and detection of a change in temperature of the film with satisfactory responsiveness in Comparative Example 1.

In Comparative Example 2, the amount of warpage of the heater 62 was 11 mm, and difficulty was found in the assembling property. Since the bending strength of the substrate in the thickness direction was enhanced by the substrate being bent in Example 1, the amount of warpage significantly decreased in Example 1 as compared with Comparative Example 2 in which the same layer configuration was included.

Also, the adjusted temperature in Comparative Example 2 was 195° C., and the number of pieces of loadable recording material was 100 pieces. Although the insulating layer was provided only on one surface of the substrate in both Comparative Example 2 and Example 1, the drawing depth d1 of 50 μm was formed in the substrate in Example 1, and the end portion of the substrate in the transverse direction was located closer to the inner circumferential surface of the film as compared with the substrate in Comparative Example 2. In other words, heat of the film 23 was transmitted to the substrate 221 not only via the protective layer 224, and the heat was easily transmitted to the substrate 221 directly from the film 23 in Example 1. Therefore, since it is possible to more sensitively sense a change in temperature of the film 23 in Example 1 than in Comparative Example 2, the adjusted temperature was lower, and the number of loadable pieces increased, in Example 1 than in Comparative Example 2.

As described above, it was possible to curb a decrease in adjusted temperature and curling of the recording material by detecting a change in temperature of the film with satisfactory responsiveness while curbing warpage generated when the heater was molded to such an extent that no problem occurs in assembling and to increase the number of loadable pieces according to the present invention. In other words, it was possible to curb warpage of the heater without providing the insulating layer on both surfaces of the substrate by bending the substrate such that the side of the end portion of the substrate in the transverse direction approached the side of the pressurizing roller (the side of the heat generating element) in the thickness direction. Furthermore, one side of the substrate was not provided with the insulating layer, it is thus possible to detect a change in temperature of the film with satisfactory responsiveness.

The above effects and advantages of the present invention are more useful in a high-speed machine, in particular. In a case where a toner printing rate of a graphic pattern or the like is high, for example, the temperature of the film significantly drops when the recording material passes through the nip portion. If responsiveness to a change in temperature of the film is poor at this time, the recording material falls out of the nip portion N before a decrease in temperature of the film is fed back to power distribution control of the heater. Thus, in a case in which the responsiveness to a change in temperature of the film is poor, it is necessary to set a high adjusted temperature that satisfies fixability under a condition that a decrease in temperature of the film is large. On the other hand, at the time of second side printing performed after paper passes through the nip portion and the nip portion is warmed at the time of the first side printing at the time of double-sided printing, the amount of decrease in temperature of the film is relatively smaller than that of the first side. Therefore, if the adjusted temperature is high, there is a concern that loadability may be degraded due to an excessive increase in amount of heat applied to the recording material by the nip portion (excessive temperature rise of the recording medium) and an increase in amount of curling of the recording material. According to the present invention, it is possible to detect a change in temperature of the film with satisfactory responsiveness and thereby to realize a decrease in adjusted temperature and curbing of curling of the recording material.

Figure 8:
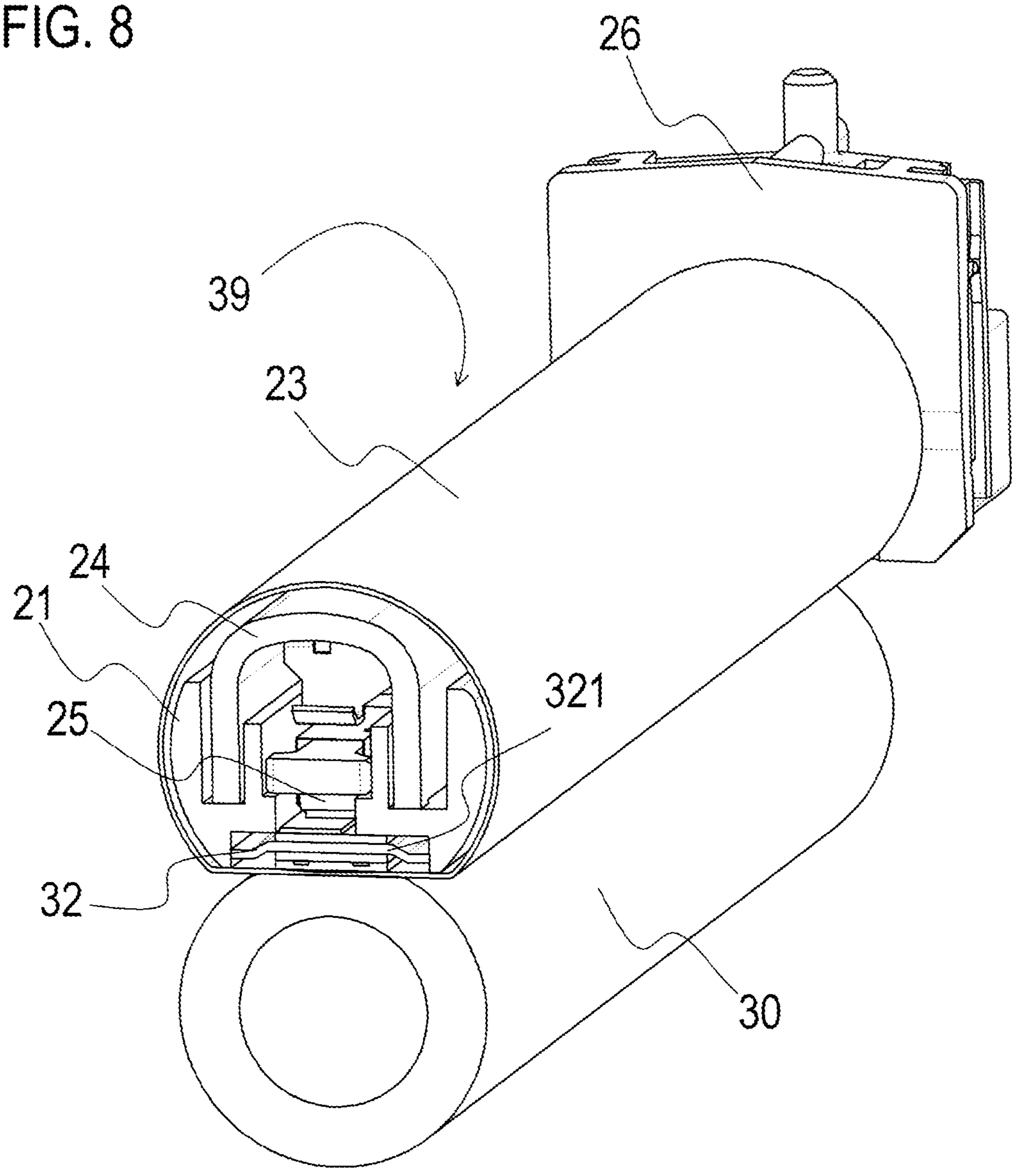
FIG. 8 is a sectional perspective view of a fixing device according to Modification Example 1.
Figure 9A:
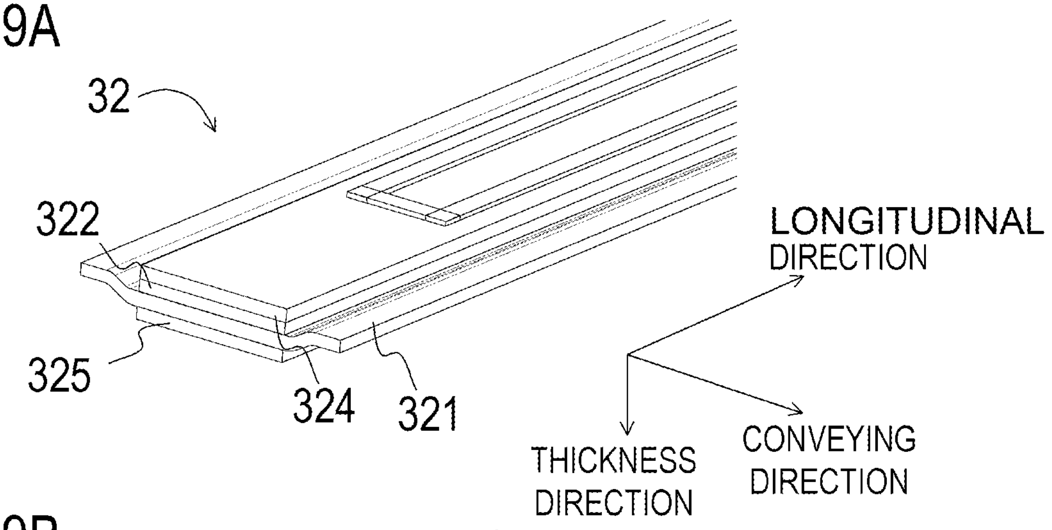
FIGS. 9A and 9B are respectively a perspective view of a heater and a sectional view of the fixing device according to Modification Example 1.
Figure 9B:
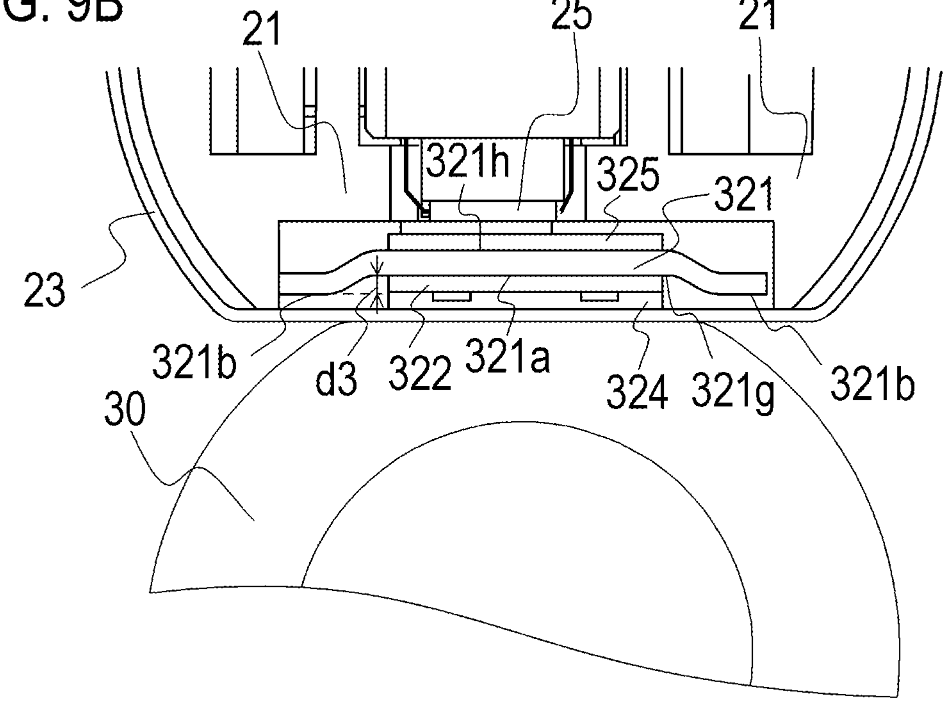

Next, Modification Example 1 will be described as a modification example of Example 1 with reference to FIGS. 8 and FIGS. 9A and 9B. FIG. 8 is a perspective view illustrating a section of a fixing device 39 provided with a heater 32 according to Modification Example 1. FIG. 9A is a perspective view illustrating a substrate 321 of the heater 32, and FIG. 9B is a sectional view of the fixing device 39 illustrating a part near the heater 32. The same reference signs will be applied to configurations that are similar to those in Example 1, and description thereof will be omitted in Modification Example 1. Modification Example 1 is characterized in that the amount of warpage of the heater 32 is curbed as compared with the configuration in Example 1, as a configuration in which an insulating layer 325 is provided on the side of a second surface 321*h* of the substrate 321 without damaging temperature responsiveness of the thermistor 25. In other words, an insulating layer 322 is provided as a first insulating layer on a first surface 321*g* of the substrate 321, and an insulating layer 325 is provided as a second insulating layer on a second surface 321*h* in Modification Example 1.

In Modification Example 1, the thickness of the insulating layer 325 on the side of the second surface 321*h* is 50 and the drawing depth d3 of the substrate 321 corresponding to the amount of level difference between a center-part planar portion 321*a* and an end-side planar portion 321*b* is 50 The total thickness of the insulating layer 322 and the protective layer 324 formed on the side of the first surface 321*g* is set to 100 μm similarly to Example 1.

Table 2 shows main configurations in this example, a comparative example, and Modification Example 1, and results of evaluating the amounts of warpage and assembling properties at the time of molding the heaters, fixation, and loadability. As for the assembling properties, the amounts of warpage of not more than 3 mm were described as OK, and the others were described as NG in the table.

TABLE 2

| | Total thickness of insulating layer (front surface side) and protective layer [μm] | Substrate drawing depth [μm] | Thickness of insulating layer (rear surface side) [μm] | Heater evaluation: Amount of warpage [mm] | Heater evaluation: Assembling property | Fixability and loadability evaluation: Adjusted temp. [° C.] | Fixability and loadability evaluation: Number of pieces of loadable recording material [pieces] |
|---|---|---|---|---|---|---|---|
| Example 1 | 100 | 50 | 0 | 2.8 | OK | 190 | 200 |
| Comparative Example 1 | 100 | 0 | 100 | 0.1 | OK | 200 | 50 |
| Comparative Example 2 | 100 | 0 | 0 | 11.0 | NG | 195 | 100 |
| Modification Example 1 | 100 | 50 | 50 | 1.4 | OK | 195 | 100 |

As shown in Table 2, the adjusted temperature was 195° C. because the insulating layer 325 was provided on the side of the second surface 321*h* in this modification example, and the number of pieces of loaded recording material decreased from 200 to 100 due to degradation of the fixability by the amount corresponding to 5° C. from the configuration in Example 1. On the other hand, the amount of warpage of the heater 32 in Modification Example 1 was 1.4 mm, and the warpage decreased at the time of molding of the heater as compared with Example 1. This is because the insulating layer was provided only on one surface of the substrate in Example 1, while in Modification Example 1, the insulating layer 325 was provided on the side of the second surface 321*h* and the insulating layers were provided on both the first surface 321*g* and the second surface 321*h* of the substrate 321. In other words, the configuration in which the insulating layers are provided on both surfaces of the substrate as in Modification Example 1 is advantageous from the viewpoint of achieving both the fixability and the amount of warpage of the heater in the configuration required to have assembling precision, in particular.

Also, although both the upstream side and the downstream side of the substrate in the conveying direction were bent to approach the inner circumferential surface of the film in this example, it is also possible to obtain the effect of curbing warpage of a flat substrate in the related art even with a configuration in which any one side of them is bent in another modification example. Furthermore, although the end-side planar portions were provided at both ends of the substrate in the transverse direction in this example, a modification example in which the substrate includes only two bent portions such that both ends of the substrate in the transverse direction extend to be substantially parallel with the thickness direction without having the end-side planar portions for saving a space of the apparatus is also conceivable.

Figure 10:
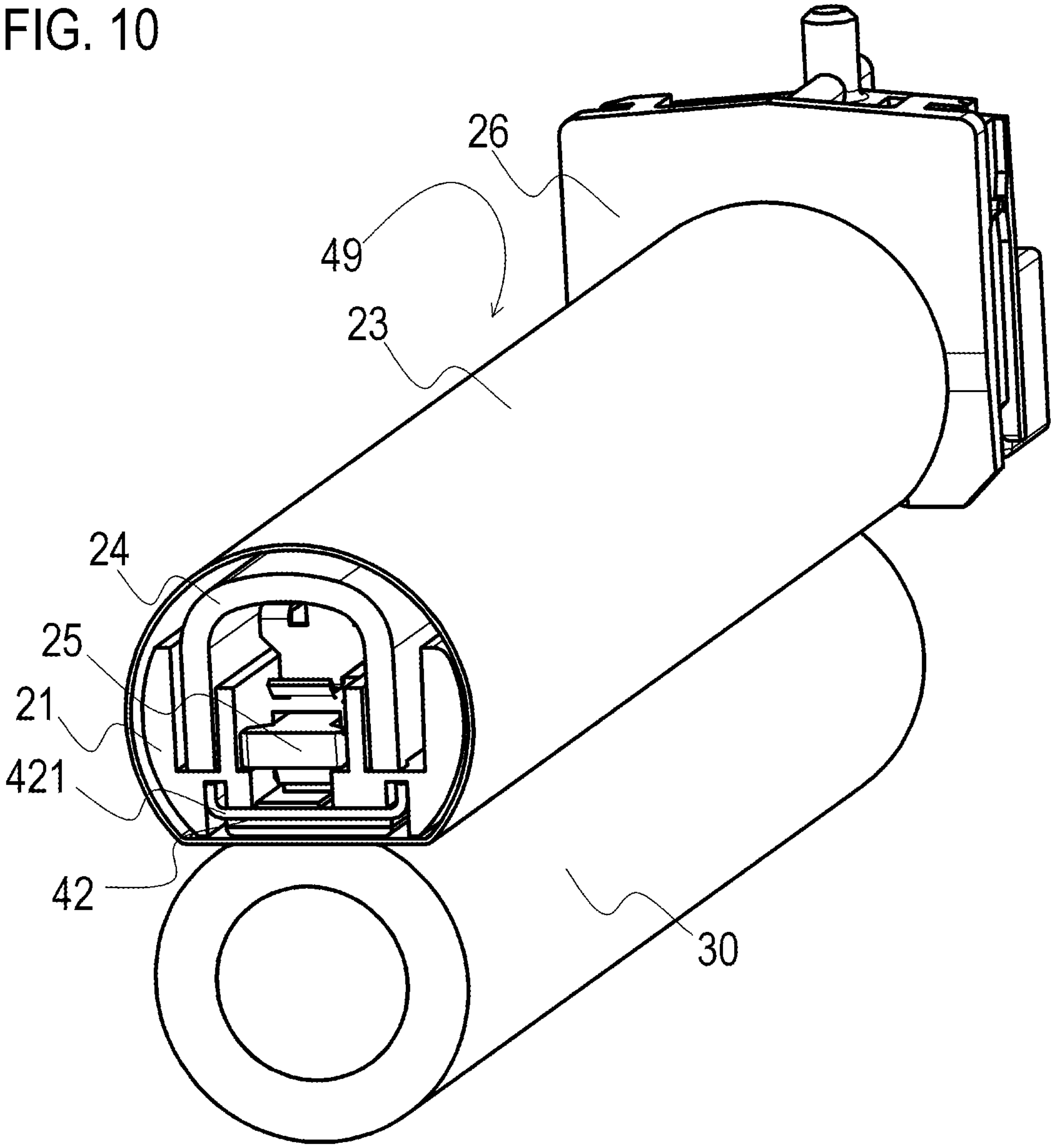
FIG. 10 is a sectional perspective view of a fixing device according to Modification Example 2.
Figure 11A:
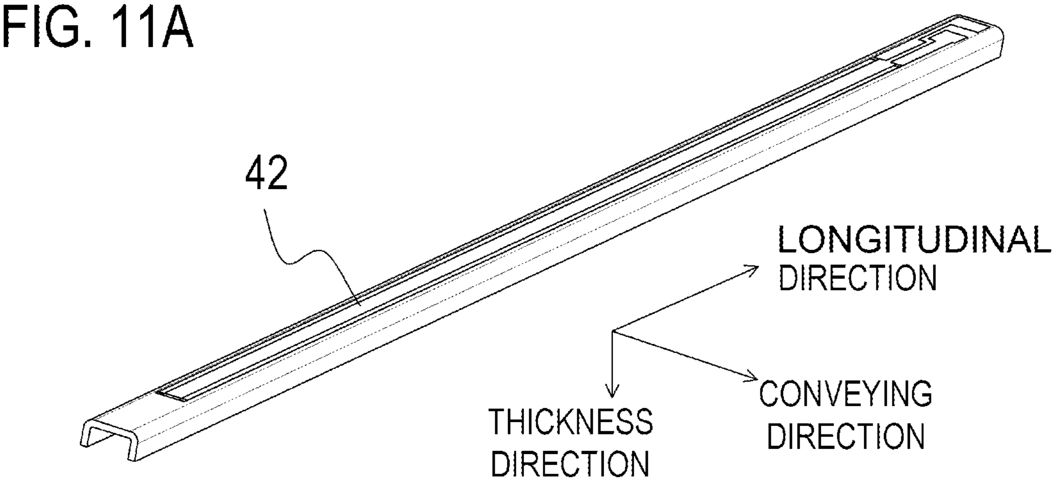
FIGS. 11A and 11B are respectively a perspective view of a heater and a sectional view of the fixing device according to Modification Example 2.
Figure 11B:
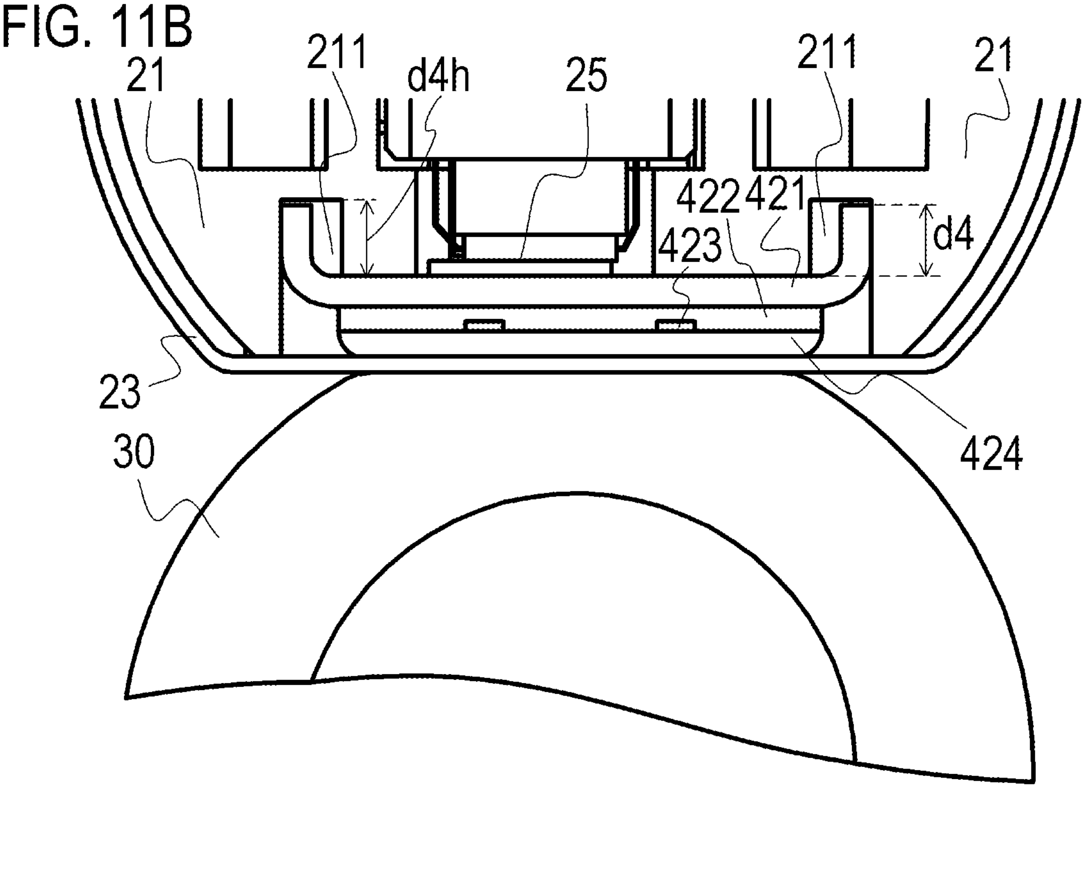

Next, Modification Example 2 will be described as a modification example of Example 1 with reference to FIG. 10 and FIGS. 11A and 11B. FIG. 10 is a perspective view illustrating a section of a fixing device 49 provided with a heater 42 according to Modification Example 2. FIG. 11A is a perspective view illustrating a substrate 421 of a heater 42, and FIG. 11B is a sectional view of the fixing device 49 illustrating a part near the heater 42. The same reference signs will be applied to configurations in Modification Example 2 that are similar to those in Example 1, and description thereof will be omitted. The fixing device 49 in Modification Example 2 is different from that in Example 1 in that the folding direction in the short side direction that is orthogonal to the longitudinal direction of the substrate 421 of the heater is opposite to that in Example 1 and the substrate 421 is configured to be folded on the side of the thermistor 25. In other words, the substrate 421 is folded such that the end of the substrate 421 in the transverse direction is separated from the pressurizing roller 30 in Modification Example 2.

As illustrated in FIG. 11A, the end portion of the substrate 421 in the transverse direction is bent in the direction on the side opposite to the surface on which the heat generating element 423 is provided in the thickness direction of the substrate 421. In other words, the end portion of the substrate 421 in the transverse direction is bent in the direction away from the insulating layer 422 and the protective layer 424. Also, the substrate 421 is configured such that the end-side planar portions are not included and the substrate includes only two bent portions such that both ends of the substrate in the transverse direction extend to be substantially parallel with the thickness direction, and space saving for the fixing device 49 is realized. The bent portions extend over the entire range of the substrate 421 in the longitudinal direction, and the substrate 421 in this example is molded by drawing pressing working. For Modification Example 2, the assembling properties, fixability, and loadability of the heater in each of a case where the folding depth d4 of the substrate 421 was set to 50 μm and a case where the folding depth d4 of the substrate 421 was set to 150 μm were evaluated.

Also, as illustrated in FIG. 11B, the bent portion of the substrate 421 on the side of the thermistor 25 is disposed in a notch groove 211 provided in a heater holder 21. The notch groove 211 of the heater holder 21 is formed over the entire range in the longitudinal direction, and a groove depth d4*h* is set in consideration of a tolerance and an influence of thermal expansion of the folded portions of the substrate 421. Specifically, the groove depth d4*h* is set to 150 μm in a case where the folding depth d4 of the substrate 421 is 50 μm, and the groove depth d4*h* is set to 250 μm in a case in where the folding depth d4 is 150 μm. The groove depth d4*h* of the notch groove is set to ensure that the groove depth d4*h* is larger than the folding depth d4 and the heater 42 abuts the holding surface of the heater holder 21 in consideration of a manufacturing tolerance and the like. Also, the groove depth d4*h* of the notch groove is set within a range in which there are no influences such as deflection or the like generated when the heater holder 21 is pressurized by the pressurizing roller 30.

Table 3 shows main configurations in this example, a comparative example, and Modification Example 2, and results of evaluating the amounts of warpage and assembling properties at the time of molding the heaters, fixation, and loadability. As for the assembling properties, the amounts of warpage of not more than 3 mm were described as OK, and the others were described as NG in the table.

TABLE 3

| | Total thickness of insulating layer (front surface side) and protective layer [μm] | Substrate drawing/ folding depth [μm] | Thickness of insulating layer (rear surface side) [μm] | Substrate folding direction | Heater evaluation: Amount of warpage [mm] | Heater evaluation: Assembling property | Fixability and loadability evaluation: Adjusted temp. [° C.] | Fixability and loadability evaluation: Number of pieces of loadable recording material [pieces] |
|---|---|---|---|---|---|---|---|---|
| Example 1 | 100 | 50 | 0 | film 23 side | 2.8 | OK | 190 | 200 |
| Modification Example 2 | 100 | 50 | 0 | Thermistor 25 side | 2.8 | OK | 195 | 100 |
| | | 150 | 0 | Thermistor 25 side | 0.8 | OK | 195 | 100 |
| Comparative Example 1 | 100 | 0 | 100 | — | 0.1 | OK | 200 | 50 |
| Comparative Example 2 | 100 | 0 | 0 | — | 11.0 | NG | 195 | 100 |

As shown in Table 3, the amount of warpage of the heater was 2.8 mm in a case where the folding depth d4 of the substrate 421 was 50 μm, and the amount of warpage of the heater was 0.8 mm in a case where the folding depth d4 of the substrate 421 was 150 μm in Modification Example 2. In other words, a result that the amount of warpage of the heater decreased as the folding depth d4 of the substrate 421 increased was obtained. Also, in regard to the result of evaluating fixability and loadability, the adjusted temperature was 195° C. regardless of the folding depth d4 of the substrate 421, and the number of pieces of loaded recording material was 100, which was the result that an improvement by 5° C. was achieved as compared with Comparative Example 1. On the other hand, the reason that the adjusted temperature was raised by 5° C. in Modification Example 2 as compared with the configuration in Example 1 was because the effect that a change in temperature of the film 23 was likely to be transmitted directly to the substrate 421 was reduced due to the change in folding direction of the substrate 321 to the side of the thermistor 25.

As described above, it is possible to reduce the amount of warpage of the heater at the time of molding of the heater 42 by increasing the folding depth d4 of the substrate 421, and an improvement of the assembling property is expected. Also, it is possible to detect a change in temperature of the film with satisfactory responsiveness by the insulating glass layer being not provided on the side opposite to the surface on which the heat generating element 423 is provided similarly to Example 1 and thereby to lower the adjusted temperature and to curb curling of the recording material.

Example 2

Next, Example 2 according to the present invention will be described. A fixing device 79 in Example 2 is different from that in Example 1 in that both end portions of a substrate of a heater in the transverse direction abut an inner circumferential surface of a film. Since configurations that are similar to those in Example 1 are employed for other configuration in an image forming apparatus and a fixing device in Example 2, similar reference signs will be applied, and description thereof will be omitted. Hereinafter, characteristic configurations in Example 2 will be described in detail.

Figure 12:
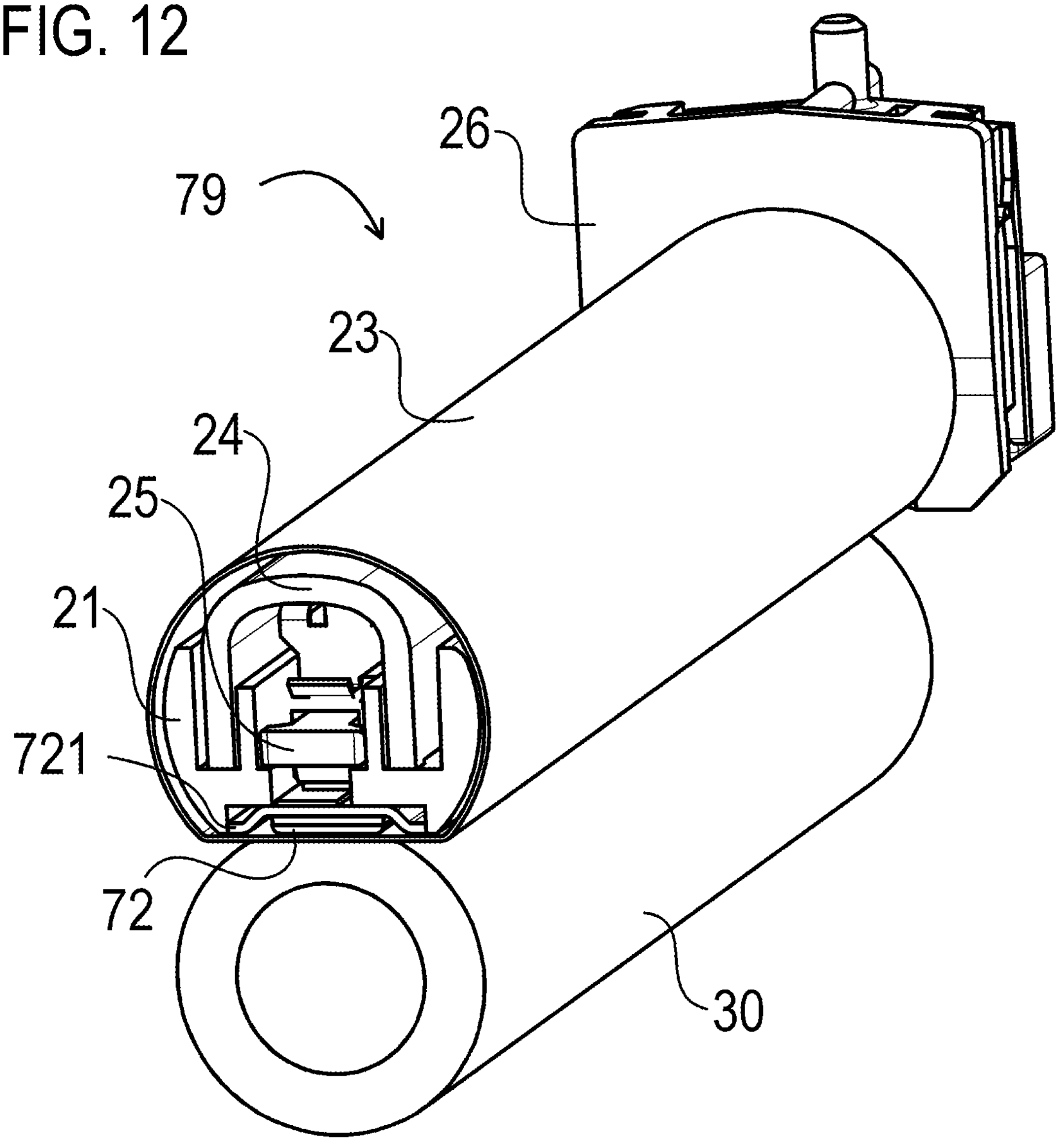
FIG. 12 is a sectional perspective view of the fixing device according to Example 2.
Figure 13A:
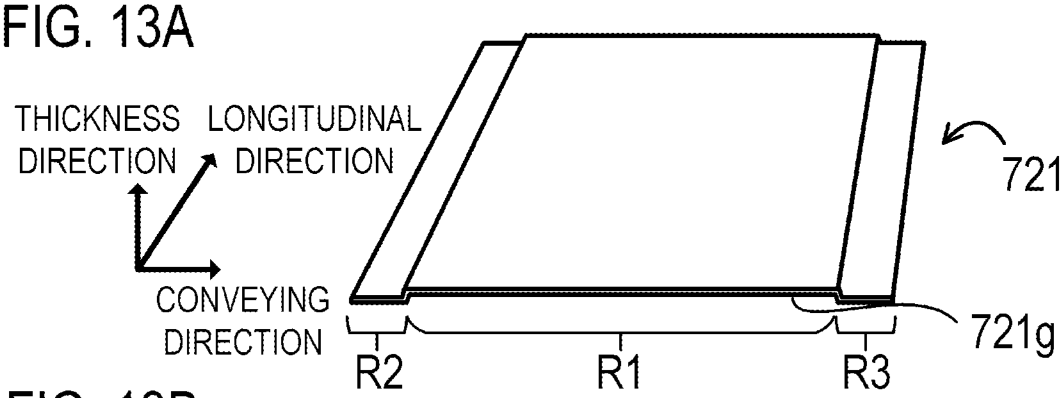
FIGS. 13A and 13B are respectively a perspective view of a substrate and a sectional view of the fixing device according to Example 2.
Figure 13B:
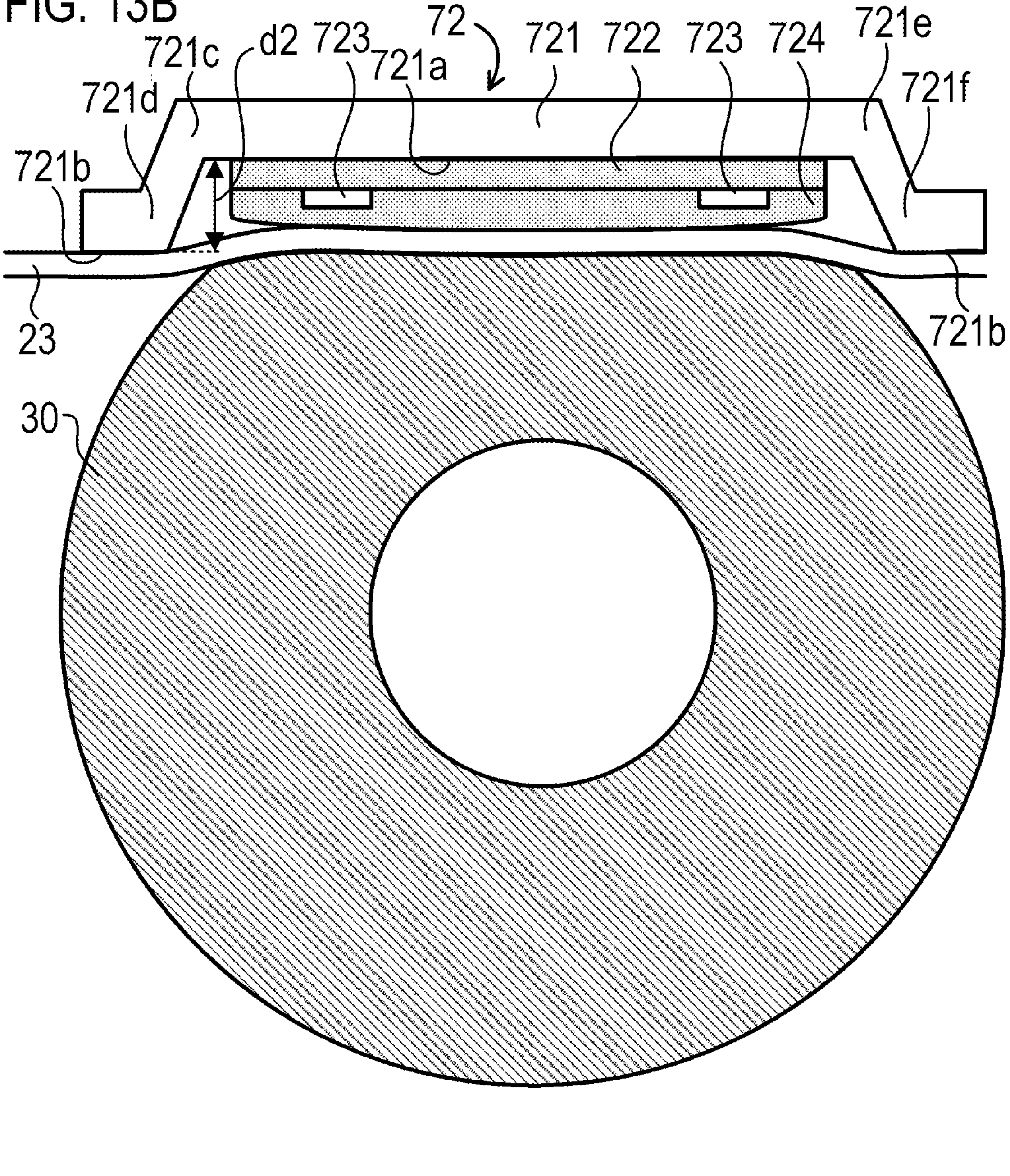

FIG. 12 is a perspective view illustrating a section of the fixing device 79 provided with a heater 72 in this example. FIG. 13A is a perspective view illustrating a substrate 721 of the heater 72, and FIG. 13B is a sectional view of the fixing device 79 illustrating a part near the heater 72.

The heater 72 includes a thin and long plate-shaped substrate 721 containing metal as a main material, a heat generating element 723 that generates heat in response to power distribution, an insulating layer 722 that insulates the heat generating element 723 from the substrate 721, and a protective layer 724 that protects the heat generating element 723 in this example as well.

As illustrated in FIG. 13A, the substrate 721 in this example is a member that is longer in the longitudinal direction and is made of metal and includes the insulating layer 722 and the heat generating element 723 provided at a center-part planar portion 721*a*. An end portion side of the substrate 721 in the transverse direction that is orthogonal to the longitudinal direction is bent to approach the side of the pressurizing roller 30 in the thickness direction of the substrate 721. Also, end-side planar portions 721*b* that are substantially parallel with the center-part planar portion 721*a* are provided at both ends of the substrate 721 in the transverse direction to be located on the side of the pressurizing roller 30 (the side of the heat generating element 723). Also, the substrate 721 also include a plurality of bent portions 721*c* to 721*f* formed over the entire range in the longitudinal direction. In this example, the substrate 721 is molded by drawing pressing working, and a drawing depth d2 of the substrate 721 that is the amount of level difference between the center-part planar portion 721*a* and the end-side planar portions 721*b* is 150 μm.

In the transverse direction of the substrate 721, a region on the center side including the center-part planar portion 721*a* of a first surface 721*g* on which the insulating layer 722 is provided is defined as a first region R1, a region on one end portion side with respect to the first region R1 is defined as a second region R2, and a region on the other end portion side with respect to the first region R1 is defined as a third region R3. At this time, it is possible to state that the second region R2 includes the first bent portion 721*c* and the second bent portion 722*d* while the third region R3 includes the third bent portion 721*e* and the fourth bent portion 721*f* instead in this example. In other words, the first region R1 of the substrate 721 is a plane, and the second region R2 and the third region R3 are bent from the first region R1. Also, each of the second region R2 and the third region R3 includes a part of the end-side planar portion 721*b*.

As described above, the drawing depth in this example is set to be larger than that in Example 1, and the drawing depth d2 is larger than the total thickness of the insulating layer 722 and the protective layer 724. Therefore, the end-side planar portions 721*b* of the substrate 721 of the heater 72 are configured to project on the side closer to the pressurizing roller 30 than the protective layer 724 in the thickness direction. In other words, the fixing device 79 in this example is different from that in Example 1 in that the end-side planar portions 721*b* provided at the end portions of the substrate 721 in the transverse direction abut the inner surface of the film 23. In the fixing device 79, the film 23 slides against the protective layer 724 and the substrate 721 of the heater 72 and the heater holder 21.

The test for evaluating the amount of warpage of the heater, fixability, and the loadability performed in Example 1 and the comparative examples was carried out for this example as well. Moreover, the lifetimes of the fixing devices were additionally evaluated for comparison between Example 1 and Example 2. For the lifetimes of the fixing devices, a paper feeding duration test was performed on Xerox Vitality (75 g/m$^2$, LTR) in an environment at an atmosphere temperature of 33° C. and a humidity of 80%, and the evaluation was performed on the basis of the number of fed papers until JAM due to a conveyance failure occurred in a case of intermittent paper feeding.

Table 4 shows main configurations in this example and Example 1, and results of evaluating the amounts of warpage and assembling properties at the time of molding the heaters, fixation, and loadability, and lifetimes of the fixing devices. As for the assembling properties, the amounts of warpage of not more than 3 mm were described as OK, and the others were described as NG in the table.

bending strength of the substrate was more excellent in Example 2. In other words, a larger drawing depth of the substrate is better to curb warpage of the heater.

Also, the adjusted temperature was lowered, and the number of pieces of recording material that could be loaded increased in Example 2 as compared with Example 1. This is because the substrate 721 in Example 2 abuts the inner circumferential surface of the film 23 at the end-side planar portions 721*b* and it is thus possible to more sensitively sense a change in temperature of the film 23 in Example 2 than in Example 1. In other words, the substrate of the heater located closer to the inner circumferential surface of the film is better in order to lower the adjusted temperature and to increase the number of pieces of recording material that can be loaded.

On the other hand, the lifetime of the fixing device in Example 2 was inferior to the result of Example 1. This is because the film 23 rotates while sliding against the substrate 721 in the fixing device 79 in Example 2. If paper feeding is repeatedly performed in the state in which the film is sliding against the substrate, the inner circumferential surface of the film is gradually scraped, and the rotation resistance of the film increases due to the scraping of the inner circumferential surface of the film. In other words, since the rotation resistance of the film 23 increased and the ability of conveying the recording material was degraded in Example 2, JAM due to a conveyance failure occurred with a smaller number of pieces of recording material than in Example 1, and the lifetime of the fixing device was shortened. In other words, a configuration in which the substrate of the heater does not come into contact with the film is preferable in order to improve the lifetime of the fixing device.

If the configuration in which the substrate of the heater is caused to abut the inner circumferential surface of the film as in Example 2 is employed as described above, it is possible to expect an improvement in effect of curbing warpage of the heater, lowering of the adjusted temperature, and an effect of increasing the number of pieces of recording material that can be loaded instead of shortening of the lifetime of the fixing device as compared with a configuration in which the substrate is not caused to abut the inner circumferential surface of the film. Such a configuration of

TABLE 4

| | Total thickness of insulating layer (front surface side) and protective layer [μm] | Substrate drawing depth [μm] | Heater evaluation: Amount of warpage [mm] | Heater evaluation: Assembling property | Fixability and loadability evaluation: Adjusted temp. [° C.] | Fixability and loadability evaluation: Number of pieces of loadable recording material [pieces] | Lifetime of fixing device [prints] |
|---|---|---|---|---|---|---|---|
| Example 1 | 100 | 50 | 2.8 | OK | 190 | 200 | 200,000 |
| Example 2 | 100 | 150 | 0.8 | OK | 180 | 250 | 100,000 |

In Example 2, the amount of warpage of the heater 72 was 0.8 mm, and the assembling property was not problematic. Also, the adjusted temperature was 180° C., the number of pieces of recording material that could be loaded was 250 pieces, and the lifetime of the fixing device was 100 thousand prints.

In Example 2, the amount of warpage of the heater significantly decreased as compared with Example 1. This is because the drawing depth of the substrate is larger and the the fixing device is suitable for a printer or the like for individuals for which a long lifetime of the product is not regarded as being important, for example.

Figure 14A:
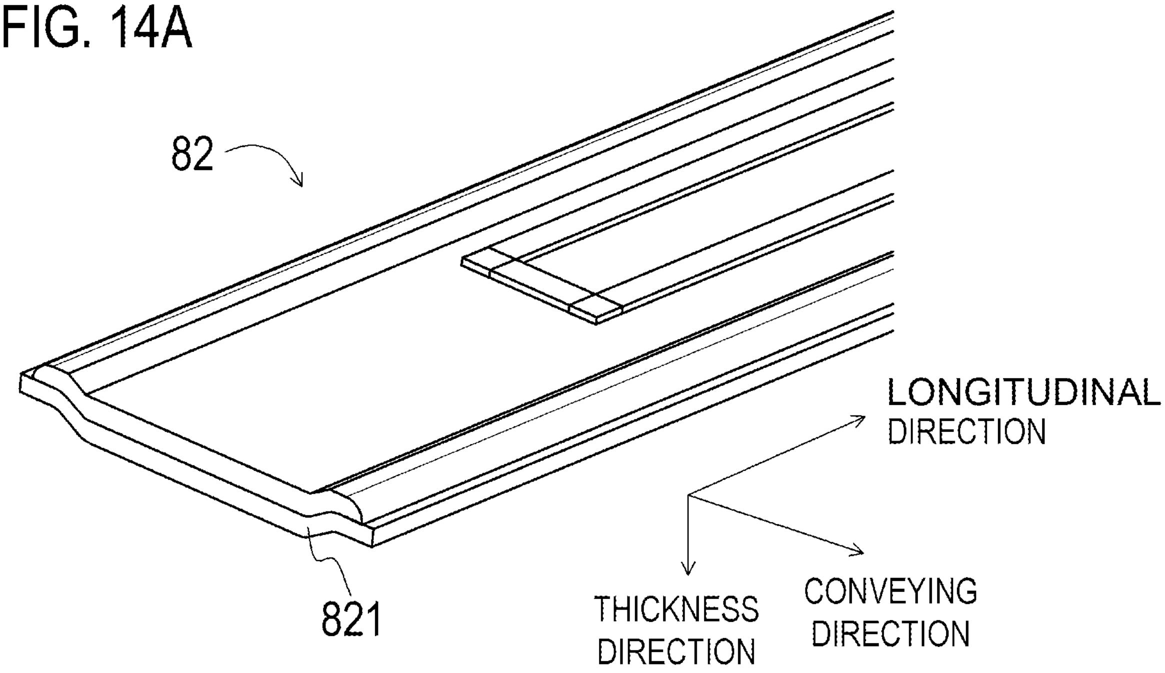
FIGS. 14A and 14B are respectively a perspective view of a heater and a sectional view of a fixing device according to Modification Example 3.
Figure 14B:
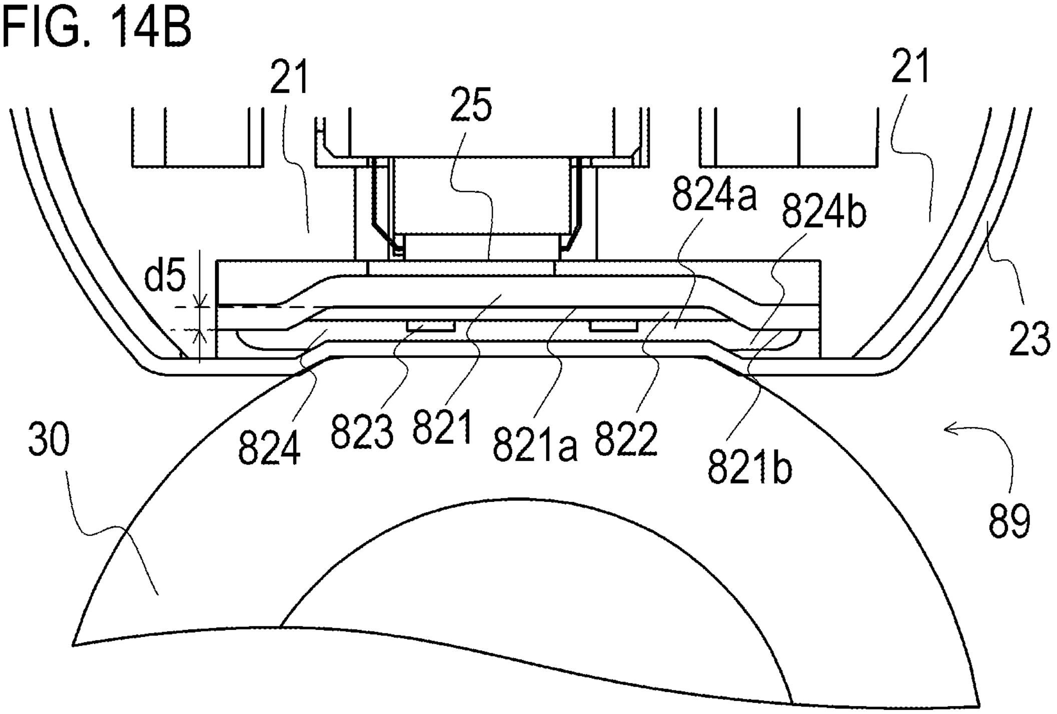

Modification Example 3 will be described as a modification example of Example 2 with reference to FIGS. 14A and 14B. FIG. 14A is a perspective view illustrating a substrate 821 of a heater 82 according to Modification Example 3, and FIG. 14B is a sectional view of a fixing device 89 illustrating a part near the heater 82. The same reference signs will be applied to configurations in Modification Example 3 that are similar to those in Example 2, and description thereof will be omitted.

In Modification Example 3, the drawing depth d5 of the substrate 821 which is the amount of level difference between the center-part planar portion 821*a* and the end-side planar portions 821*b* is set to 100 μm. Also, slidability of the heater 82 and the film 23 is improved by forming the protective layer 824 to cover the end-side planar portions 821*b* as well in addition to the center-part planar portion 821*a* of the substrate 821. At the end-side planar portions 821*b* of the substrate 821, the protective layer 824 is provided directly on the substrate 821, and the insulating layer 822 does not intervene between the substrate 821 and the protective layer 824. In other words, a center portion 824*a* of the protective layer 824 is in contact with the insulating layer 822, and an end portion 824*b* is in contact with the substrate 821. In the configuration in Modification Example 3, the thickness of the end portion 824*b* of the protective layer 824 covering the end-side planar portions 821*b* of the substrate 821 is set to 50 μm, and the height from the center-part planar portion 821*a* to the end portion 824*b* is set to be the same value as the substrate drawing depth in Example 2.

Table 5 shows main configurations in Examples 1 and 2 and Modification Example 3, and results of evaluating the amounts of warpage and assembling properties at the time of molding the heaters, fixation, and loadability, and lifetimes of the fixing devices. As for the assembling properties, the amounts of warpage of not more than 3 mm were described as OK, and the others were described as NG in the table.

improving the lifetime of the fixing device instead of slight reduction of the number of pieces of recording material that can be loaded as compared with Example 2 by employing the heater configuration as in Modification Example 3.

Figure 15A:
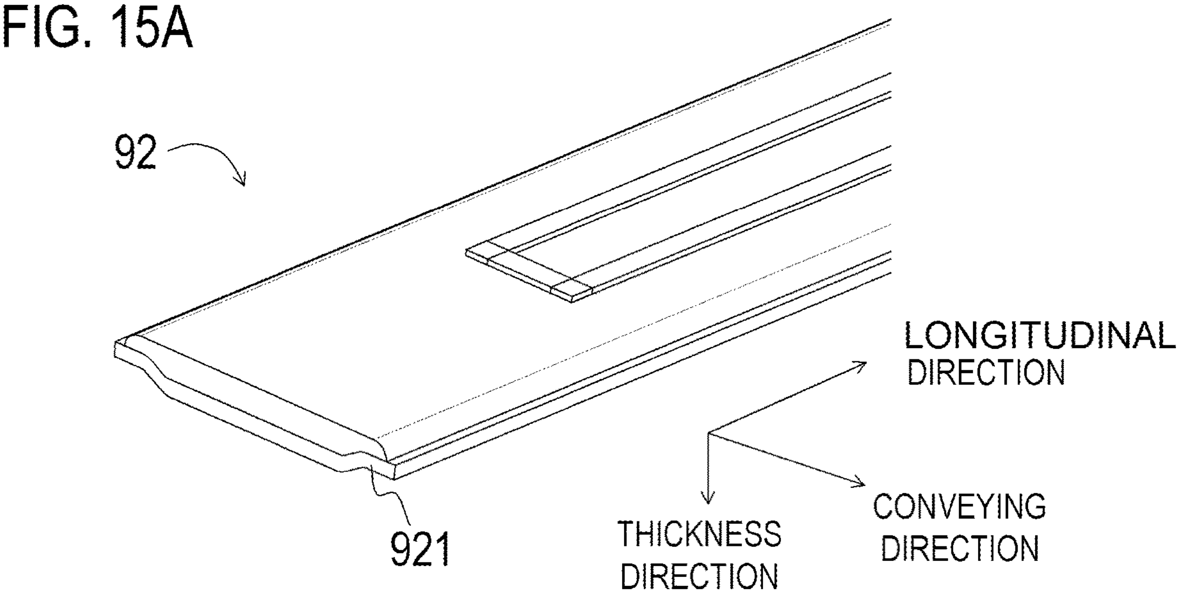
FIGS. 15A and 15B are respectively a perspective view of a heater and a sectional view of a fixing device according to Modification Example 4.
Figure 15B:
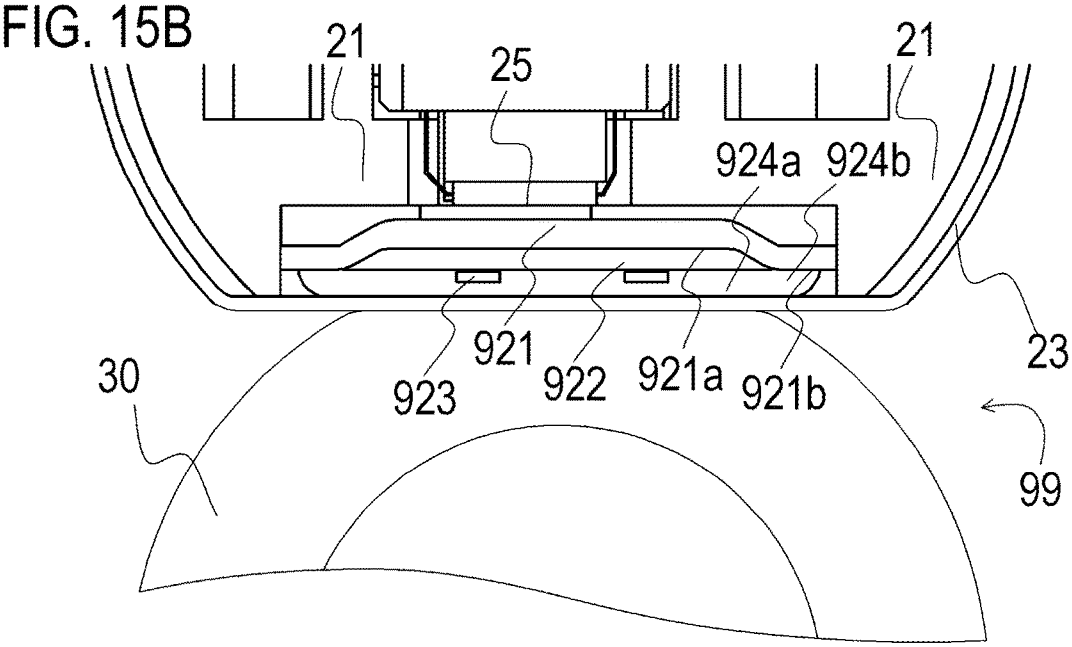

Next, Modification Example 4 will be described as a modification example of Example 2 with reference to FIGS. 15A and 15B. FIG. 15A is a perspective view illustrating a substrate 921 of a heater 92 according to Modification Example 4, and FIG. 15B is a sectional view of a fixing device 99 illustrated a part near the heater 92. The same reference signs will be applied to configurations in Modification Example 4 that are similar to those in Example 2, and description thereof will be omitted. Modification Example 4 is configured by changing the thicknesses of an insulating layer 922 and a protective layer 924 from Modification Example 3.

Modification Example 4 is configured such that the surface shape of the protective layer 924 abutting an inner surface of the film 23 is one plane by adjusting the thicknesses of the insulating layer 922 and the protective layer 924 formed on a center-part planar portion 921*a* and end-side planar portions 921*b* of a substrate 921. In other words, the thickness of the protective layer 924 is substantially the same at a center portion 924*a* and end portions 924*b* in Modification Example 4. It is possible to apply the present invention to a fixing configuration requiring a wider nipping width such as a high-speed machine by employing a heater shape with the protective layer 924 substantially on a plane.

Also, working to improve slidability, such as alumite treatment or release agent application, may be performed on the surface of the substrate in order to extend the lifetime of

TABLE 5

| | Total thickness of insulating layer (front surface side) and protective layer [μm] | Substrate drawing depth [μm] | Thickness of protective layer on end portion planar portion [μm] | Thickness of insulating layer (rear surface side) [μm] | Heater evaluation: Amount of warpage [mm] | Heater evaluation: Assembling property | Fixability and loadability evaluation: Adjusted temp. [° C.] | Fixability and loadability evaluation: Number of pieces of loadable recording material [pieces] | Lifetime of fixing device [prints] |
|---|---|---|---|---|---|---|---|---|---|
| Example 1 | 100 | 50 | 0 | 0 | 2.8 | OK | 190 | 200 | 200,000 |
| Example 2 | 100 | 150 | 0 | 0 | 0.8 | OK | 180 | 250 | 100,000 |
| Modification Example 3 | 100 | 100 | 50 | 0 | 1.4 | OK | 185 | 225 | 200,000 |

Since the amount of warpage of the heater in Modification Example 3 was 1.4 mm. Although the amount of warpage slightly increased as compared with the configuration in Example 2 since the drawing depth d5 in Modification Example 3 was 100 μm and the drawing depth d5 decreased by 50 μm as compared with the configuration in Example 2, the result showed that the assembling property was not problematic. Also, the protective layer 824 was also provided at the end-side planar portions 821*b* of the substrate 821, and the lifetime of the fixing device was improved from 100 thousand prints in Example 2 to 200 thousand prints due to the effect of improving slidability between the heater 82 and the film 23. On the other hand, the adjusted temperature was 185° C. which was higher than 180° C. in Example 2 by 5° C. due to the protective layer 824 on the end-side planar portions 821*b* inhibiting heat transmission, and the number of pieces of recording material that could be loaded slightly degraded from 250 pieces to 225 pieces.

As described above, it is possible to obtain the effect of curbing warpage of the heater and to expect the effect of the fixing device in yet another modification example of a configuration in which the substrate of the heater is caused to abut the inner circumferential surface of the film.

Example 3

Next, Example 3 according to the present invention will be described with reference to FIG. 16 and FIGS. 17A and 17B. This example is characterized in that a heat dissipating member 81 is provided between a heater 102 and a film 23 to dissipate and uniformize temperature distribution of the amount of heat generation generated by a heat generating element of the heater 102. Since configurations that are similar to those in Example 1 are employed for the other configurations of an image forming apparatus and a fixing device in Example 3, description thereof will be omitted. Hereinafter, characteristic configurations in Example 3 will be described in detail.

Figure 16:
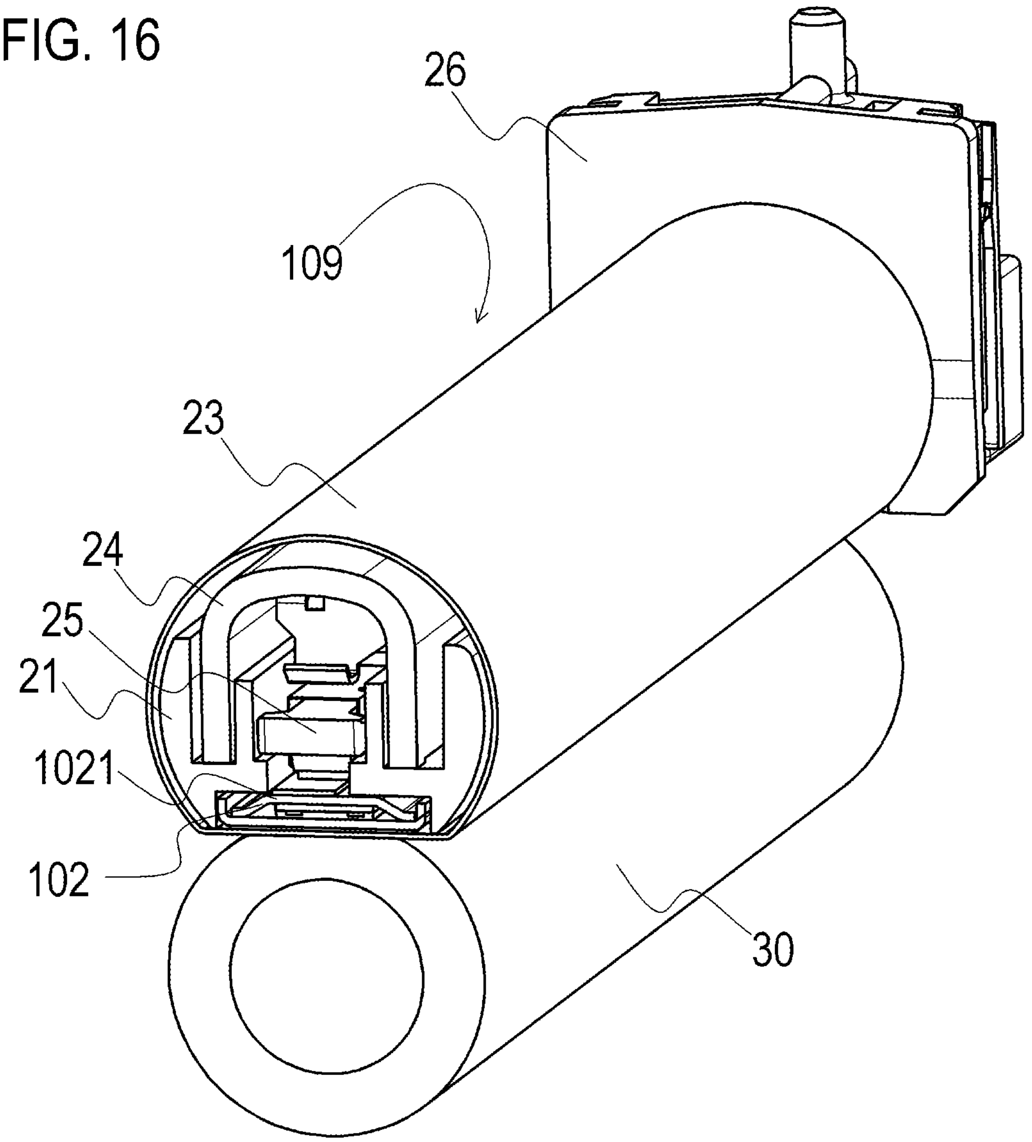
FIG. 16 is a sectional perspective view of a fixing device according to Example 3.

FIG. 16 is a perspective view illustrating a section of a fixing device 109 provided with the heater 102 in this example. FIG. 17A is a schematic view illustrating a configuration of the heater 102, FIG. 17B is a sectional view of the fixing device 109 illustrating a part near the heater 102. In this example, the heat dissipating member 81 that is longer in the same direction as that of the heater 102 is provided between the heater 102 and the film 23.

The heater 102 includes a thin and long plate-shaped substrate 1021 containing metal as a main material, a heat generating element 1023 that generates heat in response to power distribution, an insulating layer 1022 that insulates the heat generating element 1023 from the substrate 1021, and a protective layer 1024 that protects the heat generating element 1023 in this example as well.

Figure 17A:
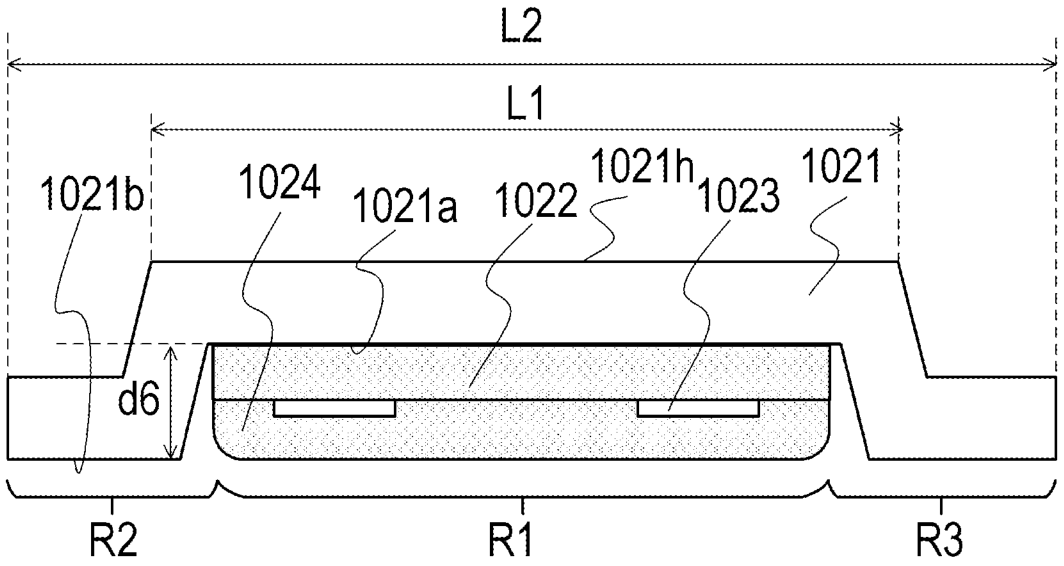
FIGS. 17A and 17B are respectively a schematic view of a heater and a sectional view of the fixing device in the vicinity of the heater according to Example 3.
Figure 17B:
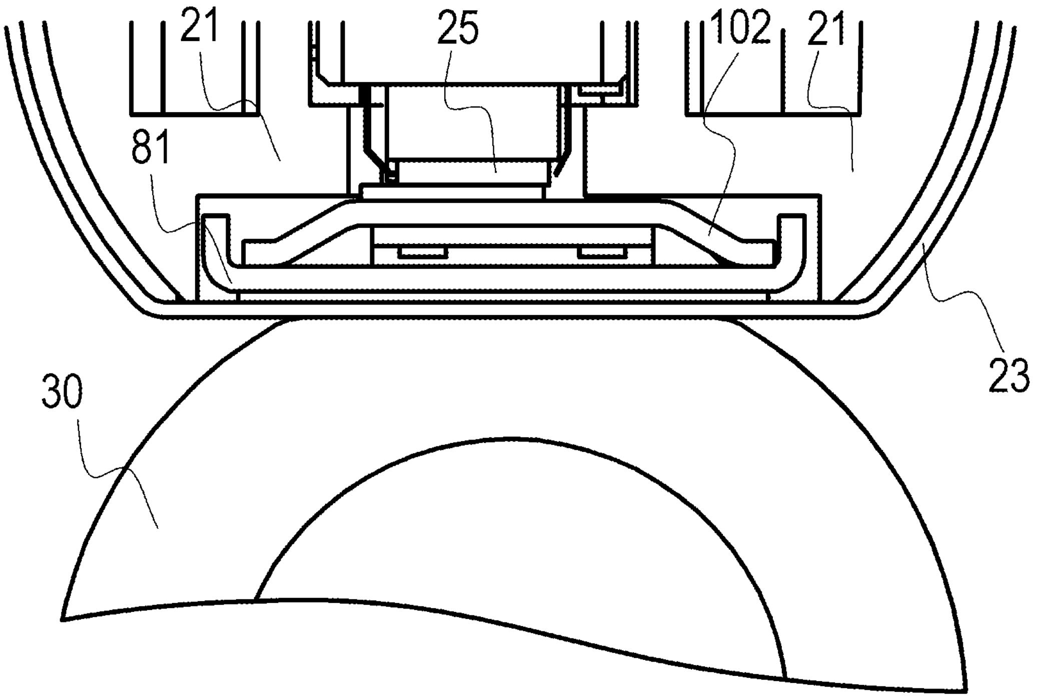

As illustrated in FIG. 17A, the substrate 1021 in this example is a member that is longer in the longitudinal direction and is made of metal and is provided with the insulating layer 1022 and the heat generating element 1023 at a center-part planar portion 1021*a*. The substrate 1021 is bent on an end portion side in the transverse direction that is orthogonal to the longitudinal direction to approach the side of the pressurizing roller 30 in the thickness direction of the substrate 1021. Also, end-side planar portions 1021*b* that are substantially parallel with the center-part planar portion 1021*a* are provided at both ends of the substrate 1021 in the transverse direction such that the end-side planar portions 1021*b* are located on the side of the pressurizing roller 30 (the side of the heat generating element 1023). Also, the substrate 1021 also includes a plurality of bent portions formed over the entire range in the longitudinal direction.

In the transverse direction of the substrate 1021, a region on the center side of the surface on which the insulating layer 1022 is provided is defined as a first region R1, a region on the side of one end portion with respect to the first region R1 is defined as a second region R2, and a region on the side of the other end portion with respect to the first region R1 is defined as a third region R3. At this time, each of the second region R2 and the third region R3 includes two bent portions in this example. In other words, the first region R1 of the substrate 1021 is a plane, and the second region R2 and the third region R3 are bent from the first region R1.

In this example, the substrate 1021 is molded by drawing pressing working, and the drawing depth d6 of the substrate 1021 that is the amount of level difference between the center-part planar portion 1021*a* and the end-side planar portions 1021*b* is 100 μm. The thickness of the substrate 1021 is 0.5 mm, the length L1 of the center-part planar portion in the transverse direction is 6 mm, and the length L2 of the heater 102 in the transverse direction is 8 mm.

The heater 102 in this example is configured such that the drawing depth d6 of the substrate 1021 is substantially the same as the total thickness of the insulating layer 1022 and the protective layer 1024 on the center-part planar portion 1021*a* and the surface of the protective layer 1024 and the end-side planar portions 1021*b* are on substantially the same plane. With such a configuration, both the end-side planar portions 1021*b* and the protective layer 1024 are in contact with the heat dissipating member 81 as illustrated in FIG. 17B.

The heat dissipating member 81 is a metal plate with both end portions in the transverse direction folded on the side of the thermistor 25 and with a substantially C-shaped section. It is desirable that the heat dissipating member 81 be a metal plate with a thickness within a range of 0.2 mm to 1.0 mm. As the heat dissipating member 81, it is possible to use a metal thin plate of stainless steel, an aluminum alloy, or iron, for example. Furthermore, it is desirable that processing (for example, glass coating or hard chromium coating) for lowering a frictional coefficient and enhancing abrasion resistance be performed on a sliding surface of the heat dissipating member 81 against the film 23.

In this example, stainless steel with a plate thickness of 0.5 mm was used as the heat dissipating member 81. The heat dissipating member 81 was formed by performing folding working on the thin stainless steel plate at a position of an end portion in the transverse direction to have a length of 0.6 mm at the folded portion. The length of the heat dissipating member 81 in the transverse direction after the folding working was 9.0 mm, and glass coating with a thickness of 50 μm was performed on the sliding portion against the film 23.

Also, a part between the heater 102 and the heat dissipating member 81 was coated with a grease in order to enhance a heat transmitting property. In this example, a heat-conductive grease was applied as the grease, and the heater 102 was held by the heater holder 21 in a state in which the heater 102 and the heat dissipating member 81 were brought into close contact with each other.

The aforementioned substantially C-shaped section of the heat dissipating member 81 prevented a part of the grease applied between the heater 102 and the heat dissipating member 81 from being pushing out of the heat dissipating member 81 and adhering to the film 23 due to pressurization and heating achieved by a fixing machine.

The thermistor 25 that is a temperature detection unit abuts a second surface of the substrate on the side opposite to a first side on which a resistance heating element is provided in the thickness direction that is orthogonal to the longitudinal direction and the transverse direction of the heater 102. Power distribution to the heat resistor is controlled in accordance with the temperature detected by the thermistor 25, and the temperatures of the heater 102 and the film 23 are managed. In other words, the thermistor 25 detects a change in temperature of the film 23 via the heat dissipating member 81 and the heater 102 in this example.

An evaluation test that has been carried out to include a comparative example to check effects and advantages of the present invention will be described. In the evaluation test, the amounts of warpage of the heaters, the adjusted temperatures at which fixation was able to be achieved, and loadability in this example and Comparative Examples 3 and 4 were evaluated similarly to the evaluation test in Example 1.

The evaluation test was carried out using three types of heaters in this example and the two comparative examples. The heater configuration in Comparative Example 3 is the same as that of the heater 52 in Comparative Example 1 used for comparison with Example 1. Also, the heater configuration in Comparative Example 4 is the same as that of the heater 62 in Comparative Example 2 used for comparison with Example 1. The other configurations in Comparative Examples 3 and 4 are similar to those in Example 3, and heat dissipating members that are similar to that in Example 3 are provided in Comparative Examples 3 and 4 as well.

Table 6 shows main configurations in this example and Comparative Examples 3 and 4, and results of evaluating the amounts of warpage and assembling properties at the time of molding the heaters, fixation, and loadability. As for the assembling properties, the amounts of warpage of not more than 3 mm were described as OK, and the others were described as NG in the table.

TABLE 6

| | Total thickness of insulating layer (front surface side) and protective layer [μm] | Substrate drawing depth [μm] | Thickness of insulating layer (rear surface side) [μm] | Heater evaluation: Amount of warpage [mm] | Heater evaluation: Assembling property | Fixability and loadability evaluation: Adjusted temp. [° C.] | Fixability and loadability evaluation: Number of pieces of loadable recording material [pieces] |
|---|---|---|---|---|---|---|---|
| Example 3 | 100 | 100 | 0 | 1.4 | OK | 190 | 200 |
| Comparative Example 3 | 100 | 0 | 100 | 0.1 | OK | 200 | 50 |
| Comparative Example 4 | 100 | 0 | 0 | 11.0 | NG | 195 | 100 |

In Example 3, the amount of warpage of the heater 22 was 2.8 mm, and there was no problem in the assembling property. Also, the adjusted temperature was 190° C., and the number of pieces of recording material that could be loaded was 200.

In Comparative Example 3, the amount of warpage of the heater 52 was 0.1 mm. It was found from this result that it was possible to curb warpage by providing the insulating layer 525 on the surface on the side opposite to the surface on which the heat generating element 523 was formed as well.

However, the adjusted temperature in Comparative Example 3 was 200° C., which was higher than that in Example 3, and the number of pieces of recording material that could be loaded was 50, which was also smaller than that in Example 3. Since sensitivity of the thermistor 25 of detecting a change in temperature of the film 23 decreased due to an influence of a heat resistance of the insulating layer 525, the adjusted temperature was raised, curling of the recording material also further increased, and the number of pieces of recording material that could be loaded decreased in Comparative Example 3 as compared with Example 3. In other words, it is not possible to achieve a balance between both curbing of warpage of the heater and detection of a change in temperature of the heat dissipating member 81 with satisfactory responsiveness in Comparative Example 3.

In Comparative Example 4, the amount of warpage of the heater 62 was 11 mm, and there was a difficulty in assembling property. Since the bending strength of the substrate in the thickness direction was reinforced by the substrate being bent in Example 3, the amount of warpage of the heater significantly decreased in Example 3 as compared with Comparative Example 4 with the same layer configuration.

Also, the adjusted temperature was 195° C., and the number of pieces of recording material that could be loaded was 100 pieces in Comparative Example 4. Although the insulating layer was provided only on one surface of the substrate in both Comparative Example 4 and Example 3, the substrate 1021 in Example 3 was formed to have a drawing depth d6 of 100 μm, and an end portion of the substrate 1021 in the transverse direction was in contact with the heat dissipating member 81. In other words, since the heat of the heat dissipating member 81 was not only transmitted to the substrate 1021 via the protective layer 1024, the heat was also transmitted to the substrate 1021 directly from the heat dissipating member 81 in Example 3, the heat of the heat dissipating member 81 was more likely to be transmitted to the substrate 1021 than in Comparative Example 4. Therefore, since it was possible to more sensitively sense a change in temperature of the heat dissipating member 81 in Example 3 than in Comparative Example 4, the adjusted temperature was lower, and the number of pieces of recording material that could be loaded increased in the configuration in Example 3 than in Comparative Example 4.

As described above, it was possible to curb warpage of the heater generated at the time of molding of the heater to such an extent that no problem occurred in assembling according to the present invention. Moreover, since the adjusted temperature was lowered and curling of the recording material was curbed by detecting a change in temperature of the heat dissipating member 81 with satisfactory responsiveness, it was possible to increase the number of pieces of recording material that could be loaded. In other words, it was possible to curb warpage of the heater without providing the insulating layers on both surfaces of the substrate by bending the substrate such that the end portion side of the substrate in the transverse direction approached the side of the pressurizing roller (the side of the heat generating element) in the thickness direction. Also, since the heat of the heat dissipating member was also transmitted to the end portion side of the substrate in the transverse direction, it was possible to detect a change in temperature of the heat dissipating member with satisfactory responsiveness. Furthermore, since the insulating layer was not provided on one surface of the substrate, it was possible to detect a change in temperature of the film with satisfactory responsiveness.

Note that although the drawing depth d6 of the folding portion of the substrate was set to 100 μm to achieve such a height to be substantially planar with the protective layer 1024 in this example, the present invention is not limited thereto, and the depth of the folding portion of the substrate may be set to a smaller value than a total thickness of the insulating layer and the protective layer. Even in a case where such a configuration is employed, it is possible to sensitively sense changes in temperatures of the film 23 and the heat dissipating member 81 as compared with a configuration in which the substrate does not include any folded portion.

Figure 18:
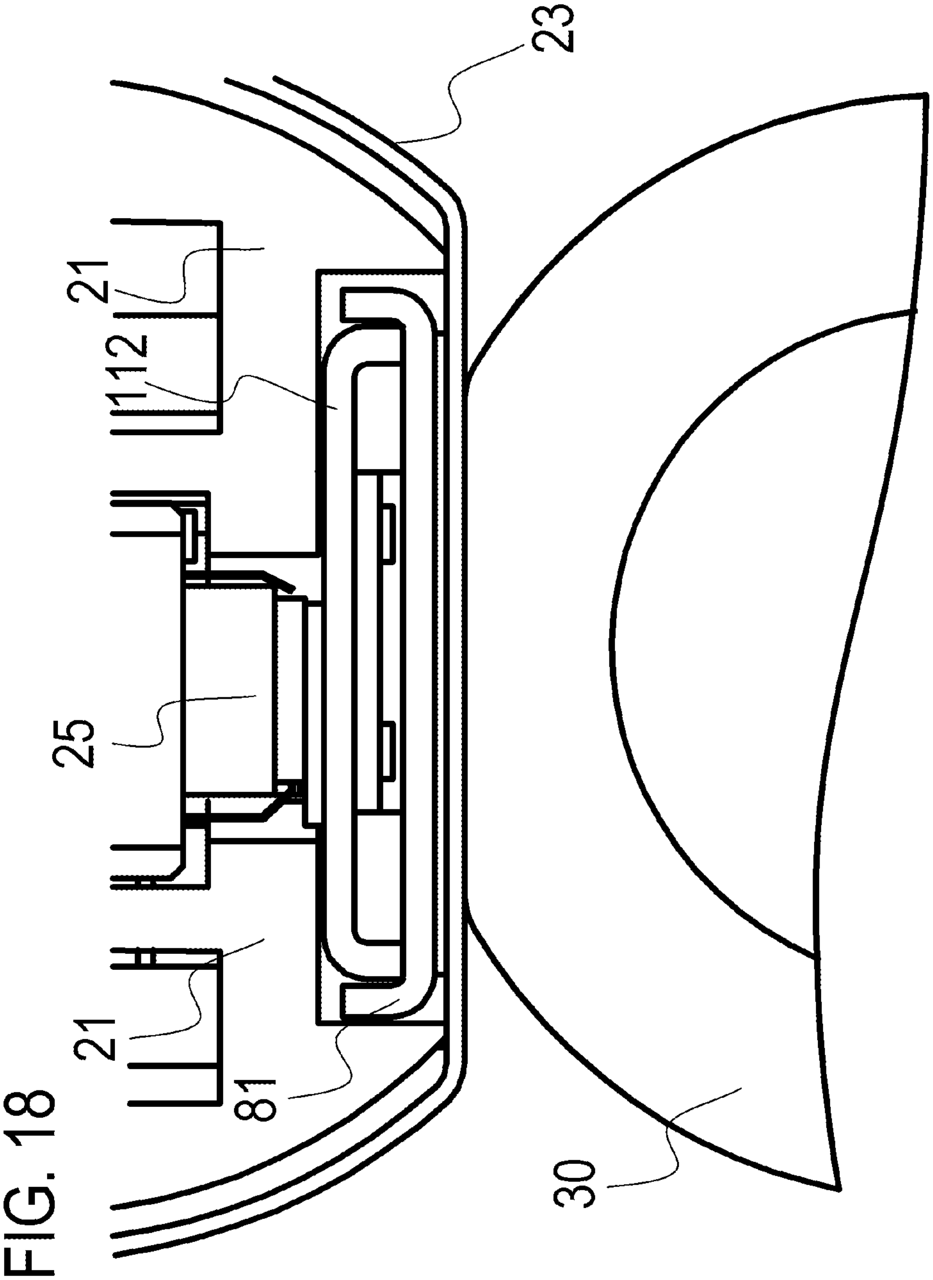
FIG. 18 is a sectional view of a fixing device in the vicinity of a heater according to Modification Example 5.

As a modification example of Example 3, Modification Example 5 will be described with reference to FIG. 18. FIG. 18 is a sectional view of a fixing device illustrating a part near a heater 112 according to Modification Example 5. The same reference signs will be applied to configurations in Modification Example 5 that are similar to those in Example 3, and description thereof will be omitted.

As illustrated in FIG. 18, Modification Example 5 is configured such that a substrate of the heater 112 does not include an end-side planar portion, the substrate is formed such that both ends of the substrate in the transverse direction extend to be substantially parallel with the thickness direction, and the substrate includes only two bent portions. Also, an end portion of the substrate in the transverse direction comes into contact with the folded portion at an end portion of the heat dissipating portion in the transverse direction. Even with such a configuration, warpage of the heater is curbed by the substrate being provided with the bent portion, and a change in temperature of the heat dissipating member 81 is sensitively sensed since the bent portions of the substrate are in contact with the heat dissipating member 81. Thus, it is possible to achieve a balance between both curbing of warpage of the heater and detection of a change in temperature of the heat dissipating member 81 with satisfactory responsiveness in Modification Example 5 as well similarly to Example 3.

Also, in another modification example, a configuration in which the heater does not include an end-side planar portion, both end portions of the substrate in the transverse direction are folded in the direction of the surface on the side opposite to the surface provided with the heat generating element, and the substrate includes only two bent portions such that both ends of the substrate extend to be substantially parallel with the thickness direction may be employed. Even with such a configuration, effects similar to those in Example 3 are obtained by bringing both end portions of the substrate in the transverse direction into contact with the folded portion at the end portion of the heat dissipating member in the transverse direction.

Example 4

Figure 19:
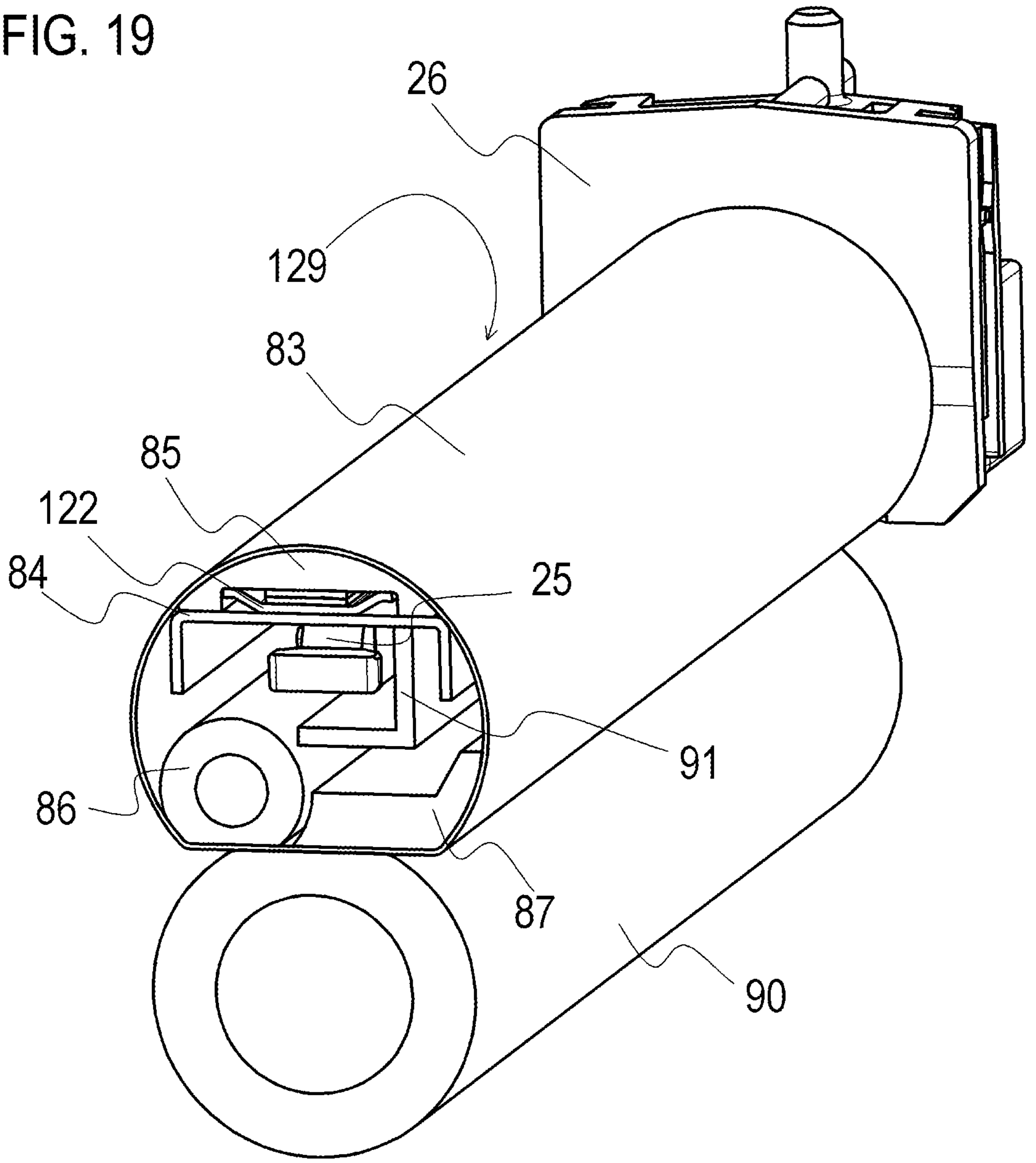
FIG. 19 is a sectional perspective view of a fixing device according to Example 4.
Figure 20:
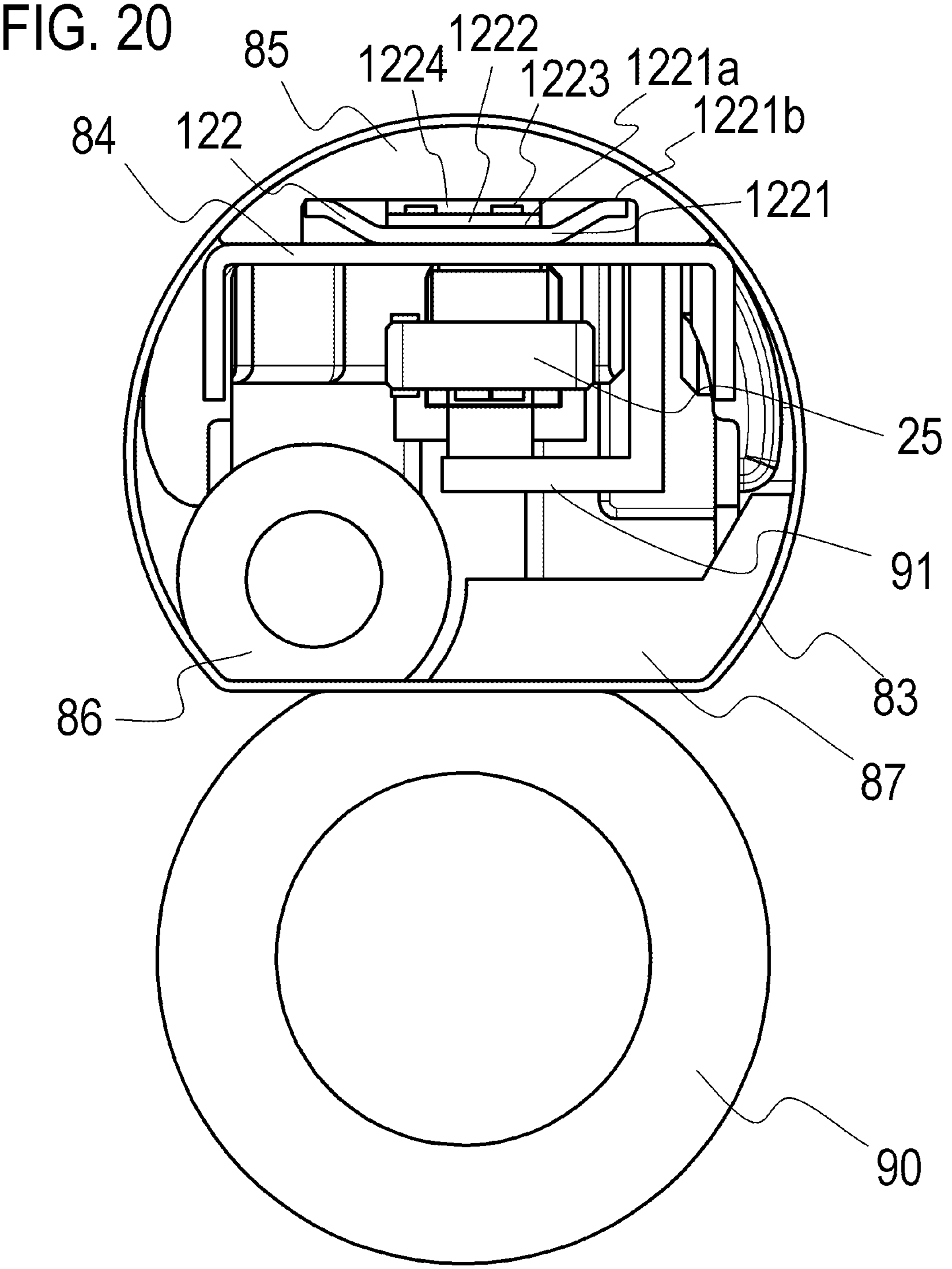
FIG. 20 is a sectional view of the fixing device according to Example 4.

Next, Example 4 according to the present invention will be described with reference to FIGS. 19 and 20. FIG. 19 is a perspective view illustrating a section of a fixing device 129 provided with a heater 122 according to Example 4, and FIG. 20 is a sectional view of a fixing device 129. A fixing configuration in this example is characterized in that a heat transmitting member 85 disposed at a location other than a nip portion N that is a region where a film 83 and a pressurizing roller 90 come into close contact with each other is heated by a heater 122 and the film 83 is heated via the heat transmitting member 85. The fixing configuration is excellent because it is possible to realize a high throughput since there is no heater in the nip portion N, the degree of freedom in designing the nip portion is enhanced, and the size of the nip portion N can be increased.

In this example, the heater according to the present invention is applied as heating means for heating the aforementioned heat transmitting member 85. Other characteristic configurations of an image forming apparatus and a fixing device in Example 4 will be described in detail. Also, the same reference signs will be applied to configurations in Example 4 that are similar to those in Example 1, and description thereof will be omitted.

A configuration of the fixing device 129 in this example will be described with reference to FIG. 20. The fixing device 129 in this example includes a tubular film 83 that serves as a first rotating body and a pressurizing roller 90 that serves as a second rotating body that conveys a recording material. The fixing device 129 further includes a nipping roller 86 and a nipping formation member 87 that are disposed in an internal space of a film and form the nip portion N with the pressurizing roller 90 via the film 83 and the heater 122 that is disposed at a location other than the nip portion N in the internal space of the film 83. The fixing device 129 further includes a heater support member 84 that holds the heater 122 and is disposed in the internal space of the film and the heat transmitting member 85 that abuts the film 83 in the internal space of the film 83 and uniformly spreads and transmits heat generated by the heater 122. Also, the nipping formation member 87 and the heater support member 84 are pressurized by a pressurizing spring disposed at an end portion of a stay 91 disposed in the internal space of the film 83 in the longitudinal direction, which is not illustrated.

In this example, the heat transmitting member 85, the nipping roller 86, and the nipping formation member 87 from among the aforementioned members provided in the internal space of the film 83 are disposed to abut an inner surface of the film 83. The nipping roller 86 and the nipping formation member 87 abut the film 83 on the side close to the pressurizing roller 90, and the heat transmitting member 85 abuts the film 83 on the side far from the pressurizing roller 90, in the adjacent direction of the film 83 and the pressurizing roller 90.

The film 83 is a composite-layer film in which a base layer is made of PI to have a thickness of 100 μm and is coated with a release layer made of PFA with a thickness of 12 μm to achieve a balance between both abrasion of the release layer due to paper feeding and heat conductivity, and the composite layer film with an outer diameter of φ45 mm is used.

The pressurizing roller 90 is configured of a core metal and an elastic layer, silicon rubber with a thickness of 1.5 mm is used for the elastic layer, a PFA tube with a thickness of 30 μm is used for the release layer, and the outer diameter of the pressurizing roller 90 is set to φ36 mm to secure the nipping width.

The nipping roller 86 disposed in the internal space of the film 83 is configured of a core metal and an elastic layer. A silicon rubber with a thickness of 2.0 mm is used for the elastic layer of the nipping roller 86, and the outer diameter is set to φ25 mm.

The nipping formation member 87 is pressurized to come into close contact with the film 83 by a pressurizing spring disposed on the inner surface of the film. In the configuration in this example, the nipping roller 86 and the nipping formation member 87 form the pressurizing roller 90 and the nip portion via the film 83, and it is thus possible to increase the nipping width as compared with a configuration in which the heater and the pressurizing roller form the nip portion. The shape of the portion of the nipping formation member 87 that comes into contact with the film 83 and also has a function of guiding rotation of the film is a composite curve including a substantially planar location and a substantially curved location, and an aluminum extrusion processed material is used as a material of the nipping formation member 87 in order to improve dimensional precision. The substantially planar portion of the nipping formation member 87 forms the pressurizing roller 90 and the nip portion via the film 83.

A thermistor 25 that is a temperature detection unit abuts a second surface of the substrate on the side opposite to a first surface on which a resistance heating element is provided via a through-hole provided in the heater support member 84 in the thickness direction that is orthogonal to the longitudinal direction and the transverse direction of the heater 122. Power distribution to the heat resistor is controlled in accordance with the temperature detected by the thermistor 25, and the temperatures of the heater 122 and the film 83 are managed. In other words, the thermistor 25 detects a change in temperature of the film 83 via the heat transmitting member 85 and the heater 122 in this example.

The heater support member 84 is configured of PPS with high heat resistance and heat insulating performance, and the surface on the side opposite to the surface on which the heater 122 is supported is configured to receive a pressurizing force from pressurizing springs that are disposed at two locations at an end portion of the stay 91 in the longitudinal direction and are not illustrated in the drawing.

Aluminum with high heat conductivity is used as a material of the heat transmitting member 85 in order to efficiently transmit the heat from the heater 122 to the film 83, and a contact surface with the film 83 has a substantially arc shape in order to secure a wide contact region with the film 83. Also, in order to enhance close contact between the heater 122 and the heat transmitting member 85 and secure heat transmitting performance, a part between the heater 122 and the heat transmitting member 85 is coated with a grease, which is not illustrated.

The heater 122 includes a thin and long plate-shaped substrate 1221 containing metal as a main material, a heat generating element 1223 that generates heat in response to power distribution, an insulating layer 1222 that insulates the heat generating element 1223 from the substrate 1121, and a protective layer 1224 that protects the heat generating element 1223 in this example as well. Since the shape of the heater 122 in this example is the same as that of the heater 102 in Example 3, description thereof will be omitted.

The heater 122 is configured such that a drawing depth of the substrate 1221 is substantially the same as a total thickness of the insulating layer 1222 and the protective layer 1224 on a center planar portion 1221*a* and the surface of the protective layer 1224 and an end-side planar portion 1221*b* are on substantially the same plane. With such a configuration, the end-side planar portion 1221*b* and the protective layer 1224 come into contact with the heat transmitting member 85 together as illustrated in FIG. 20, and the thermistor 25 can thus detect changes in temperatures of the film 83 and the heat transmitting member 85 with satisfactory responsiveness.

In order to check effects and advantages of the present invention, an evaluation test carried out to include a comparative example will be described. In the evaluation test, amounts of warpage of heaters, adjusted temperatures at which fixation was able to be achieved, and loadability in this example and Comparative Examples 5 and 6 were evaluated similarly to the evaluation test in Example 1.

The evaluation test was carried out using three types of heaters in this example and the two comparative examples. The heater configuration in Comparative Example 5 was the same as that of the heater 52 in Comparative Example 1 used for comparison with Example 1. Also, the heater configuration in Comparative Example 6 was the same as the heater 62 in Comparative Example 2 used for comparison with Example 1. The other configurations in Comparative Examples 5 and 6 are similar to those in Example 4, and the heat transmitting member 85, the nipping formation member 87, and the like were provided in Comparative Examples 5 and 6 as well similarly to Example 4.

Table 7 shows main configurations in this example and Comparative Examples 5 and 6, and results of evaluating the amounts of warpage and assembling properties at the time of molding the heaters, fixation, and loadability. As for the assembling properties, the amounts of warpage of not more than 3 mm were described as OK, and the others were described as NG in the table.

TABLE 7

| | Total thickness of insulating layer (front surface side) and protective layer [μm] | Substrate drawing depth [μm] | Thickness of insulating layer (rear surface side) [μm] | Heater evaluation: Amount of warpage [mm] | Heater evaluation: Assembling property | Fixability and loadability evaluation: Adjusted temp. [° C.] | Fixability and loadability evaluation: Number of pieces of loadable recording material [pieces] |
|---|---|---|---|---|---|---|---|
| Example 4 | 100 | 100 | 0 | 1.4 | OK | 190 | 200 |
| Comparative Example 5 | 100 | 0 | 100 | 0.1 | OK | 200 | 50 |
| Comparative Example 6 | 100 | 0 | 0 | 11.0 | NG | 195 | 100 |

In Example 4, the amount of warpage of the heater 22 was 1.4 mm, and the assembling property was not problematic. Also, the adjusted temperature was 190° C., and the number of pieces of recording material that could loaded was 200.

In Comparative Example 5, the amount of warpage of the heater 52 was 0.1 mm. It is found from this result that warpage was able to be curbed by the insulating layer 525 being provided on the surface on the side opposite to the surface on which the heat generating element 523 was formed as well.

However, the adjusted temperature in Comparative Example 5 was 200° C., which was higher than that in Example 4, and the number of pieces of recording material that could be loaded was 50, which was a result smaller than that in Example 4. Since sensitivity of the thermistor 25 detecting a change in temperature of the film 83 was degraded in Comparative Example 5 than in Example 4 due to an influence of a heat resistance of the insulating layer 525, the adjusted temperature was raised, curling of the recording material further increased, and the number of pieces of recording material that could be loaded decreased. In other words, it was not possible to achieve a balance between curbing of warpage of the heater and detection of a change in temperature of the heat transmitting member 85 with satisfactory responsiveness in Comparative Example 5.

In Comparative Example 6, the amount of warpage of the heater 62 was 11 mm, and there was a difficulty in assembling. In Example 4, the bending strength of the substrate in the thickness direction was enhanced by the substrate being bent, and the amount of warpage of the heater in Example 4 was significantly reduced as compared with Comparative Example 6 with the same layer configuration.

Also, the adjusted temperature was 195° C., and the number of pieces of recording material that could be loaded was 100 in Comparative Example 6. Although the insulating layer was provided only on one surface of the substrate in both Comparative Example 6 and Example 4, the substrate 1221 was formed to have a drawing depth of 100 μm, and the end portion of the substrate 1221 in the transverse direction was in contact with the heat transmitting member 85 in Example 4. In other words, since heat of the heat transmitting member 85 was not only transmitted to the substrate 1221 via the protective layer 1224 but also transmitted to the substrate 1221 directly from the heat transmitting member 85 in Example 4, the heat of the heat transmitting member 85 was more likely to be transmitted to the substrate 1221 as compared with Comparative Example 6. Therefore, since it was possible to more sensitively sense a change in temperature of the heat transmitting member 85 in Example 4 than in Comparative Example 6, the adjusted temperature was lower in the configuration in Example 4 than in Comparative Example 6, and the number of pieces of recording material that could be loaded increased.

As described above, it was possible to curb warpage of the heater occurring at the time of molding of the heater to such an extent that no problem occurred in assembling according to the present invention. Furthermore, the adjusted temperature was lowered and curing of the recording material was curbed by detecting a change in temperature of the heat transmitting member 85 with satisfactory responsiveness, and it was thus possible to increase the number of pieces of recording material that could be loaded. In other words, it is possible to curb warpage of the heater without providing the insulating layers on both surfaces of the substrate by bending the substrate such that the end portion side of the substrate in the transverse direction approaches the side opposite to the heater support member (the side of the heat transmitting member) in the thickness direction. Also, since the heat of the heat transmitting member is also transmitted to the end portion side of the substrate in the transverse direction, it is possible to detect a change in temperature of the heat dissipating member with satisfactory responsiveness. Moreover, since the insulating layer is not provided on one surface of the substrate, it is possible to detect a change in temperature of the film with satisfactory responsiveness.

Also, although the depth of the folded portion of the substrate is set to 100 μm to achieve such a height that the protective layer 1224 becomes substantially planar in this example, the present invention is not limited thereto, and the depth of the folded portion of the substrate may be a value that is smaller than the total thickness of the insulating layer and the protective layer. It is possible to sense changes in temperatures of the film 83 and the heat transmitting member 85 even in a case where such a configuration is employed.

Figure 21:
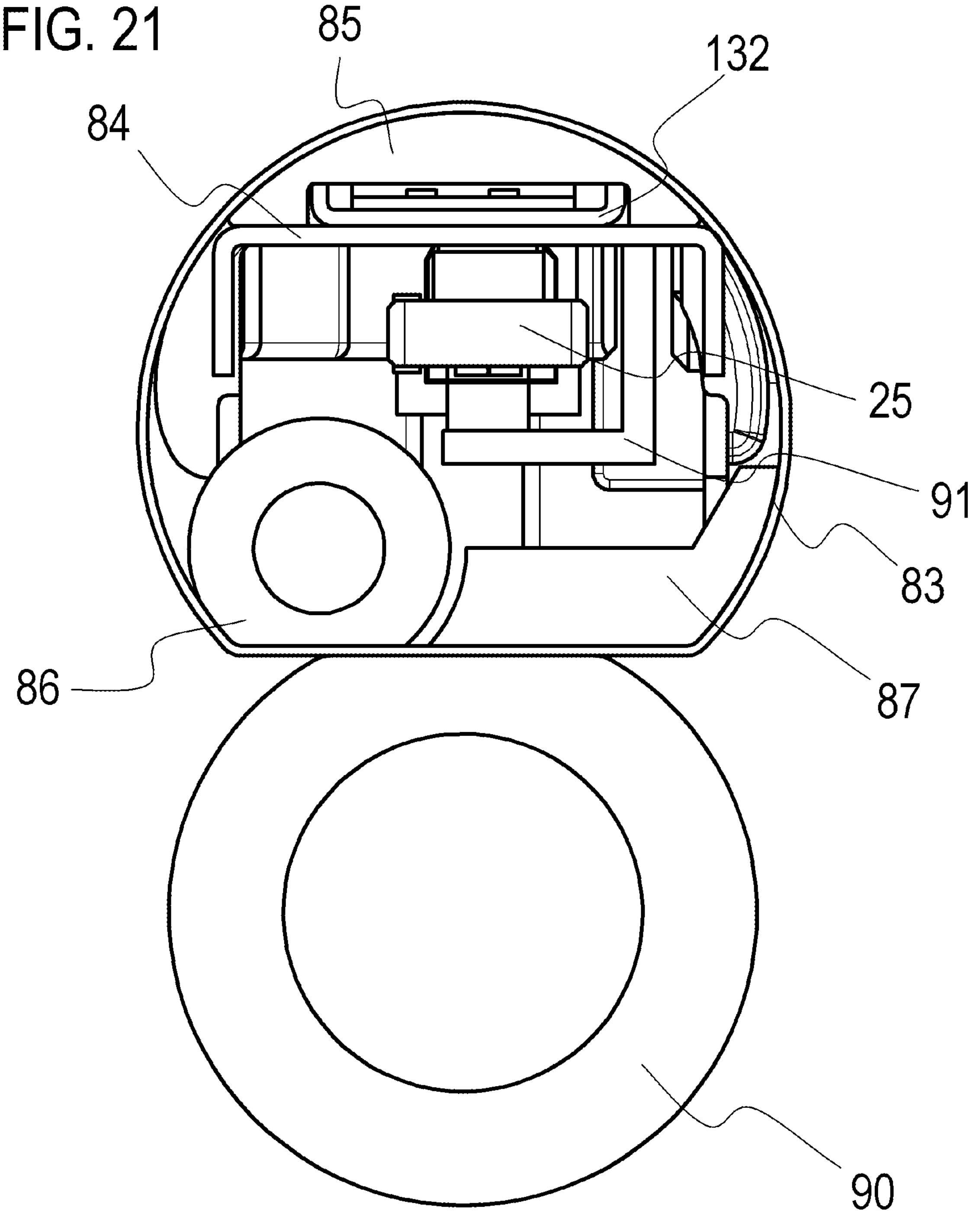
FIG. 21 is a sectional view of a fixing device according to Modification Example 6.

Modification Example 6 will be described as a modification example of Example 4 with reference to FIG. 21. FIG. 21 is a sectional view of a fixing device illustrating a part near a heater 132 according to Modification Example 6. The same reference signs will be applied to configurations in Modification Example 6 that are similar to those in Example 4, and description thereof will be omitted.

As illustrated in FIG. 21, Modification Example 6 is configured such that a substrate of the heater 132 does not include an end-side planar portion, the substrate is formed such that both ends thereof in the transverse direction extend to be substantially parallel with the thickness direction, and the substrate has only two bent portions. Also, the end portion of the substrate in the transverse direction comes into contact with a heat transmitting member. Even with such a configuration, warpage of the heater is curbed by the substrate being provided with the bent portions, and also, a change in temperature of the heat transmitting member 85 is sensitively sensed because the bent portions of the substrate are in contact with the heat transmitting member 85. Thus, it is possible to achieve a balance between both curbing of warpage of the heater and detection of a change in temperature of the heat transmitting member 85 with satisfactory responsiveness in Modification Example 6 as well similarly to Example 4.

Also, in another modification example, the heater may not include the end-side planar portion, both end portions of the substrate in the transverse direction may be folded in the direction of the surface on the side opposite to the surface provided with the heat generating element, the substrate may have only two bent portions such that both ends of the substrate extend to be substantially parallel with the thickness direction, and the substrate may be porous. Even with such a configuration, effects that are similar to those in Example 4 are obtained by bringing both end portions of the substrate in the transverse direction into contact with the heat transmitting member.

Hereinafter, configuration or concept examples disclosed in the aforementioned embodiment will be described below. However, these are just an example, and the disclosure of the aforementioned embodiment is not limited to the configurations or concepts described below.

Configuration A1

A heater including;

a substrate that is thin and long and is made of metal;

an insulating layer that is provided on the substrate; and a heat generating element that is provided on the insulating layer, in which in a case where a region including a center of the substrate is defined as a first region, a region on a side closer to one end portion than the first region is defined as a second region, and a region on a side closer to the other end portion than the first region is defined as a third region in a transverse direction that is orthogonal to a longitudinal direction of a surface of the substrate on which the insulating layer is provided, the first region is a plane, and the second region and the third region are bent from the first region in a thickness direction of the substrate that is orthogonal to the longitudinal direction and the transverse direction.

Configuration A2

In the heater according to Configuration A1, the second region includes a first bent portion that is bent to approach a side of the heat generating element from the first region in the thickness direction.

Configuration A3

In the heater according to Configuration A2, the second region includes a second bent portion that is bent in the transverse direction from the first bent portion.

Configuration A4

In the heater according to Configuration A3, the second bent portion includes a plane that is parallel to the first region.

Configuration A5

In the heater according to Configuration A4, a distance from a plane of the first region to a plane of the second bent portion in the thickness direction is longer than a thickness of the insulating layer.

Configuration A6

In the heater according to Configuration A2, the third region includes a third bent portion that is bent to approach a side of the heat generating element from the first region in the thickness direction.

Configuration A7

In the heater according to Configuration A6, the third region includes a fourth bent portion that is bent in the transverse direction from the third bent portion.

Configuration A8

In the heater according to Configuration A7, the fourth bent portion includes a plane that is parallel to the first region.

Configuration A9

In the heater according to Configuration A8, a distance from a plane of the first region and a plane of the fourth bent portion in the thickness direction is longer than a thickness of the insulating layer.

Configuration A10

In the heater according to any one of Configurations A1 to A9, the insulating layer is not provided on the substrate in the second region and the third region.

Configuration A11

In the heater according to any one of Configurations A1 to A10, the second region and the third region are bent from the first region in entire regions in the longitudinal direction of the substrate.

Configuration A12

In the heater according to any one of Configurations A1 to A11, in a case where the surface on which the insulating layer is provided is defined as a first surface, the insulating layer is not provided on a second surface of the substrate on a side opposite to the first surface in the thickness direction.

Configuration A13

In the heater according to any one of Configurations A1 to A11, in a case where the insulating layer with the heat generating element provided thereon is defined as a first insulating layer, and the surface on which the first insulating layer is provided is defined as a first surface, the substrate is provided with a second insulating layer on which the heat generating element is not provided, on a second surface on a side opposite to the first surface in the thickness direction, and the first insulating layer is thicker than the second insulating layer in the thickness direction.

Configuration A14

A heating device includes:

a first rotating body;

the heater according to any one of Configurations A1 to A13 that is provided in an internal space of the first rotating body;

a second rotting body that forms a nip portion with the heater via the first rotating body; and a temperature detection unit that detects a temperature of the heater, in which the temperature detection unit is provided on a surface on a side opposite to the surface on which the insulating layer provided with the heat generating element is provided in the thickness direction.

Configuration A15

In the heating device according to Configuration A14, the second region and the third region abut the first rotating body.

Configuration A16

In the heating device according to Configuration A14 or A15, the first rotating body is a tubular film, and the second rotating body is a roller.

Configuration A17

A heating device includes:

a first rotating body;

a heater that includes a substrate that is thin and long and is made of metal, an insulating layer that is provided on the substrate, and a heat generating element that is provided on the insulating layer, the heater being provided in an internal space of the first rotating body; and a second rotating body that forms a nip portion with the heater via the first rotating body, in which in a case where a region including a center of the substrate is defined as a first region, a region on a side closer to one end portion than the first region is defined as a second region, and a region on a side closer to the other end portion than the first region is defined as a third region in a transverse direction that is orthogonal to a longitudinal direction of a surface of the substrate on which the insulating layer is provided, the second region and the third region are bent to be located closer to a side of the nip portion than the first region in a thickness direction of the substrate that is orthogonal to the longitudinal direction and the transverse direction.

Configuration A18

In the heating device according to Configuration A17, the second region includes a first bent portion that is bent to approach the side of the nip portion from the first region in the thickness direction.

Configuration A19

In the heating device according to Configuration A18, the second region includes a second bent portion that is bent in the transverse direction from the first bent portion.

Configuration A20

In the heating device according to Configuration A19, the first region includes a plane, and the second bent portion includes a plane that is parallel with the first region.

Configuration A21

In the heating device according to Configuration A20, a distance from the plane of the first region to the plane of the second bent portion in the thickness direction is longer than a thickness of the insulating layer.

Configuration A22

In the heating device according to any one of Configurations A18 to A21, the third region includes a third bent portion that is bent to approach from the first region to a side of the heat generating element in the thickness direction.

Configuration A23

In the heating device according to Configuration A22, the third region includes a fourth bent portion that is bent in the transverse direction from the third bent portion.

Configuration A24

In the heating device according to Configuration A23, the first region includes a plane, and the fourth bent portion includes a plane that is parallel with the first region.

Configuration A25

In the heating device according to Configuration A24, a distance from the plane of the first region to the plane of the fourth bent portion in the thickness direction is longer than a thickness of the insulating layer.

Configuration A26

In the heating device according to any one of Configurations A17 to A25, the insulating layer is not provided on the substrate in the second region and the third region.

Configuration A27

In the heating device according to any one of Configurations A11 to A26, the second region and the third region are bent from the first region in entire regions in the longitudinal direction of the substrate.

Configuration A28

In the heating device according to any one of Configurations A11 to A27, in a case where the surface on which the insulating layer is provided is defined as a first surface, the insulating layer is not provided on a second surface on a side opposite to the first surface of the substrate in the thickness direction.

Configuration A29

In the heating device according to any one of Configurations A11 to A27, in a case where the insulating layer with the heat generating element provided thereon is defined as a first insulating layer, and the surface on which the first insulating layer is provided is defined as a first surface, a second insulating layer on which the heat generating element is not provided is provided on a second surface on a side opposite to the first surface of the substrate in the thickness direction, and the first insulating layer is thicker than the second insulating layer in the thickness direction.

Configuration A30

An image forming apparatus includes:

an image forming portion that forms an image on a recording material; and the heating device according to any one of Configurations A14 to A29 that fixes, on the recording material, the image formed on the recording material.

In a heating device configured of a heater, a film, a pressurizing roller, and a like, there may be a case in which a hole opens in the film or the like when a recording material with something projecting such as a staple or something unintentionally adhering thereto is conveyed to the heating device. If a hole opens in the film, a toner image is not sufficiently heated at the hole opening part, and a fixing failure may occur. Thus, a heating device and an image forming apparatus capable of curbing hole opening in the film will be described next.

Example 5

(1) Image Forming Apparatus

Figure 22:
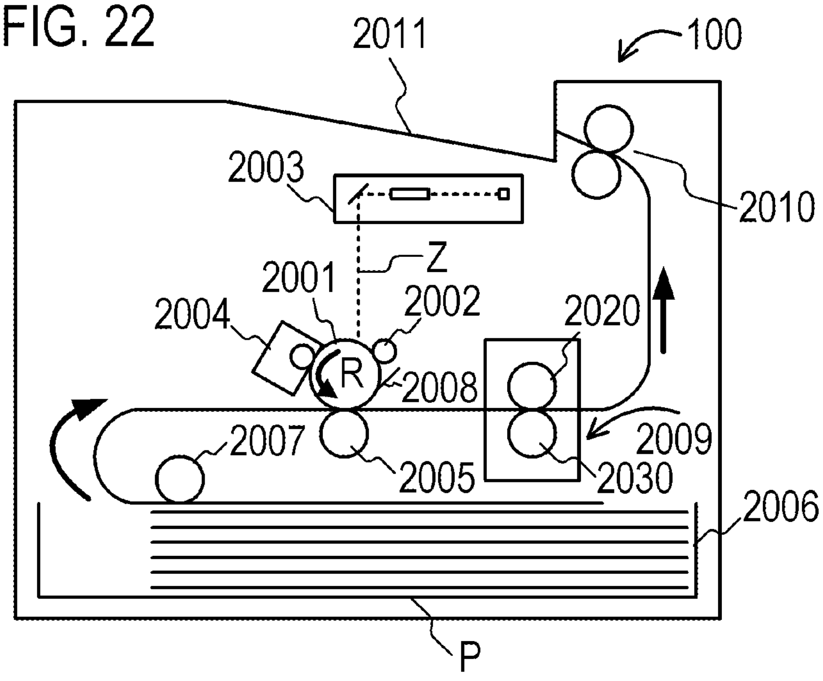
FIG. 22 is an overview configuration diagram of an image forming apparatus according to Example 5.

FIG. 22 is an overview configuration diagram of an image forming apparatus 2100 using an electrophotography recording technique in Example 5. First, a configuration and operations of the image forming apparatus 2100 will be described.

An image forming operation performed by an image forming portion of the image forming apparatus 2100 will be described. If the image forming apparatus 2100 receives a printing instruction from an external device or the like, then a scanner unit 2003 emits laser light Z in accordance with image information toward a photosensitive member 2001. The photosensitive member 2001 charged with a predetermined polarity by a charging roller 2002 is scanned with the laser light Z, and an electrostatic latent image in accordance with the image information is formed on the surface of the photosensitive member 2001. Thereafter, a developing device 2004 supplies a toner to the photosensitive member 2001, and a toner image in accordance with the image information is formed on the photosensitive member 2001. The toner image on the photosensitive member 2001 moves to a transfer position formed by the photosensitive member 2001 and a transfer roller 2005 through rotation of the photosensitive member 2001 in the arrow R direction and is transferred to a recording material P fed by a pickup roller 2007 from a cassette 2006. The surface of the photosensitive member 2001 that has passed through the transfer position is cleaned by a cleaner 2008.

Fixing processing is performed on the recording material P with the toner image transferred thereto with heat and a pressure by the fixing device 2009 that serves as a fixing portion. Thereafter, the recording material P is discharged to a discharge tray 2011 by a discharge roller 2010

(2) Fixing Device

Next, a configuration and operations of the fixing device 2009 will be described. In this example, a tensionless-type film heating-system fixing device 2009 is used as an example of the heating device. The fixing device 2009 in this example is a device in which an endless belt-shaped (or cylindrical) heat-resistant film is used, at least a part of the perimeter of the film is always kept free from tension (a state in which no tension is applied thereto), and the film is driven to rotate by a rotation drive force of a pressurizing member.

Figure 23:
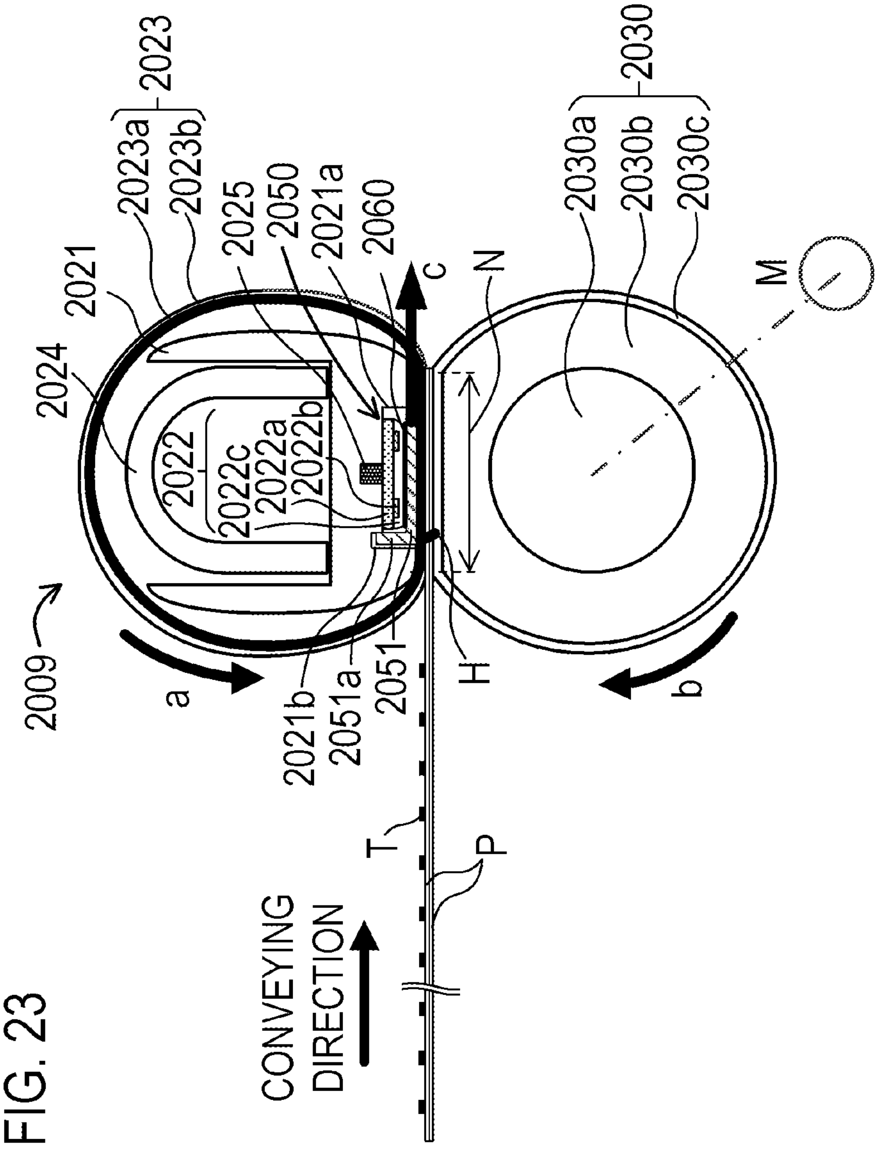
FIG. 23 is a sectional view of a fixing device according to Example 5.
Figure 24A:
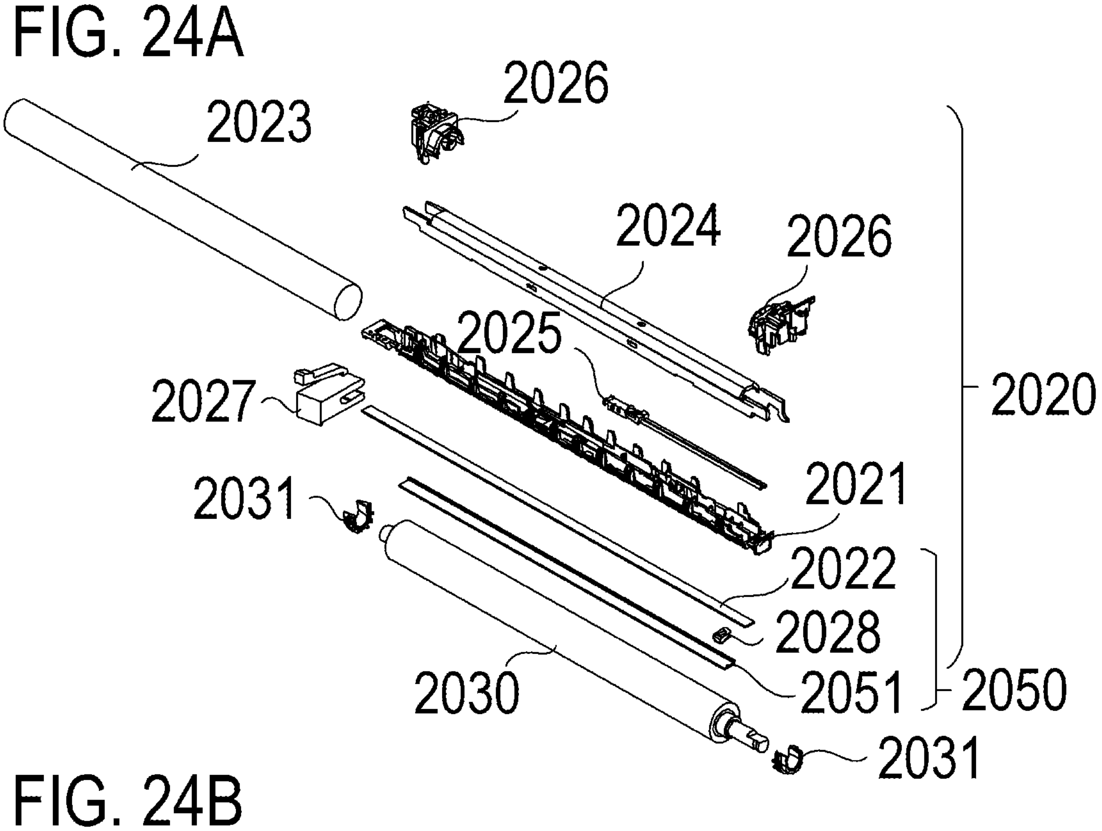
FIGS. 24A and 24B are perspective views of a film unit and a heat conducting member according to Example 5.
Figure 24B:
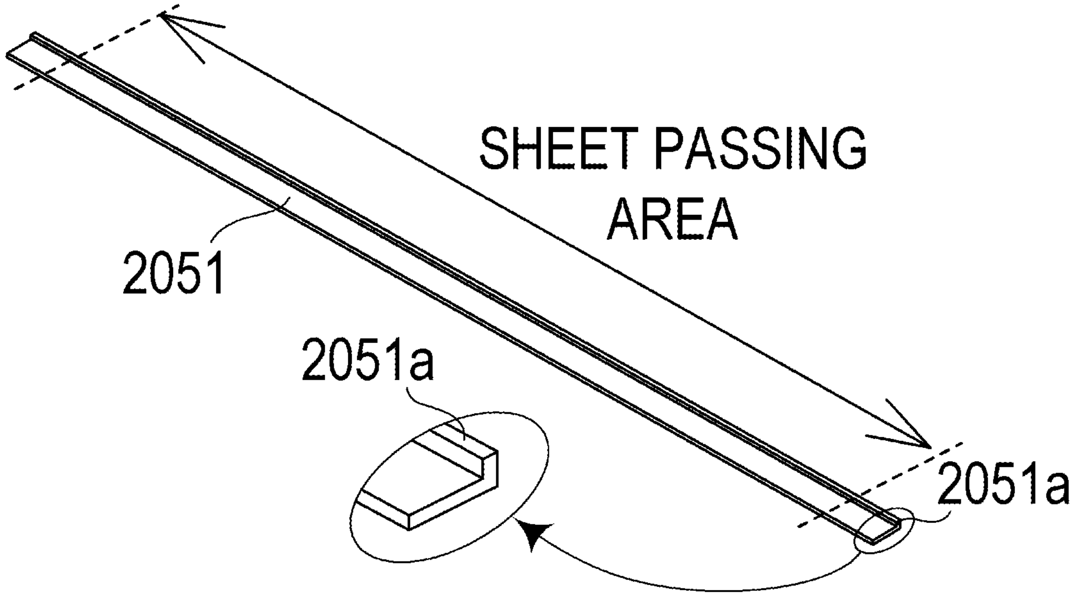
Figure 25:
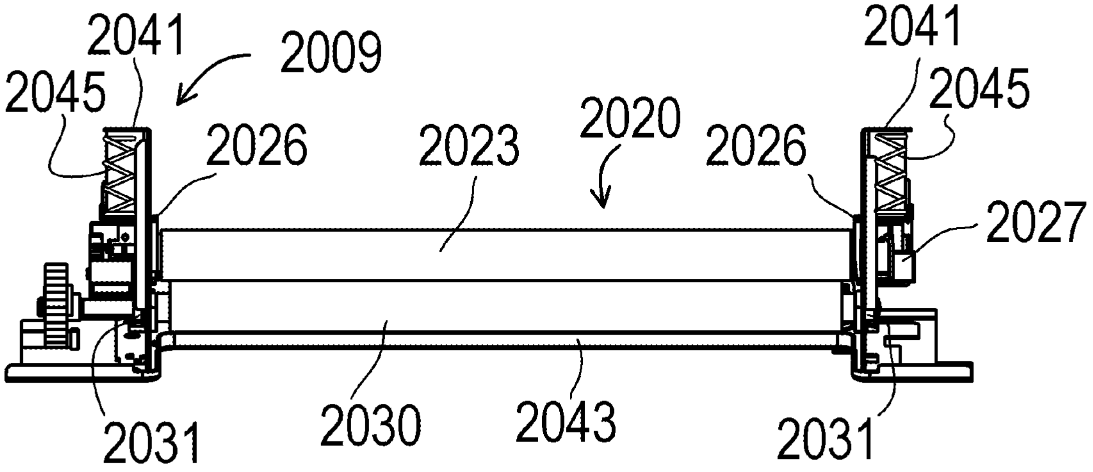
FIG. 25 is a front view of the fixing device according to Example 5.

FIG. 23 is an overview sectional view of the fixing device 2009 in this example and illustrates a state in which two pieces of recording material P bound with a staple H have a toner image T and are conveyed to the fixing device 2009. Also, FIG. 24A is an exploded perspective view of a film unit 2020 used in the fixing device 2009, and FIG. 24B is a perspective view of a heat conducting member 2051. FIG. 25 is a front view of the fixing device 2009 when seen from the conveying direction of the recording material.

A configuration of the fixing device 2009 will be described with reference to FIG. 23. The fixing device 2009 in this example includes a rotational tubular film 2023 and a heating unit 2050 that heats a film 2023 in an internal space of the film 2023. The heating unit 2050 is configured of a heater 2022 that is a heating body and a heat conducting member 2051 that is joined to the heater 2022, comes into contact with the inner surface of the film 2023, and transmits heat of the heater 2022 to the film 2023. The fixing device 2009 further includes a film guide 2021 that supports the heater 2022 and guides rotation of the film 2023, a reinforcing member 2024 that reinforces the film guide 2021, and a pressurizing roller 2030 that forms a nip portion N with the heating unit 2050 and the film guide 2021 via the film 2023.

The heater 2022 includes a thin and long plate-shaped substrate 2022*a* made of ceramic, a heat generating element 2022*b* that generates heat in response to power distribution, and a protective layer 2022*c* that protects the surface of the heat generating element 2022*b*. A detailed configuration of the heater 2022 will be described later.

A thermistor 2025 that is a temperature detection member abuts a surface of the heater 2022 abutting the film guide 2021. Power distribution to the heat generating element 2022*b* is controlled in accordance with the temperature detected by the thermistor 2025, and the temperatures of the heater 2022 and the film 2023 are managed.

The film 2023 is a tubular rotating body. The thickness of the film 2023 is preferably at least 20 μm and not more than 100 μm to secure satisfactory heat conductivity. In a case where the film 2023 is a single-layer film, it is preferable to use polytetrafluoroethylene (PTFE), tetrafluoroethylene-perfluoroalkyl vinyl ether (PFA), PPS, or the like as a film base layer 2023*a*. In a case of a composite-layer film, it is preferable to use a material such as polyimide (PI), polyamidimide (PAI), polyether ethery ketone (PEEK), polyether sulfone (PES) as the film base layer 2023*a*. Moreover, it is preferable to configure the composite-layer film using, as a film release layer 2023_b_ with which the surface thereof is to be coated, a material such as PTFE, PFA, tetrafluoroethylene-perfluoroalkyl vinyl ether (FEP). Also, a film obtained by using pure metal, an alloy or the like of SUS, Al, Ni, Cu, Zn, or the like with high heat conductivity in a base layer and performing the aforementioned coating processing or coating with a fluorine resin tube on the release layer is also suitably used.

The film 2023 in this example is a composite-layer film in which the film base layer 2023_a_ is made of PI to have a thickness of 60 μm and is coated with a film release layer 2023_b_ made of PFA with a thickness of 12 μm to achieve a balance between both abrasion of the film release layer 2023_b_ due to paper feeding and thermal conductivity. The length of the film 2023 in the longitudinal direction is 240 mm. The axial direction of the cylindrical shape of the film 2023 will be referred to as a longitudinal direction below.

The film guide 2021 is a support member that is provided in an internal space of the film 2023 and supports the heater 2022 with a heater support portion 2021_a_. The film guide 2021 is provided with a recessed portion 2021_b_ that is engaged with a projecting portion 2051_a_ of the heat conducting member 2051, which will be described later. The film guide 2021 has the film 2023 loosely inserted thereonto and also has a guide function of guiding rotation of the film 2023 while keeping slide contact with the inner circumferential surface of the film 2023. Since the film guide 2021 is required to have high resistance and rigidity, it is preferable to use a liquid crystal polymer resin or the like with high heat resistance and excellent strength as a material of the film guide 2021. As the film guide 2021, a molded article of a heat-resistant resin such as polyphenylene sulfide (PPS) or a liquid crystal polymer, for example, is used.

The reinforcing member 2024 is made of metal such as iron, receives a force of a pressurizing spring, which will be described later, and presses the heater 2022 on the side of the pressurizing roller 2030 via the film guide 2021. Moreover, the reinforcing member 2024 is also a member that maintains strength to prevent significant deformation even with a pressure with which the film guide 2021 forms the nip portion N.

The heat conducting member 2051 is a member that is longer in the longitudinal direction, and it is suitable to use a material such as metal with excellent heat conductivity. As described above, the heat conducting member 2051 configures the heating unit 2050 for heating the film 2023 along with the heater 2022. In other words, the heating unit 2050 heats the film 2023 via the heat conducting member 2051 by the heater 2022 that has generated heat. The heat conducting member 2051 in this example is joined to the heater 2022 with a heat-conductive adhesive 2060 and comes into contact with the inner circumferential surface of the film 2023.

The heat conducting member 2051 is provided to cover the entire region of the substrate 2022_a_ in the transverse direction when seen in the thickness direction of the substrate 2022_a_. The heat conducting member 2051 includes, at an end portion thereof in the transverse direction, a projecting portion 2051_a_ that is folded into an L shape, and the projecting portion 2051_a_ projects on the side further from the pressurizing roller 2030 than the heater 2022 in the thickness direction of the substrate 2022_a_. The projecting portion 2051_a_ is located on the side further upstream than the heater 2022 in the conveying direction at a position at which the projecting portion 2051_a_ does not overlap the substrate 2022_a_ and the heat generating element 2022_b_ when seen in the thickness direction of the substrate 2022_a_ to be engaged with the recessed portion 2021_b_. Also, the projecting portion 2051_a_ is located on the side further upstream than an exit of the nip portion N on the side further downstream than an entrance of the nip portion N in the conveying direction along with the recessed portion 2021_b_. Relative movement of the heating unit 2050 in the conveying direction with respect to the film guide 2021 is restricted by the projecting portion 2051_a_ being inserted into the recessed portion 2021_b_ provided in the film guide 2021. Note that in this example, the thickness direction of the substrate 2022_a_ is substantially parallel with the pressurizing direction of the recording material P conveyed to the fixing device 2009.

The pressurizing roller 2030 is a rotating body that includes a core metal 2030_a_ of a material such as iron or aluminum, an elastic layer 2030_b_ of a material such as silicone rubber, and a release layer 2030_c_ of a material such as PFA. The pressurizing roller 2030 receives power from a motor M via a gear, which is not illustrated, rotates in the b direction, and forms the nip portion N along with the heating unit 2050 and the film guide 2021 via the film 2023.

As illustrated in FIG. 23, the film 2023 is driven by motion of the pressurizing roller 2030 and rotates in the a direction due to rotation of the pressurizing roller 2030 in the b direction, and the heating unit 2050 receives a force in the arrow c direction that is substantially parallel with the conveying direction of the recording material P. However, since the projecting portion 2051_a_ of the heat conducting member 2051 is engaged with the recessed portion 2021_b_ of the film guide 2021 as described above, the heating unit 2050 does not significantly move or warp in the c direction inside the heater support portion 2021_a_. The toner image T is heated and fixed on the recording material P by the recording material P being nipped and conveyed by the nip portion N, and the recording material P that has passed through the nip portion N is conveyed to the discharge tray 2011.

Next, the film unit 2020 of the fixing device 2009 will be described with reference to the exploded perspective view in FIG. 24A. The heater 2022 and the heat conducting member 2051 joined to each other with a heat-conductive adhesive is held as the heating unit 2050 by the film guide 2021. After the film guide 2021 and the reinforcing member 2024 are fitted to each other, the film 2023 is fitted onto the outer circumferences of the film guide 2021 and the reinforcing member 2024 with a margin at the perimeter. Both end portions of the reinforcing member 2024 sticks out of both ends of the film 2023, and flanges 2026 are fitted to both ends. In this manner, the film unit 2020 including the film 2023, the heating unit 2050, the film guide 2021, the flanges 2026, and the like are assembled.

A power supply terminal of the heater 2022 projects on one end side of the film 2023 in the longitudinal direction, and a power supply connector 2027 is fitted thereto. The power supply connector 2027 comes into contact with an electrode portion of the heater 2022 with a predetermined abutting pressure, and a power supply path is thereby formed. Also, a heater clip 2028 is a metal plate bent into a C shape and holds an end of the heater 2022 at the film guide 2021 with the spring property. In other words, both ends of the heater 2022 in the longitudinal direction located outside the sheet passing area are held by the power supply connector 2027 and the heater clip 2028 that serve as holding members.

As illustrated in FIG. 24B, the heat conducting member 2051 has a length with which the entire sheet passing area can be covered in the width direction that is orthogonal to the conveying direction of the recording material. In this example, the width direction of the recording material is substantially parallel with the longitudinal direction of the film 2023 and the like. Also, the projecting portion 2051*a* in this example extends over the entire region of the heat conducting member 2051 in the longitudinal direction. The heat conducting member 2051 may be formed by folding a plate member made of metal or can also be produced by other means such as cutting working.

Next, the configuration of the fixing device 2009 will be described in further detail with reference to FIG. 25. The flanges 2026 provided at both end portions of the film 2023 restrict movement of the rotating film 2023 in the longitudinal direction and restricts the position of the film 2023 when the fixing device 2009 is activated.

The film unit 2020 is provided to face the pressurizing roller 2030 and is supported by a top plate-side casing 2041. The film unit 2020 is supported to be freely movable in the pressurizing direction by the top plate-side casing 2041, and movement thereof in the longitudinal direction is restricted. The pressurizing spring 2045 is attached to the top plate-side casing 2041 of the fixing device 2009 in a compressed state. The pressing force of the pressurizing spring 2045 is received by both end portions of the reinforcing member 2024 in the longitudinal direction via the flange 2026. With the pressing force of the pressurizing spring 2045, the reinforcing member 2024 is pressed on the side of the pressurizing roller 2030, the entire film unit 2020 is pressed on the side of the pressurizing roller 2030, and the nip portion N is thereby formed.

The bearing member 2031 is provided to axially support the metal core of the pressurizing roller 2030 and receives the pressing force from the film unit 2020 via the pressurizing roller 2030. In order to rotationally support the metal core of the pressurizing roller 2030 that is heated to a relatively high temperature, a material with heat resistance and excellent slidablity is used for the bearing member 2031. The bearing member 2031 is attached to a bottom-side casing 2043 of the fixing device 2009.

(3) Heater 2022

Figure 26A:
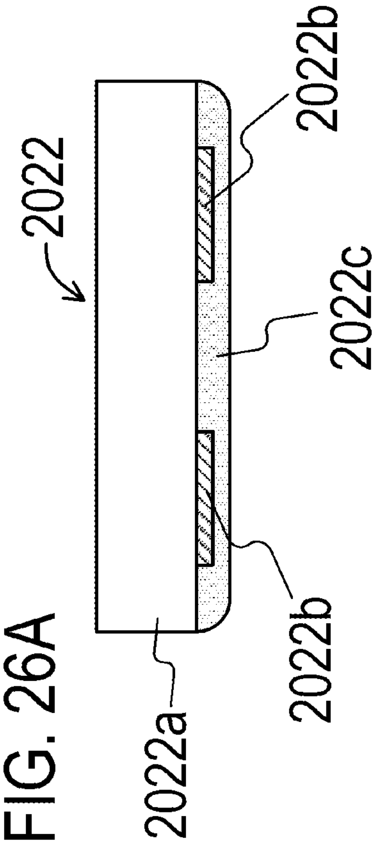
FIGS. 26A and 26B are respectively a sectional view and a plan view of a heater according to Example 5.
Figure 26B:
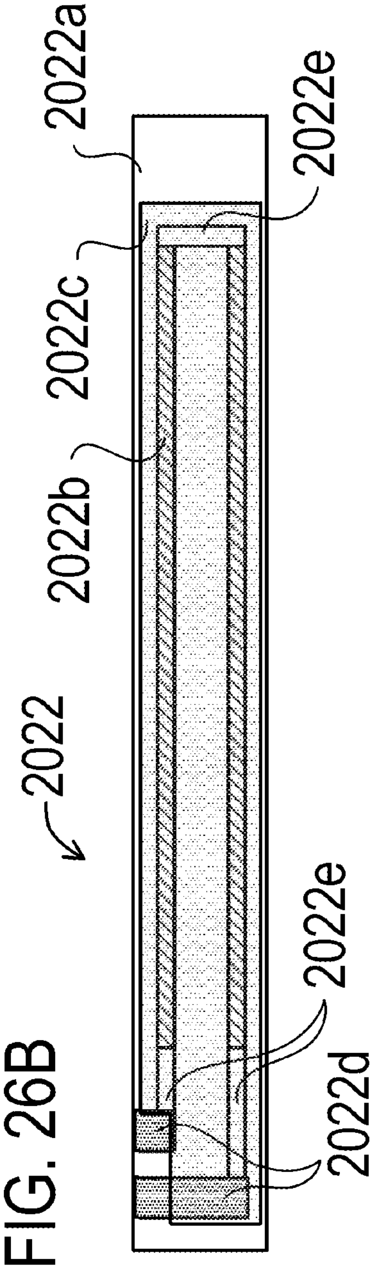

Next, a material configuring the heater 2022, a manufacturing method, and the like in this example will be described using FIGS. 26A and 26B. FIG. 26A is a sectional view of the heater 2022 when seen from the longitudinal direction, and FIG. 26B is a plan view when seen from the thickness direction of the substrate 2022*a*.

(3-1) Substrate 2022*a*

The substrate 2022*a* in this example is a substrate made of ceramic. The type of ceramic is not particularly limited, and it is only necessary to appropriately select ceramic in consideration of necessary mechanical strength, a linear expansion coefficient in accordance with formation of the heat generating element, easiness of obtaining a plate material in the market, and the like.

It is only necessary to determine the thickness of the substrate 2022*a* in consideration of strength, a heat capacity, and heat dissipation performance. Although a thin thickness of the substrate 2022*a* leads to a small heat capacity and is thus advantageous for quick starting, a problem such as distortion is likely to occur when the heat generating element is heated if the thickness is too thin. On the contrary, although a thick thickness of the substrate 2022*a* is advantageous in terms of distortion when the heat generating element is heated, an excessively thick thickness is disadvantageous for quick starting due to a large heat capacity. A preferable thickness of the substrate 2022*a* is about 0.3 mm to 2.0 mm in a case where a balance of mass production, cost, and performance is taken into consideration. The substrate 2022*a* in this example is an alumina substrate with a width of 10 mm, a length of 300 mm, and a thickness of 1 mm.

(3-2) Heat Generating Element 2022*b*

The heat generating element 2022*b* is obtained by printing a heat generating element paste obtained by mixing a conductive component (A), a glass component (B), and an organic binding component (C) on the substrate 2022*a* and baking the resulting object. If the heat generating element paste is baked, the organic binding component (C) is burnt and disappears and the components (A) and (B) remain, and the heat generating element 2022*b* containing the conductive component and the glass component is thereby formed. Here, silver-palladium (Ag·Pd), ruthenium oxide ($RuO_2$), or the like is used alone or in combination as the conductive component (A), and it is preferable to obtain a sheet resistance value (surface resistivity) of 0.1 [Ω/□] to 100 [kΩ/□]. Also, other materials may be contained in addition to (A) to (C) described above as long as the amounts are very small and properties of the present invention are not damaged.

The heat generating element 2022*b* in this example is formed by the heat generating element paste obtained by using silver-palladium (Ag·Pd) as a conductive component and additionally incorporating a glass component and an organic binding component. After the heat generating element paste is applied to the substrate 2022*a* made of ceramic by screen printing, the resulting object is dried at 180° C. and is then baked at 850° C., and heat generating element 2022*b* is thereby formed. The heat generating element 2022*b* after the baking has a thickness of 15 μm, a length of 220 mm, and width of 1.1 mm.

(3-3) Power Supply Electrode 2022*d* and Conduction Pattern 2022*e*

The power supply electrode 2022*d* and the conduction pattern 2022*e* illustrated in FIG. 26B contain silver (Ag), platinum (Pt), gold (Au), a silver-platinum (Ag·Pt) alloy, a silver-palladium (Ag·Pd) alloy, or the like as a main constituent. The power supply electrode 2022*d* and the power conduction pattern 2022*e* are formed by printing the paste obtained by mixing the conductive component (A), the glass component (B), and the organic binding component (C) on the substrate 2022*a* and baking the paste similarly to the heat generating element paste.

The power supply electrode 2022*d* and the conduction pattern 2022*e* are provided for the purpose of supplying power to the heat generating element 2022*b*, and a resistance is set to be sufficiently low with respect to the heat generating element 2022*b*. It is necessary to select a material that is softened and melts at a temperature that is lower than the melting point of the substrate 2022*a* and to select a material with heat resistance in view of the temperature in actual use, for the heat generating element paste, the power supply electrode and conduction pattern paste.

The power supply electrode 2022*d* and the conduction pattern 2022*e* in this example are formed using a paste for the power supply electrode and the conduction pattern obtained using silver as a conductive material and additionally incorporating a glass component and an organic binding component. The paste for the power supply electrode and the conduction pattern is applied to the substrate 2022*a* made of ceramics by screen printing, the resulting object is then dried at 180° C. and is baked at 850° C., and the power supply electrode 2022*d* and the conduction pattern 2022*e* are thereby formed.

(3-4) Protective Layer 2022*c*

The protective layer 2022*c* illustrated in FIGS. 26A and 26B are provided for the purpose of protecting the heat generating element 2022*b* and the conduction pattern 2022*e*. As a material, glass or polyimide (PI) is preferably used from the viewpoint of heat resistance, and a heat conductive filler with an insulating property and the like may be incorporated as needed.

In this example, a protective layer glass paste is prepared, the protective layer glass paste is applied to the heat generating element 2022*b* and the conduction pattern 2022*e* by screen printing, the resulting object is then dried at 180° C. and is baked at 850° C., and the protective layer 2022*c* with a layer thickness of 60 μm is thereby formed.

(4) Effects and Advantages

In order to explain the effects and advantages of the present invention, a mechanism in which a hole corresponding to a position of a staple opens in the film that is a plastic member when the fixing device is caused to transport recording material bound with the staple will be described first.

Figure 28A:
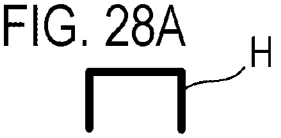
FIGS. 28A and 28B are schematic views illustrating a staple and a recording material bound with the staple.
Figure 28B:
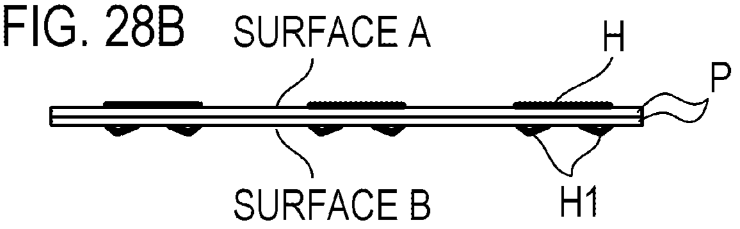
Figure 29:
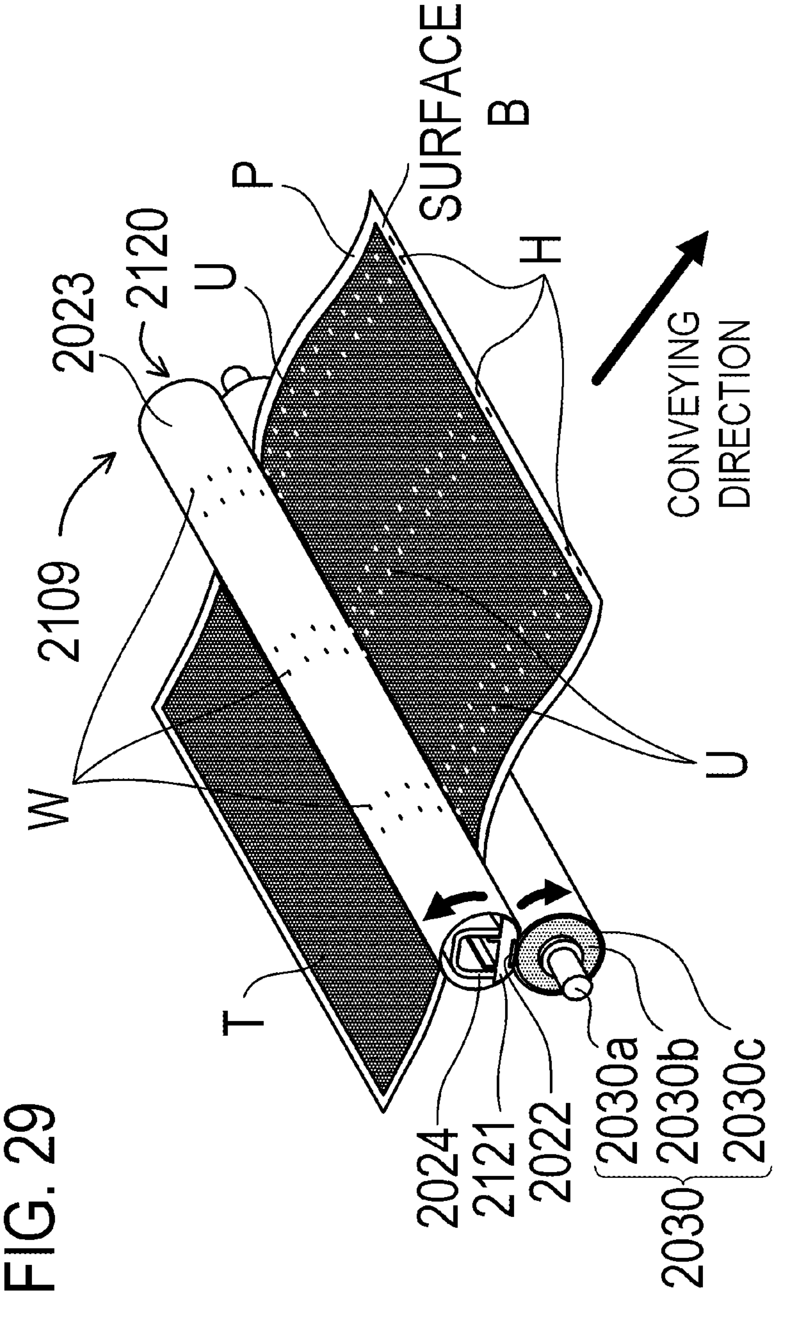
FIG. 29 is a perspective view illustrating a state in which a recording material is conveyed to a fixing device in an example in the related art.

FIG. 28A is a schematic view of the staple H, and FIG. 28B is a schematic view illustrating two pieces of recording material P bound using the staple H. FIG. 29 is a schematic view illustrating a state in which a fixing device 2109 including a film unit 2120 in an example in the related art is caused to transport the recording material P bound with the staple H and the paper is caused to pass therethrough. If the recording material P is bound with the staple H using a stapler, the staple H is attached to follow the recording material P on one surface (surface A), and the staple H is folded and forms a projecting-shaped bent portion H1 on the other surface (surface B). If the fixing device is caused to transport the recording material P bound with the staple H illustrated in FIG. 28B, there may be a case where a hole W corresponding to the position of the staple opens in the film 2023 that is a plastic member as illustrated in FIG. 29. In particular, when the recording material is conveyed such that the surface B side, which is a side on which the staple H is bent in FIG. 28B, comes into contact with the film 2023, the sharp bent portion H1 of the staple H sticks to the film 2023, and the hole opening in the film 2023 thus significantly occurs. As a result, heating and fixing of the toner image T on the recording material P corresponding to the hole W in the film 2023 are not sufficiently performed, and an offset image U as illustrated in FIG. 29 occurs, which may lead to a fixation failure.

A mechanism in which the staple H opens a hole in the film 2023 in the fixing device 2109 in the example in the related art will be described in more detail using FIGS. 30A to 30C and FIGS. 31A and 31B. Hereinafter, similar reference signs will be applied to configurations that are similar to those in Example 5 from among configurations in the example in the related art, and description thereof will be omitted. Note that the fixing device 2109 in the example in the related art illustrated in FIGS. 30A to 30C and FIGS. 31A and 31B is not provided with the heat conducting member 2051 and does not include the recessed portion provided at the film guide 2121, unlike this example. Therefore, the film 2023 comes direct contact with the heater 2022 and slides along the heater 2022 in the fixing device 2109.

Figure 30A:
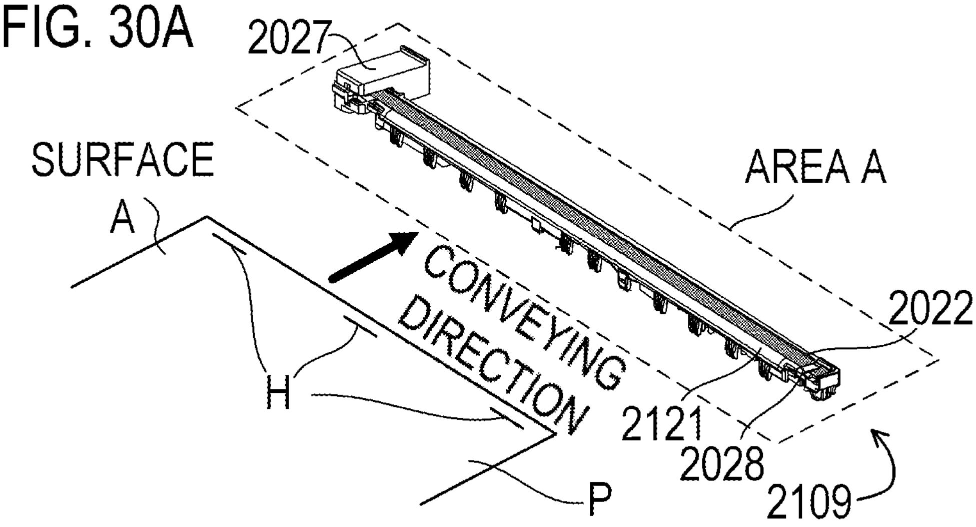
FIGS. 30A to 30C are diagrams illustrating a state in which a heater in an example in the related art warps in a conveying direction.
Figure 30B:
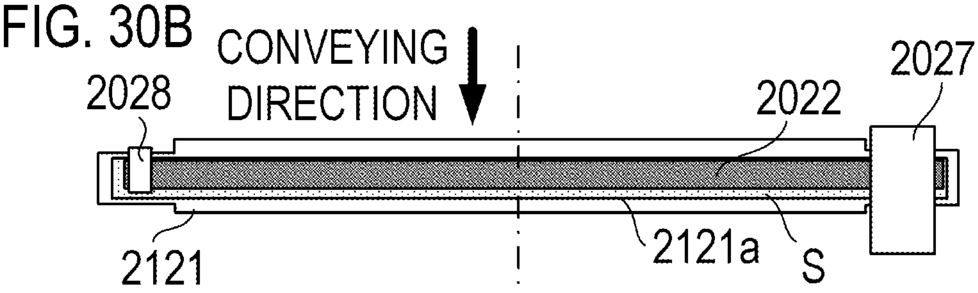
Figure 30C:
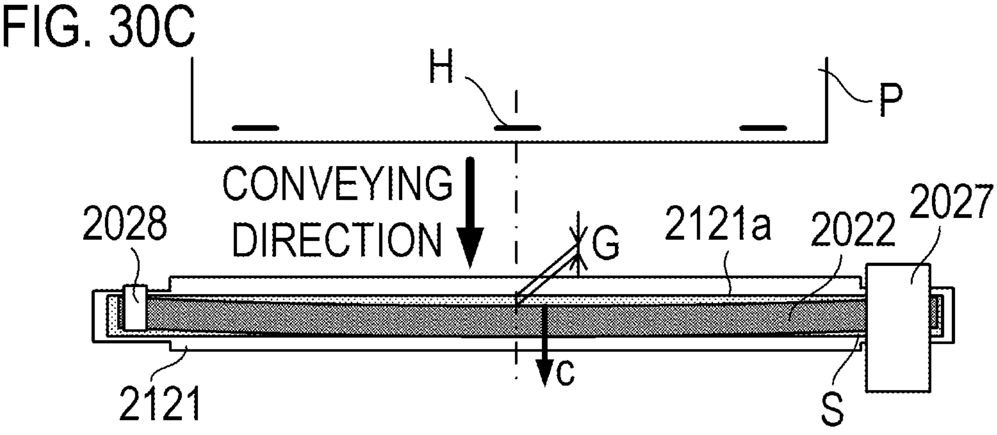

FIG. 30A is a perspective view illustrating a state in which the recording material P bound with the staple H is conveyed to the fixing device 2109 in the example in the related art by eliminating the film 2023 and the pressurizing roller 2030 such that the heater 2022 can be visually recognized. FIGS. 30A to 30C illustrate a case where the recording material P is conveyed with an orientation in which the surface B on the side where the staple H is bent abuts the film 2023. FIG. 30B illustrates an initial state of the fixing device 2109 in which the heater 2022 is attached to a heater support portion 2121*a* of the film guide 2121 in the area A in FIG. 30A and no load is imparted thereon. The heater support portion 2121*a* is widely provided with respect to the heater 2022 to have a clearance S between the heater support portion 2121*a* and the heater 2022 in consideration of heat generation and thus expansion of the heater 2022 as illustrated in FIG. 30B. Although both end portions of the heater 2022 are held by the power supply connector 2027 and the heater clip 2028, the heater 2022 is not particularly held in the sheet passing area through which the recording material P passes.

FIG. 30C illustrates a state in which the heater 2022 in contact with the film 2023 receives a force in the c direction from the film 2023 through rotation of the film 2023 and warps in the conveying direction of the recording material P. At this time, a clearance G occurs between the heater 2022 and the heater support portion 2121*a* on the upstream side in the conveying direction with respect to the heater 2022. Since the heater 2022 is held at both end portions thereof in the longitudinal direction by the power supply connector 2027 and the heater clip 2028, the clearance G reaches its maximum near the center of the heater 2022 in the longitudinal direction.

Figure 31A:
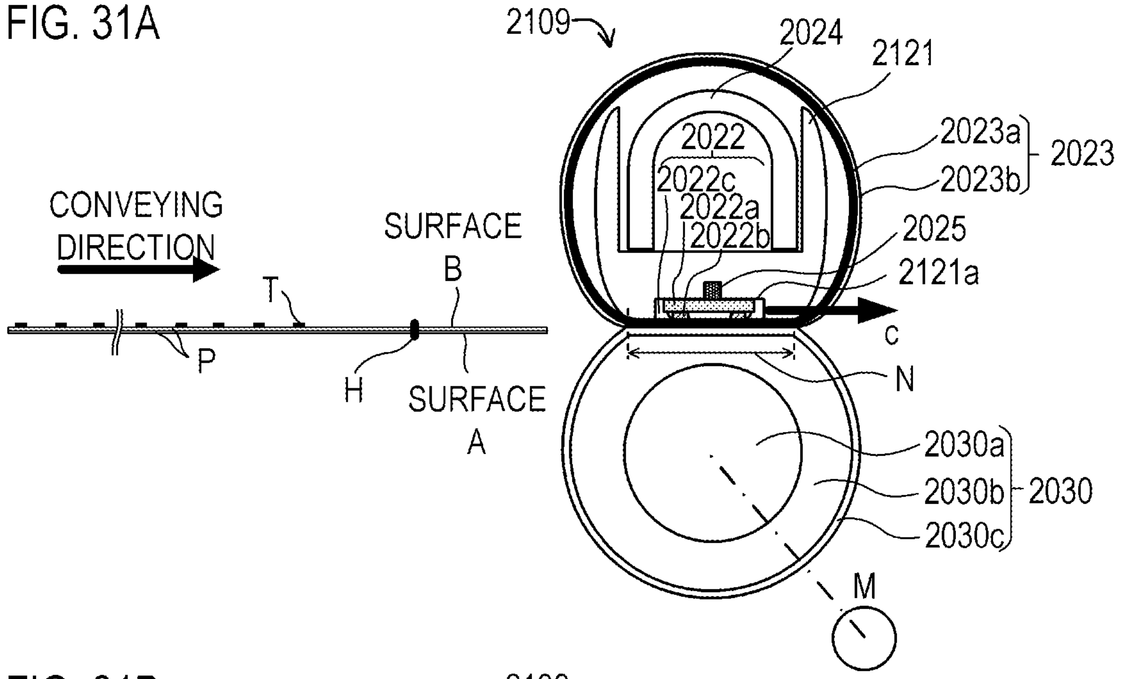
FIGS. 31A and 31B are sectional views of a fixing device in an example in the related art.
Figure 31B:
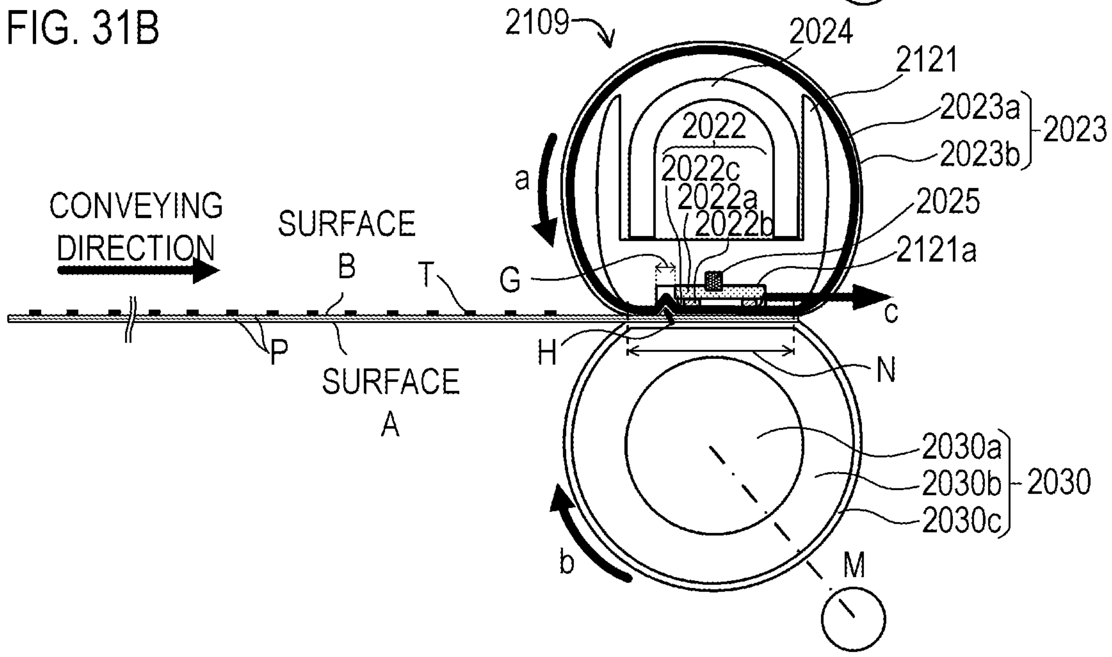

FIG. 31A is a sectional view of the center portion of the fixing device 2109 in the example in the related art in the longitudinal direction in a state in which the heater 2022 does not warp. FIG. 31B is a sectional view of the center portion of the fixing device 2109 in the longitudinal direction in a state in which the heater 2022 has warped due to rotation of the film 2023. The heater 2022 is disposed in the heater support portion 2121*a* of the film guide 2121.

Since the staple H receives a pressurizing force from the pressurizing roller 2030 at the nip portion N, the staple H is pushed into the clearance G. At this time, the staple H strongly rubs against a hard and sharp corner of the heater 2022, and a hole thereby opens in the film 2023 at a part sandwiched therebetween. Note that although a case where the staple H is pushed into the clearance between the heater 2022 and the heater support portion 2021*a* and on the downstream side in the conveying direction with respect to the heater 2022 is also assumed, the film guide 2021 is not such hard and sharp like the heater 2022, and the probability that a hole opens in the film 2023 is thus low. In the paper feeding evaluation, which will be described later, no holes opened in the film 2023 even with a configuration in which a clearance was included on the down stream side in the conveying direction with respect to the heater 2022.

(4-1) Paper Feeding Evaluation

Next, paper feeding evaluation that has been carried out to check the effects and advantages of the present invention will be described. As the paper feeding evaluation, twenty papers obtained by stacking every two pieces of recording material P and binding them with staples H at three locations at the leading end were successively fed at a conveyance speed of 200 mm/s as illustrated in FIG. 28B, and hole opening in the film 2023 and whether or not an image failure had occurred were checked. The paper feeding evaluation was similarly carried out for the fixing device 2109 which was not provided with the heat conducting member in the aforementioned example in the related art as a target of comparison in addition to the fixing device 2009 in this example, and the results were compared.

As a result of performing evaluation using the fixing device 2009 provided with the heat conducting member 2051 in this example, no holes opened in the film 2023, and satisfactory fixed images were obtained on all evaluation papers.

As illustrated in FIG. 23, the projecting portion 2051*a* of the heat conducting member 2051 is inserted into the recessed portion 2021*b* of the film guide 2021 in this example. Therefore, even if a force in the c direction works on the heating unit 2050, relative movement of the heating unit 2050 on the downstream side in the conveying direction with respect to the film guide 2021 is restricted. Therefore, a clearance which the staple H enters does not occur between the heating unit 2050 and the heater support portion 2021*a* on the side further upstream than the heating unit 2050 in the conveying direction, and it is possible to prevent hole opening in the film 2023 even in a case where a recording material with something projecting such as the staple H is conveyed according to the present invention. Note that any of a configuration in which the projecting portion 2051*a* abuts the recessed portion 2021*b* from the beginning and a configuration in which the projecting portion 2051*a* does not abut the recessed portion 2021*b* from the beginning in a state where no loads are imparted on the heating unit 2050 may be employed as long as the clearance between the heating unit 2050 and the film guide 2021 is minimized according to the configuration.

The fixing device 2109 in the example in the related art is configured such that the heat conducting member illustrated in FIGS. 31A and 31B is not provided as described above. Since configurations that are similar to those in Example 5 are employed in relation to the other configurations in the image forming apparatus and the fixing device, description thereof will be omitted.

When paper feeding test similar to that in Example 5 was carried out using the fixing device 2109 in the example in the related art, a hole opened in the film 2023, an offset image U as illustrated in FIG. 29 occurred, and an image failure occurred. This is considered to be because the heater 2022 received the force in the c direction from the film 2023 and moved in the conveying direction as illustrated in FIG. 31B. In other words, the staple H received a pressurizing force from the pressurizing roller 2030, the staple H was pushed into the clearance G between the heater 2022 and the heater support portion 2121*a* generated on the side further upstream than the heater 2022 in the conveying direction, and as a result, the staple H and the corner of the heater 2022 strongly rubbed against each other, and the hole thereby opened in the film 2023.

Note that in order to prevent a hole from opening in the film as in this example, it is not always necessary for the projecting portion 2051*a* to extend over the entire range of the heat conducting member 2051 in the longitudinal direction (the width direction of the recording material). It is possible to expect effects that are similar to those of this example as long as a configuration in which the projecting portion 2051*a* of the heat conducting member 2051 is provided in the sheet passing area of the recording material P through which the staple H passes. If the projecting portion 2051*a* is provided at the center portion in the longitudinal direction where the amount of deformation of the heater 2022 becomes the largest, in particular, relative movement of the heating unit 2050 on the downstream side in the conveying direction with respect to the film guide 2021 can be effectively restricted.

Figure 27A:
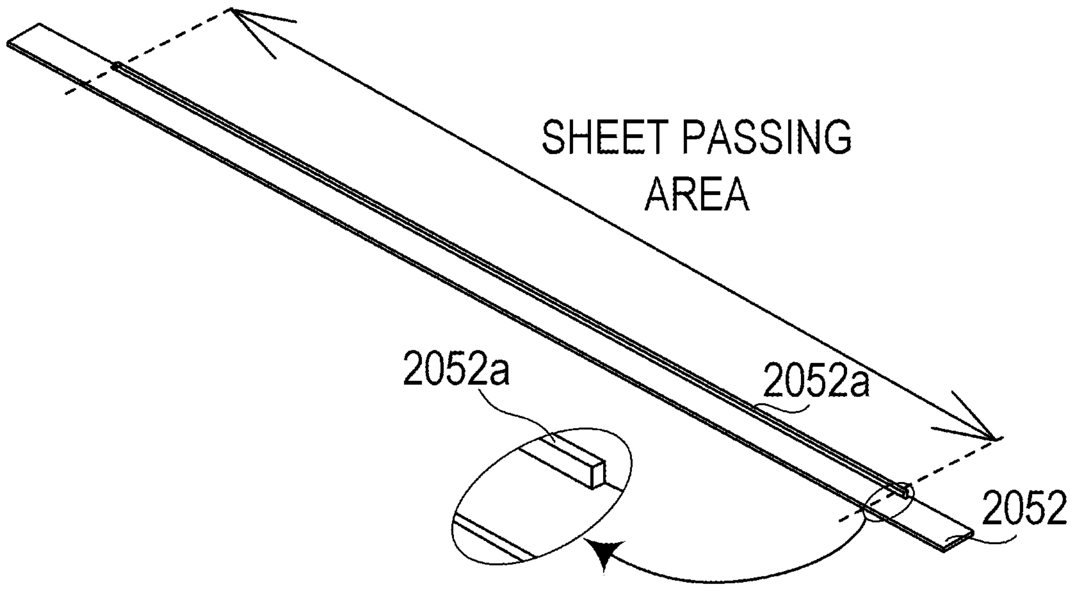
FIGS. 27A and 27B are modification examples of the heat conducting member according to Example 5.
Figure 27B:
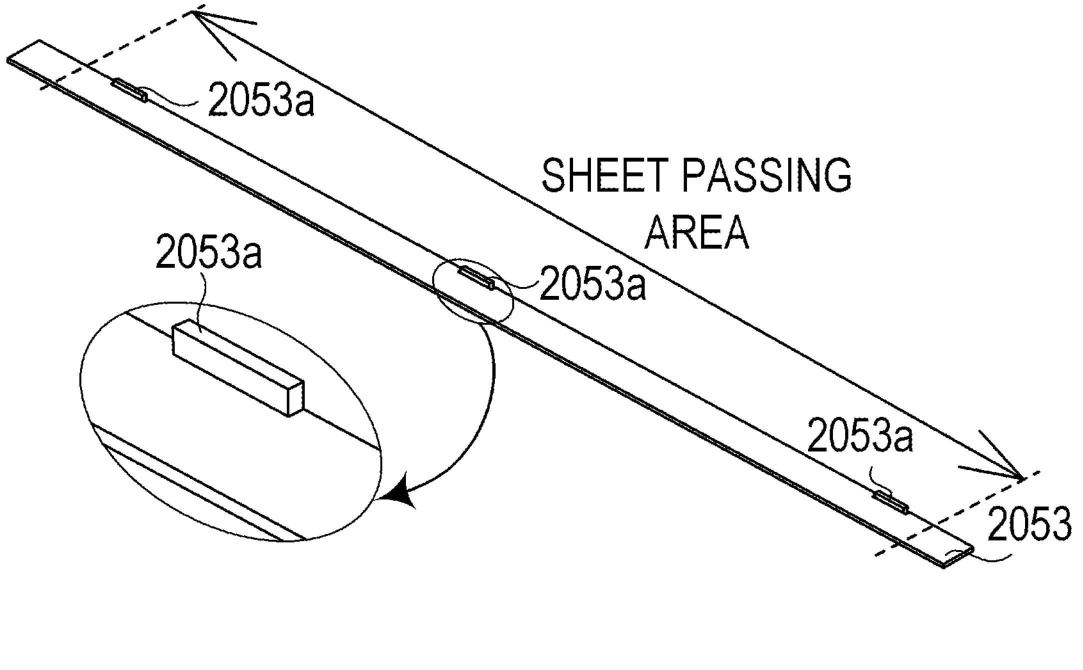

As described above, the present invention is not limited to the configuration in Example 5, and in a modification example, a configuration in which the projecting portion 2052*a* is provided in the entire sheet passing area rather than the entire region of the heat conducting member 2052 in the longitudinal direction may be employed as in the heat conducting member 2052 illustrated in FIG. 27A. In another modification example, a configuration in which a plurality of projecting portions 2053*a* with a shorter length in the longitudinal direction are provided in the sheet passing area may be employed as in the heat conducting member 2053 illustrated in FIG. 27B. Since the projecting portions 2052*a* are provided in the entire sheet passing area in the heat conducting member 2052, it is possible to obtain sufficient strength against a force received due to rotation of the film 2023. On the other hand, since the heat conducting member 2053 includes the projecting portions 2053*a* with a shorter length in the longitudinal direction provided at three locations in the sheet passing area, the heat conducting member 2053 is inferior to the heat conducting member 2052 in terms of strength. However, the heat conducting member 2053 with a small volume is more excellent than the heat conducting member 2052 from the viewpoint of minimizing an increase in heat capacity. In other words, it is possible to appropriately select a necessary configuration in consideration of a pressurizing force of the fixing device, strength required in accordance with a rotation rate of the film and the like, a warming-up time required for the image forming apparatus, a manufacturing cost of the heat conducting member, and the like.

Although the configuration in which the projecting portion 2051*a* is located on the upstream side in the conveying direction with respect to the heater 2022 is employed in this example, a configuration in which the projecting portion is located on the downstream side in the conveying direction, a configuration in which the projecting portions are located on both upstream and downstream sides, and the like are also conceivable as other modification examples. Alternatively, a configuration in which the projecting portion extends on the side toward the pressurizing roller rather than the side away from the pressurizing roller in the pressurizing direction is also exemplified as a modification example. Furthermore, the projecting portion does not necessarily extend perpendicularly to the surface of the recording material, and the projecting portion may extend at a predetermined angle with respect to the pressurizing direction as long as movement of the heating unit on the downstream side in the conveying direction is restricted with the configuration. In other words, the configuration is not limited to the projecting portion and the recessed portion, and it is possible to obtain a similar effect of preventing a hole from opening in the film as long as the heating unit and the heater holder are provided with an engaging portion and an engaged portion to restrict relative movement of the heating unit with respect to the heater holder in the configuration.

Example 6

Next, Example 6 of the present invention will be described. A fixing device 2209 in Example 6 does not include a heat conducting member, and a projecting portion that is engaged with a recessed portion of a film guide is provided at a substrate of a heater. Hereinafter, similar reference signs will be applied to configurations that are similar to those in Example 5 from among configurations in Example 6, and description thereof will be omitted.

Figure 32:
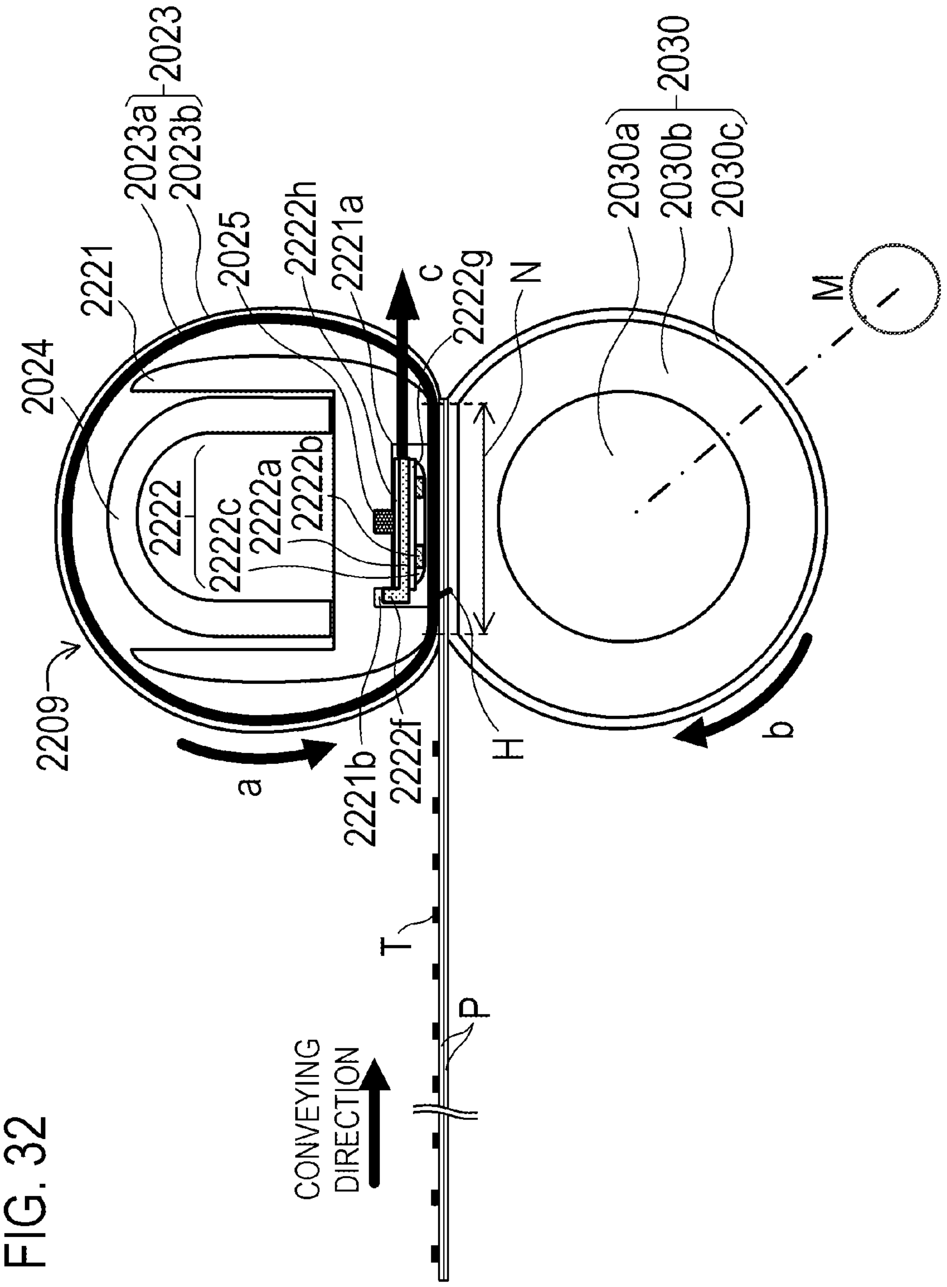
FIG. 32 is a sectional view of a fixing device according to Example 6.
Figure 33A:
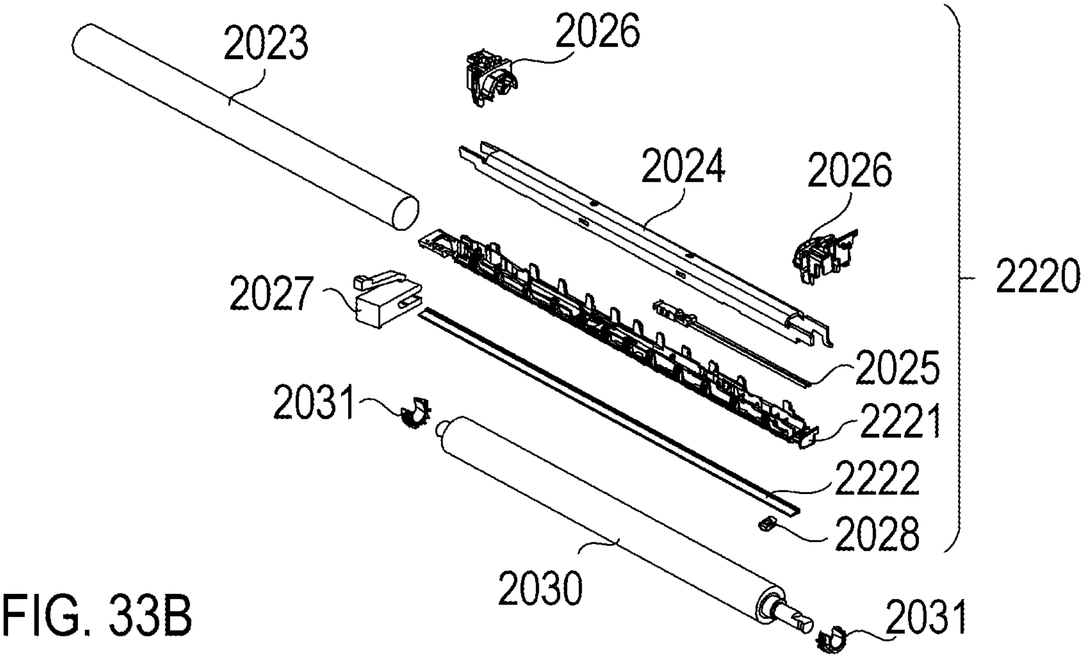
FIGS. 33A and 33B are perspective views of a film unit and a heater according to Example 6.
Figure 33B:
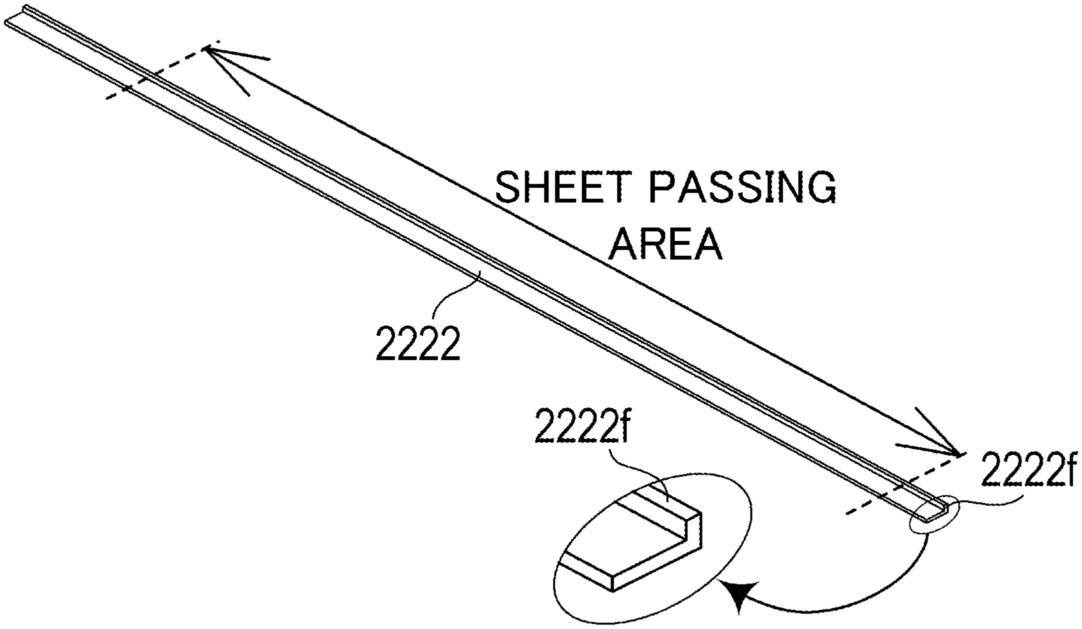

FIG. 32 is an overview sectional view of the fixing device 2209 in this example and illustrates a state in which two pieces of recording material P bound with a staple H have a toner image T and are conveyed to the fixing device 2209. Also, FIG. 33A is an exploded perspective view of a film unit 2220 used in the fixing device 2209, and FIG. 33B is a perspective view of the heater 2222 using a projecting portion 2222*f*

The fixing device 2209 in Example 6 is different from the fixing device 2009 in Example 5 in that the fixing device 2209 in Example 6 does not include a heat conducting member and the heater 2222 includes the projecting portion 2222*f* that is engaged with a recessed portion 2221*b* of the film guide 2221. In other words, the heating unit in this example is configured of the heater 2222 alone. Description of the other components of the image forming apparatus and the fixing device that are similar to those in Example 5 will be omitted.

Figure 34A:
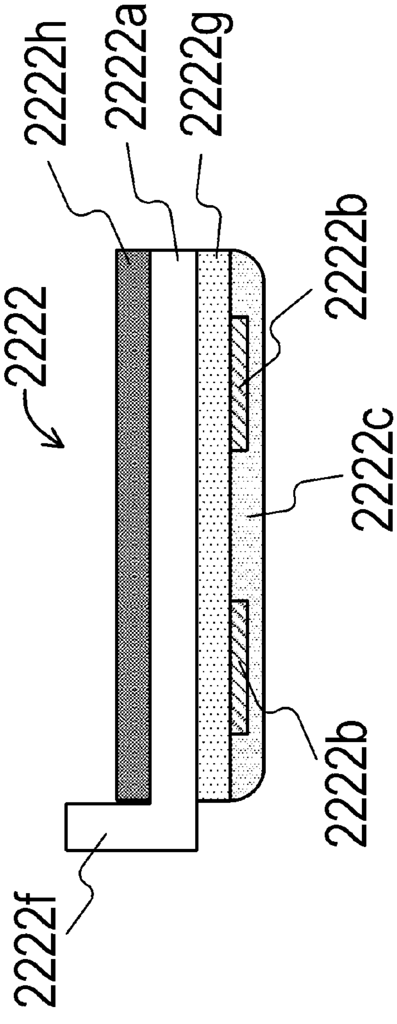
FIGS. 34A and 34B are respectively a sectional view and a plan view of the heater according to Example 6.
Figure 34B:
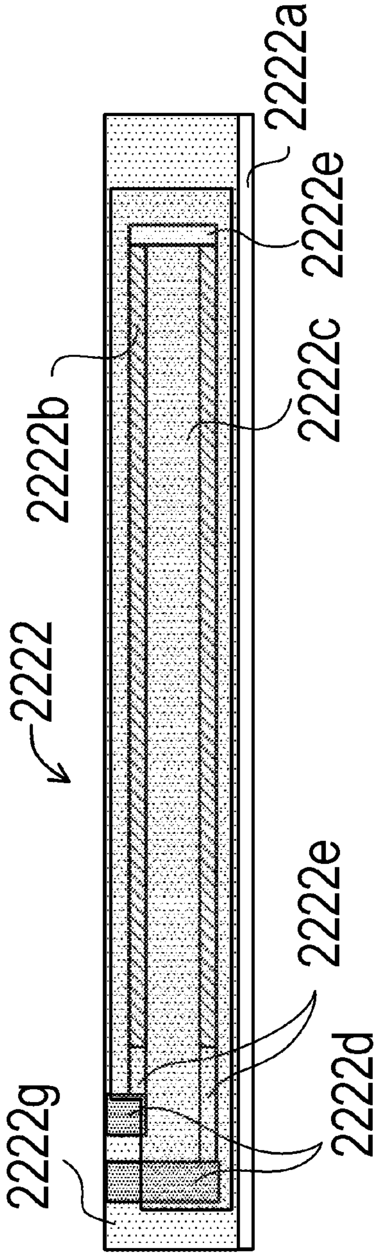

Next, a material configuring the heater 2222, a manufacturing method, and the like in this example will be described using FIGS. 34A and 34B. FIG. 34A is a sectional view of the heater 2222 when seen from the longitudinal direction, and FIG. 34B is a plan view of a substrate 2222*a* when seen from the thickness direction.

The substrate 2222*a* of the heater 2222 in this example is made of metal, and it is only necessary for the substrate 2222*a* to contain at least a metal alloy as a main material. The heater 2222 includes the thin and long plate-shaped substrate 2222*a*, a heat generating element 2222*b* that generates heat in response to power distribution, an insulating layer 2222*g* that insulates the heat generating element 2222*b* from the substrate 2222*a*, and a protective layer 2222*c* that protects the heat generating element. Also, an insulating layer 2222*h* is also provided on the surface of the substrate 2222*a* on the side opposite to the surface on which the heat generating element 2222*b* is provided in order to prevent warpage of the substrate at the time of manufacturing. In this example, the heat generating element 2222*b* is provided on the substrate 2222*a* via the insulating layer 2222*g*.

The substrate 2222*a* is provided with the projecting portion 2222*f* formed by an end portion of the substrate 2222*a* on the upstream side in the conveying direction being folded. The projecting portion 2222*f* is located on the side further upstream than the heat generating element 2222*b* and an insulating layer 2222*h* in the conveying direction and extends to project on the side further from a pressurizing roller 2030 than the insulating layer 2222*h* in the thickness direction of the substrate 2222*a*. On the other hand, the recessed portion 2221*b* provided at the film guide 2221 is recessed in the thickness direction of the substrate 2222*a* and on the side away from the pressurizing roller 2030 and is engaged with the projecting portion 2222*f* Note that in this example, the thickness direction of the substrate 2222*a* is substantially parallel with the pressurizing direction of the recording material P conveyed to the fixing device 2209.

As a material used in the substrate 2222*a* made of metal, stainless steel, nickel, copper, aluminum, or an alloy containing such metal as a main material is suitably used. Among these, stainless steel is most preferably used in terms of strength, heat resistance, and corrosion. The type of stainless steel is not particularly limited, and it is only necessary to appropriately select stainless steel in consideration of necessary mechanical strength, a linear expansion coefficient in accordance with formation of the insulating layer and the heat generating elements, which will be described later, easiness of obtaining the plate material in the market, and the like. In one example, martensite-based stainless steel and ferrite-based stainless steel of chromium-based stainless steel (400-based) have relatively low linear expansion coefficients from among others and are thus suitably used because the insulating layer and the heat generating elements are easily formed with them.

The thickness of the substrate 2222*a* may be determined in consideration of strength, a heat capacity, and heat dissipation performance. Although a thin thickness of the substrate 2222*a* leads to a small heat capacity and is thus advantageous for quick starting, a problem such as distortion is likely to occur when the heat generating element 2222*b* is heated if the thickness is too thin. On the contrary, although a thick thickness of the substrate 2222*a* is advantageous in terms of distortion when the heat generating element 2222*b* is heated, an excessively thick thickness is disadvantageous for quick starting due to a large heat capacity. A preferable thickness of the substrate 2222*a* is about 0.3 mm to 2.0 mm in a case where a balance of mass production, cost, and performance is taken into consideration. The substrate 2222*a* in this example is a ferrite-based stainless steel substrate (SUS430:18Cr stainless steel) with a width of 10 mm, a length of 300 mm, and a thickness of 0.5 mm.

Next, the insulating layers 2222*g* and 2222*h* will be described. Although a material of the insulating layers 2222*g* and 2222*h* is not particularly limited, it is necessary to select a material with heat resistance in view of a temperature in actual use. As a material, glass or polyimide (PI) is preferably used from the viewpoint of heat resistance, and a powder material in a case where glass is used may be appropriately selected without losing properties of the present invention from the viewpoint of heat resistance and the like. Furthermore, a heat conductive filler with an insulating property and the like may be incorporated as needed. No problems occur if mutually the same material or different materials are formed for the insulating layers 2222*g* and 2222*h*. In relation to the layer thicknesses, the insulating layers 2222*g* and 2222*h* may have the same thickness or different thicknesses. It is generally preferable that a heater used in an image forming apparatus have a dielectric strength of about 1.5 kV, and it is only necessary to secure the layer thickness of the insulating layer 2222*g* in accordance with the material in order to obtain the dielectric strength performance of 1.5 kV between the heat generating element 2222*b* and the substrate 2222*a*. Although a method for forming the insulating layers 2222*g* and 2222*h* is not particularly limited, it is possible to smoothly form the insulating layers 2222*g* and 2222*h* by a screen printing method or the like in one example. When an insulating layer of glass or polyimide (PI) is formed on the substrate 2222*a*, it is necessary to appropriately adjust the linear expansion coefficients of the materials of the substrate and the insulating layer such that cracking or peeling does not occur in insulating layer due to a difference between the linear expansion coefficients of the materials.

In this example, an insulating layer glass paste is applied to the aforementioned substrate 2222*a* made of stainless steel by screen printing, the resulting object is dried at 180° C. and is baked at 850° C., and the insulating layer 2222*g* with a layer thickness of 60 μm and the insulating layer 2222*h* with a layer thickness of 120 μm are thereby formed. Since a method for forming the heat generating element 2222*b*, the power supply electrode 2222*d*, the conduction pattern 2222*e*, and the protective layer 2222*c* on the substrate 2222*a* on which the insulating layers 2222*g* and 2222*h* is similar to that in Example 5, description thereof will be omitted.

Effects and advantages of this example will be described using FIG. 32. In this example, the projecting portion 2222*f* of the heater 2222 is inserted into the recessed portion 2221*b* of the film guide 2221. Therefore, even if a force in the direction c works on the heater 2222, relative motion of the heater 2222 on the downstream side in the conveying direction with respect to the film guide 2221 is restricted. Therefore, a clearance which the staple H enters does not occur between the heater 2222 and the heater support portion 2221*a* on the side further upstream than the heater 2222 in the conveying direction, and it is possible to prevent hole opening in the film 2023 even in a case where a recording material with something projecting such as the staple H is conveyed according to the present invention.

As a result of carrying out a paper feeding test similar to that in Example 5 using the fixing device 2209 in this example, no holes opened in the film 2023 and satisfactory fixed images were obtained on all evaluated papers. Moreover, since the heat conducting member 2051 is not provided in this example, there is no increase in an extra heat capacity, and it is possible to improve the warming-up time of the fixing device 2209 as compared with Example 5.

Figure 35A:
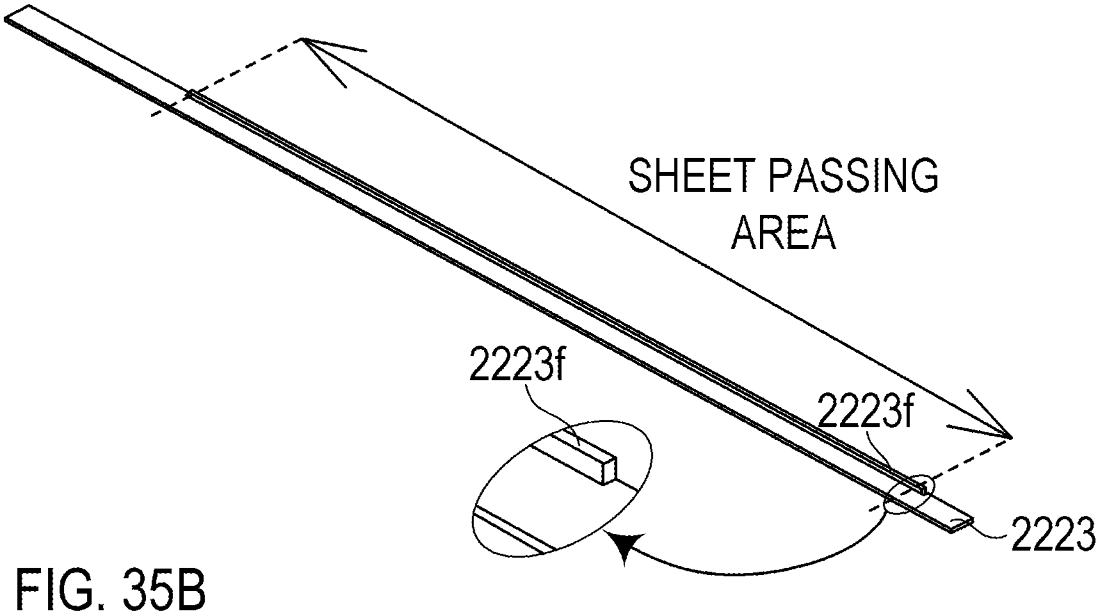
FIGS. 35A and 35B are modification examples of the heater according to Example 6.
Figure 35B:
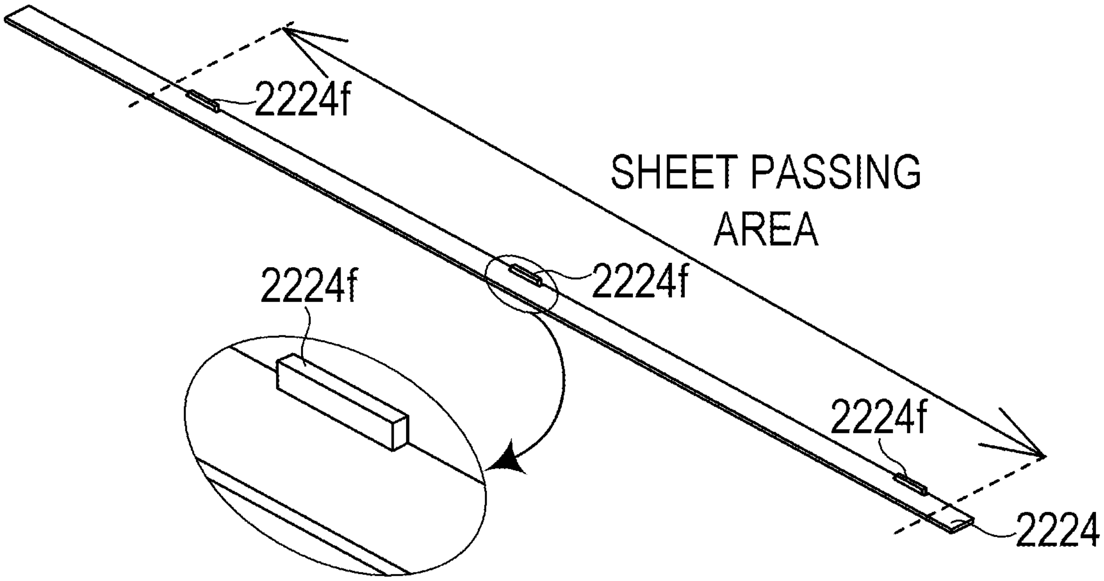

Note that the present invention is not limited to the aforementioned configuration, and in a modification example, a configuration in which the projecting portion 2223*f* is provided in the entire sheet passing area rather than the entire region of the heater 2223 in the longitudinal direction may be employed as in the heater 2223 illustrated in FIG. 35A. In another modification example, a configuration in which a plurality of projecting portions 2224*f* with a shorter length in the longitudinal direction are provided in the sheet passing area may be employed as in the heater 2224 illustrated in FIG. 35B. The heater 2223 include the projecting portion 2223*f* provided in the entire sheet passing area, and it is thus possible to obtain sufficient strength with respect to a force received due to rotation of the film 2023. On the other hand, the heater 2224 includes the projecting portions 2224*f* with a shorter length in the longitudinal direction provided at three locations in the sheet passing area, and the heater 2224 is thus inferior to the heater 2223 in terms of strength. However, the heater 2224 with a small volume is more excellent than the heater 2223 from the viewpoint of minimizing an increase in heat capacity. In other words, it is possible to appropriately select a necessary configuration in consideration of a pressurizing force of the fixing device, strength required in accordance with a rotation rate of the film and the like, a warming-up time required for the image forming apparatus, a manufacturing cost of the heating unit, and the like.

In another configuration, a configuration in which the projecting portion is located on the downstream side in the conveying direction, a configuration in which the projecting portions are located on both upstream and downstream sides, and the like are also conceivable although the configuration in which the projecting portion 2222*f* is located on the upstream side of the heater 2222 in the conveying direction is employed in this example. Alternatively, a configuration in which the projecting portion extends on the side toward the pressurizing roller rather than the side away from the pressurizing roller in the pressurizing direction is also exemplified as a modification example. Moreover, the projecting portion does not necessarily extend perpendicularly to the surface of the recording material, and the projecting portion may extend at a predetermined angle with respect to the pressurizing direction as long as movement of the heater on the downstream side in the conveying direction is restricted with the configuration.

Furthermore, a configuration in which a substrate made of metal is provided with a heat conducting member including a projecting portion, a configuration in which a substrate made of ceramic is provided with a projecting portion, and the like are also conceivable in other modification examples. A modification example in which a substrate 2522*a* made of metal is provided with a heat conducting member 2551 including a projecting portion 2551*a* will be described using FIGS. 36 and 16. Hereinafter, similar reference signs will be applied to configurations that are similar to those in Example 5 from among configurations in the modification example, and description thereof will be omitted.

Figure 36:
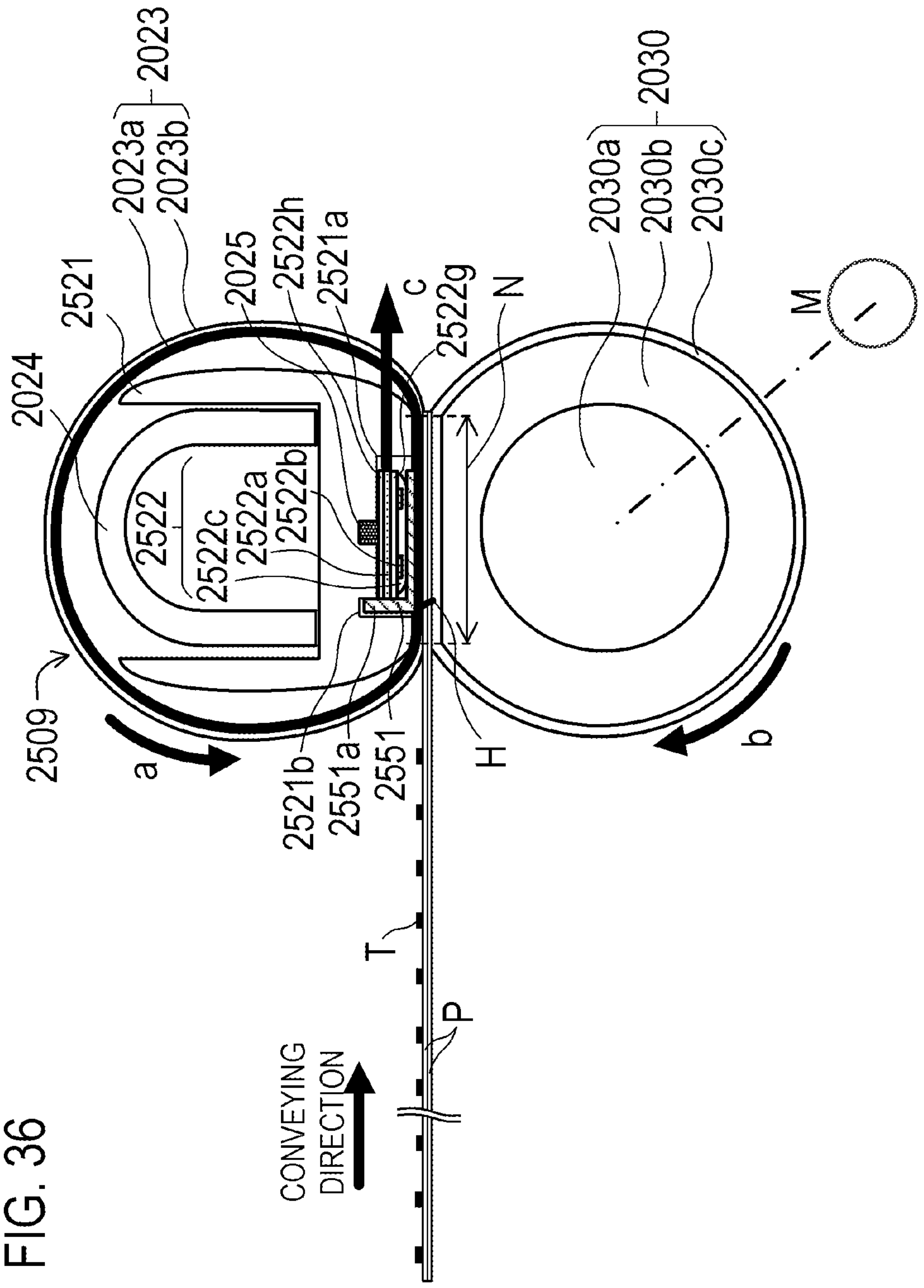
FIG. 36 is a sectional view of a fixing device according to a modification example.

FIG. 36 is an overview sectional view of a fixing device 2509 according to the modification example. The fixing device 2509 is configured such that the heat conducting member 2551 including the projecting portion 2551*a* is joined to a heater 2522 similarly to Example 5. Once the heater 2522 is attached to the heater attachment portion 2521*a* of the of a film guide 2521, the projecting portion 2551*a* of the heat conducting member 2551 is engaged with a recessed portion 2521*b* of the film guide 2521, and relative movement of the heater 2522 in the conveying direction with respect to the film guide 2521 is restricted.

Figure 37A:
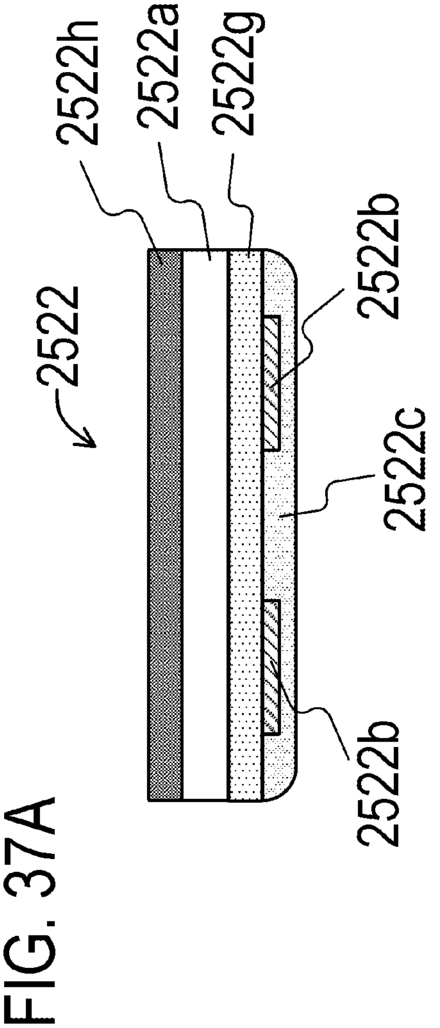
FIGS. 37A and 37B are respectively a sectional view and a plan view of a heater according to a modification example.
Figure 37B:
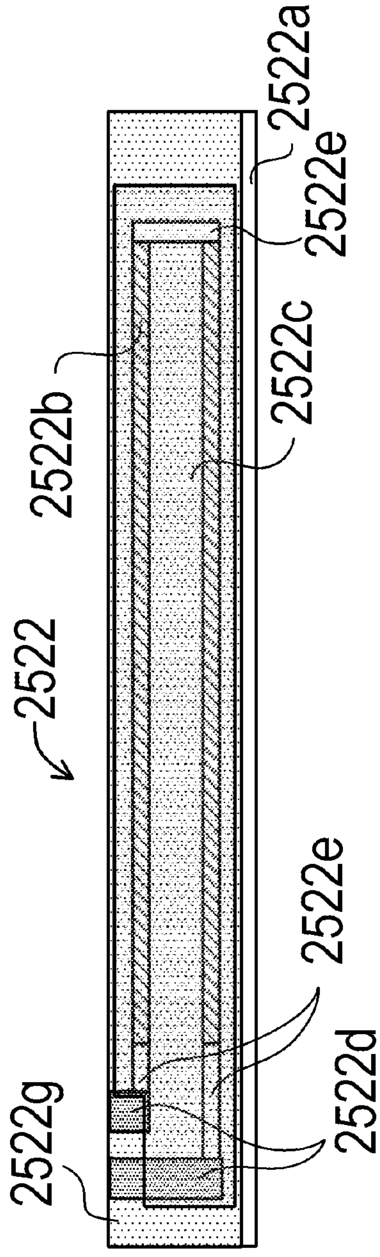

FIG. 37A is a sectional view of the heater 2522 when seen from the longitudinal direction, and FIG. 37B is a plan view of the heater 2522 when seen from the thickness direction of the substrate 2522*a*. It is only necessary for the substrate 2522*a* of the heater 2522 in this example to be made of metal and contain at least a metal alloy as a main material. The heater 2522 includes a thin and long plate-shaped substrate 2522*a*, a heat generating element 2522*b* that generates heat in response to power distribution, an insulating layer 2522*g* that insulates the heat generating element 2522*b* from the substrate 2522*a* and a protective layer 2522*c* that protects the heat generating element. Additionally, an insulating layer 2522*h* is also provided on the surface of the substrate 2522*a* on the side opposite to the surface on which the heat generating element 2522*b* is provided in order to prevent warpage of the substrate at the time of manufacturing. In this example, the heat generating element 2522*b* is provided on the substrate 2522*a* via the insulating layer 2522*g*.

Example 7

Next, Example 7 according to the present invention will be described. In a fixing device 2309 in Example 7, a film guide 2321 includes a projecting portion 2321*b*, and a recessed portion 2351*a* provided at a heat conducting member 2351 of a heating unit 2350 is engaged with the projecting portion 2321*b*. Hereinafter, similar reference signs will be applied to configurations similar to those in Example 5 from among configurations in Example 7, and description thereof will be omitted.

Figure 38:
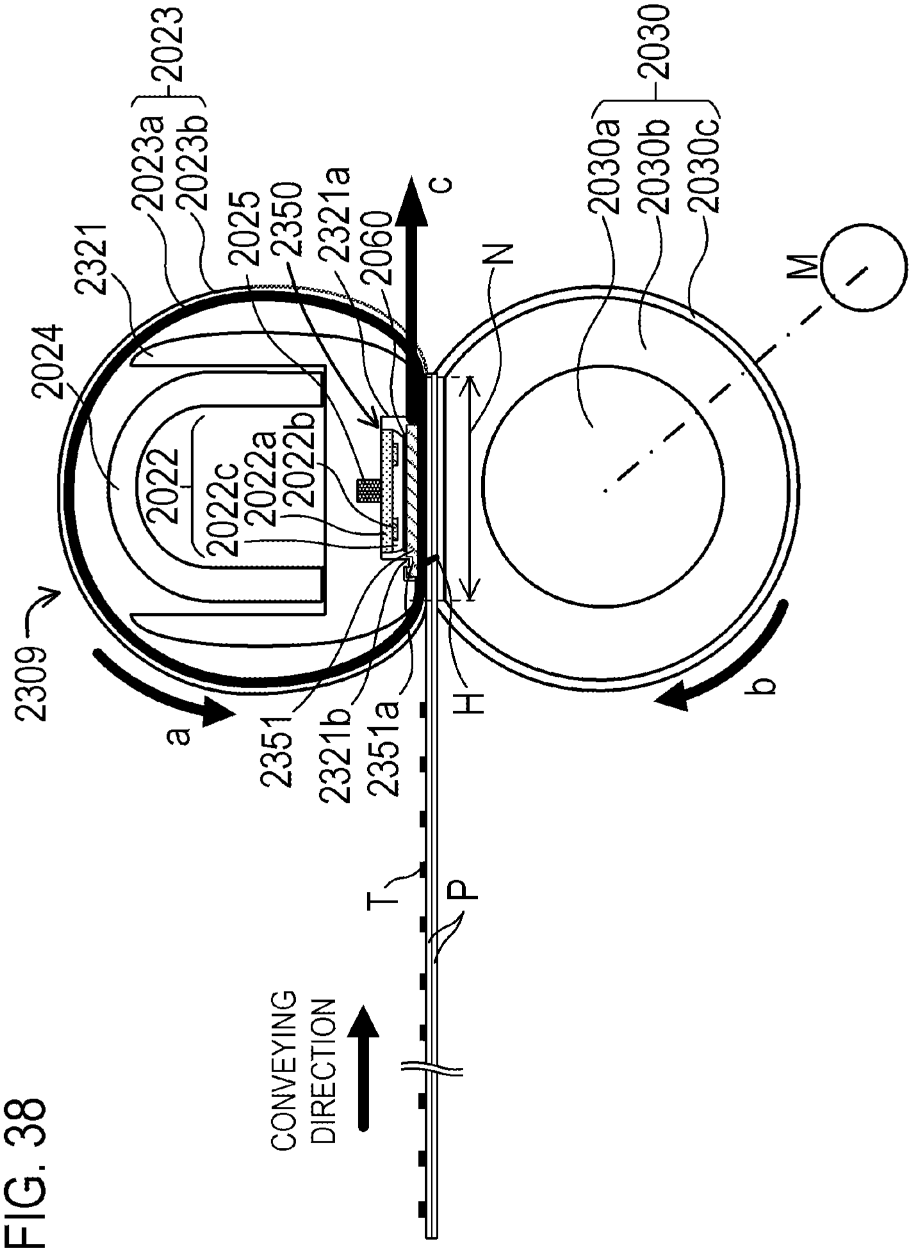
FIG. 38 is a sectional view of a fixing device according to Example 7.

FIG. 38 is an overview sectional view of the fixing device 2309 in this example and illustrates a state in which two pieces of recording material P bound with a staple H for a stapler have a toner image T and are conveyed to the fixing device 2309. In this example, the heating unit 2350 is configured of a heater 2022 and a heat conducting member 2351 with similar configurations as those in Example 5.

Figure 39A:
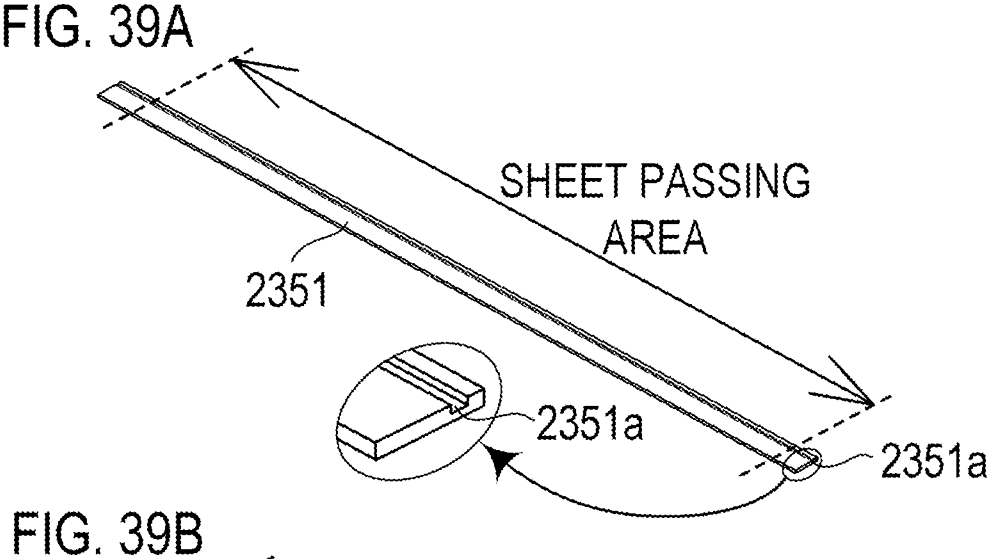
FIGS. 39A to 39C are schematic views illustrating heat conducting members according to Example 7 and modification examples.

The heat conducting member 2351 in this example includes a recessed portion 2351*a*. The recessed portion 2351*a* is located on the side further upstream than the heater 2022 in the conveying direction and is recessed in the thickness direction of the substrate 2022*a* and on the side toward the pressurizing roller 2030 inside the heating unit 2350. On the other hand, a projecting portion 2321*b* provided at the film guide 2321 extends in the thickness direction of the substrate 2022*a* and on the side toward the pressurizing roller 2030 and is engaged with the recessed portion 2351*a*. In the heat conducting member 2351 in this example, the recessed portion 2351*a* is formed over the entire region in the longitudinal direction as illustrated in FIG. 39A. Note that in this example, the thickness direction of the substrate 2022*a* is substantially parallel with the pressurizing direction of the recording material P conveyed to the fixing device 2309.

Even if a force in the direction c works on the heating unit 2350 due to engagement between the recessed portion 2351*a* and the projecting portion 2321*b*, relative movement of the heating unit 2350 on the downstream side in the conveying direction with respect to the film guide 2321 is restricted. Therefore, a clearance which the staple H enters does not occur between the heating unit 2350 and the heater support portion 2321*a* on the side further upstream than the heating unit 2350 in the conveying direction, and it is possible to prevent hole opening in the film 2023 even in a case where a recording material with something projecting such as the staple H is conveyed according to the present invention.

As a result of carrying out a paper feeding test similar to that in Example 5 using the fixing device 2309 in this example, no holes opened in the film 2023 and satisfactory fixed images were obtained on all evaluated papers. Moreover, since the heat conducting member 2351 is provided with the recessed portion 2351*a* rather than a projecting portion in this example, the heat conducting member 2351 in this example has a smaller volume and a smaller heat capacity as compared with the heat conducting member 2051 in Example 5. Therefore, since the heat capacity of the heat conducting member is reduced in this example as compared with Example 5, it is possible to improve a warming-up time of the fixing device.

Figure 39B:
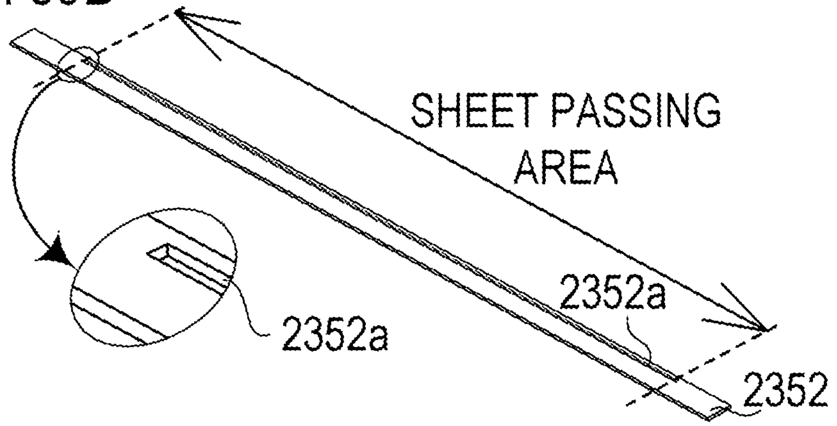
Figure 39C:
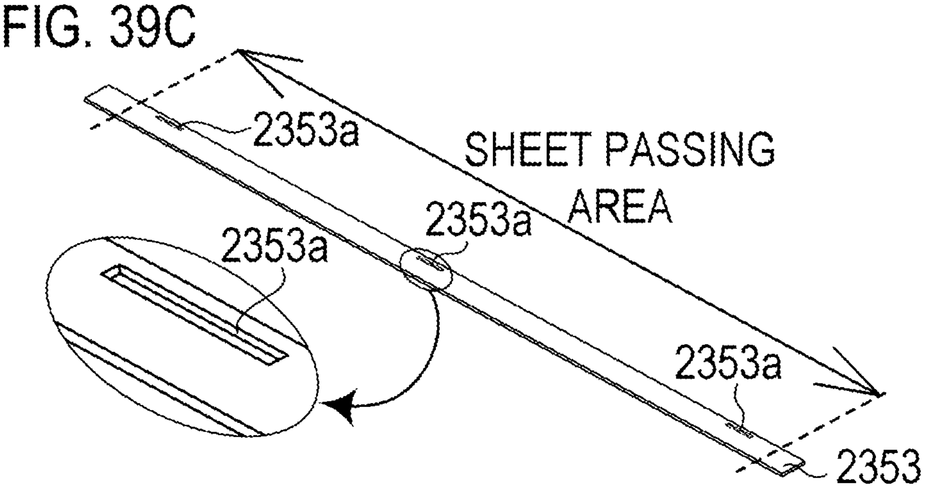

Note that the present invention is not limited to the aforementioned configuration, and in a modification example, a configuration in which the recessed portion 2352*a* is provided over the entire sheet passing area rather than the entire region of the heat conducting member 2352 in the longitudinal direction as in the heat conducting member 2352 illustrated in FIG. 39B, for example, may be employed. In another modification example, a configuration in which a plurality of recessed portions 2353*a* with a shorter length in the longitudinal direction are provided in the sheet passing area as in the heat conducting member 2353 illustrated in FIG. 39C may also be employed. Since the heat conducting member 2352 includes the recessed portions 2352*a* provided over the entire sheet passing area, it is possible to obtain sufficient strength with respect to a force received due to rotation of the film 2023. On the other hand, the heat conducting member 2353 includes the recessed portions 2353*a* with a shorter length in the longitudinal direction provided at three locations in the sheet passing area and is thereby inferior to the heat conducting member 2352 in terms of strength. However, the heat conducting member 2353 with a smaller volume is more excellent than the heat conducting member 2352 from the viewpoint of minimizing an increase in heat capacity. Also, in a case where the recessed portion is worked by cutting working, the heat conducting member 2353 including the recessed portion with a shorter length is more excellent than the heat conducting member 2351 and the heat conducting member 2352 in terms of working cost. In other words, it is possible to appropriately select a necessary configuration in consideration of a pressurizing force of the fixing device, strength required in accordance with a rotation rate of the film and the like, a warming-up time required for the image forming apparatus, a manufacturing cost of the heating unit, and the like.

As other modification examples, various configurations such as a configuration in which the recessed portion is provided on the downstream side in the conveying direction with respect to the heater, a configuration in which recessed portions are provided on both upstream and downstream sides, and a configuration in which the substrate is made of metal rather than ceramic are conceivable.

Example 8

Next, Example 8 according to the present invention will be described. A fixing device 2409 in Example 8 does not include a heat conducting member similarly to Example 6. Also, in the fixing device 2409 in Example 8, a film guide 2421 includes a projecting portion 2421*b* and a recessed portion 2422*d* provided at a substrate 2422*a* of a heater 2422 is engaged with the projecting portion 2421*b*. Hereinafter, similar reference signs will be applied to configurations that are similar to those in Example 5 from among configurations in Example 8, and description thereof will be omitted.

Figure 40:
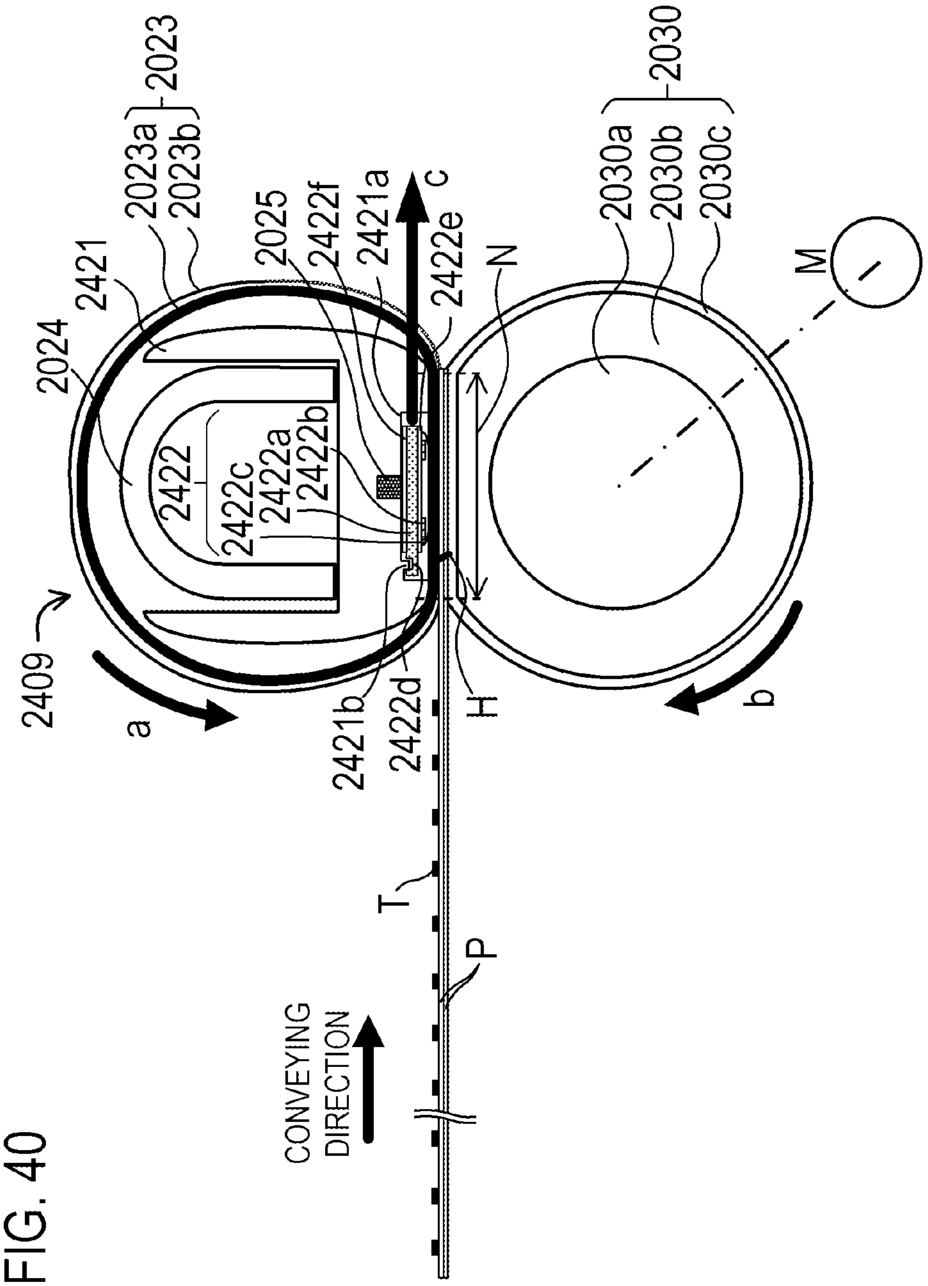
FIG. 40 is a sectional view of a fixing device according to Example 8.

FIG. 40 is an overview sectional view of the fixing device 2409 in this example and illustrates a state in which two pieces of recording material P bound with a staple H for a staple have a toner image T and are conveyed to the fixing device 2409. In this example, the heating unit does not include a heat conducting member and is configured only of the heater 2422.

Figure 41A:
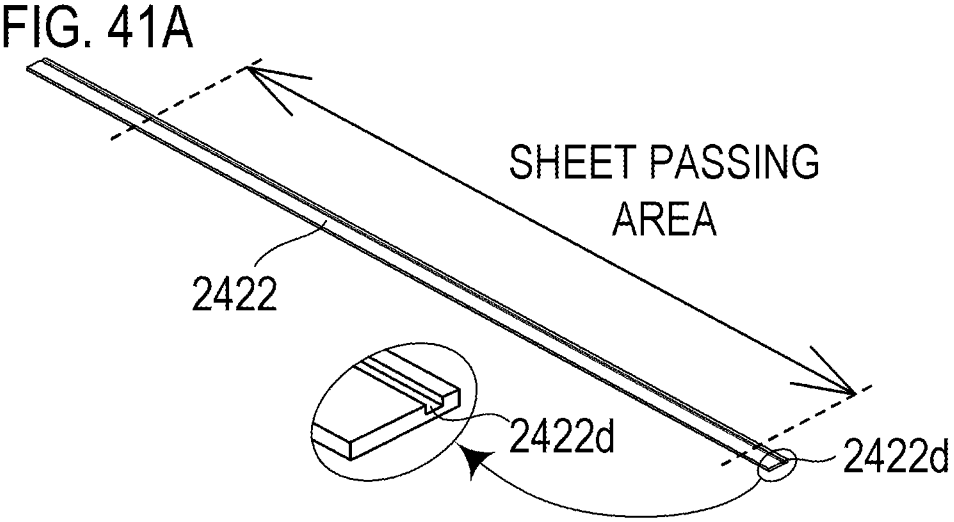
FIGS. 41A to 41C are schematic views illustrating heaters according to Example 8 and modification examples.

The heater 2422 in this example includes a substrate 2422*a* made of metal, a heat generating element 2422*b*, a protective layer 2422*c*, and insulating layers 2422*e* and 2422*f* Moreover, the recessed portion 2422*d* is formed near an end portion of the substrate 2422*a* on the upstream side in the conveying direction and on the side further upstream than the heat generating element 2422*b* and the insulating layer 2422*f* in the conveying direction. The recessed portion 2422*d* is recessed in the pressurizing direction (the thickness direction of the substrate 2422*a*) and on the side toward the pressurizing roller 2030. On the other hand, a projecting portion 2421*b* provided at the film guide 2421 extends in the pressurizing direction on the side toward the pressurizing roller 2030 and is engaged with the recessed portion 2422*d*. In the heater 2422 in this example, the recessed portion 2422*d* is formed over the entire range in the longitudinal direction as illustrated in FIG. 41A.

Even if a force in the direction c works on the heater 2422 due to engagement between the recessed portion 2422*d* and the projecting portion 2421*b*, relative movement of the heater 2422 on the downstream side in the conveying direction with respect to the film guide 2421 is restricted. Therefore, a clearance which the staple H enters does not occur between the heater 2422 and the heater support portion 2421*a* on the side further upstream than the heater 2422 in the conveying direction, and it is possible to prevent hole opening in the film 2023 even in a case where a recording material with something projecting such as the staple H is conveyed according to the present invention.

As a result of carrying out a paper feeding test similar to that in Example 5 using the fixing device 2409 in this example, no holes opened in the film 2023 and satisfactory fixed images were obtained on all evaluated papers. Moreover, since the substrate 2422*a* of the heater 2422 is provided with the recessed portion 2422*d* rather than a projecting portion in this example, the heater 2422 in this example has a smaller volume and a smaller heat capacity as compared with the heater 2222 in Example 6. Therefore, since the heat capacity of the heater is reduced in this example as compared with Example 6, it is possible to improve a warming-up time of the fixing device.

Note that the present invention is not limited to the aforementioned configuration, and in a modification example, a configuration in which the recessed portion

Figure 41B:
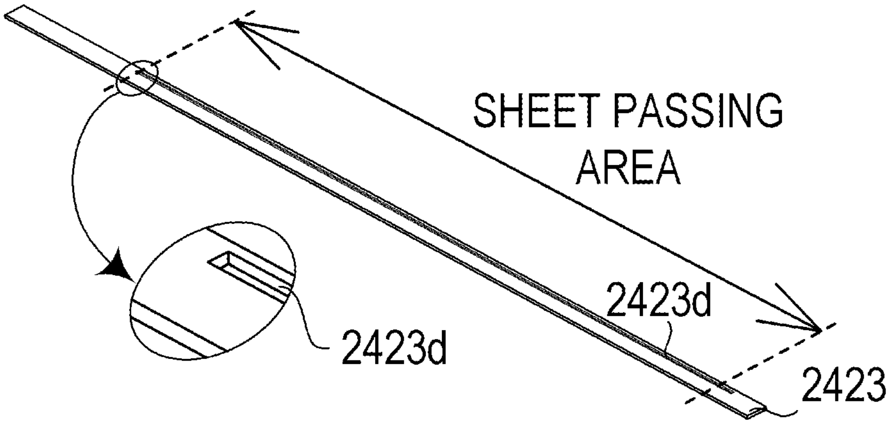
Figure 41C:
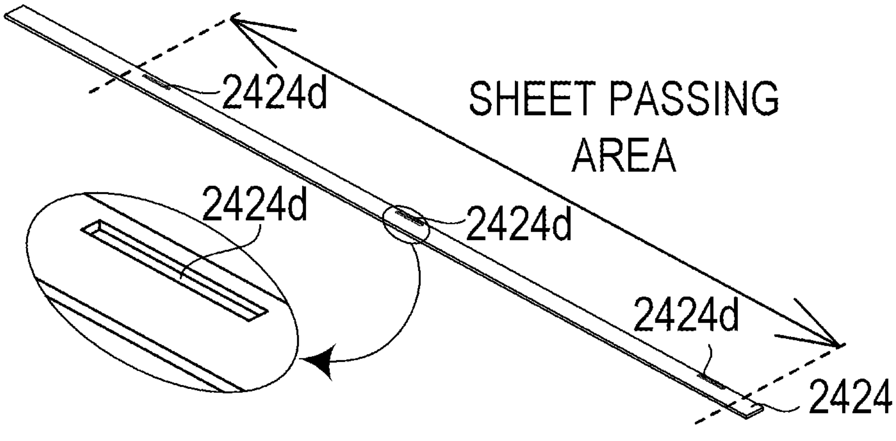

2423*d* is provided in the entire sheet passing area rather than the entire region of the heater 2423 in the longitudinal direction may also be employed as in the heater 2423 illustrated in FIG. 41B, for example. In another modification example, a configuration in which a plurality of recessed portion 2424*d* with a shorter length in the longitudinal direction are provided in the sheet passing area may also be employed as in the heater 2424 illustrated in FIG. 41C. The heater 2423 includes the recessed portion 2423*d* provided over the entire sheet passing area, and it is thus possible to obtain sufficient strength with respect to a force received due to rotation of the film 2023. On the other hand, the heater 2424 includes the recessed portions 2424*d* with a shorter length in the longitudinal direction provided at three locations in the sheet passing area and is thus inferior to the heater 2423 in terms of strength. However, the heater 2424 with a smaller volume than the heater 2423 is more excellent from the viewpoint of minimizing an increase in heat capacity. Also, in a case where the recessed portion is worked by cutting working, the heater 2424 including the recessed portion with a shorter length is more excellent than the heater 2422 and the heater 2423 in terms of working cost. In other words, it is possible to appropriately select a necessary configuration in consideration of a pressurizing force of the fixing device, strength required in accordance with a rotation rate of the film and the like, a warming-up time required for the image forming apparatus, a manufacturing cost of the heating unit, and the like.

Other modification examples include a configuration in which the recessed portion is provided on the downstream side in the conveying direction with respect to the heat generating elements, a configuration in which the recessed portions are provided on both upstream and downstream sides, a configuration in which the substrate is made of ceramic rather than metal, and the like. Furthermore, it is also possible to combine the aforementioned plurality of examples, and various configurations such as a configuration in which both a projecting portion and a recessed portion are provided at each of the heating unit and the film guide are conceivable.

Hereinafter, configuration or concept examples disclosed in the aforementioned embodiment will be described below. However, these are just an example, and the disclosure of the aforementioned embodiment is not limited to the configurations or concepts described below.

Configuration B1

A heating device that heats a recording material with a nip portion including:

- a tubular film that is rotatable;
- a heating unit that is provided in an internal space of the film and heats the film;
- a support member that holds the heating unit, comes into contact with an inner circumferential surface of the film, and guides rotation of the film; and
- a rotating body that forms the nip portion between the rotating body and the film,
- in which any one of the heating unit and the support member includes an engaging portion that is located in a sheet passing area in a width direction of a recording material that is orthogonal to a conveying direction of the recording material, and the other includes an engaged portion that is engaged with the engaging portion,
- a position of the heating unit in the conveying direction with respect to the support member is determined by the engaging portion engaging the engaged portion, and
- the engaging portion and the engaged portion are located on a side further downstream than an inlet of the nip portion and on a side further upstream than an outlet of the nip portion in the conveying direction.

Configuration B2

The heating device according to Configuration B1, further includes:

- a holding member that is located outside the sheet passing area and holds both end portions of the heating unit in the width direction such that relative movement of the heating unit with respect to the support member is restricted.

Configuration B3

In the heating device according to Configuration B1 or B2,

- the engaging portion is a projecting portion,
- the engaged portion is a recessed portion, and
- the projecting portion projects in a direction that is orthogonal to the conveying direction such that the projecting portion overlaps the recessed portion when seen in the conveying direction.

Configuration B4

In the heating device according to any one of Configurations B1 to B3, the engaging portion is provided at a center of the sheet passing area in the width direction.

Configuration B5

In the heating device according to any one of Configurations B1 to B4, a plurality of the engaging portions are provided in the sheet passing area.

Configuration B6

In the heating device according to any one of Configurations B1 to B5, the heating unit includes a heater and a heat conducting member that comes into contact with an inner circumferential surface of the film and transmits heat of the heater to the film.

Configuration B7

In the heating device according to Configuration B6, the heat conducting member is joined to the heater to cover the entire region of the heater in a transverse direction when seen in a pressurizing direction that is orthogonal to the conveying direction and the width direction.

Configuration B8

In the heating device according to Configuration B6 or B7,

- the engaging portion is provided in the heat conducting member, and
- the engaged portion is provided in the support member.

Configuration B9

In the heating device according to Configuration B8, the engaging portion is provided at an end portion of the heat conducting member on an upstream side in the conveying direction and extends on a side away from the rotating body, which is a direction that is orthogonal to a surface of a conveyed recording material.

Configuration B10

In the heating device according to Configuration B8 or B9,

- the heat conducting member is a thin and long plate member, and
- the engaging portion is formed by folding the plate member.

Configuration B11

In the heating device according to Configuration B10, the heater includes a substrate made of metal.

Configuration B12

In the heating device according to Configuration B6, the engaging portion is provided in the support member, and the engaged portion is provided in the heat conducting member.

Configuration B13

In the heating device according to Configuration B12, the engaging portion extends on the side closer to the rotating body, which is a direction that is orthogonal to a surface of a conveyed recording material, and the engaged portion is provided at an end portion of the heat conducting member on an upstream side in the conveying direction.

Configuration B14

In the heating device according to any one of Configurations B1 to B5, the heating unit includes a substrate, a heat generating element that is provided on the substrate, and a protective layer that covers the heat generating element, and is a heater in which the heat generating element generates heat in response to power distribution.

Configuration B15

In the heating device according to Configuration B14, the engaging portion is provided in the heater, and the engaged portion is provided in the support member.

Configuration B16

In the heating device according to Configuration B15, the engaging portion is provided at an end portion of the substrate on an upstream side in the conveying direction and extends on a side away from the rotating body, which is a direction that is orthogonal to a surface of the conveyed recording material.

Configuration B17

In the heating device according to Configuration B15 or B16, the substrate is a thin and long plate member, and the engaging portion is formed by folding the plate member.

Configuration B18

In the heating device according to Configuration B14, the engaging portion is provided in the support member, and the engaged portion is provided in the heater.

Configuration B19

In the heating device according to Configuration B18, the engaging portion extends on a side closer to the rotating body, which is a direction that is orthogonal to a surface of the conveyed recording material, and the engaged portion is provided at an end portion of the substrate on an upstream side in the conveying direction.

Configuration B20

An image forming apparatus includes:

an image forming portion that forms an image on a recording material; and the heating device according to any one of Configurations B1 to B19 that fixes, on the recording material, the image formed on the recording material.

Also, there is a configuration in which the number of components such as a heater clip is reduced by bending the metal substrate of the heater and engaging the heater with the heater holder such that movement of the heater is restricted, in the heating device configured of a heater, film, a pressurizing roller, and the like. If the heat generating element and the electrode for supplying power to the heat generating element are provided to be adjacent to each other in the longitudinal direction on the same plane of the substrate in such a configuration, it is not possible to achieve size reduction of the heater, thus size reduction of the heating device and the image forming apparatus. Thus, a heater capable of reducing the size of the heating device will be described next.

Example 9

(1) Image Forming Apparatus 3100

Figure 42:
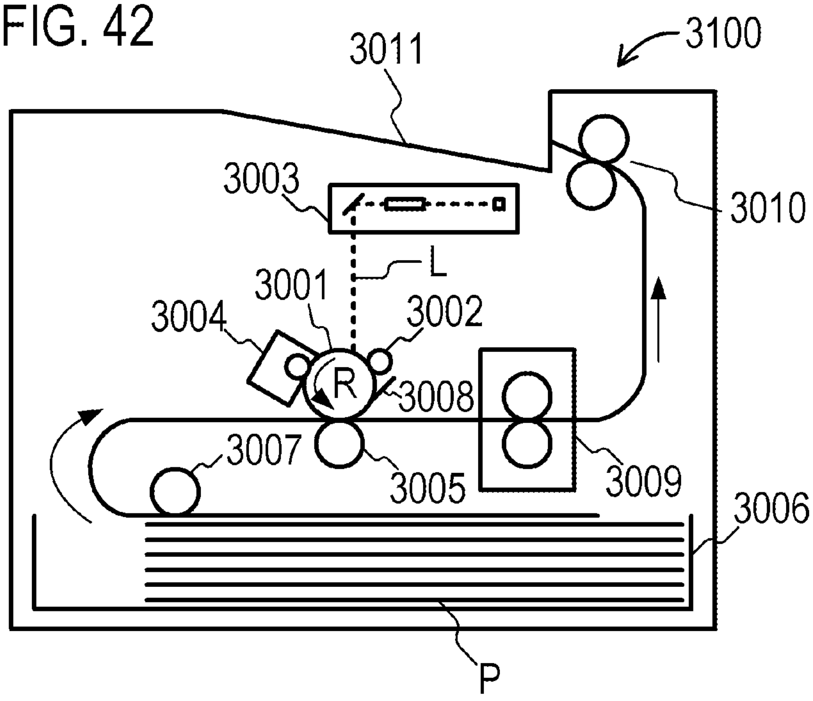
FIG. 42 is an overview configuration diagram of an image forming apparatus according to Example 9.

FIG. 42 is an overview configuration diagram of an image forming apparatus 3100 using an electrophotography recording technique according to Example 9. First, a configuration and operations of the image forming apparatus 3100 will be described.

An image forming operation performed by an image forming portion of the image forming apparatus 3100 will be described. If the image forming apparatus 3100 receives a printing instruction from an external device or the like, then a scanner unit 3003 emits lase light L in accordance with image information to a photosensitive member 3001. The photosensitive member 3001 charged with a predetermined polarity by a charging roller 3002 is scanned with the laser light L, and an electrostatic latent image in accordance with the image information is formed on the surface of the photosensitive member 3001. Thereafter, a developing device 3004 supplies a toner to the photosensitive member 3001, and a toner image in accordance with the image information is formed on the photosensitive member 3001. The toner image on the photosensitive member 3001 moves to a transfer position formed by the photosensitive member 3001 and a transfer roller 3005 through rotation of the photosensitive member 3001 in the arrow R direction and is transferred to a recording material P fed by a pickup roller 3007 from a cassette 3006. The surface of the photosensitive member 3001 that has passed through the transfer position is cleaned by a cleaner 3008.

A fixing device 3009 that serves as a fixing portion performs fixing processing on the recording material P with the toner image transferred thereto at the image forming portion with heat and a pressure. Thereafter, the recording material P is discharged to a discharge tray 3011 by a discharge roller 3010.

(2) Fixing Device 3009

Next, a configuration and operations of the fixing device 3009 will be described. In this example, a tensionless-type film heating-system fixing device 3009 is used as an example of the heating device. The fixing device 3009 in this example is a device in which an endless belt-shaped (or cylindrical) heat-resistant film is used, at least a part of the perimeter of the film is always kept free from tension (a state in which no tension is applied thereto), and the film is driven to rotate by a rotation drive force of a pressurizing member.

Figure 43:
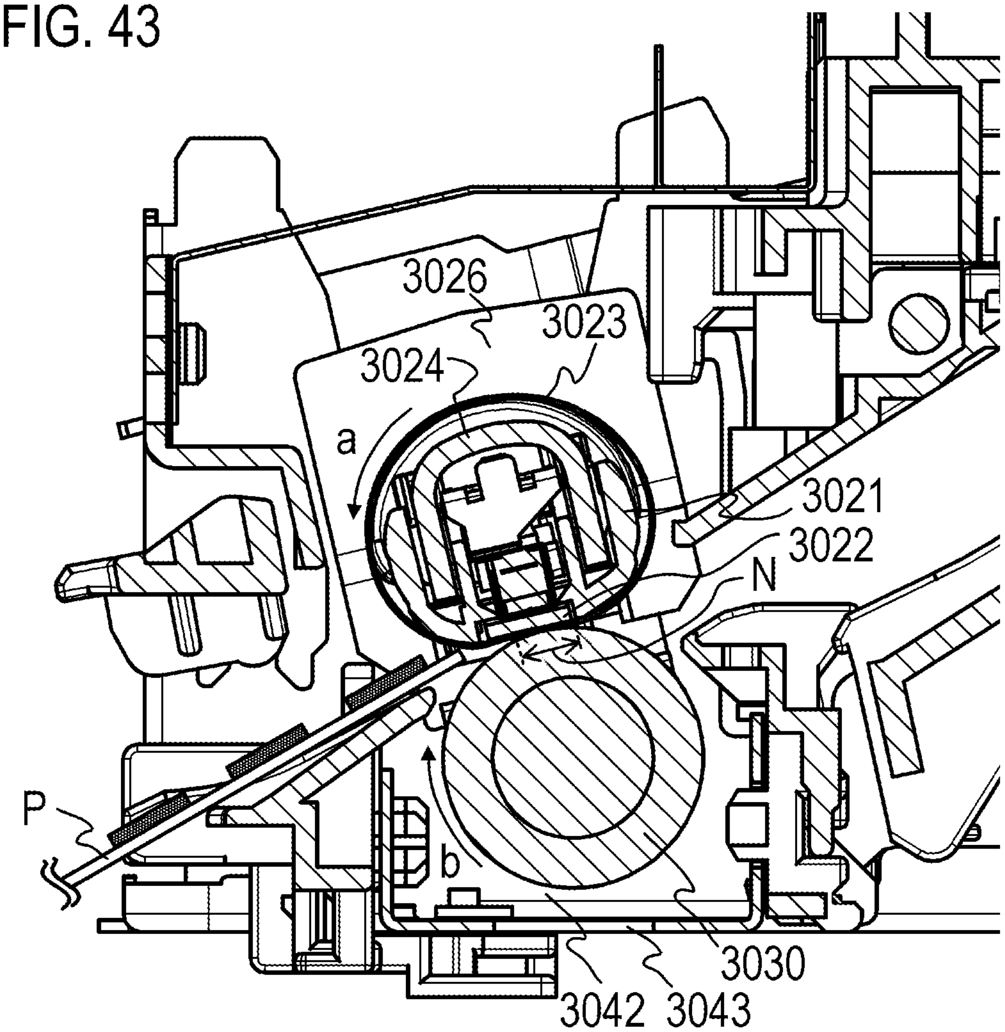
FIG. 43 is a sectional view of a fixing device according to Example 9.
Figure 44:
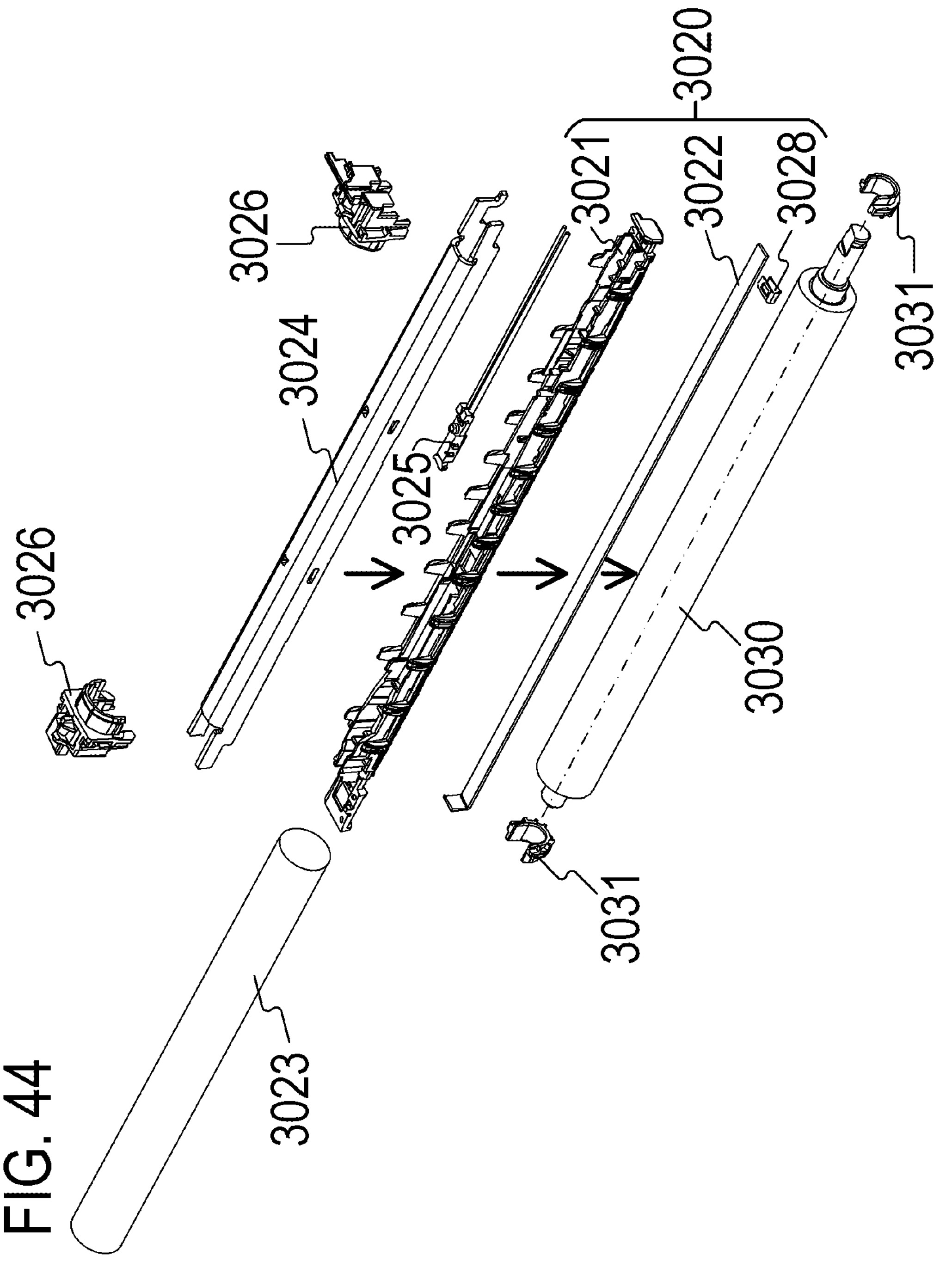
FIG. 44 is an exploded perspective view of a heater holder unit and peripheral components according to Example 9.
Figure 45:
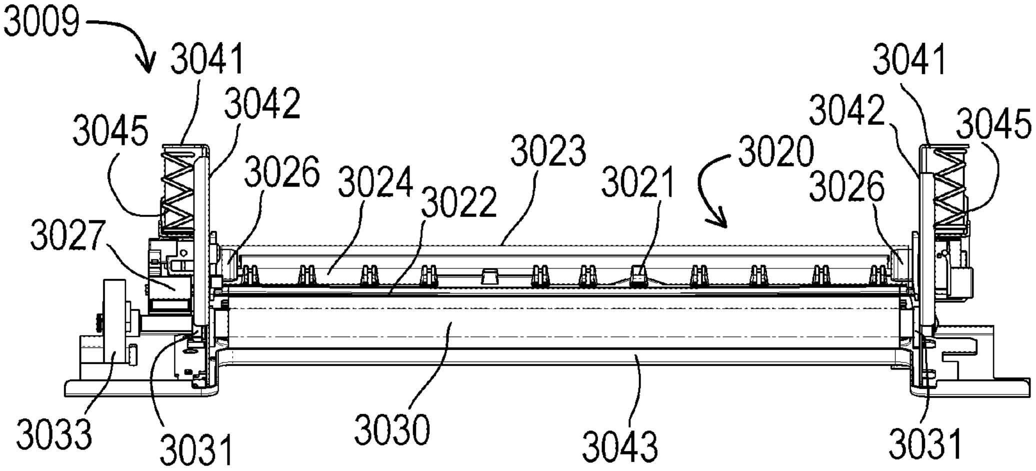
FIG. 45 is a front view of the fixing device according to Example 9.

FIG. 43 is an overview sectional view of the fixing device 3009 in this example and illustrates a state in which the recording material P including a toner image is conveyed to the fixing device 3009. Also, FIG. 44 is an exploded perspective view of the heater holder unit 3020 and peripheral components. FIG. 45 is a schematic front view of the fixing device 3009 in which a part of a film 3023 is not illustrated in order to illustrate an internal space of the film 3023.

A configuration of the fixing device 3009 will be described with reference to FIG. 43. The fixing device 3009 in this example includes the tubular film 3023 that serves as a first rotating body, a heater 3022 that heats the film 3023 in an internal space of the film 3023, a pressurizing roller 3030 that serves as a second rotating body that forms a nip portion N with the heater 3022 via the film 3023. The fixing device 3009 further includes a heater holder 3021 that supports the heater 3022 and guides rotation of the film 3023 and a reinforcing member 3024 that reinforces the heater holder 3021. The film 3023 is driven to rotate in the arrow a direction by the pressurizing roller 3030 receiving power from a motor, which is not illustrated, and rotating in the arrow b direction.

The film 3023 is a tubular rotating body. The thickness of the film 3023 is preferably at least about 20 μm and not more than 100 μm in order to secure satisfactory heat conductivity. In a case where the film 3023 is a single-layer film, it is preferable to use polytetrafluoroethylene (PTFE), tetrafluoroethylene-perfluoroalkyl vinyl ether (PFA), PPS, or the like as a base layer. In a case of a composite-layer film, it is preferable to use a material such as polyimide (PI), polyamidimide (PAI), polyether ethery ketone (PEEK), or polyether sulfone (PES) as a base layer. Moreover, it is preferable to configure the composite-layer film using, as a release layer with which the surface of the base layer is to be coated, a material such as PTFE, PFA, tetrafluoroethylene-perfluoroalkyl vinyl ether (FEP). Also, a film obtained by using pure metal, an alloy or the like of SUS, Al, Ni, Cu, Zn, or the like with high heat conductivity in a base layer and performing the aforementioned coating processing or coating with a fluorine resin tube on the release layer is also suitably used.

The film 3023 in this example is a composite-layer film in which the base layer is made of PI to have a thickness of 60 μm and is coated with a release layer made of PFA with a thickness of 12 μm to achieve a balance between both abrasion of the release layer due to paper feeding and thermal conductivity. The axial direction of the cylindrical shape of the film 3023 will be referred to as a longitudinal direction below.

The heater holder 3021 is a support member provided in an internal space of the film 3023 and supports the heater 3022. The heater holder 3021 has the film 3023 loosely inserted thereonto and also has a guide function of guiding rotation of the film 3023 while keeping slide contact with the inner circumferential surface of the film 3023. For the heater holder 3021, it is possible to suitably use a high-heat-resistant resin such as polyimide, polyamidimide, PEEK, PPS, or a liquid crystal polymer, or a composite material of such a resin and ceramic, metal, glass, or the like. Among these, it is possible to particularly preferably use the liquid crystal polymer from the following advantages. First, it is possible to set a high degree of freedom in a setting temperature of the heater due to a high heat-resistant temperature. Also, since it can be molded with a mold, satisfactory productivity is achieved, and mass production can be performed. Furthermore, it is possible to uniformize the pressing force on the pressurizing member and to stabilize paper conveying performance due to excellent dimension stability. In this example, a composite material obtained by mixing glass fiber into a liquid crystal polymer is used.

The heater 3022 that serves as a heat generating member includes a thin and long substrate containing metal as a main material, a heat generating element that generates heat in response to power distribution, an insulating layer that insulates the heat generating element from the substrate, and a glass coating layer that protects the heat generating element. A detailed configuration of the heater 3022 will be described later.

A thermistor 3025 that is a temperature detection member abuts on a surface of the heater 3022 abutting the heater holder 3021. Power distribution to the heat resistor is controlled in accordance with the temperature detected by the thermistor 3025, and the temperatures of the heater 3022 and the film 3023 are managed. In other words, a change in temperature of the film 3023 is detected by the thermistor 3025 via the heater 3022.

The pressurizing roller 3030 includes a core metal of a material such as iron or aluminum, an elastic layer of a material such as silicone rubber, and a release layer of a material such as PFA. A drive gear 3033 (see FIG. 45) is attached to one end of the core metal of the pressurizing roller 3030 in the longitudinal direction, and the drive gear 3033 is caused to receive a rotation drive force by drive means, which is not illustrated, and causes the pressurizing roller 3030 to rotate.

The reinforcing member 3024 is a member that is made of metal such as iron and maintains strength for preventing significant deformation even with a pressure of pressing the heater holder 3021 on the side of the pressurizing roller 3030. The heater 3022 is pressed by pressing means, which will be described later, on the side of the pressurizing roller 3030 via the heater holder 3021 and the reinforcing member 3024. The region where the pressurizing roller 3030 and the film 3023 are in close contact with each other due to pressurization is the nip portion N.

Next, details of the heater holder unit 3020 configured of components such as the heater 3022 and peripheral components will be described with reference to the perspective view in FIG. 44. The heater 3022 is held by the heater holder 3021 and is positioned by a heater clip 3028 provided at an end portion in the longitudinal direction with respect to the heater holder 3021. The heater clip 3028 is formed of a metal plate bent into a C shape and holds an end of the heater 3022 at the heater holder 3021 with a spring property thereof. The heater holder unit 3020 in this example is configured of the heater holder 3021, the heater 3022, and the heater clip 3028.

The heater holder 3021 has substantially a gutter-shaped sectional shape that is orthogonal to the longitudinal direction, and the reinforcing member 3024 is fitted to the inside of the gutter shape. A heater receiving groove is provided at the heater holder 3021 on the side facing the pressurizing roller 3030, and the heater 3022 is fitted into the heater receiving groove and is fitted at a desired position. The film 3023 is fitted onto the outside of the heater holder 3021 with which the aforementioned components are assembled with a margin at the perimeter thereof. Both ends of the reinforcing member 3024 in the longitudinal direction stick out from both ends of the film 3023 to the outside, and flanges 3026 is fitted to both ends of the reinforcing member 3024.

Next, the configuration of the fixing device 3009 will be described in further detail with reference to FIG. 45. In FIG. 45, a part of the film 3023 is not illustrated such that the heater holder 3021 and the heater 3022 provided in the internal space of the film 3023 can be visually recognized. The flanges 3026 located at both end portions of the film 3023 restrict movement of the rotating film 3023 in the longitudinal direction.

The heater holder unit 3020 is provided to face the pressurizing roller 3030 and is supported by a top plate-side casing 3041 via the flanges 3026 or the like. The heater holder unit 3020 is supported by the top plate-side casing 3041 such that it can freely move in the pressurizing direction, and movement thereof in the longitudinal direction is restricted by a side surface-side casing 3042. A pressurizing spring 3045 is attached to the top plate-side casing 3041 of the fixing device 3009 in a compressed state. The pressing force of the pressurizing spring 3045 is received at end portions of the reinforcing member 3024 in the longitudinal direction via the flanges 3026. The reinforcing member 3024 is pressed on the side of the pressurizing roller 3030 with the pressing force of the pressurizing spring 3045, the heater holder unit 3020 is pressed on the side of the pressurizing roller 3030, and the nip portion N is formed between the film 3023 and the pressurizing roller 3030.

The bearing member 3031 is provided to axially support the metal core of the pressurizing roller 3030 and receives the pressing force from the heater holder unit 3020 via the pressurizing roller 3030. In order to rotatably support the metal core of the pressurizing roller 3030 that is heated to a relatively high temperature, a material with heat resistance and excellent slidability is used for the bearing member 3031. The bearing member 3031 is attached to a bottom-side casing 3043 of the fixing device 3009.

(3) Heater 3022

Next, the heater 3022 in this example will be described in detail. First, a material configuring the heater 3022, a manufacturing method, and the like will be described using FIG. 46.

Figure 46:
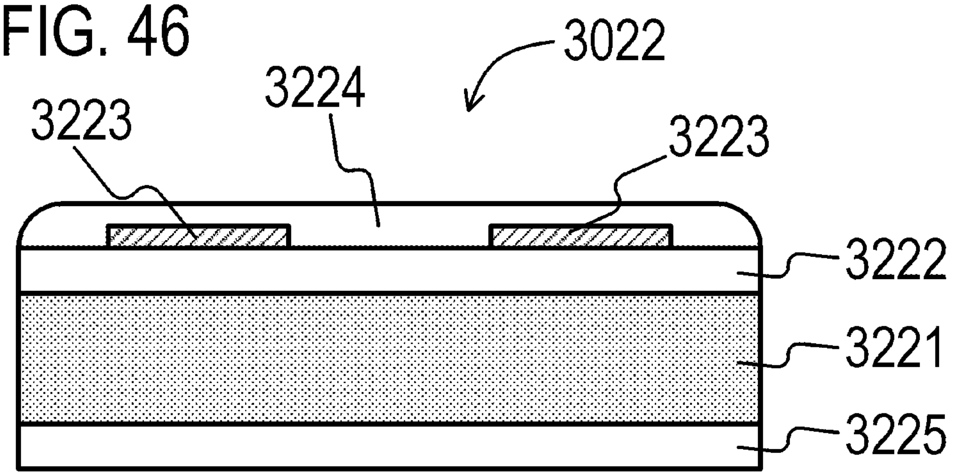
FIG. 46 is a sectional view of a heater according to Example 9.

FIG. 46 is a sectional view of the heater 3022. The heater 3022 includes a thin and long substrate 3221 that contains metal as a main material, heat generating elements 3223 that generate heat in response to power distribution, an insulating layer 3222 that insulates the heat generating elements 3223 from the substrate 3221, and a protective layer 3224 that protects the heat generating elements 3223. Also, an insulating layer 3225 and an insulating layer 3225 are also provided on the surface of the substrate 3221 on the side opposite to the surface on which the heat generating elements 3223 are provided in order to prevent warpage of the substrate at the time of manufacturing. The heat generating elements 3223 are provided on the surface of the substrate 3221 facing the pressurizing roller 3030.

As a metal material used in the substrate 3221, stainless steel, nickel, copper, aluminum, or an alloy containing such metal as a main material is suitably used. Among these, stainless steel is most preferably used in terms of strength, heat resistance, and corrosion. The type of stainless steel is not particularly limited, and it is only necessary to appropriately select stainless steel in consideration of necessary mechanical strength, a linear expansion coefficient in accordance with formation of the insulating layer 3222 and the heat generating elements 3223, easiness of obtaining the plate material in the market, and the like. In one example, martensite-based stainless steel and ferrite-based stainless steel of chromium-based stainless steel (400-based) have relatively low linear expansion coefficients from among others and are thus suitably used because the insulating layer and the heat generating elements are easily formed with them.

The thickness of the substrate 3221 may be determined in consideration of strength, a heat capacity, and heat dissipation performance. Although a thin thickness of the substrate leads to a small heat capacity and is thus advantageous for quick starting, a problem such as distortion is likely to occur when the heat generating element is heat-molded if the thickness is too thin. On the contrary, although a thick thickness of the substrate is advantageous in terms of distortion when the heat generating element is heat-molded, an excessively thick thickness is disadvantageous for quick starting due to a large heat capacity. A preferable thickness of the substrate 3221 is 0.3 mm to 2.0 mm in a case where a balance of mass production, cost, and performance is taken into consideration.

The substrate 3221 in this example is a ferrite-based stainless steel substrate (SUS430:18Cr stainless steel) with a width of 20 mm, a length of 376 mm, and a thickness of 0.3 mm. The shape of the substrate 3221 that is characteristic in the present invention will be described in detail.

Although a material of the insulating layers 3222 and 3225 is not particularly limited, it is necessary to select a material with heat resistance in view of a temperature in actual use. As a material, glass or polyimide (PI) is preferably used in terms of heat resistance, and selection of a specific powder material in the case of glass may be appropriately performed without damaging the properties of the present invention. A heat conductive filler with an insulating property and the like may be incorporated as needed. Materials and thicknesses of the insulating layers 3222 and 3225 may be similar to each other, or no problem occurs if they are changed as needed.

In general, a heater used in an image forming apparatus preferably has dielectric strength of about 1.5 kV. Therefore, it is only necessary to secure the film thickness of the insulating layer 3222 in accordance with the material in order to obtain dielectric strength performance of 1.5 kV between the heat generating elements 3223 and the substrate 3221.

Although a method for forming the insulating layers 3222 and 3225 and the heat generating elements 3223, which will be described later, is not particularly limited, it is possible to smoothly form them by a screen printing method in one example. It is only necessary to form them on the bent portion of the heater, which will be described later, as well by the screen printing or the like. When an insulating layer of glass or polyimide (PI) is formed on the substrate 3221, it is necessary to appropriately adjust the linear expansion coefficients of the materials of the substrate and the insulating layer such that cracking or peeling does not occur in insulating layer due to a difference between the linear expansion coefficients of the materials.

In this example, an insulating layer glass paste is applied to the substrate 3221 made of stainless steel by screen printing, the resulting object is dried at 180° C. and is baked at 850° C., and the insulating layers 3222 and 3225 are thereby formed. The insulating layer after the baking has a thickness of 25 μm and are formed on both surfaces of the substrate 3221.

The heat generating elements 3223 are obtained by printing a heat resistor paste obtained by mixing a conductive component (A), a glass component (B), and an organic binding component (C) to the insulating layer 3222 and then baking the resulting object. If the heat resistor paste is baked, the organic binding component (C) is burnt and disappears and the components (A) and (B) remain, and the heat generating element 3223 containing the conductive component and the glass component is thereby formed. Here, silver-palladium (Ag·Pd), ruthenium oxide ($RuO_2$), or the like is used alone or in combination as the conductive component (A), and it is preferable to obtain a sheet resistance value of 0.1 [Ω/□] to 100 [kΩ/□]. Also, there may be no problem if other materials are contained in addition to (A) to (C) described above as long as the amounts are very small and properties of the present invention are not damaged.

The power supply electrode 3226 and the power conduction pattern 3227 contain silver (Ag), platinum (Pt), gold (Au), a silver-platinum (Ag·Pt) alloy, a silver-palladium (Ag·Pd) alloy, or the like as a main constituent. The power supply electrode 3226 and the power conduction pattern 3227 are formed by printing the paste obtained by mixing the conductive component (A), the glass component (B), and the organic binding component (C) on the insulating layer 3222 and baking the paste similarly to the heat resistor paste.

The power supply electrode 3226 and the conduction pattern 3227 that serves as a conductive body are provided for the purpose of supplying power to the heat generating elements 3223, and the resistance is set to be sufficiently low with respect to the heat generating elements 3223. Here, it is necessary to select a material that is softened and melts at a temperature that is lower than the melting point of the substrate 3221 and to select a material with heat resistance in view of the temperature in actual use, for the aforementioned heat resistor paste and the power supply electrode and the conduction pattern paste.

In this example, a heat resistor paste obtained by using silver-palladium (Ag·Pd) as a conductive component and additionally incorporating a glass component and an organic binding component and a paste for the power supply electrode and the conduction pattern obtained by using silver as a conductive component and additionally incorporating a glass component and an organic binding component are used. Each paste is applied to the substrate 3221 made of stainless steel on which the insulating layers 3222 and 3225 are provided by screen printing, the resulting object is then dried at 180° C. and is baked at 850° C., and the heat generating elements 3223, the power supply electrode 3226, and the conduction pattern 3227 are formed. The heat generating elements 3223 after the baking have a thickness of 15 μm, a length of 312 mm, and a width of 1.1 mm.

The protective layer 3224 is provided to cover the heat generating elements 3223 and the conduction pattern 3227. In a case where the heat generating elements 3223 are disposed on the side on which they come into contact with the film 3023, the protective layer 3224 is provided as a protective layer to secure electrical insulation between the heat generating elements 3223 and the film 3023 and to secure slidablity of the heat generating elements 3223 and the film 3023. As a material, glass or polyimide (PI) is preferably used in view of heat resistance, and a heat conductive filler with an insulating property or the like may be incorporated as needed.

In this example, a protective layer glass paste is prepared, the protective layer glass paste is applied to the heat generating elements 3223 and the conduction pattern 3227 by screen printing, the resulting object is dried at 180° C. and is baked at 850° C., and the protective layer 3224 is thereby formed. The thickness of the protective layer 3224 after the baking is 30 μm.

Figure 47:
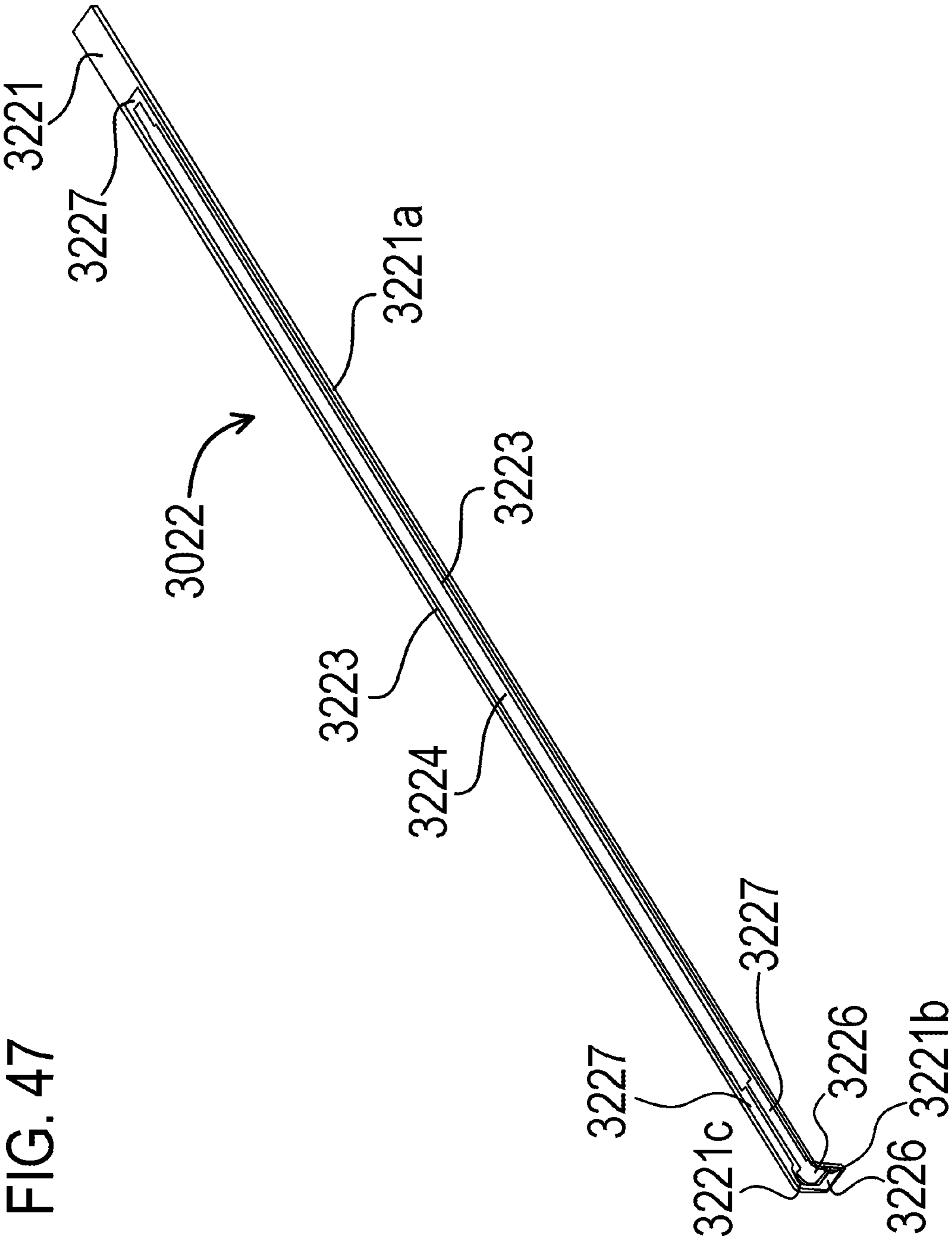
FIG. 47 is a perspective view of the heater according to Example 9.

Next, the shape of the heater 3022 that is characteristic in the present invention will be described using FIG. 47. FIG. 47 is a perspective view illustrating a configuration of the heater 3022 in this example. The substrate 3221 of the heater 3022 in this example is formed by being bent in the longitudinal direction and folded at an end portion in the longitudinal direction at 90°. The heat generating elements 3223 and the power supply electrode 3226 are provided on the substrate 3221, and the substrate 3221 includes a heat generating element placement portion 3221*a*, an electrode placement portion 3221*b*, and a bent portion 3221*c*.

The heat generating element placement portion 3221*a* linearly extends in a direction that is orthogonal to the conveying direction of the recording material P at the nip portion N, and the two heat generating elements 3223 are disposed. Also, the heat generating element placement portion 3221*a* forms the nip portion N with the pressurizing roller 3030 via the film 3023. The bent portion 3221*c* extend to be bent from one end of the heat generating element placement portion 3221*a* in the longitudinal direction toward the thickness direction of the heat generating element placement portion 3221*a*. The electrode placement portion 3221*b* extends perpendicularly to the heat generating element placement portion 3221*a*, and the power supply electrode 3226 to which power for distributing power to the heat generating elements 3223 is supplied is disposed. Note that in the fixing device 3009 in this example, the thickness direction of the heat generating element placement portion 3221*a* is parallel to the pressurizing direction of the recording material P. Also, orthogonal, vertical, and parallel described herein are not necessarily orthogonal, vertical, and parallel in a strict sense as long as it is possible to achieve the function of the image forming apparatus.

In other words, the heat generating element 3223 and the power supply electrode 3226 are not in the same plane, and the conduction pattern 3227 extends from the heat generating element placement portion 3221*a* to the electrode placement portion 3221*b* via the bent portion 3221*c* in this example. In other words, the point that the substrate 3221 is bent such that the planar-shaped heat generating element placement portion 3221*a* and electrode placement portion 3221*b* extend to perpendicularly intersect each other is a characteristic point in the present invention.

Note that the aforementioned bending does not necessarily mean that the substrate is molded by performing bending working on a plate material. For example, it is possible to expect an effect of reducing the size of the heating device, which will be described later, even with a configuration in which the substrate formed to have a similar shape is provided by means such as casting working or cutting working. In other words, although the substrate is molded using bending working as a working method from which easiness of working and an effect of enhancing strength of the substrate achieved by plastic working can be expected in this example, the method for molding the substrate in the present invention is not limited to plastic working.

(4) Method for Holding Heater 3022 and Method for Supplying Power Thereto

Figure 48:
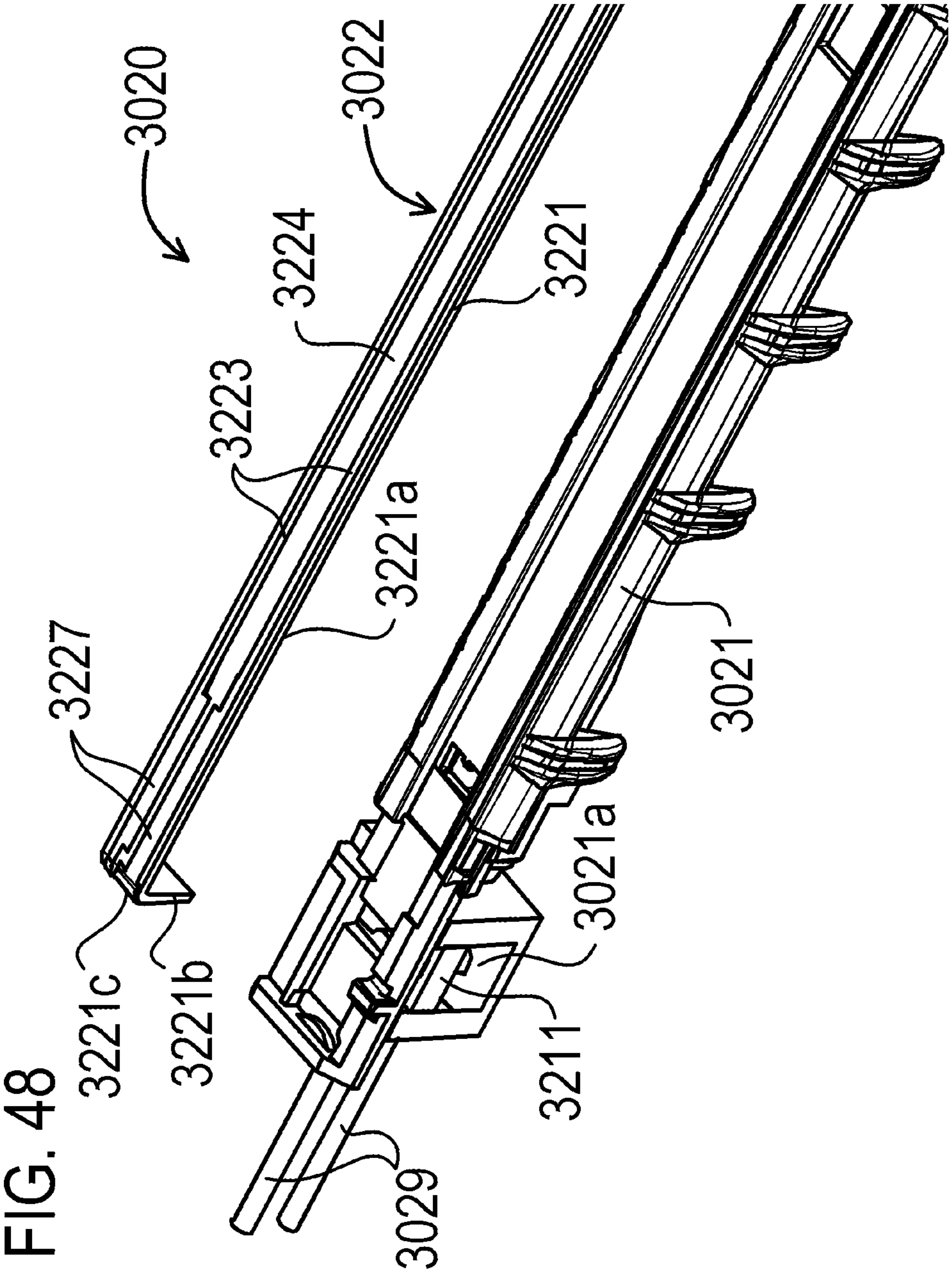
FIG. 48 is a perspective view of the heater and a power supply means according to Example 9.
Figure 49:
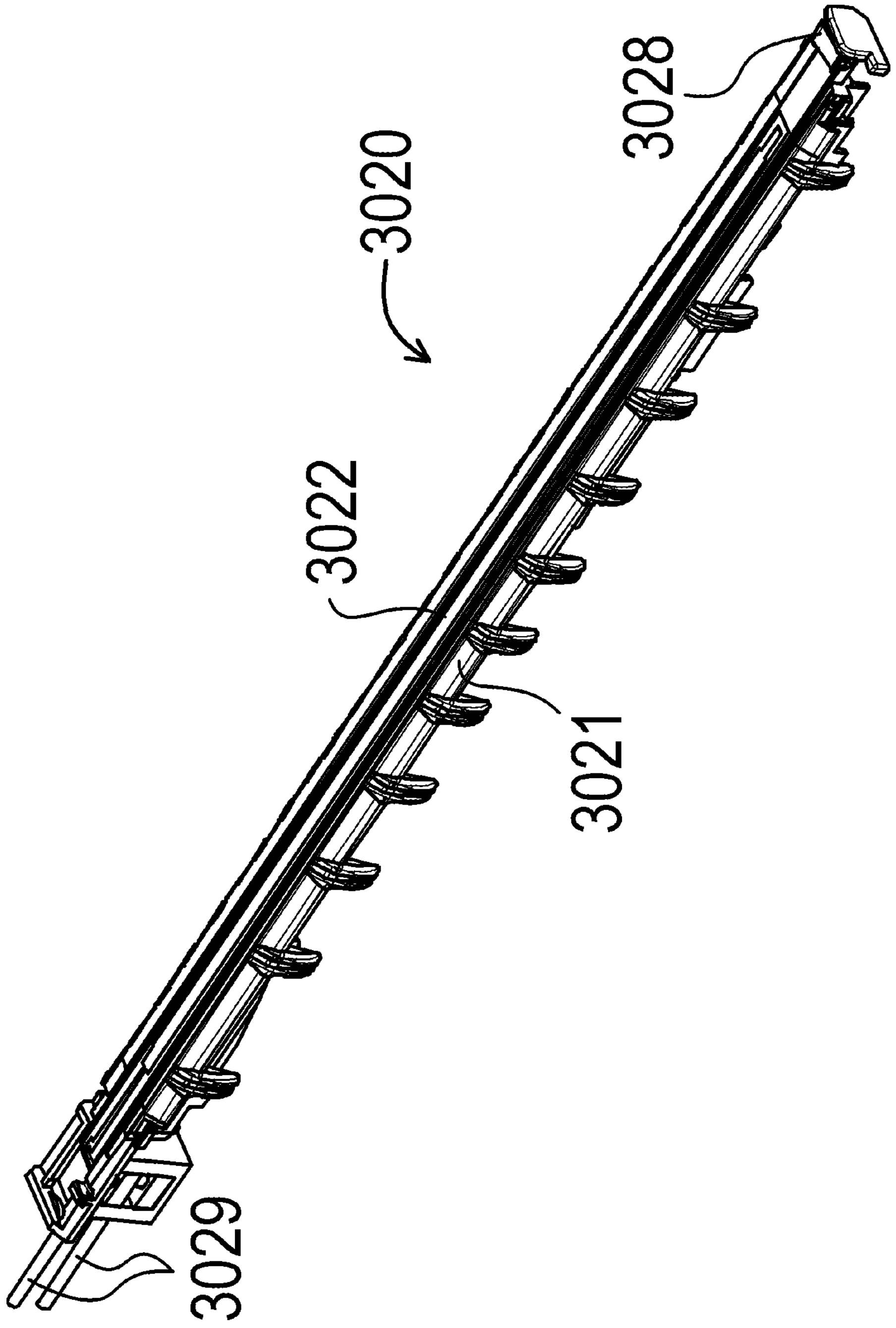
FIG. 49 is a perspective view of the heater holder unit according to Example 9.

Subsequently, the heater holder unit 3020 configured of the heater holder 3021, the heater 3022, and the heater clip 3028 will be described in detail using FIGS. 48 and 49. FIG. 48 is a perspective view illustrating one end side of the heater holder unit 3020 in this example in the longitudinal direction on which the power supply contact point 3211 is provided. FIG. 49 is a perspective view illustrating the heater holder unit 3020 in a state in which the heater 3022 is engaged with the heater holder 3021.

The heater holder 3021 in this example includes, at an end portion in the longitudinal direction, a holding portion 3021*a* into which the electrode placement portion 3221*b* of the heater 3022 is inserted, and is provided with a power supply contact point 3211 that serves as power supply means provided in the holding portion 3021*a*. The heater 3022 is held by the heater holder 3021 in a state in which a part including the electrode placement portion 3221*b* provided with the power supply electrode 3226 is inserted into the holding portion 3021*a* of the heater holder 3021. In other words, the electrode placement portion 3221*b* is provided on the side away from the nip portion N with respect to the heat generating element placement portion 3221*a* in the thickness direction of the heat generating element placement portion 3221*a*. The power supply electrode 3226 on the electrode placement portion 3221*b* and the power supply contact point 3211 in the heater holder come into contact with each other with an abutting pressure by the electrode placement portion 3221*b* of the heater 3022 being inserted into the holding portion 3021*a* of the heater holder 3021.

The power supply contact point 3211 in the heater holder 3021 is electrically connected to a bunched line 3029 that serves as a power distribution path from control means. Control performed by the control means (for example, triac-based power distribution and disconnection control means that is known in the related art), which is not illustrated, in accordance with the temperature detected by the thermistor 3025 is performed by distributing power to the heater 3022 through the bunched line 3029.

One end side of the heater 3022 in the longitudinal direction is positioned and held by the electrode placement portion 3221*b* provided with the power supply electrode 3226 being inserted into the holding portion 3021*a*, and further, the other end side of the heater 3022 on the side opposite to the one end in the longitudinal direction is positioned by the heater clip 3028. In this manner, the heater 3022 is configured to keep the power distribution without any deviation of the power supply portion by both ends thereof being held in a positioned state even in a case where the heater 3022 extends due to thermal expansion at the time of heating.

(5) Effects and Advantages

Figure 50:
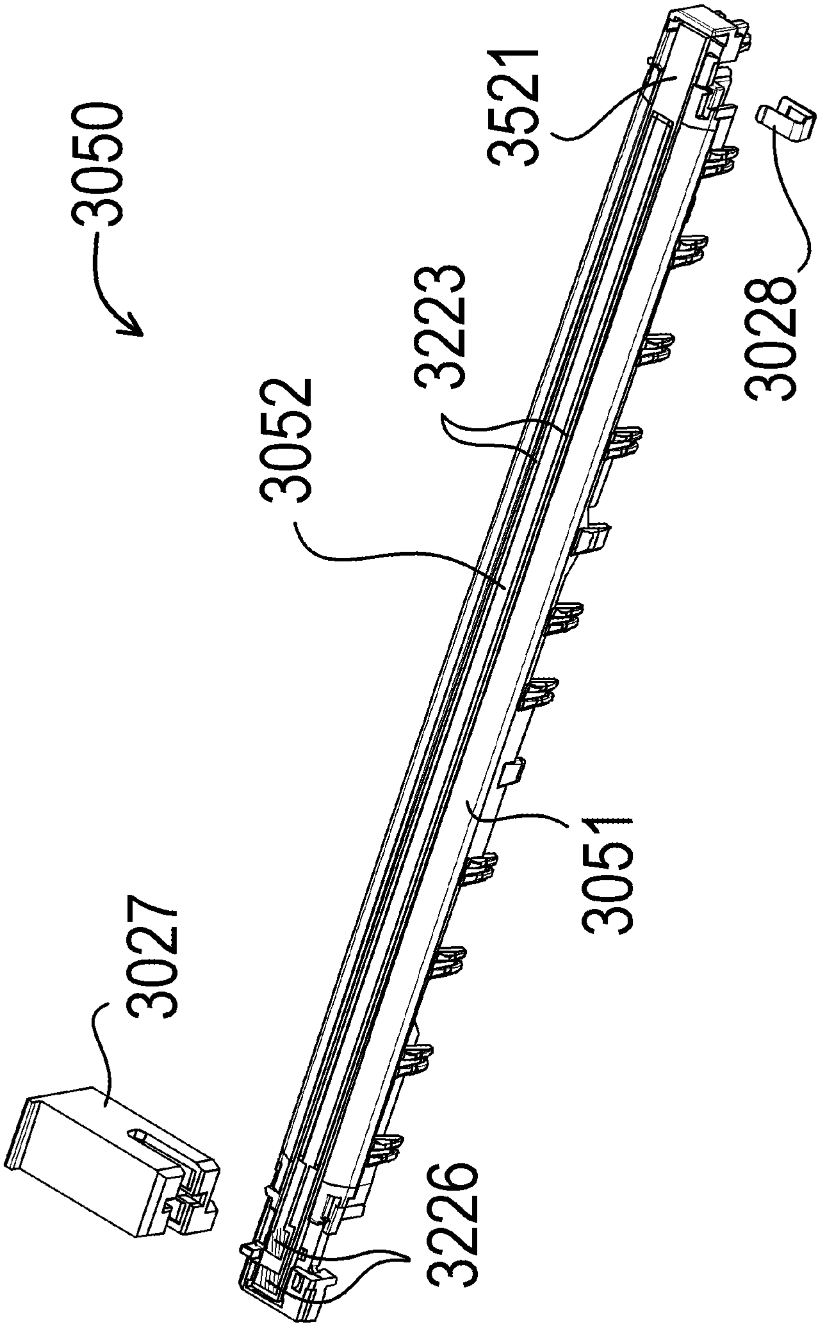
FIG. 50 is a perspective view of a heater holder unit in an example in the related art.

In order to check effects and advantages of the present invention, this example is compared with a comparative example of the configuration in the related art. FIG. 50 is a perspective view illustrating a heater holder unit 3050 in the comparative example. The heater holder unit 3050 in the comparative example is configured of a heater holder 3051, a heater 3052, a heater clip 3028, and a power supply connector 3027. The heater 3052 in the comparative example is provided with heat generating elements 3223 and a power supply electrode 3226 on the same plane of a substrate 3521, includes both end portions in the longitudinal direction held by the heater clip 3028 and the power supply connector 3027, and is positioned with respect to the heater holder 3051. Also, a power supply contact point is provided in the power supply connector 3027 that serves as power supply means, and power can be supplied to the heater 3052 by the power supply contact point in the power supply connector 3027 coming into contact with the power supply electrode 3226 of the heater 3052. In other words, it is possible to state that the configuration in the related art is a configuration in which the heat generating elements and the power supply electrode are provided on the same plane of the substrate and the power supply electrode is provided on an extension of the heat generating elements in the longitudinal direction.

In comparison between the heater holder units in this example and the comparative example, this example can be configured to be smaller by about 7 mm in the longitudinal direction. In other words, it is possible to reduce the size of the heater holder unit in the longitudinal direction by employing the configuration in which the substrate of the heater is bent and the electrode is provided on the surface that is different from the surface with the heat generating element provided thereon and supplying power from the power supply contact point provided in the heater holder to the heater. Moreover, it is also possible to expect an effect of reducing the size in the conveying direction as well depending on the apparatus configuration by eliminating the power supply connector.

As described above, it is not necessary to provide the power supply connector to the heater holder unit, and it is thus possible to save the space corresponding to provision of the power supply connector according to the present invention. Moreover, since the power supply contact point that requires a predetermined width is provided on the plane that is different from the plane with the heat generating elements provided thereon, it is possible to realize size reduction of the heater holder unit and thus size reduction of the fixing device and the image forming apparatus.

Example 10

Next, Example 10 according to the present invention will be described. Example 10 is configured to be different from Example 9 in the method of supplying power to the heater. Similar reference signs will be applied to configurations that are similar to those in Example 9 from among configurations in Example 10, and description thereof will be omitted. Hereinafter, characteristic configurations in Example 10 will be described using FIG. 51.

Figure 51:
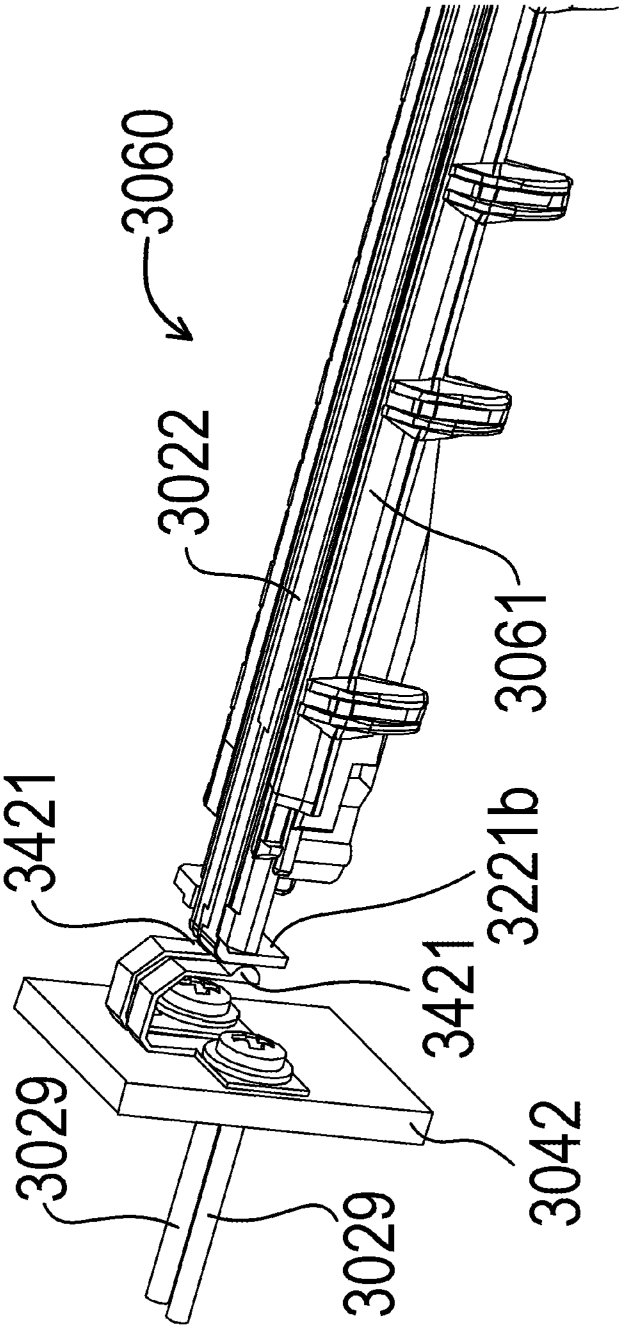
FIG. 51 is a perspective view of a heater holder unit and a power supply means according to Example 10.

FIG. 51 is a schematic perspective view illustrating a heater holder unit 3060 and power supply means in this example. A heater 3022 provided in the heater holder unit 3060 is configured to include a bent portion similarly to Example 9. A heater holder 3061 holds the heater 3022 and does not include power supply means as in Example 9. An electrode placement portion 3221*b* provided with a power supply electrode 3226 of the heater 3022 in this example is provided at one end of the heater holder unit 3060 in a longitudinal direction. Also, once the heater holder unit 3060 is incorporated in an image forming apparatus, then the electrode placement portion 3221*b* faces a side surface-side casing 3042, and the power supply electrode 3226 comes into contact with a power supply contact point 3421 that is provided on the side-surface-side casing 3042 and serves as power supply means, with abutting pressure. In other words, the image forming apparatus in this example supplies power to the heater from power distribution control means via the power supply means provided on the casing.

In comparison between the heater holder units in this example and the aforementioned comparative example that is a configuration in the related art, this example can be configured to be smaller by about 12 mm in the longitudinal direction. In other words, it is possible to obtain an effect of further saving a space in the longitudinal direction as compared with Example 1 by providing the power supply means on the casing of the image forming apparatus rather than inside the heater holder.

Example 11

Next, Example 11 according to the present invention will be described. Example 11 is configured to be different from Example 9 in the shape of the heater. Similar reference signs will be applied to configurations that are similar to those in Example 9 from among configurations in Example 11, and description thereof will be omitted. Hereinafter, characteristic configurations in Example 11 will be described using FIGS. 52A and 52B, FIG. 53, and FIGS. 54A and 54B.

Figure 52A:
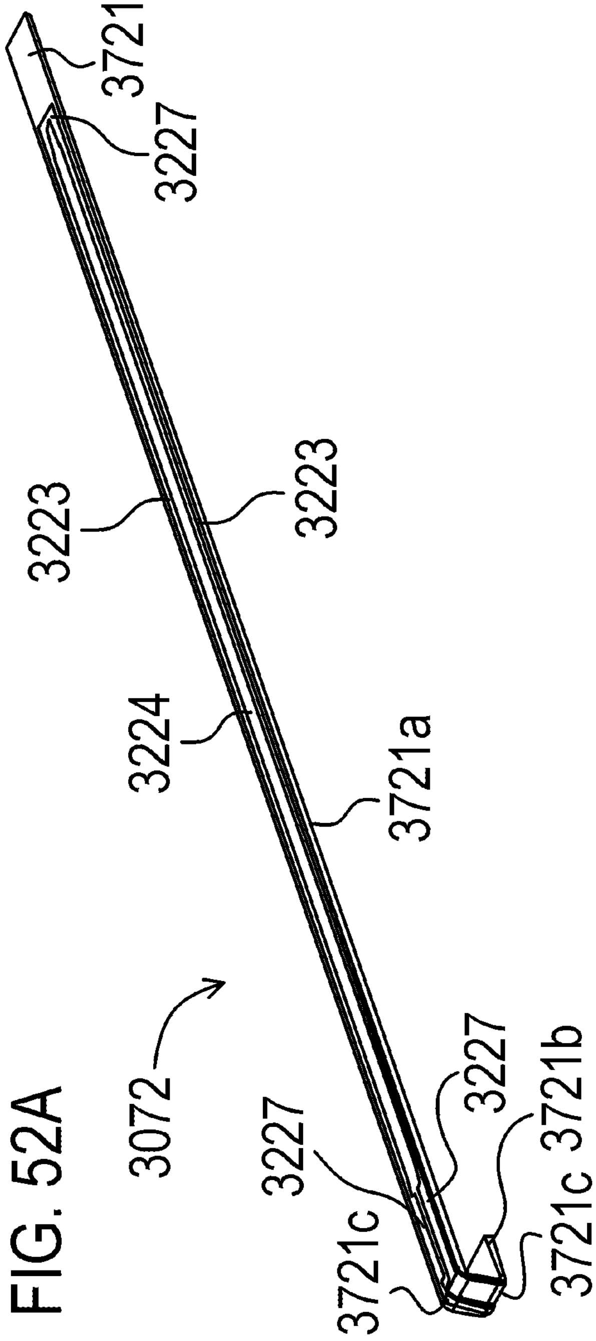
FIGS. 52A and 52B are perspective views of a heater according to Example 11.
Figure 52B:
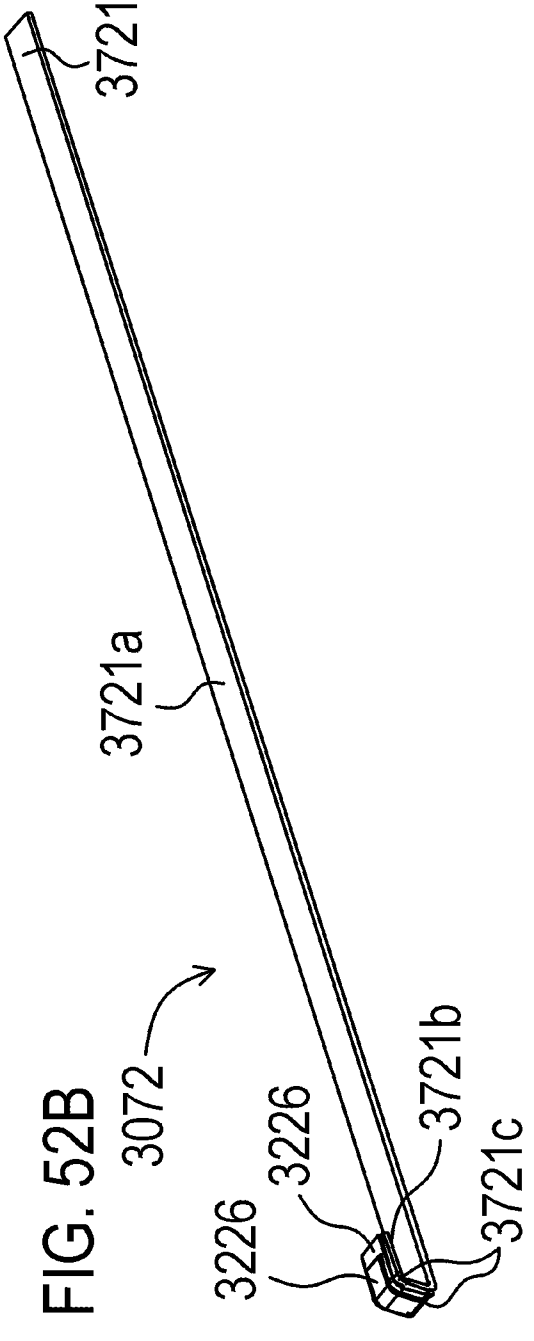

FIG. 52A is a schematic perspective view of a heater 3072 in this example when seen from the side of a heat generating elements 3223, and FIG. 52B is a schematic perspective view when seen from the side of a power supply electrode 3226. A substrate 3721 of the heater 3072 in this example is bent by two bent portions 3721*c* such that a heat generating element placement portion 3721*a* and an electrode placement portion 3721*b* extend in parallel with each other. In other words, the substrate 3721 is molded by an end portion in the longitudinal direction being folded at 180°.

Figure 53:
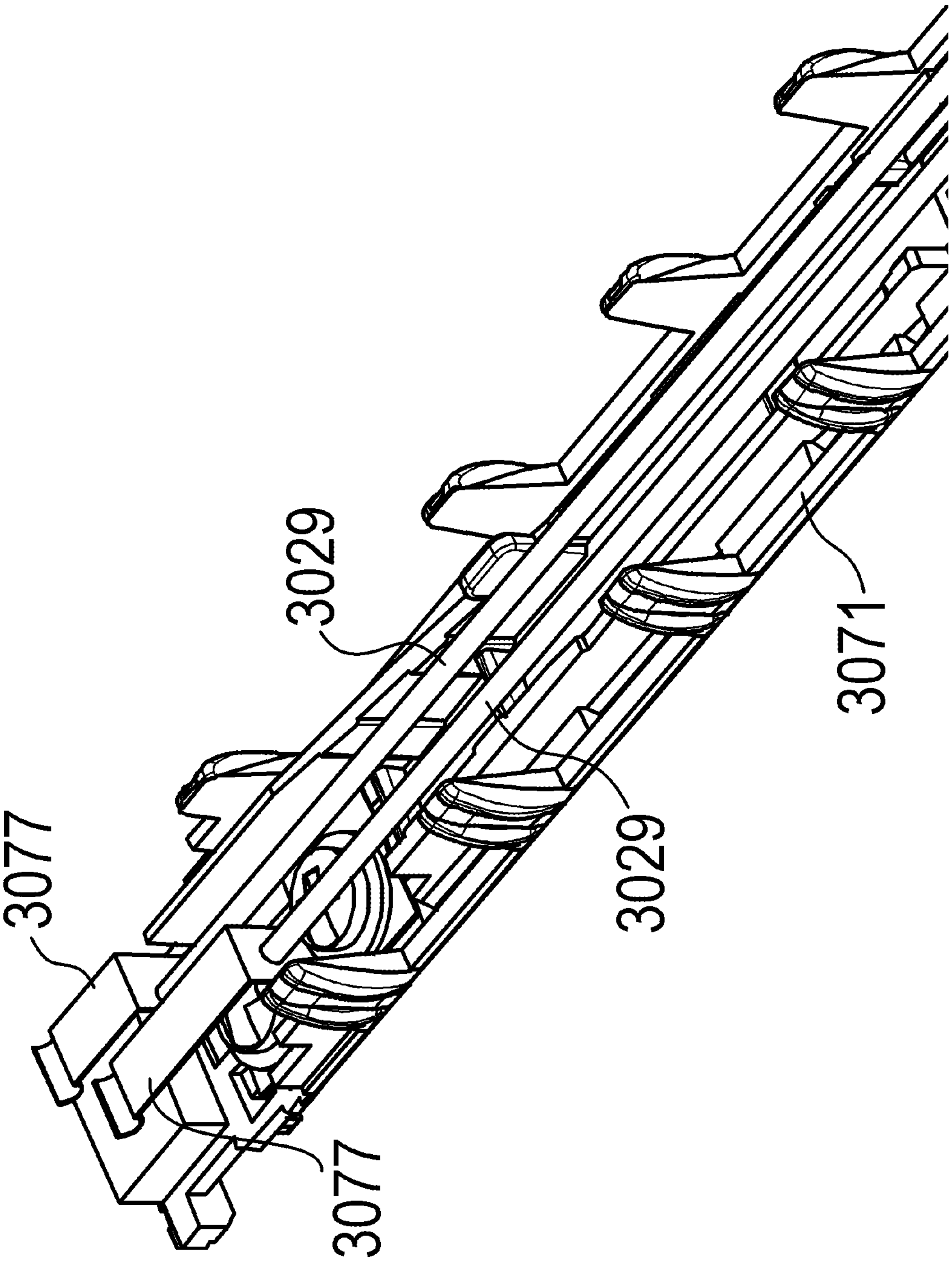
FIG. 53 is a perspective view of a heater holder and a power supply means according to Example 11.

FIG. 53 is a schematic perspective view illustrating a heater holder 3071 and a power supply contact point 3077 that serves as power supply means in this example. The power supply contact point 3077 in this example is disposed to be located near an end portion of the heater holder 3071 in the longitudinal direction and on the side opposite to the side facing the nip portion N.

Figure 54A:
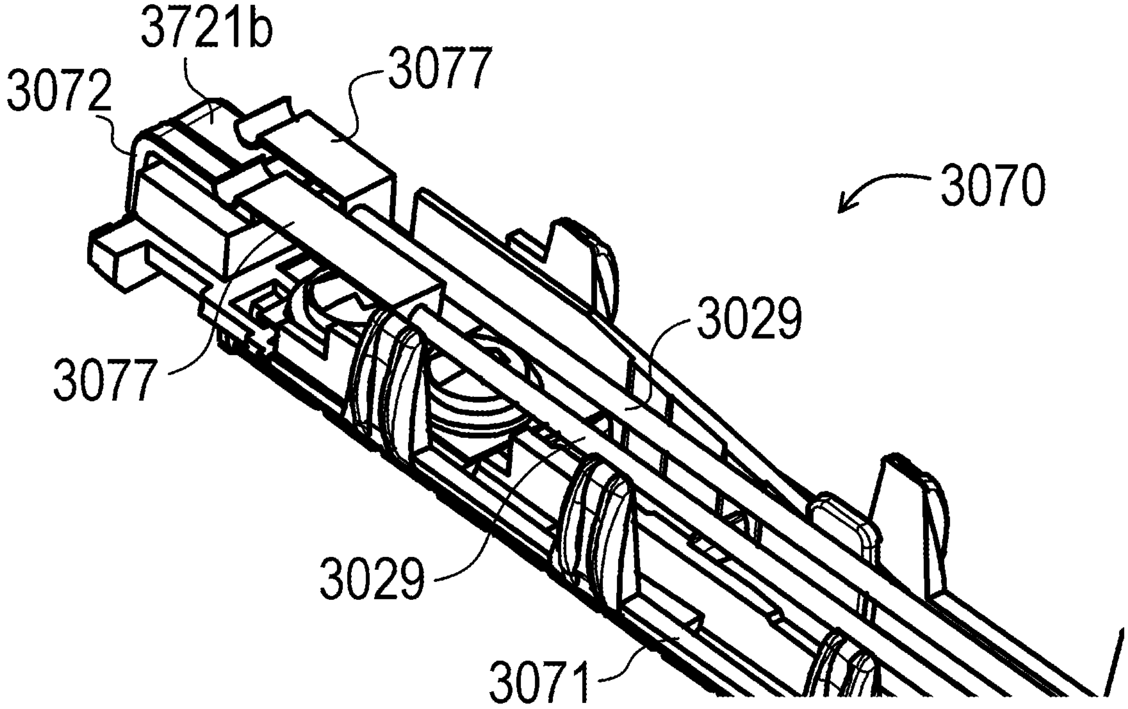
FIGS. 54A and 54B are perspective views of a heater holder unit according to Example 11.
Figure 54B:
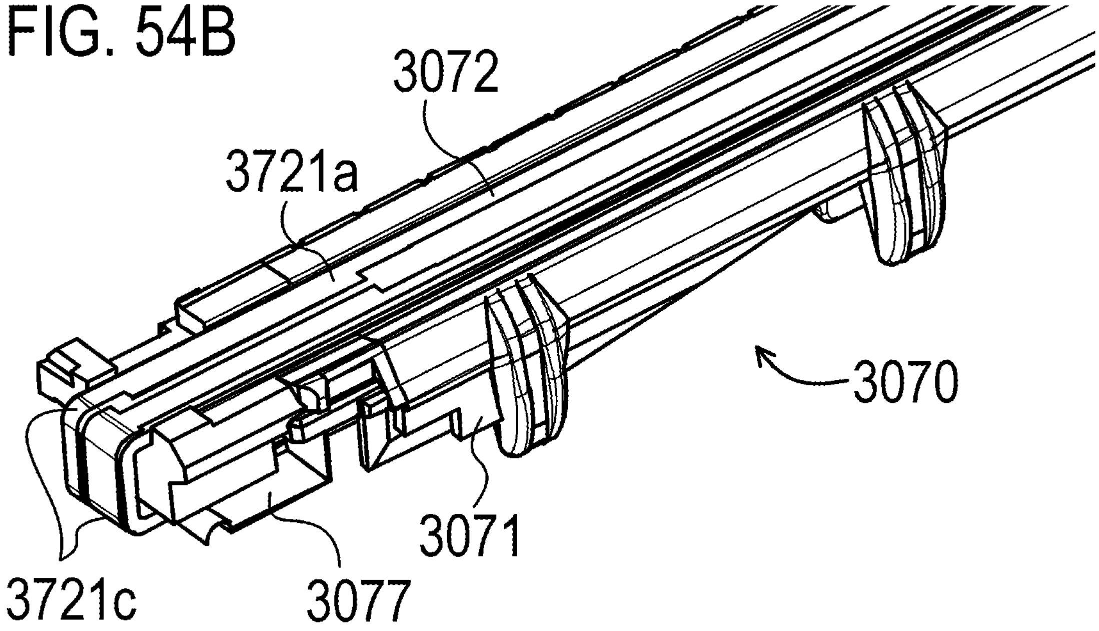

FIG. 54A is a schematic perspective view of a heater holder unit 3070 in this example when seen from the side of the electrode placement portion 3721*b*, and FIG. 54B is a schematic perspective view when seen from the side of the heat generating element placement portion 3721*a*. The heater 3072 in this example is disposed such that the heat generating element placement portion 3721*a* and the electrode placement portion 3721*b* sandwich the heater holder 3071. The heater 3072 held by the heater holder 3071 in this state is disposed such that the power supply electrode 3226 comes into contact with the power supply contact point 3077 with an abutting pressure in the image forming apparatus. In other words, power distribution control means supplies power to the heater via power supply means provided in the rear side of the heat generating element placement portion in the image forming apparatus in this example.

In comparison between the heater holder units in this example and the aforementioned comparative example that is a configuration in the related art, this example can be configured to be smaller by about 13 mm in the longitudinal direction. In other words, it is possible to obtain an effect of further saving a space in the longitudinal direction as compared with Example 1 by bending the substrate such that the electrode placement portion is parallel with the heat generating element placement portion rather than being perpendicular thereto and establishing connection to power supply means located on the rear side of the heat generating element placement portion.

Example 12

Next, Example 12 according to the present invention will be described. Example 12 is a configuration in which a method for supplying power to a heater is different from that in Example 9. Similar reference signs will be applied to configurations that are similar to those in Example 9 from among the configurations in Example 12, and description thereof will be omitted. Hereinafter, characteristic configurations in Example 12 will be described using FIG. 55.

Figure 55:
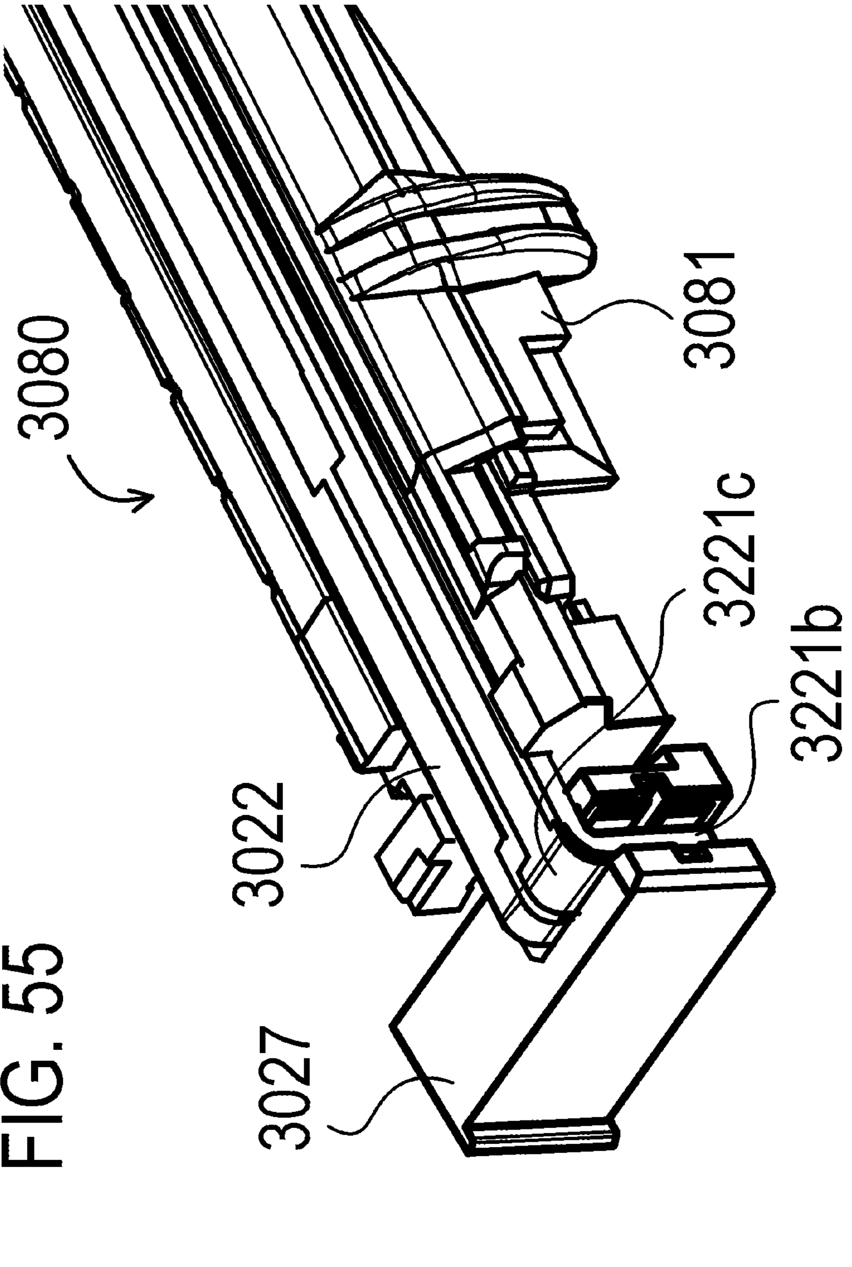
FIG. 55 is a perspective view of a heater holder unit and a power supply means according to Example 12.

FIG. 55 is an overview diagram illustrating a configuration for supplying power to a heater 3022 held by a heater holder 3081 in this example. The heater 3022 in this example has a configuration including a bent portion 3221*c* similarly to Example 9. An electrode placement portion 3221*b* provided with a power supply electrode 3226 in the heater 3022 is provided at one end of the heater holder unit 3080 in the longitudinal direction. Also, a power supply connector 3027 is connected to the electrode placement portion 3221*b* in this example. Since the substrate 3221 is bent in the fixing device in this example, the power supply connector 3027 is attached in a state in which it is rotated by 90° as compared with the configuration in the related art (see FIG. 50). Power supply to the heater 3022 is performed by a power supply contact point inside the power supply connector 3027 that serves as power supply means being connected to the power supply electrode 3226.

In comparison between the heater holder units in this example and the aforementioned comparative example that is a configuration in the related art, it is possible to configure this example to be smaller by about 3 mm in the longitudinal direction. In other words, a space saving effect in the longitudinal direction can be obtained by employing a configuration in which the power supply connector is rotated by 90° such that it can be connected to the heater. This example is particularly advantageous for a configuration in which differences in vertical and horizontal widths of the power supply connector are large.

Modification Examples

Note that although the present invention has been described using a monochrome image forming apparatus in each of the aforementioned examples, the present invention can also be applied to other various apparatuses as described at the beginning. Examples of other image forming apparatuses to which the present invention is applied include a tandem-type color image forming apparatus using a recording material conveyance belt, a four-cycle-type intermediate transfer-system color image forming apparatus, and a tandem-type intermediate transfer-system color image forming apparatus. Moreover, other examples include a color image forming apparatus using a recording material conveyance belt based on an intermediate transfer-system and an image forming apparatus using four or more toners. Similar effects can be obtained from the aforementioned image forming apparatuses by applying the present invention thereto.

Also, although each of the aforementioned examples has been described using a tensionless-type film heating system including a heater on the side of the inner surface of the film, the present invention can be applied to other systems as well. Examples of other systems include a fixing device including a heating roller as a roller for heating a toner image on a recording material and using a configuration of pressurizing a film assembly unit on the heating roller. Similar effects can be obtained even from the fixing device using the aforementioned configuration by applying the present invention thereto.

Other modification examples also include a configuration in which heat generating elements are provided not on the side of the surface of the heater abutting the film but on the surface on the opposite side. In addition, the layer configuration of the heater can be modified in various manners in accordance with an application, a size, and the like of the apparatus, and similar effects are obtained even from such a configuration by applying the present invention thereto.

Figure 56:
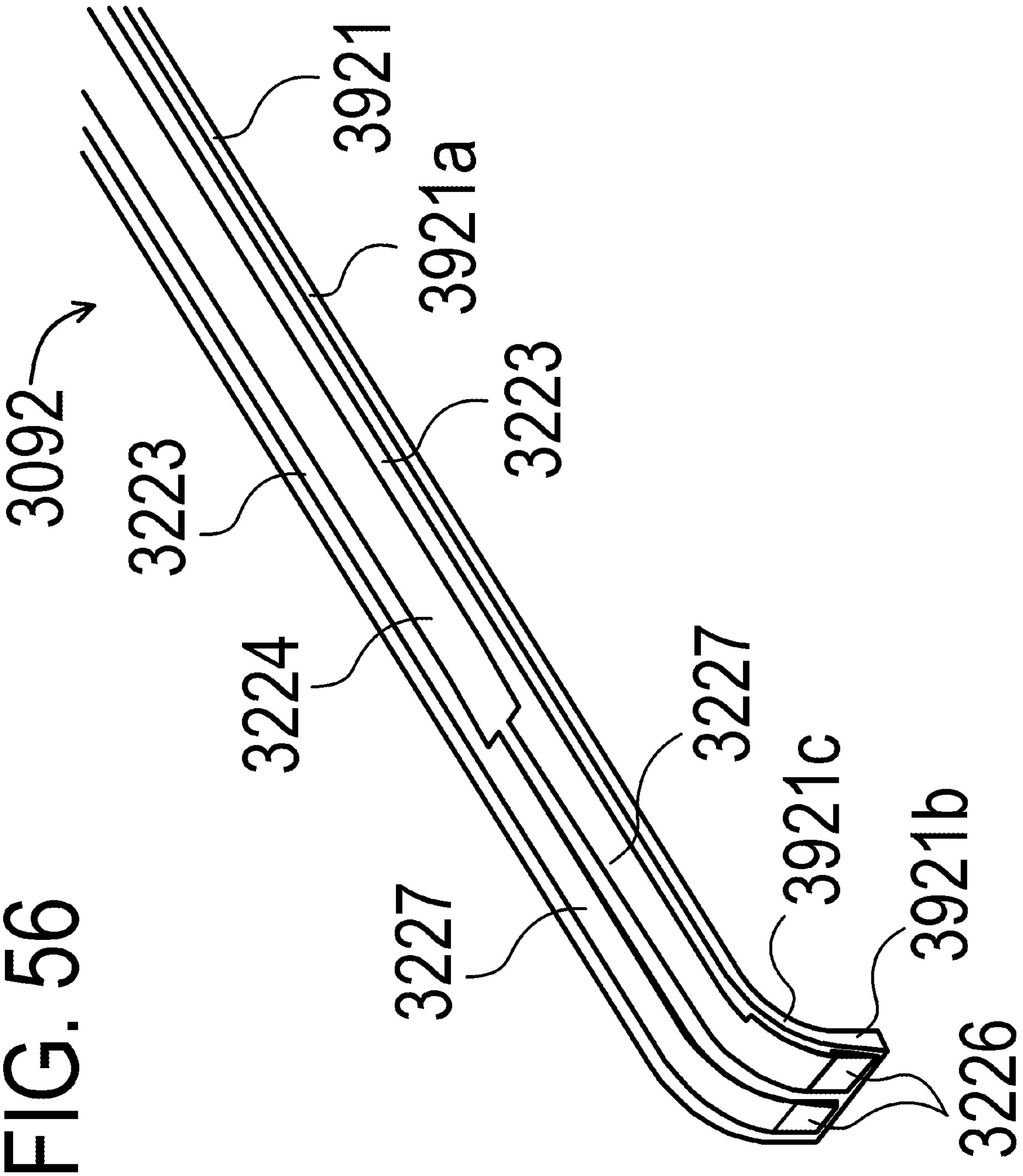
FIG. 56 is a perspective view of a heater according to a modification example.
Figure 57:
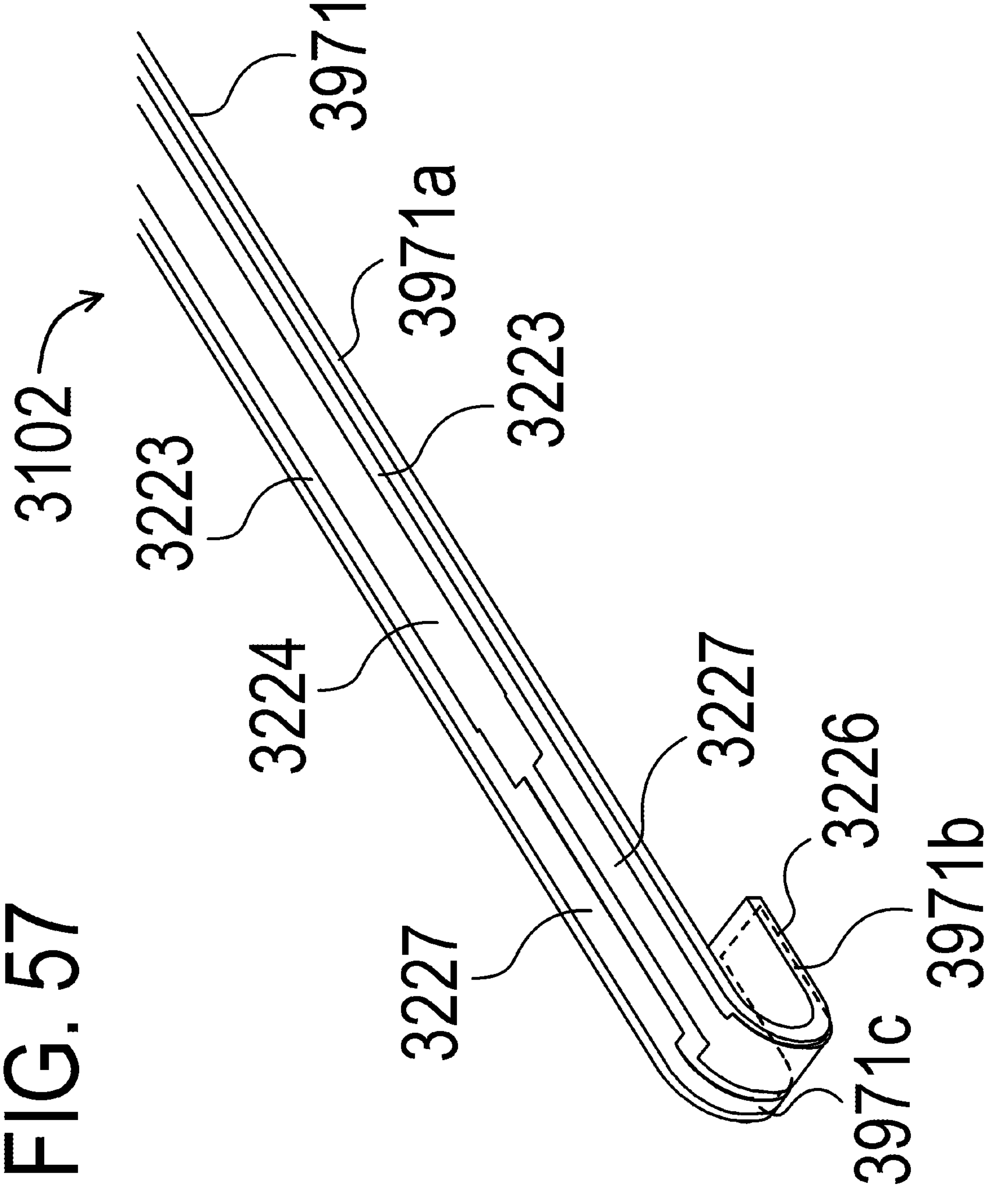
FIG. 57 is a perspective view of a heater according to a modification example.

Other modification examples include an example in which the shape of a substrate is changed by more mildly bending the substrate. FIG. 56 is a schematic perspective view illustrating a heater 3092 obtained by more mildly bending a substrate as compared with Example 9 (see FIG. 47). FIG. 57 is a schematic perspective view illustrating a heater 3102 obtained by more mildly bending a substrate as compared with Example 11 (see FIGS. 52A and 52B). Since each of the substrate 3921 and the substrates 3921 and 3971 includes a heat generating element placement portion 3921*a* and heat generating element placement portions 3921*a* and 3971*a*, an electrode placement portion 3921*b* and electrode placement portions 3921*b* and 3971*b*, and a bent portion 3921*c* and bent portions 3921*c* and 3971*c* and has a configuration that is similar to that in the aforementioned example other than the shape of the bent portion, description thereof will be omitted. Similar effects can be obtained by applying the present invention even from such a configuration including a mild bent portion and a configuration in which a steep bent portion and a mild bent portion are used together.

Figure 58:
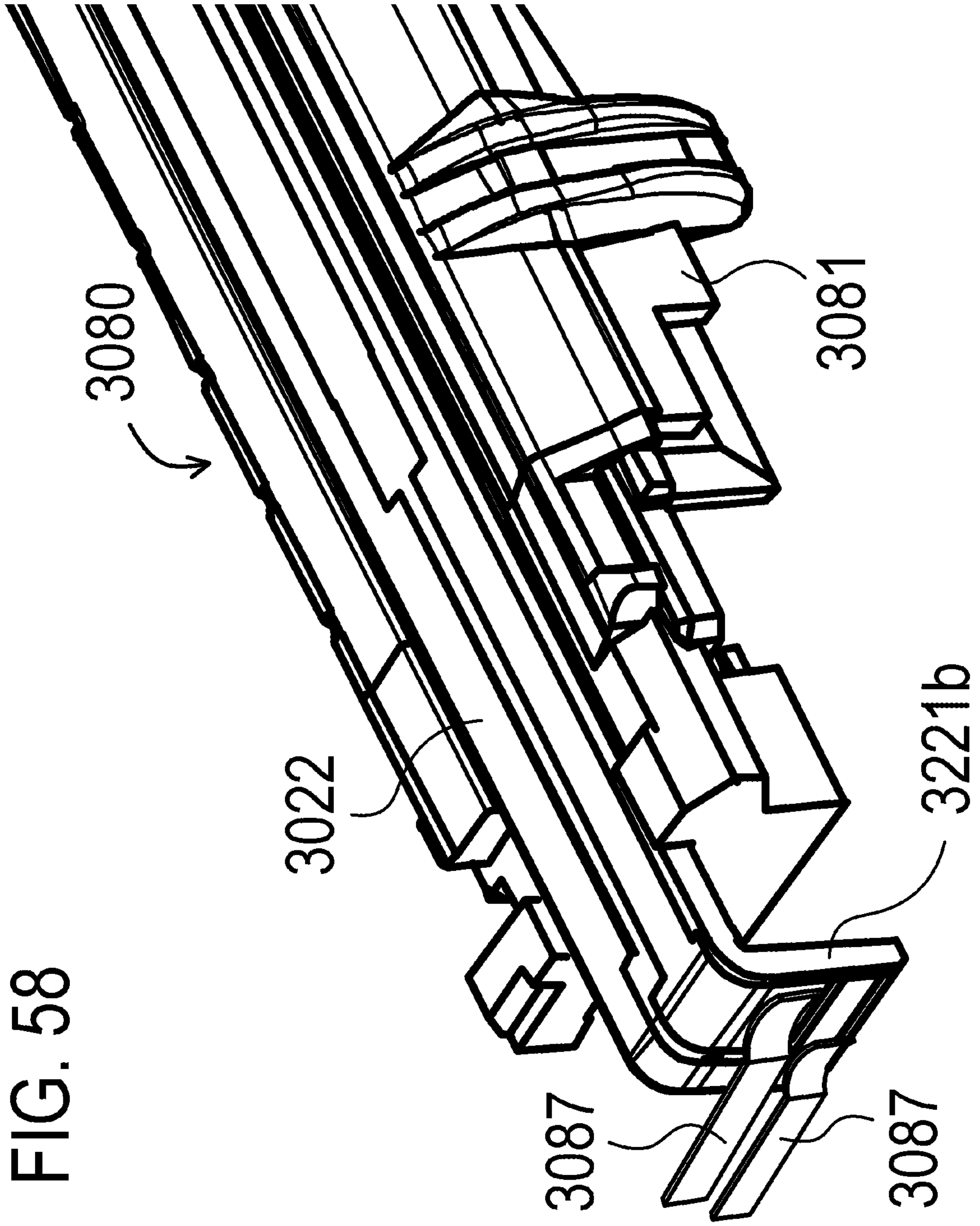
FIG. 58 is a perspective view of a heater holder unit and a power supply means according to a modification example.

Other modification examples include a configuration in which power supply means and a power supply electrode are welded and connected to each other. FIG. 58 is a schematic perspective view illustrating a state in which a power supply contact point 3087 instead of a power supply connector is welded to the electrode placement portion 3221*b* of the heater as a modification example of Example 12 (see FIG. 55). Since the other configurations are similar to those in Example 12, description thereof will be omitted. The power supply means is not limited to those employed in the examples in this manner, various modifications can be made, and similar effects can be obtained even from such configurations by applying the present invention thereto.

Hereinafter, configuration or concept examples disclosed in the aforementioned embodiment will be described below. However, these are just an example, and the disclosure of the aforementioned embodiment is not limited to the configurations or concepts described below.

Configuration C1

A heater includes:

a heat generating element;

an electrode that is for supplying power to the heat generating element; and a substrate that is thin and long and includes the heat generating element and the electrode provided thereon, in which the substrate includes a heat generating element placement portion that extends in a longitudinal direction, and an electrode placement portion that is positioned by being bent from one end of the heat generating element placement portion in the longitudinal direction, and the heat generating element is disposed on the heat generating element placement portion, and the electrode is disposed on the electrode placement portion.

Configuration C2

The heater according to Configuration C1, further includes:

a conductive body that electrically connects the heat generating element to the electrode and extends from the heat generating element placement portion to the electrode placement portion.

Configuration C3

In the heater according to Configuration C1 or C2, the heat generating element placement portion includes a plane on which the heat generating element is provided.

Configuration C4

In the heater according to Configuration C3, the electrode placement portion extends perpendicularly to the plane.

Configuration C5

In the heater according to Configuration C3, the electrode placement portion extends in parallel with the plane.

Configuration C6

In the heater according to any one of Configurations C1 to C5, the substrate is molded by folding a plate containing metal as a main material.

Configuration C7

A heating device including:

a first rotating body;

the heater according to any one of Configurations C1 to C6 that is provided in an internal space of the first rotating body; and a second rotating body that forms a nip portion with the heat generating element placement portion of the heater via the first rotating body.

Configuration C8

In the heating device according to Configuration C7, the electrode placement portion is located on a side further from the nip portion than the heat generating element placement portion in a thickness direction of the heat generating element placement portion.

Configuration C9

In the heating device according to Configuration C8, the heat generating element is provided on a surface of the substrate facing the second rotating body in the thickness direction.

Configuration C10

In the heating device according to any one of Configurations C7 to C9, the first rotating body is a tubular film, and a second rotating body is a roller.

Configuration C11

In the heating device according to any one of Configurations C7 to C10, further including:

a heater holder that holds the heater and guides rotation of the first rotating body, in which the heater holder is provided with a power supply means for supplying power to the electrode.

Configuration C12

In the heating device according to Configuration C11, the power supply means is provided in the heater holder, and the heater holder includes a holding portion that holds the heater by a part of the heater including the electrode being inserted thereinto.

Configuration C13

An image forming apparatus includes:

an image forming portion that forms an image on a recording material; and the heating device according to any one of Configurations C7 to C12 that fixes, on the recording material, the image formed on the recording material.

Configuration C14

An image forming apparatus includes:

an image forming portion that forms an image on a recording material;

the heating device according to any one of Configurations C7 to C10 that fixes, on the recording material, the image formed on the recording material; and a casing inside which the image forming portion and the heating device are provided, in which a power supply means for supply power to the electrode is provided on a surface of the casing facing the heater on the side of the one end of the substrate in the longitudinal direction.

Configuration C15

A heater holder that holds a heater including a heat generating element, an electrode that is for supplying power to the heat generating element, and a thin and long substrate on which the heat generating element and the electrode are provided includes:

a holding portion that holds the heater by a part of the heater being inserted thereinto; and a power supply means for supplying power to the electrode, the power supply means being provided at the holding portion, in which the power supply means is connected to an electrode provided in the heater inserted into the holding portion.

Also, there is a configuration in which the film unit is offset on the upstream side of the nip portion in the conveying direction for a heating device configured of a heater, a film, a pressurizing roller, and the like in order to fix a toner image on a recording material with a small amount of heat. This is because it is possible to efficiently fix a toner heated and softened from the upstream side to the downstream side of the nip portion in the recording material conveying direction on the recording material by strongly pressurizing the toner on the downstream side of the nip portion in the conveying direction and to improve fixing performance in such a configuration. However, in a case of a configuration in which the position of the nip portion is caused to deviate, fixing performance is likely to deteriorate since the heat generating portion of the heater is localized on the upstream side in the conveying direction if the width of the nip portion decreases due to variations in hardness, pressurizing force, and the like of the pressurizing roller. In other words, there is a probability that the fixing performance may vary in the above configuration in a case where the width of the nip portion changes. Thus, a heater capable of curbing variations in fixing performance will be described next.

Example 13

(1) Image Forming Apparatus

Figure 59:
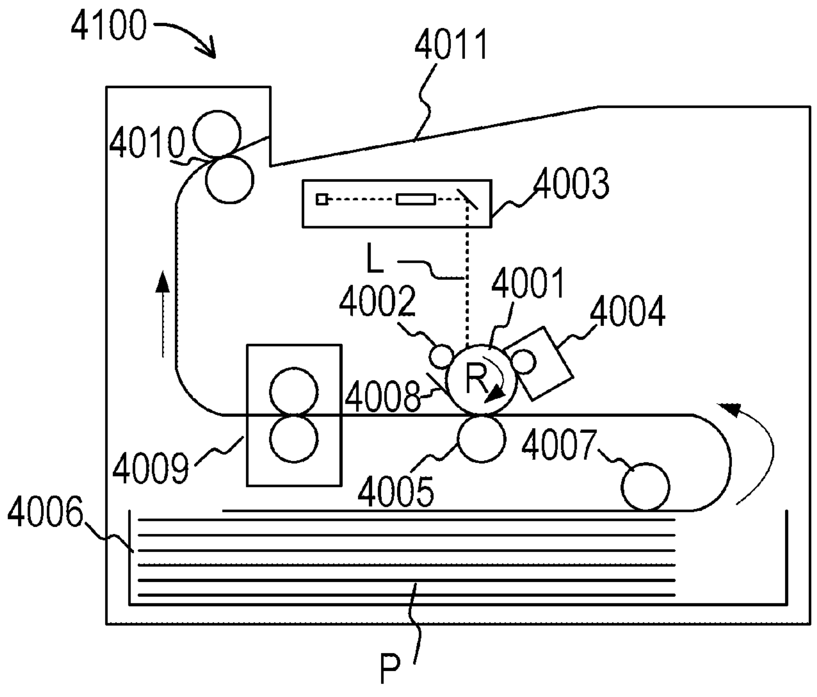
FIG. 59 is an overview configuration example of an image forming apparatus according to Example 13.

As a general image forming apparatus 4100 in the present embodiment, operations of a laser printer using an electrophotography recording technique will be briefly described using FIG. 59. FIG. 59 is a "sectional view of the general image forming apparatus 4100 in the present embodiment".

An image forming operation performed by an image forming portion of the image forming apparatus 4100 will be described. If the image forming apparatus 4100 receives a printing instruction from an external device or the like, then a scanner unit 4003 emits laser light L in accordance with image information toward a photosensitive member 4001. The photosensitive member 4001 charged with a predetermined polarity by the charging roller 4002 is scanned with the laser light L, and an electrostatic latent image in accordance with the image information is formed on the surface of the photosensitive member 4001. Thereafter, a developing device 4004 supplies a toner to the photosensitive member 4001, and a toner image in accordance with the image information is formed on the photosensitive member 4001. The toner image on the photosensitive member 4001 moves to a transfer position formed by the photosensitive member 4001 and a transfer roller 4005 through rotation of the photosensitive member 4001 in the arrow R direction and is then transferred to the recording material P fed by a pickup roller 4007 from a cassette 4006. The surface of the photosensitive member 4001 that has passed through the transfer position is cleaned with a cleaner 4008.

A fixing device 4009 that serves as a fixing portion performs fixing processing on the recording material P with the toner image transferred thereto with heat and a pressure. Thereafter, the recording material P is discharged to a discharge tray 4011 by a discharge roller 4010.

(2) Fixing Device

Next, a configuration and operations of the fixing device 4009 will be described. In the present embodiment, a tensionless-type film heating-system fixing device 4009 is used as an example of the heating device. The fixing device 4009 in the present embodiment is a device in which an endless belt-shaped (or cylindrical) heat-resistant film is used, at least a part of the perimeter of the film is always kept free from tension (a state in which no tension is applied thereto), and the film is driven to rotate by a rotation drive force of a pressurizing member.

Figure 60:
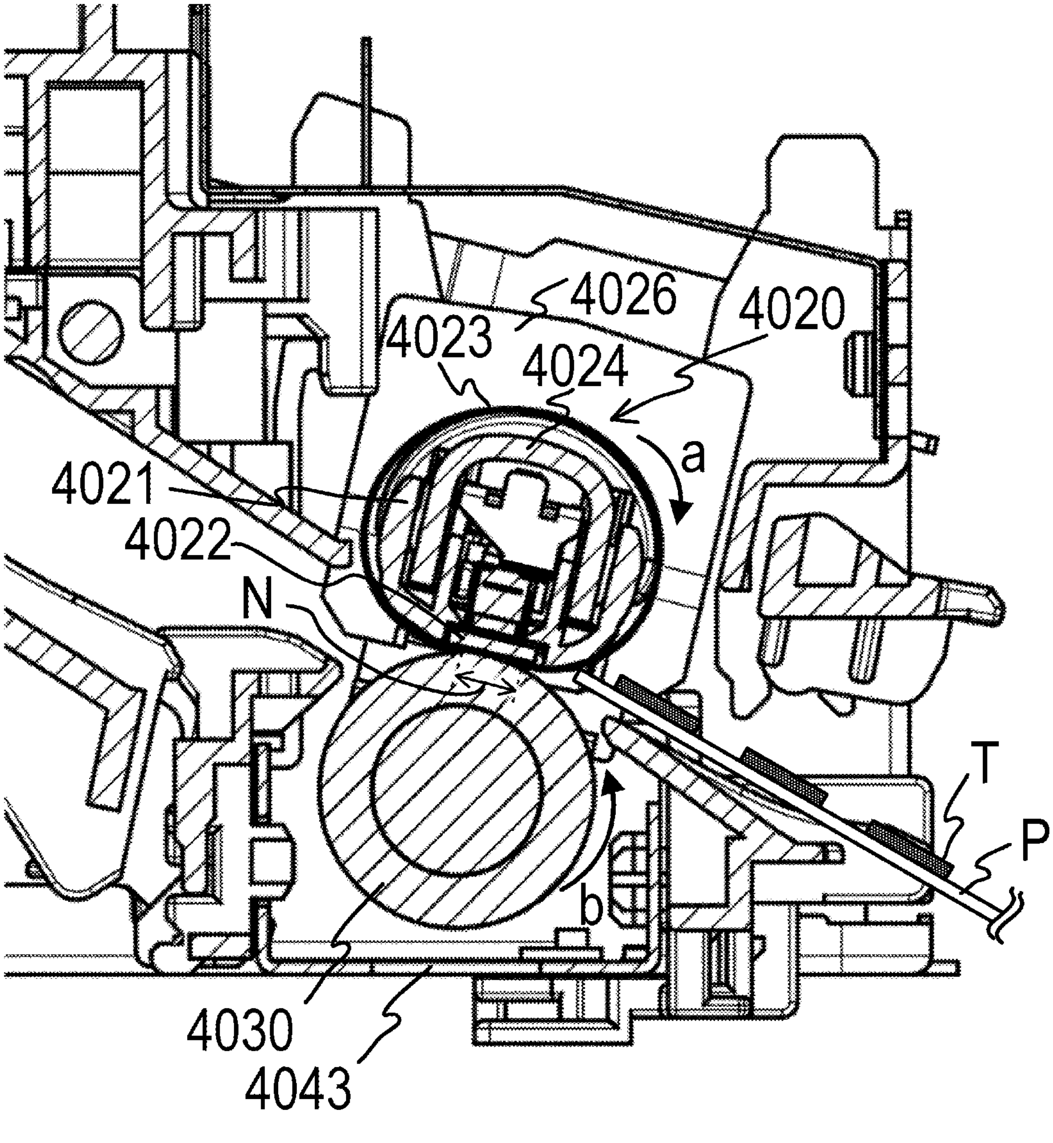
FIG. 60 is a sectional view of a fixing device according to Example 13.

A configuration of the fixing device 4009 will be described with reference to FIG. 60. FIG. 60 is an overview sectional view of the fixing device 4009 in the present embodiment. The fixing device 4009 in the present embodiment includes a rotatable tubular film 4023 as a first rotating body, a heater 4022 that heats the film 4023 in an internal space of the film 4023, and a heater holder 4021 that supports the heater 4022, guides rotation of the film 4023, and is made of a heat-resistant resin. The fixing device 4009 further includes a reinforcing member 4024 that reinforces the heater holder 4021 and a pressurizing roller 4030 that forms a nip portion N between the pressurizing roller 4030 and the film 4023 as a second rotating body. The film unit 4020 in the present embodiment is configured of members such as the film 4023, the heater 4022, the heater holder 4021, the reinforcing member 4024, and the like. Here, all of the heater 4022, the film 4023, the heater holder 4021, and the pressurizing roller 4030 are members extending to be long in the rotational axis direction of the pressurizing roller 4030. An axial direction of the cylindrical shape of the film 4023 (the arrow direction into which the fixing film is inserted in FIG. 61) that is parallel with the rotational axis direction of the pressurizing roller 4030 will be referred to as a longitudinal direction below. Also, the conveying direction of the recording material P inside the nip portion N is orthogonal to the longitudinal direction in the present embodiment.

If the pressurizing roller 4030 receives power from a motor and rotates in the arrow b direction, then the film 4023 is driven and rotates in the arrow a direction. The toner image T on the recording material P is heated and fixed to the recording material P by the recording material P being nipped and conveyed by the nip portion N. The pressurization position of the pressurizing roller 4030 is substantially the same as the center portion of the heater 4022 in the conveying direction of the recording material P. In other words, the centers of the heater 4022 and the pressurizing roller 4030 overlap each other in the conveying direction in the fixing device 4009 in this example similarly to the configuration in the related art.

Figure 61:
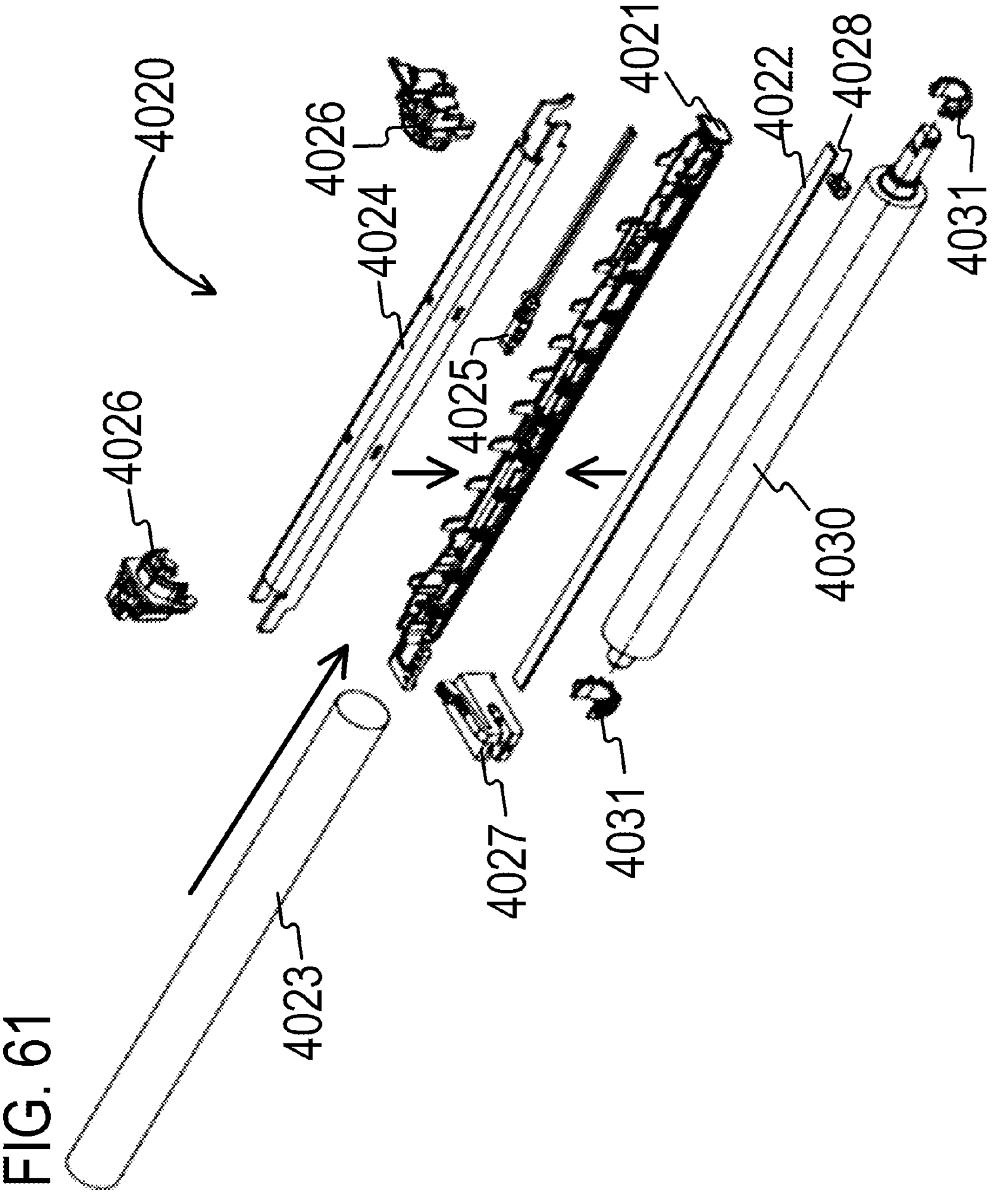
FIG. 61 is an exploded perspective view of a film unit of the fixing device according to Example 13.

Next, members configuring the fixing device 4009 will be described in detail using FIG. 61. FIG. 61 is an exploded perspective view of the film unit 4020 used in the fixing device 4009.

The heater 4022 includes a thin and long plate-shaped substrate containing ceramic or a metal alloy as a main material, a heat generating element that generates heat in response to power distribution, and a coating layer that protects the substrate and the heat generating element. Details of the heater 4022 will be described later.

In a case where the film 4023 is a single-layer film, it is preferable to use polytetrafluoroethylene (PTFE), tetrafluoroethylene-perfluoroalkyl vinyl ether (PFA), PPS, or the like as a film base layer. In a case of a composite-layer film, it is preferable to use a material such as polyimide (PI), polyamidimide (PAI), polyether ethery ketone (PEEK), or polyether sulfone (PES) as a film base layer. Moreover, it is preferable that the surface be coated with PTFE, PFA, tetrafluoroethylene-perfluoroalkyl vinyl ether (FEP) as a film release layer to configure the composite-layer film. Also, a film obtained by using pure metal, an alloy or the like of SUS, Al, Ni, Cu, Zn, or the like with high heat conductivity in a base layer and performing the aforementioned coating processing or coating with a fluorine resin tube on the release layer is also suitably used. The thickness of the film 4023 is preferably at least 20 μm and not more than 100 μm in order to secure satisfactory heat conductivity.

In the present embodiment, PI with a thickness of 60 μm is used as the film base layer, and a film release layer coated with PFA with a thickness of 12 μm is used in consideration of both abrasion of the film release layer due to paper feeding and heat conductivity.

The heater holder 4021 is a member that is longer in the longitudinal direction with a substantially gutter-shaped section. Since the heater holder 4021 is required to have heat resistance and rigidity, it is preferable to use a liquid crystal polymer resin or the like with high heat resistance and excellent strength as a material. A molded article of a heat-resistant resin such as polyphenylene sulfide (PPS), a liquid crystal polymer (LCP), or the like is particularly suitably used for the heater holder 4021.

The reinforcing member 4024 is made of metal such as iron, receives a force of a pressurizing spring, which will be described later, and presses the heater 4022 on the side of the pressurizing roller 4030 via the heater holder 4021. Moreover, the reinforcing member 4024 is a member for maintaining strength such that the heater holder 4021 is not significantly deformed even with a pressure for forming the nip portion N.

The reinforcing member 4024 is fitted to the inside of the gutter shape of the heater holder 4021. A heater receiving groove is provided on the side of the heater holder 4021 facing the pressurizing roller 4030, and the heater 4022 is fitted to the heater receiving groove and is fitted at a desired position. The film 4023 is fitted onto the outside of the heater holder 4021 with which the aforementioned components are assembled with a margin at the perimeter thereof.

The pressurizing roller 4030 that serves as a pressurizing rotating body includes a core metal of a material such as iron or aluminum, an elastic layer of a material such as silicone rubber, and a release layer of a material such as PFA.

A thermistor 4025 is a temperature detection member and abuts on the heater 4022 on the side opposite to the surface abutting the film 4023. Power distribution to the heater 4022 is controlled in accordance with the temperature detected by the thermistor 4025.

Flanges 4026 are provided at both ends of the reinforcing member 4024 in the longitudinal direction and restrict movement of the rotating film 4023 in the longitudinal direction. A power supply terminal of the heater 4022 also projects on the one end side of the film 4023, and a power supply connector 4027 is fitted thereto. The power supply connector 4027 comes into contact with an electrode portion of the heater 4022 with an abutting pressure and forms a power supply path. Also, at the one end at which the power supply connector 4027 is provided and the other end side on the opposite side, a heater clip 4028 formed of a metal plate bent into a U shape holds an end of the heater 4022 against the heater holder 4021 with a spring property thereof. A stretching portion of the reinforcing member 4024 sticks out of both ends of the film 4023 in the longitudinal direction, the flanges 4026 are fitted and attached to both ends, and the film unit 4020 is thereby assembled as a whole.

Figure 62:
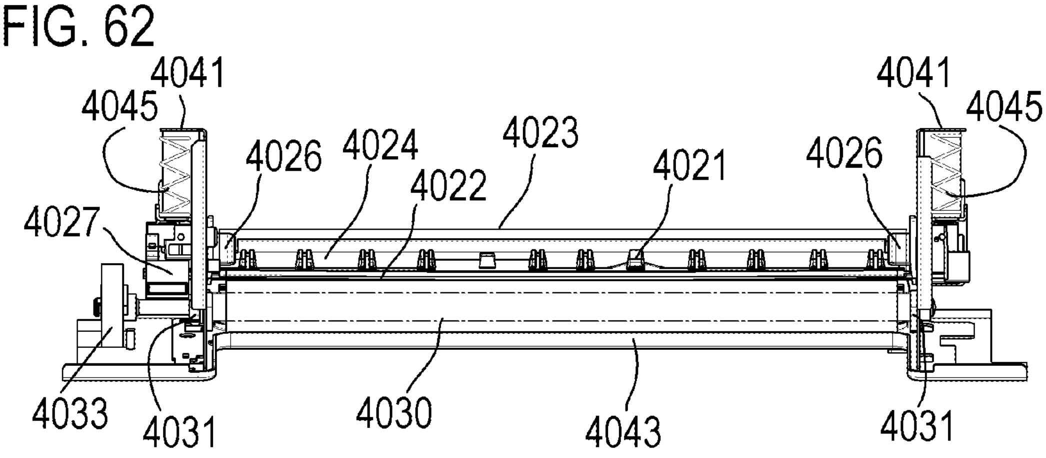
FIG. 62 is a front view of the fixing device according to Example 13.

Next, a pressurizing mechanism of the heating device will be described using FIG. 62. FIG. 62 is a front view of the fixing device 4009 seen from the conveying direction of the recording material and does not illustrate a part of the film 4023 in order to illustrate the inside of the film unit 4020.

The film unit 4020 is provided to face the pressurizing roller 4030 and is supported by a top plate-side casing 4041 of the fixing device such that movement in the longitudinal direction (the left-right direction in FIG. 62) is restricted and free movement in the pressurizing direction (the up-down direction in FIG. 62) is allowed. The pressurizing spring 4045 is attached to the top plate-side casing 4041 of the fixing device in a compressed state. The pressing force of the pressurizing spring 4045 is received by the stretching portion of the reinforcing member 4024, the reinforcing member 4024 is pressed on the side of the pressurizing roller 4030, and the film unit 4020 is pressed on the side of the pressurizing roller 4030. A bearing member 4031 is provided to axially support the core metal of the pressurizing roller 4030 and receives the pressing force from the film unit 4020 via the pressurizing roller 4030. In order to rotatably support the core metal of the pressurizing roller that is heated to a relatively high temperature, a material with heat resistance and excellent slidability is used as a material of the bearing member 4031. The bearing member 4031 is attached to a bottom-side casing 4043 of the fixing device. A pressurizing roller drive gear 4033 is attached to an end portion of the core metal of the pressurizing roller 4030 on one side, is caused to receive a rotation drive force by drive means, which is not illustrated, and causes the pressurizing roller 4030 to rotate.

(3) Heater

Figure 63:
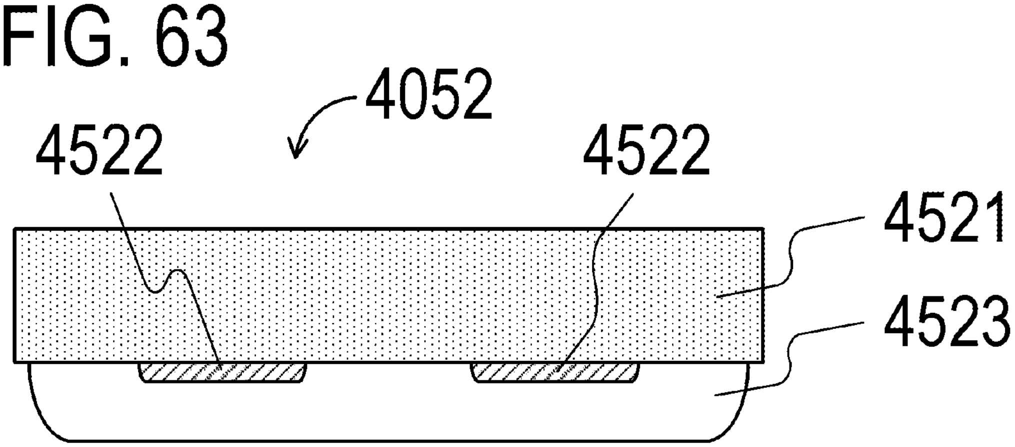
FIG. 63 is a sectional view of a heater according to a comparative example.
Figure 64:
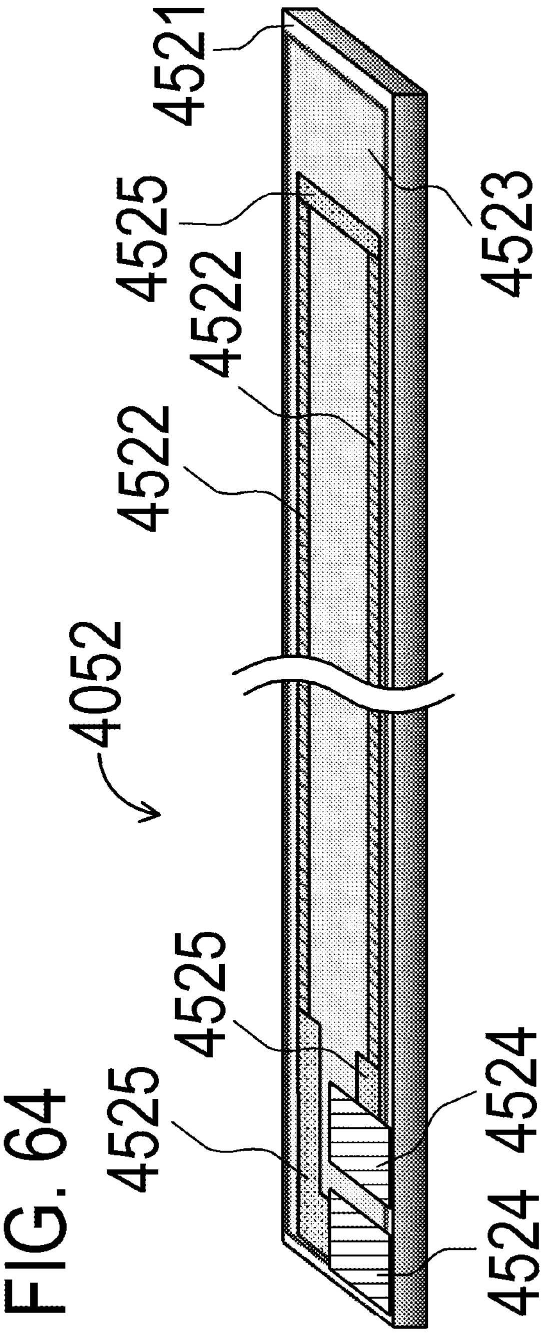
FIG. 64 is a perspective view of a heater according to a comparative example.

Before the heater in the present embodiment is described, a heater 4052 that is a configuration in the related art will be described as a comparative example first using FIGS. 63 and 64. FIG. 63 is a sectional view of the heater 4052 according to the comparative example that is a configuration in the related art, and FIG. 64 is a perspective view.

The general heater 4052 with the configuration in the related art includes a thin and long plate-shaped substrate 4521, a strip-shaped heat generating element 4522 that generates heat in response to power distribution, and a coating layer 4523 that serves as a protective layer for protecting the substrate 4521 and the heat generating element 4522. The heater 4052 further includes a power supply electrode 4524 and a conduction pattern 4545 provided for the purpose of supplying power to the heat generating element 4522, and the conduction pattern 4545 is also covered with the coating layer 4523. The heater 4052 is provided in the fixing device such that the coating layer 4523 abuts an inner circumferential surface of a film 4023.

It is necessary to select a material with heat resistance for the substrate 4521 in terms of the temperature in actual use, and ceramic or metal is mainly used. In a case where metal is used as a material of the substrate 4521, it is necessary to provide an insulating layer between the substrate 4521 and the heat generating element 4522. It is only necessary to determine the thickness of the substrate 4521 in consideration of strength, heat capacity, and a heat dissipation performance. Although a thin thickness of the substrate 4521 is advantageous for quick starting due to a small heat capacity, a problem such as distortion or the like is likely to occur when the heat generating element 4522 is heated and molded if the thickness is excessively thin. On the contrary, although a thick thickness of the substrate 4521 is advantageous in terms of distortion when the heat generating element 4522 is heated and molded, an excessively thick thickness is disadvantageous for quick starting due to a large heat capacity. A preferable thickness of the substrate 4521 is 0.3 mm to 2.0 mm in consideration of a balance of mass production, cost, and performance.

The heat generating element 4522 is obtained by applying a heat generating element paste obtained by mixing a conductive component (A), a glass component (B), and an organic binding component (C) to the substrate 4521 and then baking the resulting object. If the heat generating element paste is baked, the organic binding component (C) is burnt and disappears and the components (A) and (B) components remain, and the heat generating element 4522 containing the conductive component and the glass component is thereby formed. Here, silver-palladium (Ag·Pd), ruthenium oxide ($RuO_2$), or the like is used alone or in combination as the conductive component (A), and it is preferable to obtain a sheet resistance value of 0.1 [Ω/□] to 100 [kΩ/□]. Also, there may be no problem if other materials are contained in addition to (A) to (C) described above as long as the amounts are very small and properties of the present invention are not damaged.

The power supply electrode 4524 and the power conduction pattern 4545 contain silver (Ag), platinum (Pt), gold (Au), a silver-platinum (Ag·Pt) alloy, a silver-palladium (Ag·Pd) alloy, or the like as a main constituent. The power supply electrode 4524 and the power conduction pattern 4545 are formed by applying the paste obtained by mixing the conductive component (A), the glass component (B), and the organic binding component (C) to the substrate 4521 and baking the paste similarly to the heat generating element paste. The resistances of the power supply electrode 4524 and the conduction pattern 4545 are set to be sufficiently low with respect to the heat generating element 4522 for the purpose of supplying power to the heat generating element 4522. Here, it is necessary to select a material that is softened and melts at a temperature that is lower than the melting point of the substrate 4521 and to select a material with heat resistance in view of the temperature in actual use, for the aforementioned heat generating element paste, the power supply electrode paste, and the conduction pattern paste.

Although the material of the coating layer 4523 is not particularly limited, it is necessary to select a material with heat resistance in view of the temperature in actual use. As a material, glass or polyimide (PI) is preferably used in terms of heat resistance, and selection of a specific powder material in the case of glass may be appropriately performed without damaging the properties of the present invention. A heat conductive filler with an insulating property and the like may be incorporated as needed. When an insulating layer of glass or polyimide (PI) is formed on the substrate 4521, it is necessary to appropriately adjust the linear expansion coefficients of the substrate 4521 and the coating layer 4523 such that cracking or peeling does not occur in the coating layer 4523 due to a difference between the linear expansion coefficients of the materials. Although molding methods of the heat generating element 4522, the power supply electrode 4524, the conduction pattern 4545, and the coating layer 4523 are not particularly limited, it is possible to smoothly mold them by using a screen printing method in an example. Here, in a case where metal is used as a material of the substrate 4521, it is possible to prevent warpage of the substrate 4521 at the time of manufacturing by molding the coating layers 4523 on both surfaces of the substrate 4521.

Next, a detailed configuration and a manufacturing method of the heater 4052 that is a configuration in the related art will be described. The heater 4052 is a heater used in Comparative Examples 7, 8, and 9 in an evaluation test, which will be described later.

As the substrate 4521, an alumina substrate with a width of 11 mm, a length of 270 mm, and a thickness of 1 mm is used. Also, a heat generating element paste obtained by mixing silver-palladium (Ag·Pd) as a conductive component, other glass components, and an organic binding component and a power supply electrode paste and a conduction pattern paste obtained by mixing silver (Ag) as a conductive component, other glass components, and an organic binding component are prepared.

The heat generating element paste, the power supply electrode paste, and the conduction pattern paste are applied to the substrate 4521 by screen printing, the resulting object is dried at 180° C. and is baked at 850° C., and two heat generating elements 4522, the power supply electrode 4524, and the conduction pattern 4545 are thereby formed. The two heat generating elements 4522 after the baking have a width of 2.5 mm, a length of 230 mm, and a thickness of 15 μm, and a folded-shaped heat generation pattern is formed by connecting the two heat generating elements 4522 with the conduction pattern 4545 at one end portion of the heater 4052 in the longitudinal direction.

Subsequently, a glass paste is prepared, the glass paste is applied to the substrate 4521, the heat generating elements 4522, and the conduction pattern 4545 by screen printing, the resulting object is dried at 180° C. and is baked at 850° C., and the smooth coating layer 4523 is thereby formed. The coating layer 4523 after the baking has a width of 10.5 mm and a length of 260 mm, and the substrate 4521 has a height of 60 μm. The heater 4052 is completed in this manner.

Figure 65:
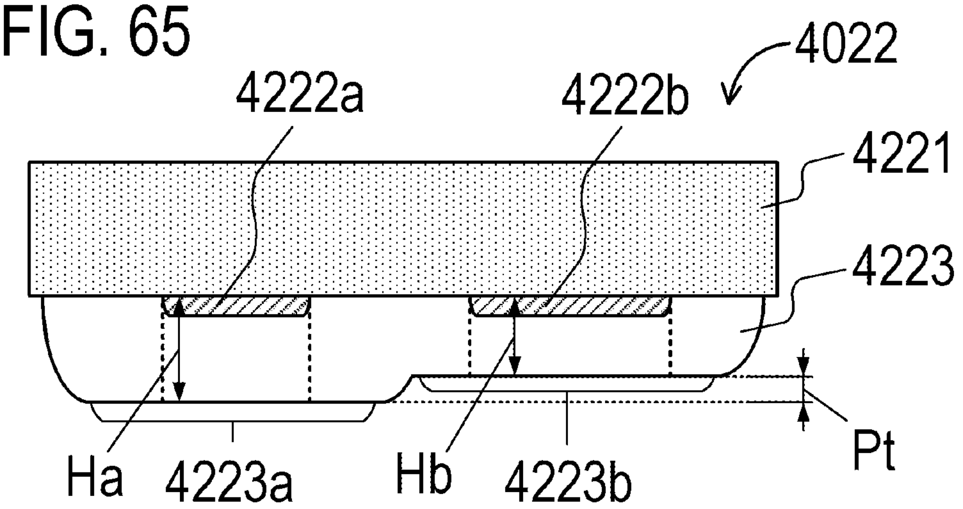
FIG. 65 is a sectional view of a heater according to Example 13.

Next, a configuration of the heater 4022 according to Example 13 will be described using FIG. 65. FIG. 65 is a sectional view of the heater 4022 according to Example 13. The heater according to the present embodiment is different from that in the comparative example of the configuration in the related art in that the amounts of heat generated by the two heat generating elements are not the same and the region on the downstream side of the surface abutting the inner circumferential surface of the film in the conveying direction projects on the side closer to the pressurizing roller than the region on the upstream side in the conveying direction.

The heater 4022 in the present embodiment includes a thin and long plate-shaped substrate 4221, the two heat generating elements 4222 that generate heat in response to power distribution, and a coating layer 4223 that serves as a protective layer for protecting the substrate 4221 and the heat generating elements 4222. The heater 4022 further includes a power supply electrode and a conduction pattern provided for the purpose of supplying power to the heat generating elements 4222, and the conduction pattern is covered with the coating layer 4223. The heater 4022 is provided in the fixing device such that the coating layer 4223 abuts the inner circumferential surface of the film 4023. In the present embodiment, the transverse direction that is orthogonal to the longitudinal direction of the heater 4022 is parallel with the conveying direction of the recording material.

The substrate 4221 according to the present embodiment is an alumina substrate with a width of 11 mm, a length of 270 mm, and a thickness of 1 mm similarly to the aforementioned comparative example. Furthermore, a heat generating element paste, a power supply electrode paste, and a conduction pattern paste that are similar to those in the comparative example are used. Configurations and formation methods of the power supply electrode and the conduction pattern are similar to those in the comparative example, and the description thereof will be omitted. Hereinafter, configurations of the heat generating elements 4222 and the coating layer 4223 that are characteristic in the present invention will be described in detail. In the present embodiment, the thickness direction of the substrate 4221 is parallel with the pressurizing direction at the nip portion N.

A heat generating element paste is applied to the substrate 4221 by screen printing, a resulting object is then dried at 180° C. and is baked at 850° C., and two heat generating elements 4222 are thereby formed. A first heat generating element 4222*a* that is disposed on the downstream side in the conveying direction of the recording material P out of the two heat generating elements 4222 after the baking has a width of 2.2 mm, a length of 230 mm, and a thickness of 15 μm such that the first heat generating element 4222*a* has a larger amount of heat generation than a second heat generating element 4222*b* located on the upstream side in the conveying direction. On the other hand, the second heat generating element 4222*b* has a width of 3.0 mm, a length of 230 mm, and a thickness of 15 μm, and a folded-shaped heat generation pattern is formed by connecting the two heat generating elements 4222*a* and 4222*b* with the conduction pattern at one end portion of the heater 4022 in the longitudinal direction. In other words, the heater 4022 according to the present embodiment has a configuration in which two heat generating elements with different amounts of heat generation are provided in the conveying direction on the substrate.

Subsequently, a glass paste is applied to the substrate 4221, the heat generating elements 4222*a* and 4222*b*, and the conduction pattern by screen printing, and the resulting object is dried at 180° C. and is baked at 850° C. Moreover, the glass paste is applied again to the first heat generating element 4222*a* by screen printing, the resulting object is dried at 180° C. and is baked at 850° C., and the coating layer 4223 with a projecting shape is thereby formed. In other words, the coating layer 4223 on the first heat generating element 4222*a* is formed to be thicker than the coating layer 4223 on the second heat generating element 4222*b*. Here, a resistance value and a resistance ratio of the heat generation pattern are adjusted by adjusting the width of each heat generating element 4222 in order to keep a relationship of a setting temperature, power consumption, and the amount of heat generation of the fixing device 4009 equivalent to those in the comparative example and in order to uniformize variations in heat transmission due to the projecting shape of the coating layer 4223.

Note that it is possible to select, as a glass paste to be applied second, a glass paste with a lower softening temperature than that of a glass paste to be applied first and to set a lower baking temperature at the time of baking the glass paste applied second than the softening temperature of the glass paste applied first. Thus, it is possible to further easily form the coating layer 4223 with a projecting shape.

The heater 4022 includes a first region 4223*a* that overlaps the first heat generating element 4222*a* and a second region 4223*b* that overlaps the second heat generating element 4222*b* when seen in the thickness direction of the substrate 4221, in the surface of the coating layer 4223 abutting the inner circumferential surface of the film 4023. At this time, the first region 4223*a* is located to project on the side closer to the pressurizing roller 4030 than the second region 4223*b* in the thickness direction of the substrate 4221 in the fixing device 4009. Also, both the first region 4223*a* and the second region 4223*b* extend over the entire region of the heater 4022 in the longitudinal direction. Note that the first region does not necessarily extent over the entire region of the heater and it is only necessary for the first region to have a length with which the entire region of the width of the recording material to be conveyed is covered.

The coating layer 4223 after the baking has a width of 10.5 mm and the length of 260 mm. Also, three types are created in Example 13 by changing the thickness of the coating layer 4223 for an evaluation test, which will be described later. The height Ha from the substrate 4221 to the surface of the coating layer 4223 in the first region 4223*a* is 75 μm, 80 μm, and 85 μm in Examples 13-1, 13-2, and 13-3. Also, the height Hb from the substrate 4221 to the surface of the coating layer 4223 in the second region 4223*b* is 65 μm, 60 μm, and 55 μm, respectively. The amount of projection Pt by which the surface of the coating layer 4223 in the first region 4223*a* projects on the side of the pressurizing roller 4030 with respect to the second region 4223*b* is set to satisfy Pt=Ha−Hb in the thickness direction of the substrate 4221. At this time, the amounts Pt of projection in Examples 13-1, 13-1, and 13-3 are 10 μm, 20 μm, and 30 μm, respectively.

Example 14

Figure 66:
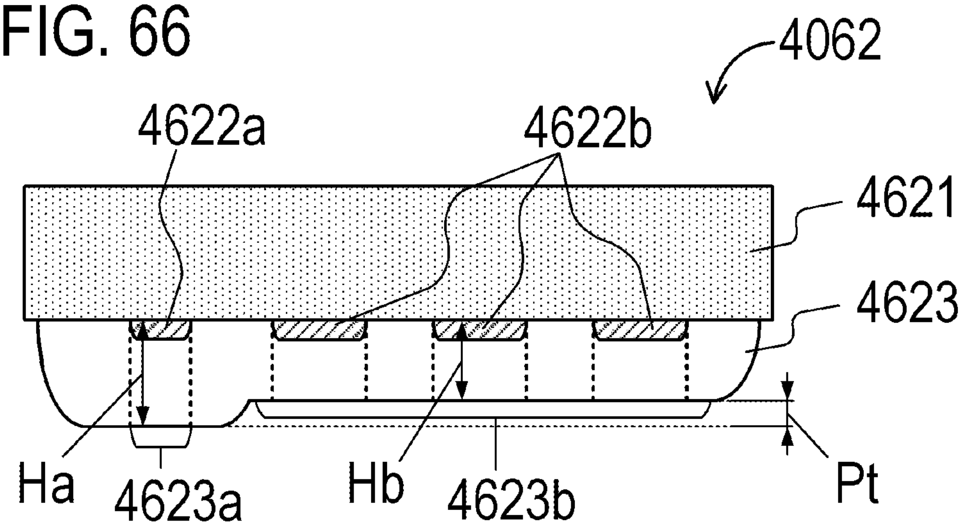
FIG. 66 is a sectional view of a heater according to Example 14.

Next, a configuration of a heater 4062 according to Example 14 will be described using FIG. 66. FIG. 66 is a sectional view of the heater 4062 according to Example 14. Similar reference signs will be applied to configurations similar to those in Example 13 from among the configurations in Example 14, and the description thereof will be omitted.

The heater 4062 in the present embodiment includes a thin and long plate-shaped substrate 4621, four heat generating elements 4622 that generate heat in response to power distribution, and a coating layer 4623 that serves as a protective layer for protecting the substrate 4621 and the heat generating elements 4622. The heater 4062 further includes a power supply electrode and a conduction pattern provided for the purpose of supplying power to the heat generating elements 4622, and the conduction pattern is also covered with the coating layer 4623. The heater 4062 is provided in the fixing device such that the coating layer 4623 abuts an inner circumferential surface of a film 4023.

The substrate 4621 in the present embodiment is an alumina substrate with a width of 11 mm, a length of 270 mm, and a thickness of 1 mm similarly to the aforementioned comparative example. Furthermore, a heat generating element paste, a power supply electrode paste, and a conduction pattern paste that are similar to those in the comparative example are used. Configurations and formation methods of the power supply electrode and the conduction pattern are similar to those in the comparative example, and the description thereof will be omitted. Hereinafter, configurations of the heat generating elements 4622 and the coating layer 4623 that are characteristic in the present invention will be described in detail.

A heat generating element paste is applied to the substrate 4621 by screen printing, the resulting object is dried at 180° C. and is baked at 850° C., and the four heat generating elements 4622 are thereby formed. The first heat generating element 4622*a* disposed on the most downstream side in the conveying direction of the recording material P from among the four heat generating elements 4222 after the baking has a width of 0.9 mm, a length of 230 mm, and a thickness of 15 μm to have a larger amount of heat generation as compared with the other three heat generating elements 4622*b*. On the other hand, the other three heat generating elements 4622*b* have a thickness of 1.4 mm, a length of 230 mm, and a thickness of 15 μm, and a three-time folded-shaped heat generation pattern is formed by connecting the four heat generating elements 4622 with the conduction pattern at the end portion of the heater 4062 in the longitudinal direction. In other words, the heater 4062 in the present embodiment has a configuration in which the four heat generating elements are provided in the conveying direction on the substrate and the amount of heat generated by the heat generating element located on the most downstream side in the conveying direction from among the plurality of heat generating elements is maximum.

Subsequently, a glass paste that is similar to that in the comparative example and Example 13 is used and applied to the substrate 4621, the heat generating elements 4622*a* and 4622*b*, and the conduction pattern by screen printing, and the resulting object is then dried at 180° C. and is baked at 850° C. Furthermore, the glass paste is applied again to the first heat generating element 4622*a* by screen printing, the resulting object is then dried at 180° C. and is baked at 850° C., and the coating layer 4623 with a projecting shape is thereby formed. In other words, the coating layer 4623 on the first heat generating element 4622*a* is formed to be thicker than the coating layer 4623 on the second heat generating element 4622*b*. Here, a resistance value and a resistance ratio of the heat generation pattern are adjusted by adjusting the width of each heat generating element 4222 in order to keep a relationship of a setting temperature, power consumption, and the amount of heat generation of the fixing device 4009 equivalent to those in the comparative example and in order to uniformize variations in heat transmission due to the projecting shape of the coating layer 4223.

The heater 4062 includes a first region 4623*a* that overlaps the first heat generating element 4622*a* and a second region 4623*b* that overlaps the other three heat generating elements 4622*b* when seen in the thickness direction of the substrate 4621, in the surface of the coating layer 4623 abutting the inner circumferential surface of the film 4023. At this time, the first region 4623*a* is located to project on the side closer to the pressurizing roller 4030 than the second region 4623*b* in the thickness direction of the substrate 4621 in the fixing device 4009.

The coating layer 4623 after the baking has a width of 10.5 mm and a length of 260 mm. Also, three types are created in Example 14 by changing the thickness of the coating layer 4623 for an evaluation test, which will be described later. The height Ha from the substrate 4621 to the surface of the coating layer 4623 in the first region 4623*a* is 75 μm, 80 μm, and 85 μm in Examples 14-1, 14-2, and 14-3. Also, the height Hb from the substrate 4621 to the surface of the coating layer 4623 in the second region 4623*b* is 65 μm, 60 μm, and 55 μm. In other words, the amounts Pt of projection in Examples 14-1, 14-2, and 14-3 are 10 μm, 20 μm, and 30 μm, respectively.

Example 15

Figure 67:
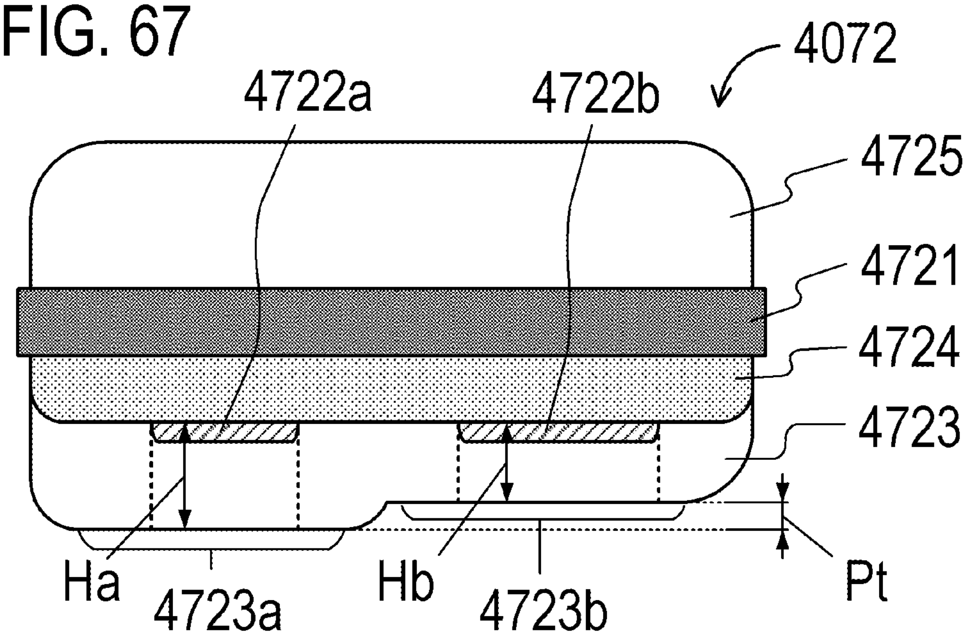
FIG. 67 is a sectional view of a heater according to Example 15.

Next, a configuration of a heater 4072 according to Example 15 will be described using FIG. 67. FIG. 67 is a sectional view of the heater 4072 according to Example 15. Similar reference signs will be applied to configurations similar to those of Example 13 from among the configurations in Example 15, and the description thereof will be omitted.

A heater 4072 in the present embodiment includes a thin and long plate-shaped substrate 4721 made of metal, two heat generating elements 4722 that generate heat in response to power distribution, a coating layer 4723 that serves as a protective layer for protecting the heat generating elements 4722, and an insulating layer 4724 that is for maintaining insulation between the heat generating element 4722 and the substrate 4721. Also, the heater 4072 includes a coating layer 4725 provided on a surface of the substrate 4721 on the side opposite to the surface on which the heat generating element 4722 and the insulating layer 4724 are provided, for the purpose of preventing warpage of the substrate 4721. The heater 4072 further includes a power supply electrode and a conduction pattern provided for the purpose of supplying power to the heat generating elements 4722, and the conduction pattern is also covered with the coating layer 4723. The heater 4072 is provided in the fixing device such that the coating layer 4723 abuts an inner circumferential surface of a film 4023. Since configurations and formation methods of the power supply electrode and the conduction pattern are similar to those in the comparative example, description thereof will be omitted. Hereinafter, configurations of the heat generating elements 4722 and the coating layer 4723 that are characteristic in the present invention will be described in detail.

The substrate 4721 in the present embodiment is a ferrite-based stainless steel substrate (SUS430:18Cr stainless steel) with a width of 11 mm, a length of 270 mm, and a thickness of 0.5 mm. As a metal material used in the substrate 4721, stainless steel, nickel, copper, aluminum, or an alloy containing such metal as a main material is suitably used. Among these, stainless steel is most preferably used in terms of strength, heat resistance, and corrosion. The type of stainless steel is not particularly limited, and it is only necessary to appropriately select stainless steel in consideration of necessary mechanical strength, a linear expansion coefficient in accordance with formation of the insulating layer 4724 and the heat generating element 4722, easiness of obtaining the plate material in the market, and the like. In one example, martensite-based stainless steel and ferrite-based stainless steel of chromium-based stainless steel (400-based) have relatively low linear expansion coefficients from among others and are thus suitably used because the insulating layer 4724 and the heat generating elements 4722 are easily formed with them.

The insulating layer 4724 is provided using an insulating glass paste in order to establish insulation between the substrate 4721 and the heat generating element 4722. For the insulating layer 4724, an insulating glass paste is applied to the substrate 4721 by screen printing, the resulting object is dried at 180° C. and is baked at 850° C., and the insulating layer 4724 is thereby formed. The insulating layer 4724 after the baking has a width of 10.5 mm, a length of 260 mm, and a height of 50 μm. Here, in relation to the thickness of the insulating layer 4724, a heater used in an image forming apparatus preferably has dielectric strength of about 1.5 kV in general. Therefore, it is only necessary to secure the film thickness of the insulating layer 4724 in accordance with the material in order to obtain the dielectric strength performance of 1.5 kV between the heat generating element 4722 and the substrate 4721.

Subsequently, a heat generating element paste is applied to the insulating layer 4724 by screen printing, the resulting object is dried at 180° C. and is baked at 850° C., and two heat generating elements 4722 are thereby formed. A first heat generating element 4722*a* that is disposed on the downstream side in the conveying direction of the recording material P out of the two heat generating elements 4722 after the baking has a width of 2.2 mm, a length of 230 mm, and a thickness of 15 μm to have a larger amount of heat generation as compared with a second heat generating element 4722*b* located on the upstream side in the conveying direction. On the other hand, the second heat generating element 4722*b* has a width of 3.0 mm, a length of 230 mm, and a thickness of 15 μm, and a folded-shaped heat generation pattern is formed by connecting the two heat generating elements 4722*a* and 4722*b* with the conduction pattern at one end portion of the heater 4072 in the longitudinal direction. In other words, the heater 4072 in the present embodiment has a configuration in which two heat generating elements with different amounts of heat generation are provided in the conveying direction on the insulating layer.

Subsequently, a glass paste that is similar to that in the comparative example and the aforementioned embodiments are used, and the glass paste is applied to the insulating layer 4724, the heat generating elements 4722, and the conduction pattern by screen printing. Moreover, the glass paste is also applied to a surface of the substrate 4721 on the side opposite to the surface on which the insulating layer 4724 is provided, the resulting object is dried at 180° C. and is baked at 850° C., and coating layers are thereby formed on both surface sides of the substrate 4721, in order to prevent warpage of the substrate 4721 at the time of the baking. Furthermore, the glass paste is applied again to the first heat generating element 4722*a* by screen printing, the resulting object is dried at 180° C. and is baked at 850° C., and the coating layer 4723 with the projecting shape is thereby formed.

The heater 4072 includes a first region 4723*a* that overlaps the first heat generating element 4722*a* and a second region 4723*b* that overlaps the second heat generating element 4722*b* when seen in the thickness direction of the substrate 4721, in the surface of the coating layer 4723 abutting the inner circumferential surface of the film 4023. At this time, the first region 4723*a* is located to project on the side closer to the pressurizing roller 4030 than the second region 4723*b* in the thickness direction of the substrate 4721 in the fixing device 4009.

The coating layer 4723 that covers the heat generating element 4722 with the film 4023 and abuts on the inner circumferential surface of the film 4023 has a width of 10.5 mm and a length of 260 mm, and a coating layer 4725 provided on the surface of the substrate 4721 on the side opposite to the coating layer 4723 has a width of 10.5 mm, a length of 260 mm, and a thickness of 110 μm. Also, three types are created in Example 15 by changing the thickness of the coating layer 4723 for an evaluation test, which will be described later. The height Ha from the substrate 4721 to the coating layer 4723 in the first region 4723*a* is 75 μm, 80 μm, and 85 μm in Examples 15-1, 15-2, and 15-3. Also, the height Hb from the substrate 4721 to the surface of the coating layer 4723 in the second region 4723*b* is 65 μm, 60 μm, and 55 μm. In other words, the amounts Pt of projection in Examples 15-1, 15-2, and 15-3 are 10 μm, 20 μm, and 30 μm.

Effects and Advantages of Examples 13, 14, and 15

In order to check the advantages of the present invention, a fixing performance evaluation test was carried out using fixing devices including the heaters in each of the aforementioned embodiments and the comparative example. Examples 13-1, 13-2, and 13-3 include the heater 4022 (see FIG. 65), Examples 14-1, 14-2, and 14-3 include the heater 4062 (see FIG. 66), Examples 15-1, 15-2, and 15-3 include the heater 4072 (see FIG. 67), and the comparative example includes the heater 4052 (see FIG. 63). Hereinafter, results of the evaluation test and saving of power consumption and an effect of stabilizing fixing performance caused by an increase in fixing performance will be described.

Although the heaters with the same configuration are used in Comparative Examples 7, 8, and 9 as described above, the positional relationships between the film units 4020 and the pressurizing rollers 4030 are changed. In Comparative Example 7, the center of the heater 4052 is located at the same position as that of the center of the pressurizing roller 4030 in the conveying direction of the recording material similarly to the configuration in the related art and each example. On the other hand, Comparative Examples 8 and 9 employ a configuration in which the film unit 4020 is offset such that the center of the heater 4052 is located on the upstream side with respect to the center of the pressurizing roller 4030 in the conveying direction of the recording material. The amount of offset is 1 mm in Comparative Example 8 and is 2 mm in Comparative Example 9.

For the fixing performance evaluation test, a solid black pattern obtained by printing a toner on the entire surface was used as an evaluation image pattern. The environment was set to a normal-temperature normal-humidity environment at a temperature of 23° C. and a humidity of 50% RH. As a paper feeding condition, three evaluation image patterns were successively fed from a cold state. The test was performed a plurality of times with the setting temperature of the fixing device 4009 changed, and a fixing temperature of each configuration was measured by regarding a lower limit of the setting temperature at which image pattern missing was not observed in each configuration as a fixing temperature. Also, the test was performed with the width of the nip portion changed to 10 mm, 8 mm, and 6 mm by changing the rubber hardness of the pressurizing roller 4030 and the spring coefficient of the pressurizing spring 4045 in order to evaluate stability of the fixing performance as well.

The test results in each of the examples and the comparative examples are shown together in Table 8. Note that a fixing temperature when the width of the nip portion was 10 mm in Comparative Example 7 was regarded as a reference value and differences of fixing temperatures from the reference value were shown as evaluation results in the table. In other words, smaller numerical values (larger in the negative direction) of the fixing temperatures shown in the table mean that the fixing devices can achieve fixation at lower temperatures with lower power consumption. Also, differences between maximum values and minimum values of the fixation temperatures when the width of the nip portion was changed in the fixing devices with the same configuration are shown in the table.

TABLE 8

| Configuration | | Projecting amount Pt | Amount of offset of film unit | Width of nip portion | Fixing temperature | Variations in fixing temperature |
|---|---|---|---|---|---|---|
| Comparative Example 7 | | 0 μm | 0 mm | 10 mm | Reference value | 5° C. |
| | | | | 8 mm | +0° C. | |
| | | | | 6 mm | +5° C. | |
| Comparative Example 8 | | 0 μm | 1 mm | 10 mm | −10° C. | 10° C. |
| | | | | 8 mm | −10° C. | |
| | | | | 6 mm | +0° C. | |
| Comparative Example 9 | | 0 μm | 2 mm | 10 mm | −15° C. | 15° C. |
| | | | | 8 mm | −15° C. | |
| | | | | 6 mm | +0° C. | |
| Example 13 | Example 13-1 | 10 μm | 0 mm | 10 mm | +0° C. | 5° C. |
| | | | | 8 mm | +0° C. | |
| | | | | 6 mm | +5° C. | |

TABLE 8-continued

| Configuration | | Projecting amount Pt | Amount of offset of film unit | Width of nip portion | Fixing temperature | Variations in fixing temperature |
|---|---|---|---|---|---|---|
| | Example 13-2 | 20 μm | | 10 mm | −15° C. | 5° C. |
| | | | | 8 mm | −15° C. | |
| | | | | 6 mm | −10° C. | |
| | Example 13-3 | 30 μm | | 10 mm | −15° C. | 5° C. |
| | | | | 8 mm | −15° C. | |
| | | | | 6 mm | −10° C. | |
| Example 14 | Example 14-1 | 10 μm | 0 mm | 10 mm | +0° C. | 5° C. |
| | | | | 8 mm | +0° C. | |
| | | | | 6 mm | +5° C. | |
| | Example 14-2 | 20 μm | | 10 mm | −15° C. | 5° C. |
| | | | | 8 mm | −15° C. | |
| | | | | 6 mm | −10° C. | |
| | Example 14-3 | 30 μm | | 10 mm | −15° C. | 5° C. |
| | | | | 8 mm | −15° C. | |
| | | | | 6 mm | −10° C. | |
| Example 15 | Example 15-1 | 10 μm | 0 mm | 10 mm | +0° C. | 5° C. |
| | | | | 8 mm | +0° C. | |
| | | | | 6 mm | +5° C. | |
| | Example 15-2 | 20 μm | | 10 mm | −15° C. | 5° C. |
| | | | | 8 mm | −15° C. | |
| | | | | 6 mm | −10° C. | |
| | Example 15-3 | 30 μm | | 10 mm | −15° C. | 5° C. |
| | | | | 8 mm | −15° C. | |
| | | | | 6 mm | −10° C. | |

In Comparative Example 7, the fixing temperature when the width of the nip portion=8 mm was equivalent to that when the width of the nip portion=10 mm, which was a reference, and the fixing temperature when the width of the nip portion=6 mm was reference +5° C. In other words, a variation in fixing temperature when the width of the nip portion was within a range of 6 mm to 10 mm in Comparative Example 7 was 5° C. Hereinafter, results of other configuration with reference to this result will be described.

In Comparative Example 8, the fixing temperature when the width of the nip portion was reference −10° C. when the width of the nip portion was 10 mm or 8 mm, and the fixing temperature when the width of the nip portion was 6 mm was reference +0° C. In comparison of the results obtained when the width of the nip portion was the same as that in Comparative Example 7, the fixing temperature was lower under any of the conditions in Comparative Example 8 than in Comparative Example 7, and the effect of improving fixing performance achieved by offsetting the film unit on the upstream side in the conveying direction was observed. On the other hand, a variation in fixing temperature when the width of the nip portion was within a range of 6 mm to 10 mm in Comparative Example 8 was 10° C., which was a result that was inferior to Comparative Example 7 in terms of the stability of fixing performance. In other words, stronger pressurization was performed on the downstream side than on the upstream side of the nip portion N in the conveying direction by offsetting the film unit on the upstream side in the conveying direction with respect to the pressurizing roller, and the fixing performance was thus improved. However, since the heat generating elements and the heater were likely to stick out to the outside from the nip portion N in the configuration in which the film unit was offset, stability of fixing performance against a change in width of the nip portion deteriorated.

In Comparative Example 9, the fixing temperature when the width of the nip portion was 10 mm and 8 mm was reference −15° C., and the fixing temperature when the width of the nip portion was 6 mm was reference +5° C. In comparison of the results obtained when the width of the nip portion was the same, the fixing temperature when the width of the nip portion was 10 mm and 8 mm was lower, and further effect of improving fixability was obtained, in Comparative Example 9 than in Comparative Examples 7 and 8. On the other hand, a variation in fixing temperature when the width of the nip portion was within a range of 6 mm to 10 mm in Comparative Example 9 was 15° C., stability of fixing performance further deteriorated as compared with Comparative Examples 7 and 8. In other words, offsetting of the film unit on the upstream side in the conveying direction led to reduction of fixing temperature and an improvement in fixing performance although stability of fixing performance against a change in width of the nip portion was degraded at the same time.

In Example 13-1, the fixing temperature when the width of the nip portion was 10 mm and 8 mm was reference +0° C., the fixing temperature when the width of the nip portion was 6 mm was reference +5° C., and both the fixing temperatures and a variation in fixing temperatures were similar to those in Comparative Example 7.

In Example 13-2, the fixing temperature when the width of the nip portion was 10 mm and 8 mm was reference −15° C., and the fixing temperature when the width of the nip portion was 6 mm was reference −10° C. In comparison of the results obtained when the width of the nip portion was the same, the fixing temperature was lower under any of the conditions in Example 13-2 than in Comparative Example 7, and the effect of improving fixing performance achieved by changing the heater shape, and performing stronger pressurization and more strongly applying heat on the downstream side of the nip portion in the conveying direction was observed. Moreover, a variation in fixing temperature when the width of the nip portion was within a range of 6 mm to 10 mm in Example 13-2 was 5° C., which was similar to that in Comparative Example 7. In other words, it is possible to lower the fixing temperature as compared with the configuration in the related art without compromising stability of fixing performance in the configuration in Example 13-2.

In Example 13-3, the fixing temperature when the width of the nip portion was 10 mm and 8 mm was reference −15°

C., and the fixing temperature when the width of the nip portion was 6 mm was reference −10° C., which were results similar to those in Example 13-2. In other words, a larger amount Pt of projection does not lead to a further decrease in fixing temperature, and it is only necessary for the amount Pt of projection to be equal to or greater than a specific amount with which the fixing performance is improved. In Example 13, it is possible to stably heat the recording material at a lower fixing temperature with lower power consumption as compared with the configuration in the related art by setting the amount Pt of projection of the heater 4022 to be equal to or greater than 20 μm.

In Example 14, a result similar to that in Example 13 was achieved in comparison with Example 13 with the configuration of the same amount Pt of projection. In other words, it is possible to lower the fixing temperature as compared with the configuration in the related art without compromising stability of fixing performance by causing the downstream side of the heater in the conveying direction to project on the side of the pressurizing roller even in a configuration in which three or more heat generating elements are included.

In Example 15, a result similar to that in Example 13 was achieved in comparison with Example 13 with the configuration of the same amount Pt of projection. In other words, it is possible to lower the fixing temperature as compared with the configuration in the related art without compromising stability of fixing performance by causing the downstream side of the heater in the conveying direction to project on the side of the pressurizing roller even in a configuration in which the substrate made of metal is provided with an insulating layer.

As described above, it is possible to lower the fixing temperature without compromising stability of fixing performance by setting a larger amount of heat generation of the heater on the downstream side than on the upstream side in the conveying direction and causing a contact surface of the heater with the film to project on the side of the pressurizing roller (the side of the second rotating body). In other words, it is possible to stably perform heating with low power consumption by employing a configuration in which heating is more intensively performed and pressurization is more strongly performed on the downstream side than on the upstream side of the nip portion in the conveying direction, without offsetting the film unit with respect to the pressurizing roller. However, it is possible to suitably apply the present invention to the configuration in which the film unit is offset with respect to the pressurizing roller even if the amount of offset is set to a level in which the width of the nip portion is stably formed.

Note that although the first region and the second region are formed into planar shapes in each of the aforementioned embodiments, and the contact surface of the heater with the inner circumferential surface of the film is formed into the form of a level difference, the configuration of the present invention is not limited thereto. As a modification example, a configuration in which a third region that is lower than the first region and is higher than the second region is included between the first region and the second region, a configuration in which the first region is formed into a curved surface rather than the planar shape, or the like is conceivable. In addition, a configuration in which the coating layer is not in the form of a level difference and is gradually inclined toward the side of the pressurizing roller on the downstream side in the conveying direction or the like is conceivable as a modification example.

Also, although the amount of heat generated by each heat generating element is made to be different by changing the width of the heat generating element in each of the aforementioned embodiments, the method of giving a difference in amounts of heat generated by the heat generating elements is not limited thereto, and a configuration in which power distribution to the heat generating elements is individually controlled may also be employed.

Also, although both the lowering of the fixing temperature and the stabilization of the fixing performance can be achieved by setting the amount Pt of projection to be equal to or greater than 20 μm in Examples 13, 14, and 15, the above numerical value can vary depending on the configuration, the material, or the like of each member. Since it is not possible to obtain the effect of lowering the fixing temperature if the amount Pt of projection is excessively small, and there is a concern of a bending tendency occurring in the recording material if the amount Pt of projection is excessively large, it is important to appropriately select a value under each condition.

Example 16

Figure 68:
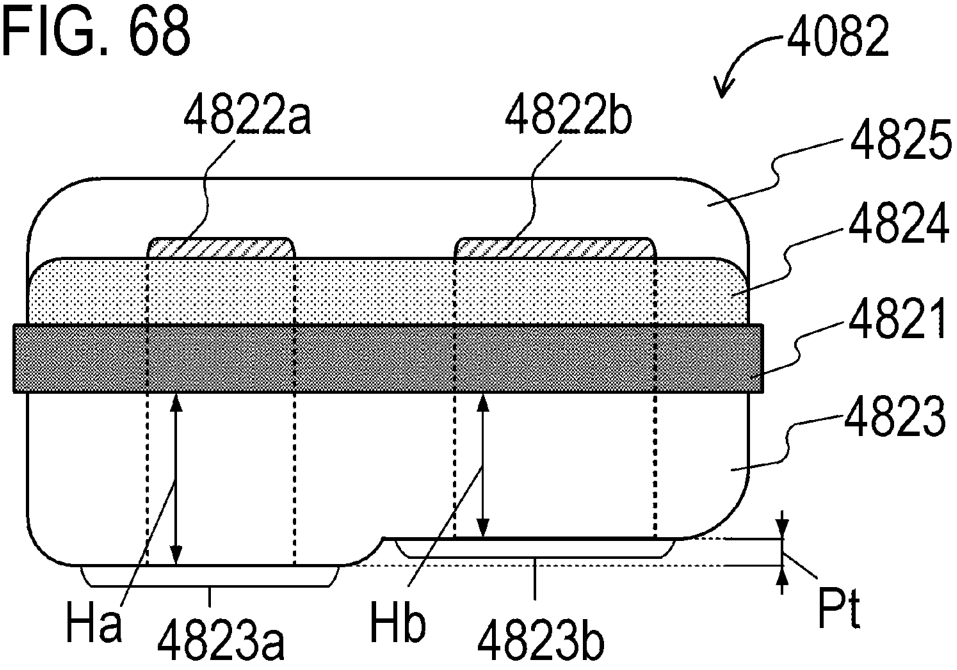
FIG. 68 is a sectional view of a heater according to Example 16.

Next, a configuration of a heater 4082 according to Example 16 will be described using FIG. 68. FIG. 68 is a sectional view of the heater 4082 according to Example 16. Similar reference signs will be applied to configurations that are similar to those in Example 13 from among the configurations in Example 16, and description thereof will be omitted.

The heater 4082 in the present embodiment includes a thin and long plate-shaped substrate 4821 made of metal, two heat generating elements 4822 that generate heat in response to power distribution thereto, a coating layer 4823 that serves as a protective layer for protecting the heat generating elements 4822, and an insulating layer 4824 that is for keeping insulation between the heat generating elements 4822 and the substrate 4821. Also, the heater 4082 includes a coating layer 4825 provided on a surface of the substrate 4821 on the side opposite to the surface on which the heat generating elements 4822 and the insulating layer 4824 are provided, for the purpose of preventing warpage of the substrate 4821. Note that in the present embodiment, the surface of the substrate 4821 on which the heat generating elements 4822 and the insulating layer 4824 are provided is a surface facing the heater holder 4021 rather than the inner circumferential surface of the film 4023, which corresponds to the side opposite to that in each of the aforementioned embodiments. The substrate 4821 in the present embodiment is a ferrite-based stainless steel substrate (SUS430: 18Cr stainless steel) with the width of 11 mm, the length of 270 mm, and the thickness of 0.5 mm similarly to Example 15.

The heater 4082 further include a power supply electrode and a conduction pattern provided for the purpose of supplying power to the heat generating element 4822, and the conduction pattern is also covered with the coating layer 4823. The heater 4082 is provided inside the fixing device such that the coating layer 4823 abuts the inner circumferential surface of the film 4023. Since configurations and formation methods of the power supply electrode and the conduction pattern are similar to those in the comparative example, description thereof will be omitted. Hereinafter, configurations of the heat generating element 4822 and the coating layer 4823 that are characteristic in the present invention will be described in detail.

The insulating layer 4824 is provided using an insulating glass paste in order to establish insulation between the substrate 4821 and the heat generating element 4822. For the insulating layer 4824, an insulating glass paste is applied to the substrate 4821 by screen printing, the resulting object is dried at 180° C. and is baked at 850° C., and the insulating layer 4824 is thereby formed. The insulating layer 4824 after the baking has a width of 10.5 mm, a length of 260 mm, and a height of 50 μm. As described above, the insulating layer 4824 is provided on the surface of the substrate 4821 on the side opposite to the face facing the film 4023 in the heater 4082 in the present embodiment.

Subsequently, a heat generating element paste is applied to the insulating layer 4824 by screen printing, the resulting object is dried at 180° C. and is baked at 850° C., and the two heat generating elements 4822 are thereby formed. A first heat generating element 4822*a* disposed on the downstream side of the recording material P in the conveying direction out of the two heat generating elements 4822 after the baking has a width of 2.2 mm, a length of 230 mm, and a thickness of 15 μm to have a larger amount of heat generation as compared with a second heat generating element 4822*b* located on the upstream side in the conveying direction. On the other hand, the second heat generating element 4822*b* has a width of 3.0 mm, a length of 230 mm, and a thickness of 15 μm, and a folded-shaped heat generation pattern is formed by connecting the two heat generating elements 4822*a* and 4822*b* with the conduction pattern at one end portion of the heater 4082 in the longitudinal direction. In other words, the heater 4082 in the present embodiment has a configuration in which the two heat generating elements with different amounts of heat generation are provided in the conveying direction on the insulating layer and each of the heat generating elements is provided on the surface of the substrate on the side opposite to the surface facing the film.

Subsequently, a glass paste is applied to the insulating layer 4824, the heat generating elements 4822, and the conduction pattern by screen printing using a glass paste that is similar to those in the comparative example and the aforementioned examples. Furthermore, a glass paste is also applied to the side of the substrate 4821 opposite to the surface on which the insulating layer 4824 is provided by screen printing, the resulting object is dried at 180° C. and is baked at 850° C., and the coating layers are thereby formed on both surface sides of the substrate 4821, in order to prevent warpage of the substrate 4821 after the baking. Moreover, the glass paste is applied again to the first heat generating element 4822*a* by screen printing, the resulting object is dried at 180° C. and is baked at 850° C., and the coating layer 4823 having a projecting shape is thereby formed.

The heater 4082 includes a first region 4823*a* that overlaps the first heat generating element 4822*a* and a second region 4823*b* that overlaps the second heat generating element 4822*b* when seen in the thickness direction of the substrate 4821, in the surface of the coating layer 4823 abutting the inner circumferential surface of the film 4023. At this time, the first region 4823*a* is located to project on the side closer to the pressurizing roller 4030 than the second region 4823*b* in the thickness direction of the substrate 4821 in the fixing device 4009.

The coating layer 4823 abutting the film 4023 has a width of 10.5 mm and a length of 260 mm, and the coating layer 4825 covering the heat generating element 4822 has a width of 10.5 mm, a length of 260 mm, and a thickness of 60 μm. Also, three types are created in Example 16 by changing the thickness of the coating layer 4823 for an evaluation test, which will be described later. The height Ha from the substrate 4821 to the surface of the coating layer 4823 in the first region 4823*a* is 75 μm, 80 μm, and 85 μm in Examples 16-1, 16-2, and 16-3. The height Hb from the substrate 4821 to the surface of the coating layer 4823 in the second region 4823*b* is 65 μm, 60 μm, and 55 μm. In other words, the amounts Pt of projection in Examples 16-1, 16-2, and 16-3 are 10 μm, 20 μm, and 30 μm, respectively.

Effects and Advantages of Example 16

In order to check the advantages of the present invention, a fixing performance evaluation test was carried out using a fixing device including the heater in the present embodiment. Examples 16-1, 16-2, and 16-3 includes the heater 4082 (see FIG. 68). Hereinafter, results of the evaluation test and saving of power consumption and an effect of stabilizing fixing performance achieved by an improvement in fixing performance will be described.

The fixing performance evaluation test was carried out under conditions similar to those described above. In other words, a solid black pattern obtained by printing a toner on the entire surface was used as an evaluation image pattern, and the environment was set to a normal-temperature normal-humidity environment at a temperature of 23° C. and a humidity of 50% RH. As a paper feeding condition, three evaluation image patterns were successively fed from a cold state. The test was performed a plurality of times with the setting temperature of the fixing device 4009 changed, and a fixing temperature of each configuration was measured by regarding a lower limit of the setting temperature at which image pattern missing was not observed in each configuration as a fixing temperature. Also, the test was performed with the width of the nip portion changed to 10 mm, 8 mm, and 6 mm by changing the rubber hardness of the pressurizing roller 4030 and the spring coefficient of the pressurizing spring 4045 in order to evaluate stability of the fixing performance as well.

Test results of each example and the aforementioned comparative example for comparison are shown in Table 9 together. Note that the fixing temperature when the width of the nip portion=10 mm in Comparative Example 7 is regarded as a reference value, and differences of the fixing temperatures from the reference value are shown as evaluation results. Also, differences between maximum values and minimum values of the fixing temperatures when the width of the nip portion was changed by fixing devices with the same configuration are shown as variations in fixing temperature.

TABLE 9

| Configuration | Projecting amount Pt | Amount of offset of film unit | Width of nip portion | Fixing temperature | Variations in fixing temperature |
|---|---|---|---|---|---|
| Comparative Example 7 | 0 μm | 0 mm | 10 mm | Reference value | 5° C. |
| | | | 8 mm | +0° C. | |
| | | | 6 mm | +5° C. | |

TABLE 9-continued

| Configuration | | Projecting amount Pt | Amount of offset of film unit | Width of nip portion | Fixing temperature | Variations in fixing temperature |
|---|---|---|---|---|---|---|
| Comparative Example 8 | | 0 μm | 1 mm | 10 mm | −10° C. | 10° C. |
| | | | | 8 mm | −10° C. | |
| | | | | 6 mm | +0° C. | |
| Comparative Example 9 | | 0 μm | 2 mm | 10 mm | −15° C. | 15° C. |
| | | | | 8 mm | −15° C. | |
| | | | | 6 mm | +0° C. | |
| Example 16 | Example 16-1 | 10 μm | 0 mm | 10 mm | +5° C. | 3° C. |
| | | | | 8 mm | +5° C. | |
| | | | | 6 mm | +8° C. | |
| | Example 16-2 | 20 μm | | 10 mm | −10° C. | 3° C. |
| | | | | 8 mm | −10° C. | |
| | | | | 6 mm | −7° C. | |
| | Example 16-3 | 30 μm | | 10 mm | −10° C. | 3° C. |
| | | | | 8 mm | −10° C. | |
| | | | | 6 mm | −7° C. | |

In Example 16-1, the fixing temperature when the width of the nip portion was 10 mm and 8 mm was reference +5° C., the fixing temperature when the width of the nip portion was 6 mm was reference +8° C., and the fixing temperatures increased as compared with Comparative Example 7 at any of the widths of the nip portions. This was considered to be because a sufficient effect of lowering the fixing temperature was not able to be obtained due to the small amount Pt of projection and the heat of the heat generating elements was less likely to be transmitted quickly to the film because the heat generating elements became further from the film inner circumferential surface. On the other hand, a variation in fixing temperature within the range of the width of the nip portion from 6 mm to 10 mm in Example 16-1 was 3° C., which was smaller than those in Comparative Example 7 and aforementioned Examples 13-1, 14-1, and 15-1.

In Example 16-2, the fixing temperature when the width of the nip portion was 10 mm and 8 mm was reference −10° C., and the fixing temperature when the width of the nip portion was 6 mm was reference −7° C. In comparison of the results obtained when the width of the nip portion was the same as that in Comparative Example 7, the fixing temperatures were low under any of the conditions in Example 16-2, and an effect of improving fixing performance achieved by changing the shape of the heater, performing stronger pressurization on the downstream side of the nip portion in the conveying direction, and more strongly applying heat was observed. Moreover, a variation in fixing temperature when the width of the nip portion was within a range of 6 mm to 10 mm in Example 16-2 was 3° C., which was smaller than that in Comparative Example 7. In other words, it is possible to improve stability of fixing performance and to lower the fixing temperature in the configuration in Example 16-2 as compared with the configuration in the related art.

On the other hand, the fixing temperatures was high in any of the conditions in Example 16-2 when the results of the same widths of the nip portion were compared between Example 16-2 and Examples 13-2, 14-2, and 15-2. However, a variation in fixing temperature when the width of the nip portion was within a range of 6 mm to 10 mm in Example 16-2 was 3° C., which was smaller than those in Examples 13-2, 14-2, and 15-2. These were differences caused by extension of time required for the heat of the heat generating elements to be transmitted to the inner circumferential surface of the film in the configuration in which the heat generating elements were made to be located further from the inner circumferential surface of the film in Example 16-2 as compared with Examples 13-2, 14-2, and 15-2.

In Example 16-3, the fixing temperature when the width of the nip portion was 10 mm and 8 mm was reference −10° C., and the fixing temperature when the width of the nip portion was 6 mm was reference −7° C., which were results similar to those in Example 16-2.

As described above, it is possible to lower the fixing temperature without compromising stability of fixing performance against a change in nip portion according to the present invention even in the configuration in which the heat generating elements and the insulating layer are provided on the surface of the substrate on the side opposite to the surface facing the inner circumferential surface of the film. Also, which of the surfaces of the substrate the heat generating elements are to be provided may be appropriately selected in accordance with which of the effect of lowering the fixing temperature and the effect of improving stability of fixing performance priority is to be placed on.

Hereinafter, configuration or concept examples disclosed in the aforementioned embodiment will be described below. However, these are just an example, and the disclosure of the aforementioned embodiment is not limited to the configurations or concepts described below.

Configuration D1

A heater includes:

a plurality of heat generating elements;

a coating layer; and a thin and long substrate that includes the heat generating element and the coating layer provided thereon, in which a first heat generating element extending in a longitudinal direction of the substrate from among the plurality of heat generating elements is provided at a position different from that of a second heat generating element in a transverse direction that is orthogonal to the longitudinal direction of the substrate, the amount of heat generated by the first heat generating element is larger than the amount of heat generated by the second heat generating element, in a case in which the coating layer is seen in a thickness direction of the substrate that is orthogonal to the longitudinal direction and the transverse direction from a surface on a side opposite to a surface that abuts the substrate, the coating layer includes a first region that overlaps the first heat generating element and a second region that overlaps the second heat generating element, and the height from the substrate to the first region is larger than the height from the substrate to the second region.

Configuration D2

In the heater according to Configuration D1, the plurality of heat generating elements are provided on the same surface as the surface of the substrate on which the coating layer is provided, and the coating layer covers the plurality of heat generating elements.

Configuration D3

In the heater according to Configuration D1, the plurality of heat generating elements are provided on the surface on the side opposite to the surface of the substrate on which the coating layer is provided.

Configuration D4

In the heater according to any one of Configurations D1 to D3, the substrate is made of metal, and the heater further includes an insulating layer provided between the substrate and the plurality of heat generating elements.

Configuration D5

A heating device that nips and conveys a recording material with a nip portion while heating the recording material includes:

a first rotating body;

the heater according to any one of Configurations D1 to D4 that is provided in an internal space of the first rotating body; and a second rotating body that forms the nip portion with the heater via the first rotating body.

Configuration D6

In the heating device according to claim D5, the first heat generating element is provided on an upstream side of the second heat generating element in a conveying direction of a recording material.

Configuration D7

In the heating device according to Configuration D6, the first region and the second region extend to cover the entire width region of the recording material in the longitudinal direction.

Configuration D8

In the heating device according to Configuration D6 or D7, the first region and the second region are planes that are parallel to a surface of the recording material.

Configuration D9

In the heating device according to any one of Configurations D6 to D8, the first region is located on the side closer to the second rotating body than the second region by not less than 20 μm in the thickness direction.

Configuration D10

In the heating device according to any one of Configurations D6 to D9, the width of the first heat generating element in the conveying direction is smaller than the width of the second heat generating element in the conveying direction.

Configuration D11

In the heating device according to any one of Configurations D6 to D10, the thickness of the coating layer in the first region is thicker than the thickness of the coating layer in the second region.

Configuration D12

In the heating device according to any one of Configurations D6 to D11, the heater includes three or more heat generating elements, and the first heat generating element is located on the most downstream side in the conveying direction and has the maximum amount of heat generation from among the heat generating element.

Configuration D13

In the heating device according to any one of Configurations D5 to D12, the first rotating body is a tubular film, and the second rotating body is a roller.

Configuration D14

An image forming apparatus includes:

an image forming portion that forms an image on a recording material; and the heating device according to any one of Configurations D5 to D13 that fixes, on the recording material, the image formed on the recording material.

Also, there is a configuration in which heat transmission efficiency and rigidity are balanced by thinning the metal substrate of the heater and bending the sectional shape of the substrate in a heating device configured of a heater, a film, a pressurizing roller, and the like. Since the metal substrate causes thermal expansion when heated in this configuration, a change in dimension is large in the longitudinal direction, in particular. It is difficult to appropriately position both end portions of the heat generating portions of the heater with respect to a heated material such as a recording material in a configuration in which the heater is positioned at one end portion in the longitudinal direction. If the heat generating portions in the heater are positioned with deviation with respect to the heated material due to a change in dimension of the substrate in the longitudinal direction of the heater, a temperature difference may occur at both end portions of the recording material, for example, a temperature significantly rises at one end of the recording material while the temperature does not sufficiently rise at the other end portion. Uniform heating of the recording medium leads to an image failure or degradation of a curling property. Thus, a heating device capable of uniformly heating both end portions of the recording material in the width direction will now be described.

Example 17

Example 17 of the present invention will be described using drawings. Explanation will be given in the order of an overall configuration of an image forming apparatus that is a color laser beam printer, a configuration of a fixing device, and configurations of a heater and peripheral components.

Overall Configuration of Image Forming Apparatus

Figure 69:
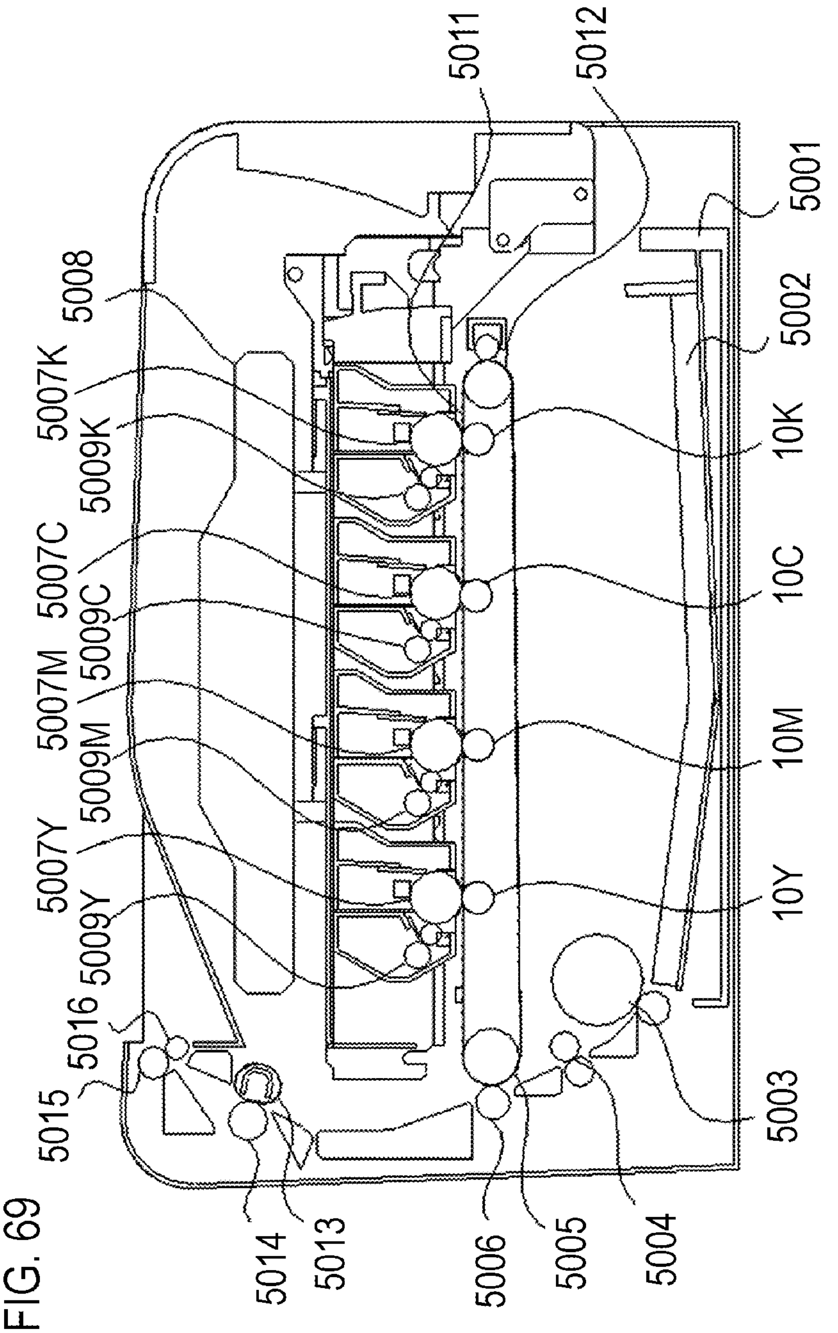
FIG. 69 is an overview sectional view of an image forming apparatus according to Example 17.

An overview of an overall configuration of an image forming apparatus will be described using FIG. 69. A recording material 5002 loaded and accommodated in a supply tray 5001 is supplied to a supply roller 5003 rotating in a clockwise direction in the drawing, is sent to a conveyance roller 5004, and is sent to a transfer nip formed by an intra-belt drive roller 5005 and a secondary transfer roller 5006.

Photosensitive drums 5007Y, 5007M, 5007C, and 5007K as image carriers configuring an image forming portion rotates in the counterclockwise direction in the drawing. In each image forming portion, an electrostatic latent image is formed in order by laser light from a laser scanner 5008 on an outer circumferential surface of each photosensitive drum, the electrostatic latent image is then developed by developing rollers 5009Y, 5009M, 5009C, and 5009K, and toner images are formed. The toner images formed on the photosensitive drums 5007Y, 5007M, 5007C, and 5007K are transferred to an intermediate transfer belt 5011 through pressing and voltage application by primary transfer units 5010Y, 5010M, 5010C, and 5010K. The intermediate transfer belt 5011 is a cylindrical and endless belt-shaped film stretched over the intra-belt drive roller 5005, a tension roller 5012, and the like. The intermediate transfer belt 5011 moves at substantially the same speed as a moving speed of the surface of the photosensitive drum 5007 by the intra-belt drive roller 5005 being driven to rotate in the clockwise direction in the drawing.

In a case where a color image is formed, color toner images of yellow, magenta, cyan, and black are developed on the photosensitive drums 5007Y, 5007M, 5007C, and 5007K, respectively. The toner images formed on the photosensitive drums 5007Y, 5007M, 5007C, and 5007K are transferred in order to the intermediate transfer belt 5011 by a primary transfer unit 5010Y, 5010M, 5010C, and 5010K, respectively. Then, the toner images formed on the intermediate transfer belt 5011 is collectively transferred to the recording material 5002 sent to the transfer nip portion of the intra-belt drive roller 5005 and the secondary transfer roller 5006.

Moreover, the recording material 5002 with the toner image transferred thereto is sent to a fixing device that serves as a fixing portion. The recording material is sent to a fixing nip portion F of a heating unit 5013 and a pressurizing roller 5014 in the fixing device and is then heated and pressurized, and the toner image is fixed on the recording material 5002. The recording material 5002 with the toner image fixed thereto is nipped and conveyed by a discharge roller 5015 and a discharge feeder 5016 and is then discharged to a discharge placement platform outside the main body of the image forming apparatus.

Configuration of Fixing Device

Figure 70:
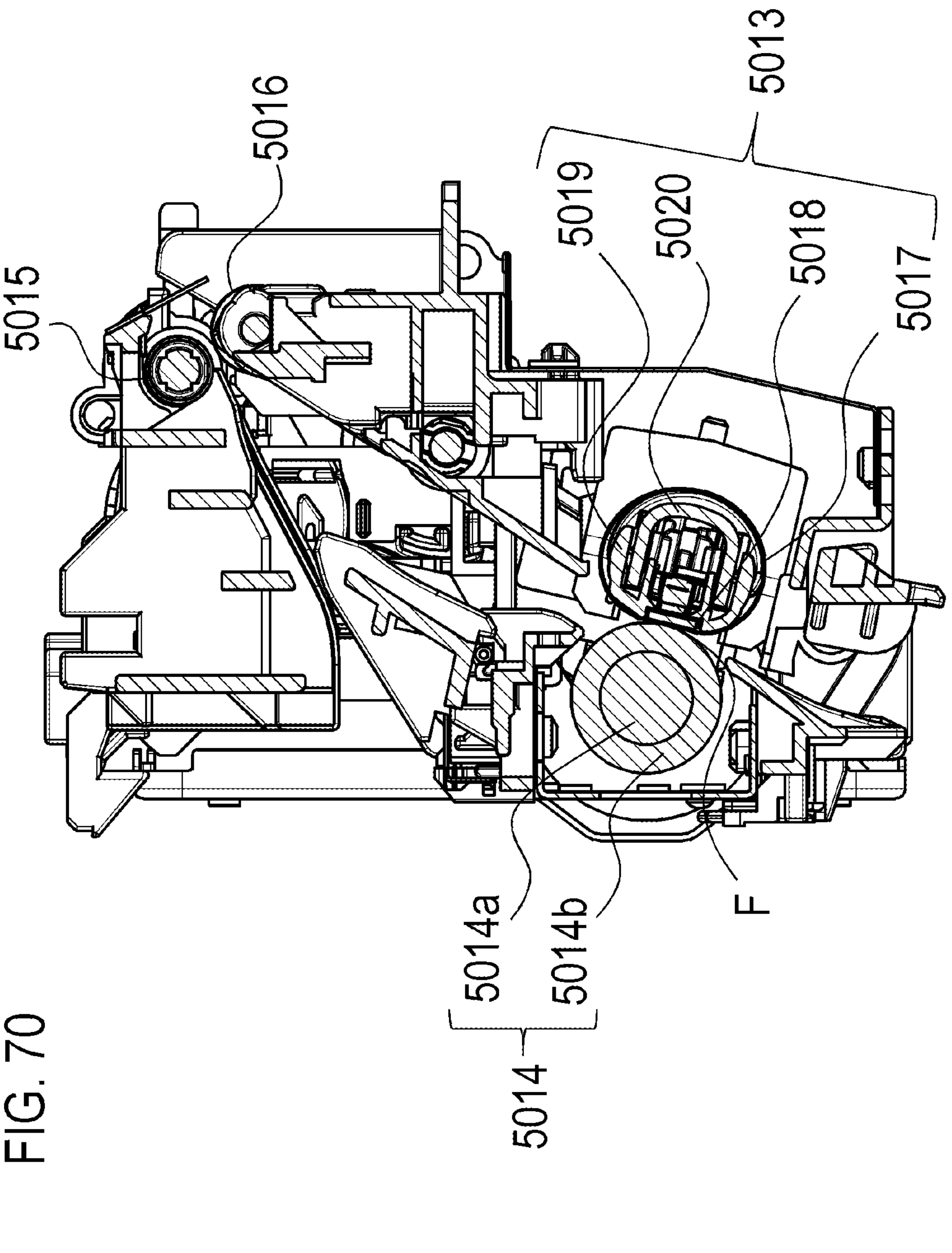
FIG. 70 is an overview sectional view of a fixing device according to Example 17.

Next, a configuration and operations of the fixing device will be described. In this example, a tensionless-type film heating-system fixing device is used as an example of the heating device. The fixing device in this example is a device in which an endless belt-shaped (or cylindrical) heat-resistant film is used, at least a part of the perimeter of the film is always kept free from tension (a state in which no tension is applied thereto), and the film is driven to rotate by a rotation drive force of a pressurizing member. FIG. 70 is an overview sectional view extracting the fixing device that is a main part in this example.

The heating unit 5013 includes a cylindrical film 5017, a heater 5018 that inscribes and heats the film 5017, a heater holder 5019 with excellent heat resistance, and a stay 5020 with excellent rigidity. The film 5017 is, for example, a thin cylindrical plastic film or the like with high heat resistance and high heat conductivity. The heater 5018 is a heat generating element that generates heat in response to power distribution from a power source, which is not illustrated, and is obtained by applying insulating coating to a substrate made of a metal base material and applying a conductive body thereto. The heater 5018 is supported in a state in which it is fitted and fixed to a groove portion of the heater holder 5019. The film 5017 is attached to cover the outer circumferences of the heater 5018, the heater holder 5019, and the stay 5020 and can perform rotational movement.

The heating unit 5013 is configured such that the film 5017 that is a first rotating body comes into contact with the pressurizing roller 5014 that is a second rotating body by receiving a force of a pressurizing spring. The pressurizing roller 5014 is configured of a core metal 5014*a* and a heat-resistant elastic material layer 5014*b* that is molded in a roller shape on the outer circumference of the core metal 5014*a*. Since the pressurizing roller 5014 has an elastic surface, the heating unit 5013 and the pressurizing roller 5014 form a fixing nip portion F with a predetermined width and establishes pressure contact with a predetermined pressure. Also, the pressurizing roller 5014 is driven to rotate at a predetermined circumferential speed from a drive train, which is not illustrated. A frictional force is generated between the film 5017 and the pressurizing roller 5014 through rotation of the pressurizing roller 5014, and the film 5017 performs driven rotating motion with respect to the pressurizing roller 5014.

In a state in which the pressurizing roller 5014 and the film 5017 are in a rotating state and power distribution to and heating of the heater 5018 are being performed, the recording material 5002 carrying an unfixed toner image thereon is introduced into and nipped and conveyed by the fixing nip portion F between the film 5017 and the pressurizing roller 5014. In the process of nipping and conveying the recording material, heat of the heater 5018 is applied to the recording material 5002 via the film 5017, and the unfixed toner image is melted and fixed on the recording material 5002 through heating and pressurization.

Configurations of Heater and Peripheral Components

Figure 71:
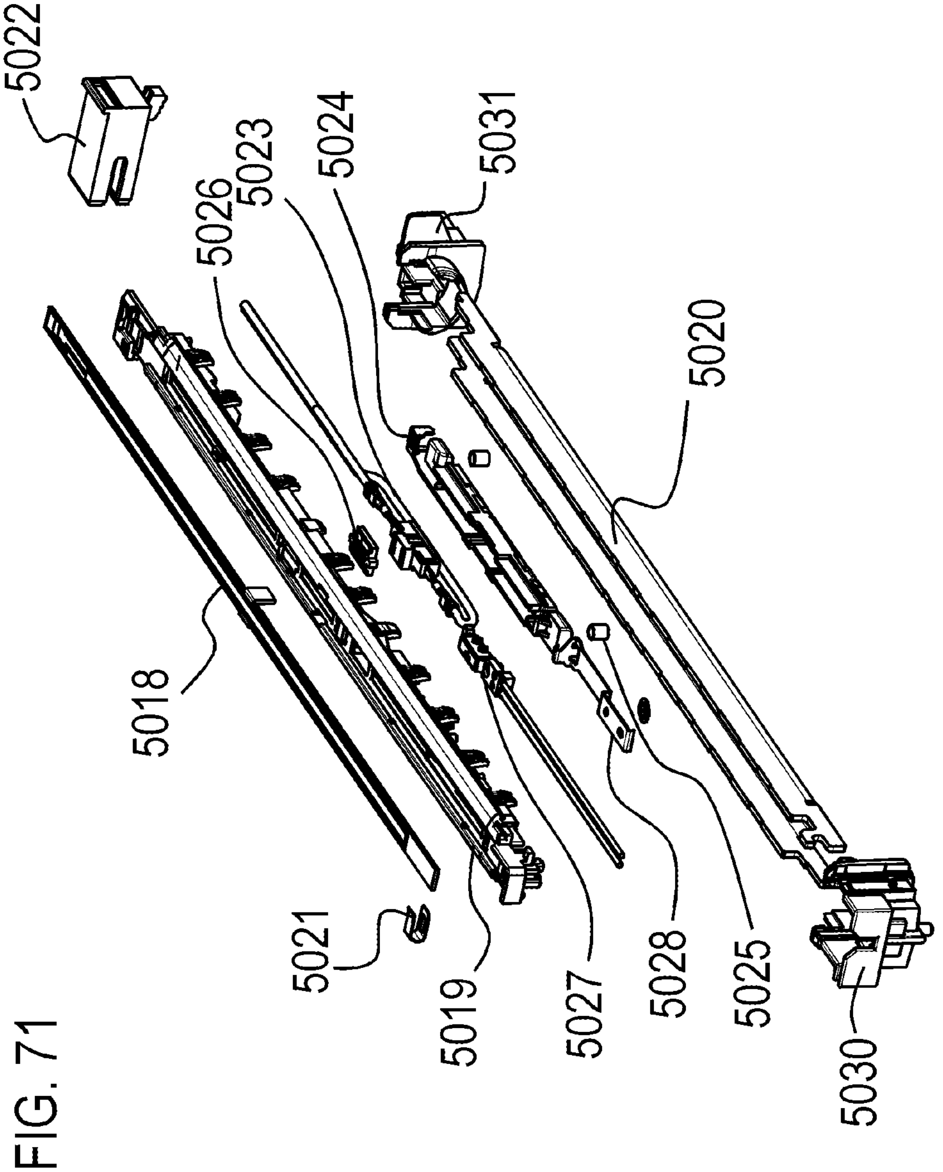
FIG. 71 is an exploded view of a heater and peripheral members according to Example 17.
Figure 72:
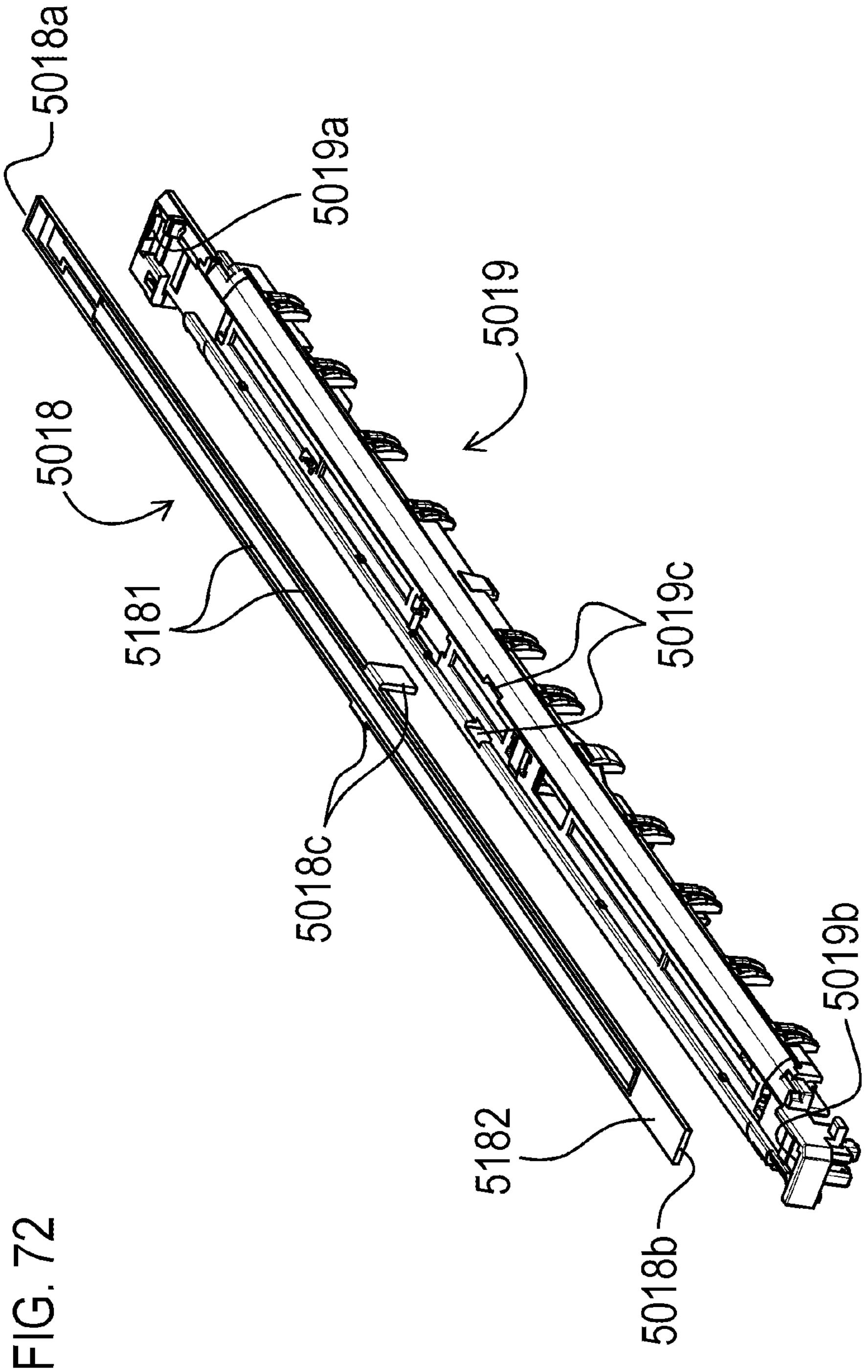
FIG. 72 is an exploded view of the heater and a heater holder according to Example 17.
Figure 73:
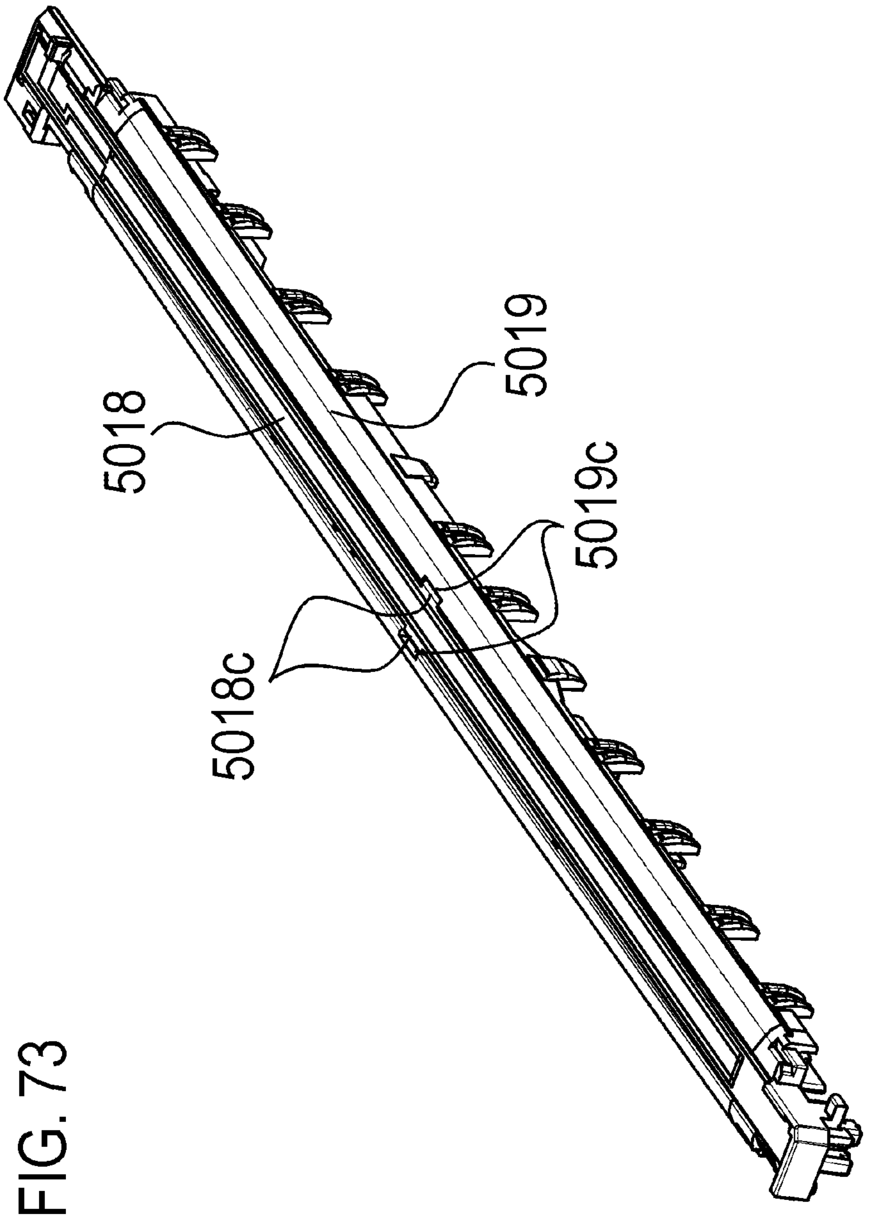
FIG. 73 is a completion diagram of the heater and the heater holder according to Example 17.

Details of configurations of the heater 5018 and peripheral components thereof will be described using FIGS. 71, 72, and 73. FIG. 71 is an exploded view of the heater 5018 and peripheral components thereof that are main parts in this example, FIG. 72 is an exploded view extracting only the heater 5018 and the heater holder 5019, and FIG. 73 is a completion diagram illustrating a state in which the heater 5018 and the heater holder 5019 are engaged with each other. The heater 5018 is a member that is longer in the rotation axis direction of the pressurizing roller 5014, and the position of the heater 5018 in the transverse direction that is orthogonal to the longitudinal direction with respect to the heater holder 5019 is determined by the heater 5018 being held in the groove portion of the heater holder 5019. Also, both end portions of the heater 5018 in the longitudinal direction are held by a clipping member 5021 and a power supply portion 5022 such that the heater 5018 does not escape from the heater holder 5019. The clipping member 5021 and the power supply portion 5022 are members that hold the heater 5018 such that the heater 5018 does not escape from the heater holder 5019 in the thickness direction that is orthogonal to the longitudinal direction and the transverse direction of the heater 5018 and is not a member that strongly curbs motion of the heater 5018 in the longitudinal direction with respect to the heater holder 5019. The power supply portion 5022 supplies power input from a power source, which is not illustrated, to a power supply portion provided at an end portion of the heater 5018 in the longitudinal direction.

A safety element 5023 for preventing breakage when the temperature of the heater 5018 is excessively raised is held in a safety element holder 5024 and is pressed against the heater 5018 via a spacer 5026 with a safety element spring 5025. A temperature detection member 5027 that detects a temperature of the heater 5018 is biased to the heater 5018 by the temperature detection spring 5028. The heater holder 5019 is held by the stay 5020, and the position thereof in the longitudinal direction with respect to the image forming apparatus main body is fixed by the position in the longitudinal direction with respect to side plates provided to pinch both ends of the heater holder 5019 in the longitudinal direction being fixed by end portion holding members 5030 and 5031.

The heater 5018 in this example includes two heat generating elements 5181 provided to extend in the longitudinal direction of the heater 5018 as heat generating portions on the substrate 5182 made of metal and a heater projecting portion 5018*c* at the center of the heat generating elements 5181 in the longitudinal direction. The heater projecting portion 5018*c* is provided at both end portions of the substrate 5182 in the transverse direction and projects on the side of the heater holder 5019 perpendicularly to the surface of the substrate 5182. Also, the heater projecting portion 5018*c* in this example is configured to be disposed at a position where the center in the width direction that is orthogonal to the conveying direction of the recording material conveyed by the nip portion passes. The heater projecting portion 5018*c* may be molded by providing a part that serves as a heater projecting portion to a flat substrate in advance and folding the part or may be molded by another method of joining a member to the substrate. As a material used in the substrate, stainless steel, nickel, copper, aluminum, or an alloy containing such a material as a main material is suitably used.

The heater holder 5019 is a support member that is provided in an internal space of the film 5017 and supports the heater 5018. The heater holder 5019 has the film 5017 loosely inserted thereonto and also has a guide function of guiding rotation of the film 5017 while keeping slide contact with the inner circumferential surface of the film 5017. For the heater holder 5019, it is possible to suitably use a high-heat-resistant resin such as polyimide, polyamidimide, PEEK, PPS, or a liquid crystal polymer, or a composite material of such a resin and ceramic, metal, glass, or the like. Moreover, the heater holder 5019 in this example includes a heater holder hole portion 5019*c* that is engaged with the heater projecting portion 5018*c* of the heater 5018.

The heater holder hole portion 5019*c* abuts the heater projecting portion 5018*c* in both directions of the longitudinal direction such that relative movement of the heater projecting portion 5018*c* in the longitudinal direction with respect to the heater holder hole portion 5019*c* is restricted. In other words, the longitudinal direction of the heater 5018 is positioned with respect to the heater holder 5019 by the heater projecting portion 5018*c* as a positioning portion abutting and being fitted to the heater holder hole portion 5019*c* as a positioned portion. At this time, one end 5018*a* and the other end 5018*b* on the side opposite to the one end 5018*a* of the heater 5018 in the longitudinal direction are provided to have clearances with respect to one end 5019*a* and the other end 5019*b* on the side opposite to the one end 5019*a* of a groove portion of the heater holder 5019 in the longitudinal direction. The amount of clearances is set to the amount with which the one end 5018*a* and the other end 5018*b* of the heater 5018 do not come into contact with the heater holder 5019 when the heater 5018 causes thermal expansion.

Effects and Advantages of the Invention

Figure 74A:
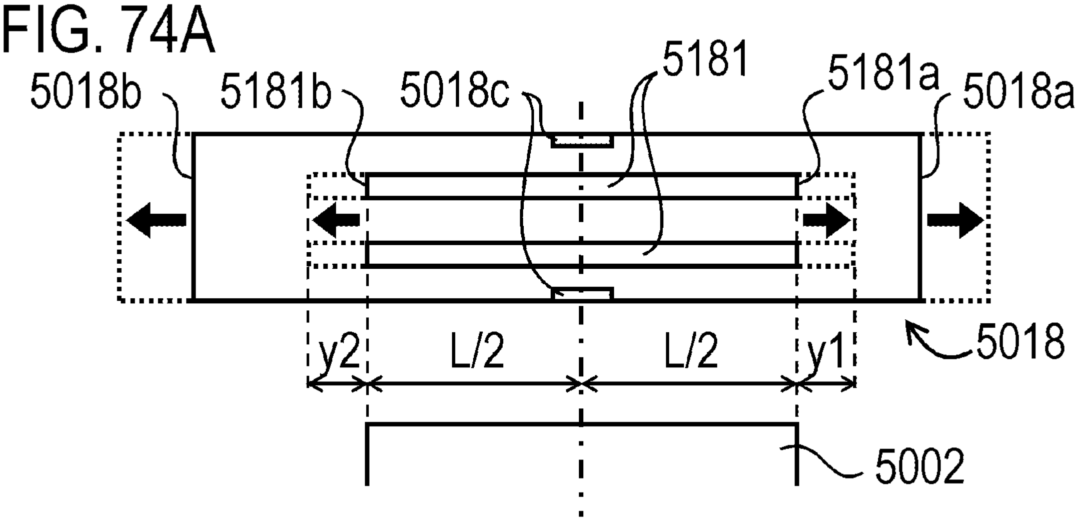
FIGS. 74A and 74B are schematic views illustrating states of thermal expansion of the heaters according to Example 17 and a comparative example, respectively.
Figure 74B:
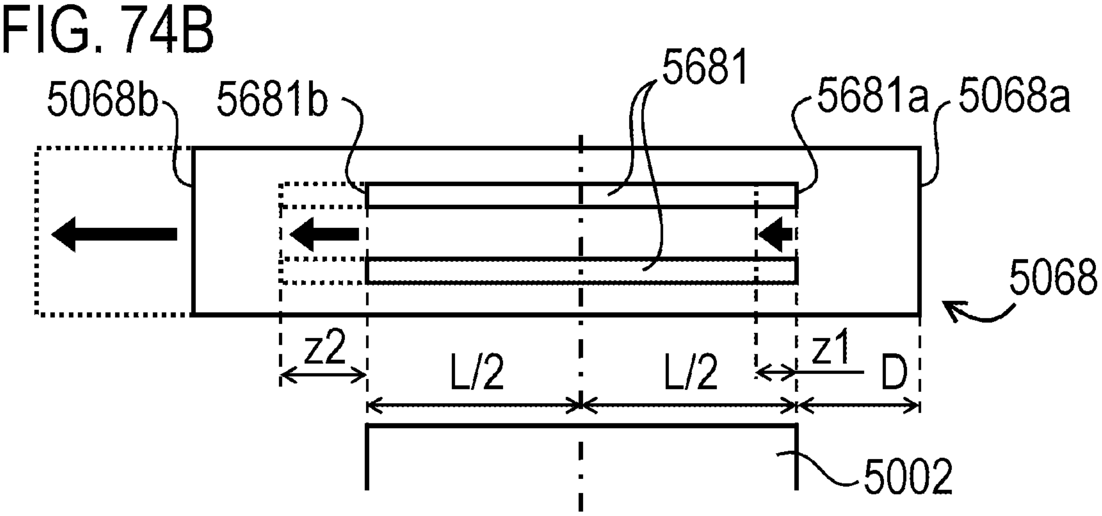

Effects and advantages of the present invention will be described using FIGS. 74A and 74B. FIG. 74A is a schematic view illustrating a state in which the heater in this example causes thermal expansion, and FIG. 74B is a schematic view illustrating a state in which a heater in a comparative example that is a configuration in the related art causes thermal expansion. In each of the drawings, a case where a recording material 5002 with a length L in the width direction is fed is assumed, and the shape of the heater held by the heater holder 5019 after deformation is illustrated by the dotted line.

The position of the heater 5018 in this example in the longitudinal direction with respect to the heater holder 5019 is determined by the heater projecting portion 5018*c*. In other words, when the heater 5018 causes thermal expansion as illustrated in FIG. 74A, the heat generating elements 5181 with the length L expand uniformly on left and right sides in the longitudinal direction with reference to the heater projecting portion 5018*c*. Since the heater projecting portion 5018*c* is located at the center in the width direction that is orthogonal to the conveying direction of the recording material 5002, the heat generating elements 5181 expand uniformly on left and right sides with reference to the center of the recording material 5002 in the width direction. In other words, when the amount of deformation of the heat generating elements 5181 at one end 5181*a* in the longitudinal direction is defined as y1, and the amount of deformation thereof at the other end 5181*b* on the side opposite to the one end 5181*a* is defined as y2, y1=y2 in this example, the amounts of deformation on the left and right sides become equivalent, and both end portions of the recording material 5002 in the width direction are thus uniformly heated.

Next, a behavior of a heater 5068 in the comparative example of a configuration in the related art including two heat generating elements 5681 with the length L and positioned at one end 5068*a* of the heater 5068 in the longitudinal direction with respect to the heater holder 5019 at the time of thermal expansion will be described using FIG. 74B. In the comparative example of the configuration in the related art that does not include the heater projecting portion, deformation is caused with reference to the one end 5068*a* of the positioned heater if the heater 5068 causes thermal expansion, and the one end 5068*a* and the other end 5068*b* on the opposite side are thus most significantly deformed. Since the amounts of deformation due to the thermal expansion are proportional to the distances from the reference position, z1<z2 in the comparative example when the amount of deformation of the heat generating elements 5681 at the one end 5681*a* in the longitudinal direction is defined as z1 and the amount of deformation at the other end 5681*b* on the side opposite to the one end 5681*a* is defined as z2. At this time, the one end 5681*a* of the heat generating element 5681 is deformed toward the outside of the recording material 5002 while the other end 5681*b* is deformed toward the inside of the recording material 5002. In other words, since the one end 5681*a* of the heat generating element 5681 is located outside the recording material 5002 as compared with the end portion of the recording material 5002 in the width direction, and the other end 5681*b* is located inside the recording material 5002 as compared with the end portion of the recording material 5002 in the width direction, both end portions of the recording material 5002 in the width direction are not uniformly heated.

In the configuration in the related art, the one end side and the other end side of the heat generating elements in the longitudinal direction behave differently, namely they are directed either toward outside of the recording material or toward the inside of the recording material when the heater causes thermal expansion, how the heat is applied is likely to change at both end portions of the recording material in the width direction as described above. If the end portion of the heat generating elements is placed inside the recording material, in particular, there is a high probability that the end portion of the recording material is not sufficiently heated. However, extension of the heat generating elements to excessively long lengths in the longitudinal direction is not preferable in terms of power saving and the like. On the other hand, since both end portions of the heat generating elements in the longitudinal direction cause thermal expansion toward the outside of the recording material in the present invention, heat is uniformly provided to both end portions of the recording material in the width direction. In other words, both end portions of the recording material in the width direction are more likely to be uniformly heated in the present invention than in the configuration in the related art from the viewpoint of not only a difference in the amounts of deformation but also behaviors at the time of the deformation.

As described above, it is possible to uniformly heat both end portions of the recording material in the width direction by providing the positioning portion and the positioned portion for determining the position of the heater in the longitudinal direction with respect to the heater holder being located at the center of the heat generating portions configured of heat generating elements or the like and by fitting the heater to the heater holder.

Note that although the configuration in which the heater projecting portion 5018*c* is located at the center in the longitudinal direction with respect to the heat generating elements 5181 and the recording material 5002 is used in the aforementioned embodiment, the heater projecting portion 5018*c* is not necessarily located at the center in a strict sense when the present invention is applied. This is because behaviors at both ends of the heat generating portions with respect to the recording material become similar on the left and right sides by the positioning portion being located on the side further inward than the heat generating portions in the longitudinal direction of the heat generating portions. In other words, even if the positioning portion such as the heater projecting portion slightly deviates from the center of the heat generating portions of the heater, it is possible to further uniformize both end portions of the recording material in the width direction as compared with the configuration in the related art as long as the positioning portion is located near the center of the heat generating portions. Thus, how large the amount of deviation of the positioning portion with respect to the center of the heat generating portions can be to obtain a heat property that is better than that of a configuration in the related art including a ceramic substrate by applying the present invention to a configuration including a metal substrate will be considered next.

Figure 75A:
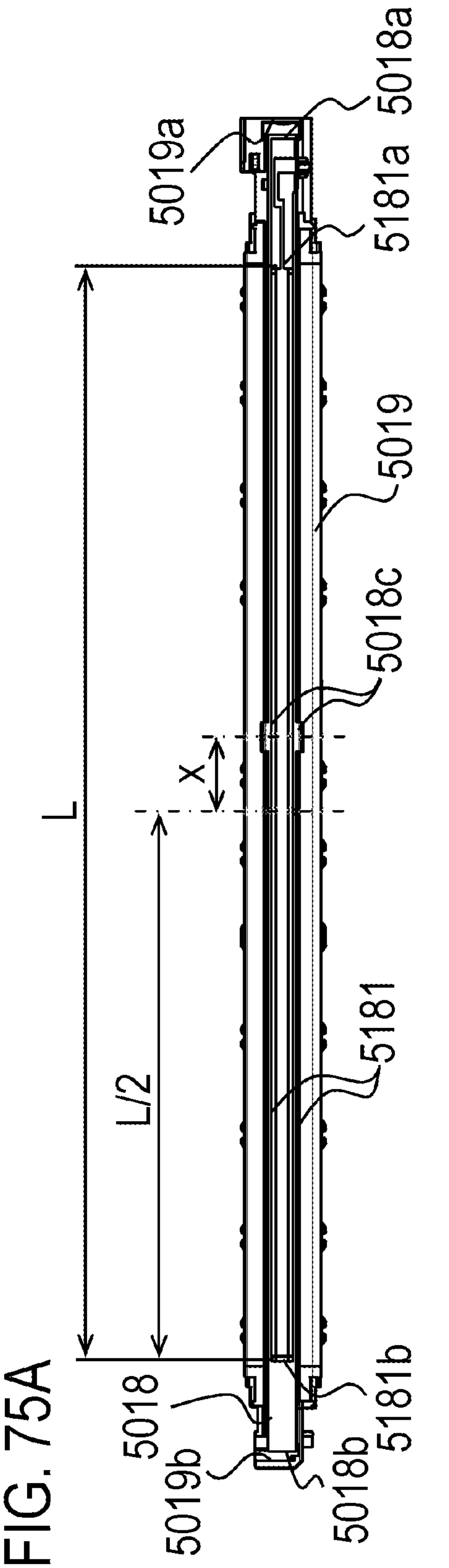
FIGS. 75A and 75B are schematic views illustrating a configuration in which a heater projecting portion deviates from the center according to Example 17.
Figure 75B:
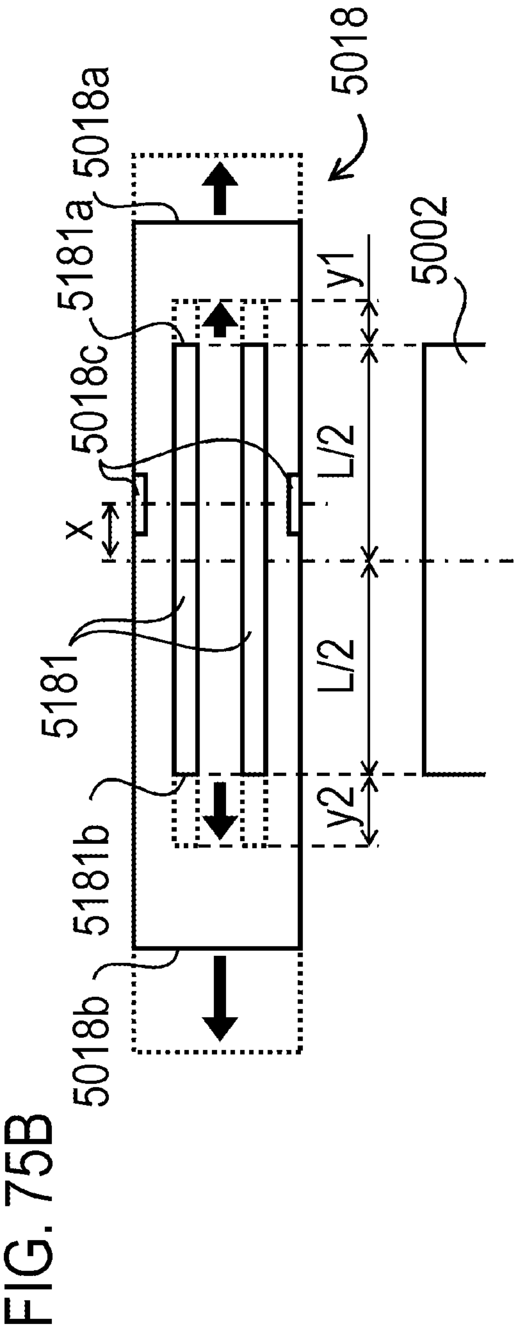

FIG. 75A is a plan view illustrating the heater 5018 in a case where the heater projecting portion 5018*c* is provided at a position deviating from the center of the heat generating elements 5181 by the amount x of deviation in the longitudinal direction. FIG. 75B is a schematic view illustrating a state when the heater 5018 causes thermal expansion, a case in which the recording material 5002 with the length L in the width direction is fed is assumed, and the shape of the heater 5018 held by the heater holder 5019 after deformation is illustrated by the dotted line.

First, how large a difference between the amounts of deformation at the one end 5181*a* and the other end 5181*b* of the heat generating elements 5181 in the longitudinal direction is when the heater 5018 causes thermal expansion will be considered for a configuration in which the heater projecting portion 5018*c* illustrated in FIGS. 75A and 75B deviates on the side of the one end 5018*a* from the center in the longitudinal direction by the amount x of deviation. Since the heat generating elements 5181 causes thermal expansion with reference to the heater projecting portion 5018*c*, the other end 5181*b* of the heat generating element 5181 that is further from the heater projecting portion 5018*c* is more significantly deformed than the one end 5181*a* that is closer to the heater projecting portion 5018*c*. When the coefficient of thermal expansion of the heater 5018 is defined as a, and the amount of change in temperature is defined as t, a difference between the amount y1 of deformation at the one end 5181*a* of the heat generating elements 5181 and the amount y2 of deformation at the other end 5181*b* is represented by the following Equation 1.

$$y2-y1=(L/2+x)\times a\times t-(L/2-x)\times a\times t=2xat \qquad \text{Equation 1}$$

As can be understood from above Equation 1, the difference y2−y1 between the amounts of deformation at both end portions of the heat generating elements in the longitudinal direction due to thermal expansion increases as the amount x of deviation of the heater projecting portion 5018*c* increases. In other words, it is important to cause the heater projecting portion 5018*c* to approach the center of the heat generating elements 5181 in the longitudinal direction in order to more uniformly heat the recording material in the width direction.

Next, how large a difference between amounts of deformation at both end portions of the heat generating elements 5681 in the longitudinal direction is when the heater 5068 causes thermal expansion will be similarly considered for the comparative example of the configuration in the related art illustrated in FIG. 74B as well. Since the heat generating elements 5681 causes thermal expansion with reference to the one end 5068*a* of the heater 5068 in the longitudinal direction, the amounts of deformation at the one end 5681*a* of the heat generating elements 5681 in the longitudinal direction and at the other end 5681*b* on the side opposite to the one end 5681*a* are different. In other words, the other end 5681*b* of the heat generating element 5681 that is further from the one end 5068*a* is more significantly deformed than the one end 5681*a* that is closer to the one end 5068*a*. When the coefficient of thermal expansion of the heater 5068 is defined as a, the amount of change in temperature is defined as t, and the distance from the one end 5068*a* of the heater 5068 to the one end 5681*a* of the heat generating element 5681 is defined as D, the difference between the amount z1 of deformation at the one end 5681*a* and the amount z2 of deformation at the other end 5681*b* of the heat generating element 5681 is represented by the following Equation 2.

$$z2-z1=(L+D)\times a\times t-D\times a\times t=Lat \qquad \text{Equation 2}$$

As can be understood from above Equation 2, in a case where the heater is positioned at an end portion in the longitudinal direction, the difference between the amounts of deformation at both end portions of the heat generating elements due to thermal expansion is proportional to the entire length of the heater. Here, it is possible to obtain the difference between the amounts of deformation at both end portions of the heat generating elements in the longitudinal direction for each of a case where the heater is positioned with respect to the holder at the center of the heat generating elements in the longitudinal direction on the basis of Equation 1 and a case in which the heater is positioned with respect to the holder at the end portions in the longitudinal direction on the basis of Equation 2. In other words, it is possible to obtain, from Equations 1 and 2, a condition for reducing the difference between the amounts of deformation at both end portions of the heat generating elements in the longitudinal direction by applying the present invention to the heater including the metal substrate as compared with the configuration in the related art in which the ceramic heater with a smaller coefficient of thermal expansion is positioned at the end portion in the longitudinal direction.

The coefficient α of thermal expansion of SUS304 that is representative metal used for the substrate of the heater is $17.3\times10^{-6}$ [1/° C.] and the coefficient α of thermal expansion of alumina that is representative ceramic used for the substrate of the heater is $8\times10^{-6}$ [1/° C.]. If the value obtained by substituting the value of the coefficient α of thermal coefficient of SUS304 to Equation 1 is smaller than the value obtained by substituting the value of the coefficient α of thermal coefficient of alumina to Equation 2, it is possible to further reduce the difference between the amounts of deformation at both end portions of the heat generating elements in the longitudinal direction as compared with the configuration in the related art. Also, the relational equation obtained as described above is represented by the following Equation 3.

$$x \leq 0.23L \approx \tfrac{1}{4}L \qquad \text{Equation 3}$$

It is possible to understand from Equation 3 above that the amounts of deformation at both end portions of the heat generating portions in the longitudinal direction can be reduced to the amounts that are equal to or less than those in the configuration in the related art even if the heater projecting portion deviates from the center of the heat generating portions in the longitudinal direction by the amount corresponding to about ¼ of the entire length of the heat generating elements in the configuration including the metal substrate to which the present invention is applied. In other words, the heater projecting portion is preferably located within a range to the position at a distance of ¼ ahead of the entire length of the heat generating portions from the center of the heat generating portions to the side of each of both ends in the longitudinal direction. With such a configuration, it is possible to obtain a heat property that is equivalent or greater than that of the configuration in the related art by applying the preset invention even from the configuration including the metal substrate.

As described above, it is possible to uniformly heat both end portions of the recording material in the width direction by employing the configuration in which the positioning portion for determining the position of the heater in the longitudinal direction with respect to the heater holder is located on the side further inward than the heat generating portions of the heater in the longitudinal direction. If the positioning portion is located near the center of the heat generating portions in the longitudinal direction, specifically within a range that is ¼ ahead of the entire length of the heat generating portions from the center of the heat generating portions to each of both end portions in the longitudinal direction, the effects and the advantages of the present invention can be more effectively obtained.

Note that although the present embodiment has been described using the configuration including the heater provided with the metal substrate, the present invention is not limited thereto. Even in a case of a configuration in which the substrate of the heater is made of ceramic, for example, the ceramic also causes thermal expansion to some extent, the deviation of the positional relationship between the heater and the end portions of the recording material is thus reduced by applying the present invention, and it is possible to more uniformly heat the recording material in the longitudinal direction.

In another modification example, a configuration in which the support member is provided with a projection projecting on the side of the heater may be employed although the heater is provided with the projecting portion projecting on the side of the support member as the positioning portion in this example. Moreover, a configuration in which the heater projecting portion is caused to project only from one end or a configuration in which the heater projecting portion projects from the surface of the substrate on the side opposite to the surface on which the heat generating elements are provided may be employed instead of the heater projecting portion projecting from both ends of the heater in the conveying direction as in this example. In other words, the positioning portion provided on the substrate, such as the projecting portion and the hole portion, is not limited to the mode described in this example and can be modified in various manners as long as the position of the heater in the longitudinal direction with respect to the heater holder can be fixed.

Also, in a configuration in which the thickness of the substrate is thin in order to quickly raise the temperature, the temperature of the heater also suddenly changes, and the temperature of the recording material is also likely to suddenly change. Since the temperatures of the recording material at both end portions are likely to change due to slight deviation of the heat generating portions with respect to the recording material in such a configuration, application of the present invention is particularly advantageous.

Example 18

Next, Example 18 according to the present invention will be described. A fixing device in Example 18 is different from that in Example 17 in that a heater is provided with a soaking plate and the soaking plates abuts an inner circumferential surface of a film instead of the heater. Since configurations similar to those in Example 17 are employed for the other configurations of an image forming apparatus and a fixing device in Example 18, similar reference signs will be applied, and description thereof will be omitted. Hereinafter, characteristic configurations in Example 18 will be described in detail.

Details of Configurations of Heater and Soaking Plate

Figure 76:
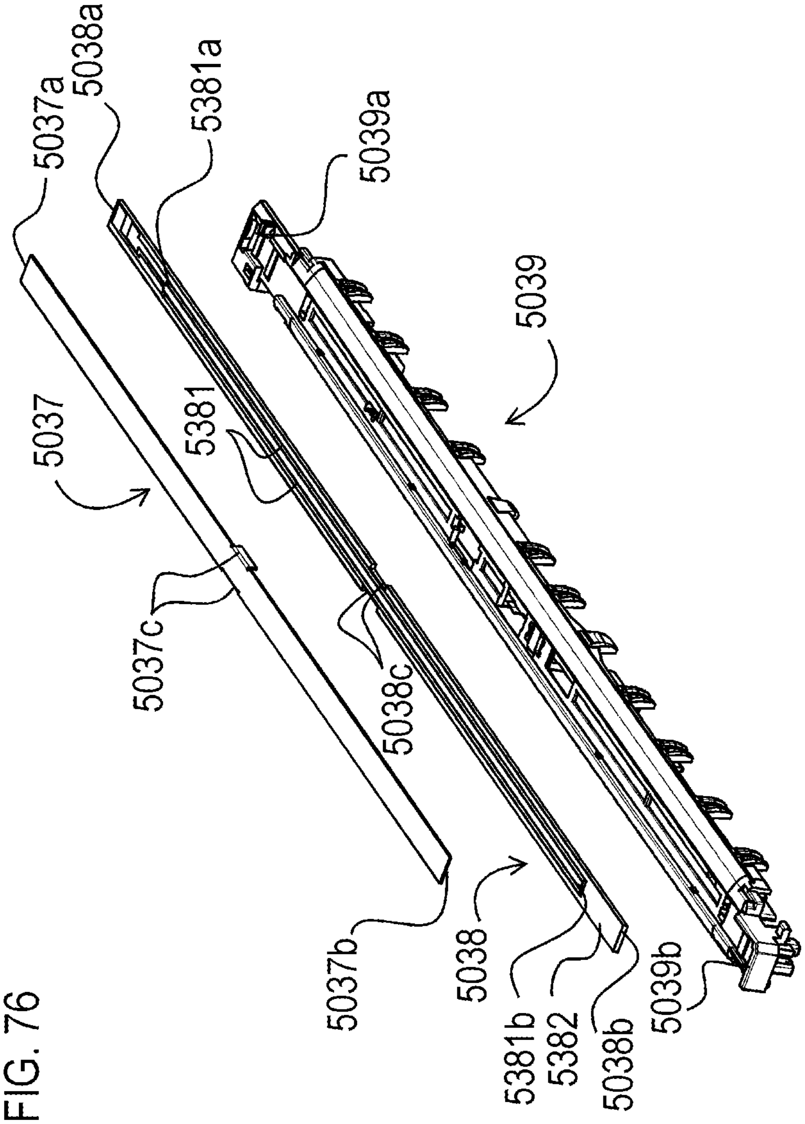
FIG. 76 is an exploded view of a heater, a soaking plate, and a heater holder according to Example 18.
Figure 77:
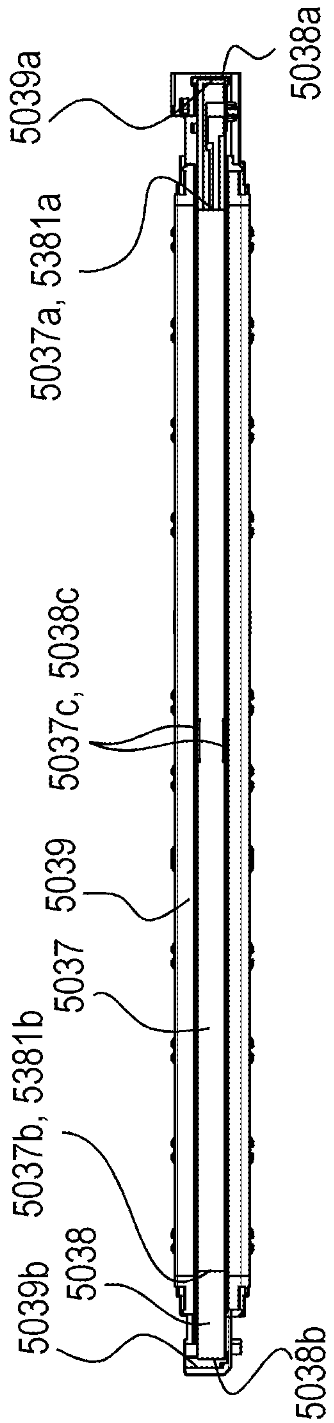
FIG. 77 is a completion diagram of the heater, the soaking plate, and the heater holder according to Example 18.

Details of configurations of a soaking plate 5037 and a heater 5038 will be described using FIGS. 76 and 77. FIG. 76 is an exploded view extracting only the soaking plate 5037 with excellent slidability, the heater 5038, and a heater holder 5039, and FIG. 77 is a completion diagram illustrating a state in which they are engaged with each other. The position of the heater 5038 in the longitudinal direction with respect to the heater holder 5039 is determined by the heater 5038 being held in a groove portion of the heater holder 5039, and the heater 5038 is held by a clipping member 5021 and a power supply portion 5022 such that the heater 5038 does not escape.

The heater 5038 in this example includes two heat generating elements 5381 provided on the substrate 5382 and a heater notch portion 5038*c* located at the center of the heat generating elements 5381 in the longitudinal direction. The heater notch portion 5038*c* opens in the thickness direction of the substrate 5382 and is fitted to a soaking plate projecting portion 5037*c* of the soaking plate 5037. The position of the heater 5038 in the longitudinal direction with respect to the heater holder 5039 is determined by the heater 5038 being provided in a groove portion of the heater holder 5039 such that one end 5038*a* in the longitudinal direction comes into contact with one end 5039*a* of the groove portion of the heater holder 5039 in the longitudinal direction. On the other hand, the one end 5038*a* and the other end 5038*b* on the opposite side of the heater 5038 include clearances with respect to the one end 5039*a* and the other end 5039*b* on the opposite side of the groove portion of the heater holder 5039 such that the heater 5038 does not come into contact with the heater holder 5039 even if the heater 5038 causes thermal expansion.

The soaking plate 5037 is a heat conducting member provided to uniformly transmit heat of the heater 5038 to the film 5017. The soaking plate 5037 may be any member with high heat conductivity, and it is suitable to use an aluminum plate or the like. One end 5037*a* and the other end 5037*b* on the side opposite to the one end 5037*a* of the soaking plate 5037 in the longitudinal direction are disposed at the same positions as those of one end 5381*a* and the other end 5381*b* on the side opposite to the one end 5381*a* of the heat generating elements 5381. In other words, both ends of the soaking plate 5037 in the longitudinal direction are located at positions corresponding to both ends of the heat generating elements 5381 in the longitudinal direction and both ends of the recording material 5002 in the width direction. The soaking plate 5037 in this example includes a soaking plate projecting portion 5037*c* that is engaged with the heater notch portion 5038*c* of the heater 5038. The soaking plate projecting portion 5037*c* projects perpendicularly to the surface of the soaking plate 5037 abutting the heater 5038. The soaking plate projecting portion 5037*c* may be molded by providing a part that serves as a heater projecting portion to a flat metal plate in advance and folding the part or may be molded by another method of joining a member to the substrate or the like.

Since the heat from the heater is uniformized in the soaking plate by employing the configuration in which heat transmission from the heater to the film is performed via the soaking plate, it is possible to transmit more uniformized heat to the film as compared with a configuration in which the soaking plate is not provided. However, since both end portions of the soaking plate in the longitudinal direction are not uniformly heated if the positions of the end portions of the heater and the soaking plate in the longitudinal direction deviate due to thermal expansion of the heater, both end portions in the width direction of the recording material passing through the positions corresponding to both end portions of the soaking plate in the longitudinal direction are heated at different temperatures. In other words, it is necessary for both end portions of the soaking plate in the longitudinal direction to be uniformly heated by the heater in order to uniformly heat both end portions of the recording material in the width direction with the configuration in which the soaking plate is included.

Next, a method for positioning the soaking plate 5037 in this example will be described. The soaking plate 5037 is disposed on the heater 5038, and the position of the soaking plate 5037 in the transverse direction with respect to the heater holder 5039 is determined by the soaking plate 5037 being held integrally with the heater 5038 in the groove portion of the heater holder 5039. On the other hand, the heater notch portion 5038*c* abuts the soaking plate projecting portion 5037*c* in both directions of the longitudinal direction such that relative movement of the soaking plate projecting portion 5037*c* in the longitudinal direction with respect to the heater notch portion 5038*c* is restricted. In other words, the position of the soaking plate 5037 in the longitudinal direction with respect to the heater 5038 is determined by the heater notch portion 5038*c* as a positioning portion being fitted to the soaking plate projecting portion 5037*c* that is a positioned portion.

The heat generating elements 5381 in this example expands uniformly on left and right sides in the longitudinal direction with reference to the heater notch portion 5038*c* when the heater 5038 causes thermal expansion. Since the heater notch portion 5038*c* is located at the center of the heat generating elements 5381 and at the center of the soaking plate 5037 in the longitudinal direction, the heat generating element 5381 expands uniformly on the left and right sides with reference to the center of the soaking plate 5037 in the longitudinal direction. In other words, the amounts of deformation at one end 5381*a* and the other end 5381*b* of the heat generating elements 5381 that are heat generating portions of the heater 5038 in the longitudinal direction become equivalent, and both end portions of the soaking plate 5037 in the longitudinal direction are uniformly heated.

As described above, it is possible to uniformly heat both end portions of the soaking plate in the longitudinal direction by employing the configuration in which the positioning portion that determines the position of the soaking plate in the longitudinal direction with respect to the heater is located at the center of the heat generating portions of the heater in the configuration in which the soaking plate is provided on the heater. Both end portions in the width direction of the recording material located at positions corresponding to both end portions of the soaking plate are uniformly heated by both end portions in the longitudinal direction of the soaking plate that transmits uniformized heat of the heater to the film being uniformly heated.

Note that in the aforementioned example, although the configuration in which the heater notch portion 5038*c* is located at the center in the longitudinal direction with respect to the heat generating elements 5381 and the soaking plate 5037 has been employed, the configuration of the present invention is not limited thereto. It is possible to obtain a more excellent thermal property as compared with the configuration in the related art even if the positioning portion such as the heater notch portion slightly deviates from the center of the heat generating portions of the heater as long as the positioning portion is located on the side further inward than the heat generating portions. When a configuration in which the positioning portion deviates from the center of the heat generating portions is employed, the positioning portion is preferably located within a range that is ¼ ahead of the entire length of the heat generating portions from the center of the heat generating portions to both end portions in the longitudinal direction as described above using Example 17.

Example 19

Next, Example 19 according to the present invention will be described. A fixing device in Example 19 is different from that in Example 18 in that although a heater is provided with a soaking plate, a projecting portion of the soaking plate is also fitted to a heater holder in addition to the heater. Since configurations similar to those in Example 17 will be employed for the other configurations of an image forming apparatus and the fixing device in Example 19, similar reference signs will be applied, and description thereof will be omitted. Hereinafter, characteristic configurations in Example 19 will be described in detail.

Details of Configurations of Heater, Soaking Plate, and Holder

Figure 78:
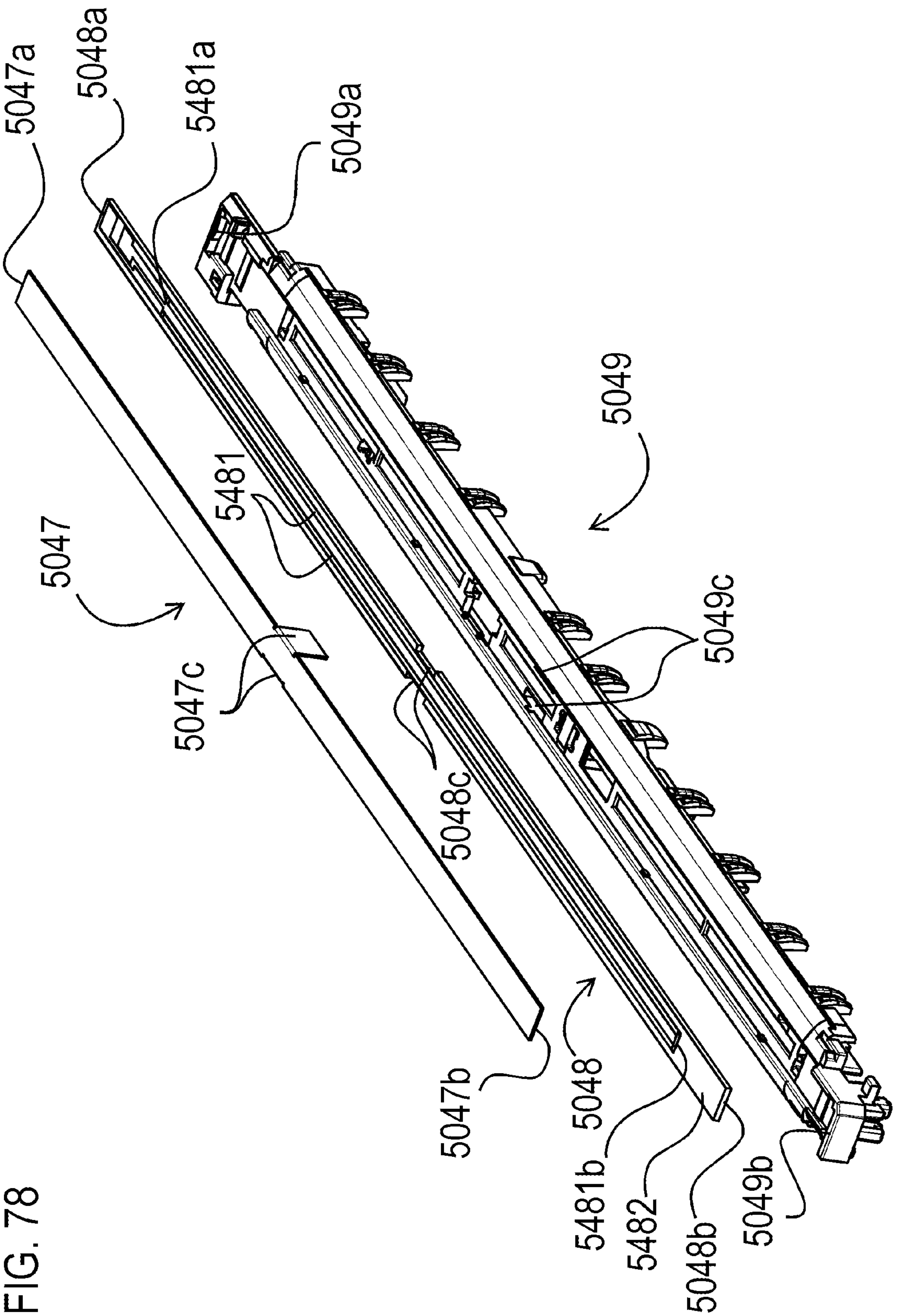
FIG. 78 is an exploded diagram of a heater, a soaking plate, and a heater holder according to Example 19.
Figure 79:
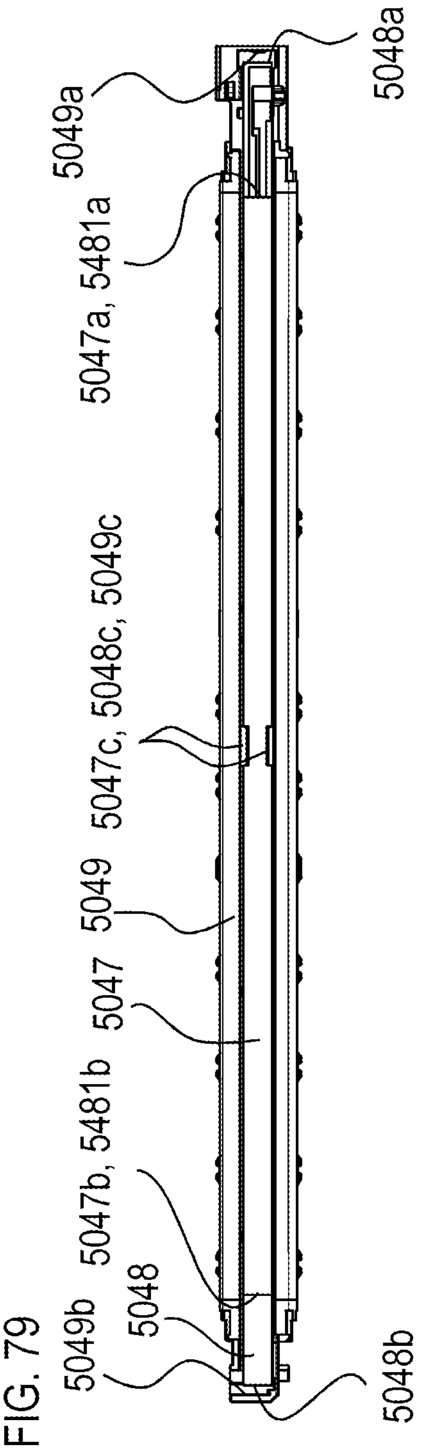
FIG. 79 is a completion diagram of the heater, the soaking plate, and the heater holder according to Example 19.

Details of configurations of a soaking plate 5047, a heater 5048, and a heater holder 5049 will be described using FIGS. 78 and 79. FIG. 78 is an exploded diagram extracting only the soaking plate 5047 with excellent slidability, the heater 5048, and the heater holder 5049, and FIG. 79 is a completion diagram illustrating a state in which they are engaged with each other. The position of the heater 5048 in the transverse direction with respect to the heater holder

5049 is determined by the heater 5048 being provided in a groove portion of the heater holder 5049. A method for positioning the heater 5048 in the longitudinal direction will be described later.

The heater 5048 in this example includes two heat generating elements 5481 provided on a substrate 5482 and a heater notch portion 5048*c* at a center portion of the heat generating elements 5481 in the longitudinal direction. The heater notch portion 5048*c* opens in the thickness direction of the substrate 5482 and is engaged with a soaking plate projecting portion 5047*c* of the soaking plate 5047. The heater 5048 is provided in the heater holder 5049 such that one end 5048*a* and the other end 5048*b* on the side opposite to the one end 5048*a* in the longitudinal direction have clearances with respect to one end 5049*a* and the other end 5049*b* on the side opposite to the one end 5049*a* of a groove portion of the heater holder 5049. In other words, the heater 5048 is provided such that the one end 5048*a* and the other end 5048*b* in the longitudinal direction do not come into contact with the heater holder 5049 when the heater 5048 causes thermal expansion.

The soaking plate 5047 in this example includes a soaking plate projecting portion 5047*c* that is fitted to a heater notch portion 5048*c* of the heater 5048 and a heater holder hole portion 5049*c* of the heater holder 5049. One end 5047*a* and the other end 5047*b* on the side opposite to the one end 5047*a* of the soaking plate 5047 in the longitudinal direction are disposed at the same positions as those of one end 5481*a* and the other end 5481*b* on the side opposite to the one end 5481*a* of the heat generating element 5481. The soaking plate projecting portion 5047*c* projects perpendicularly to the surface of the soaking plate 5047 abutting the heater 5048. Also, the soaking plate 5047 is provided on the heater 5048, and the position of the soaking plate 5047 in the transverse direction with respect to the heater 5048 is determined by the soaking plate 5047 being provided in the groove portion of the heater holder 5049 along with the heater 5048.

The heater holder 5049 in this example includes a heater holder hole portion 5049*c* that is fitted to the soaking plate projecting portion 5047*c* of the soaking plate 5047. The soaking plate projecting portion 5047*c* is fitted to the heater notch portion 5048*c* and the heater holder hole portion 5049*c*. The heater holder hole portion 5049*c* abuts the soaking plate projecting portion 5047*c* in both directions of the longitudinal direction such that relative movement of the soaking plate projecting portion 5047*c* in the longitudinal direction with respect to the heater holder hole portion 5049*c* is restricted. Also, the heater notch portion 5048*c* also abuts the soaking plate projecting portion 5047*c* in both directions of the longitudinal direction such that relative movement of the soaking plate projecting portion 5047*c* in the longitudinal direction with respect to the heater notch portion 5048*c* is restricted. In other words, the position of the heater 5048 in the longitudinal direction with respect to the soaking plate 5047 and the heater holder 5049 is determined by the soaking plate projecting portion 5047*c* being fitted to the heater notch portion 5048*c* and the heater holder hole portion 5049*c*. With such a configuration, the heater 5048 is deformed with reference to the heater notch portion 5048*c* located at the center of the heat generating element 5481 in the longitudinal direction and the recording material 5002 in the width direction with respect to the soaking plate 5047 and the heater holder 5049 when the heater 5048 causes thermal expansion. In other words, the amounts of deformation at one end 5481*a* and the other end 5481*b* of the heat generating elements 5481 that are heat generating portions of the heater 5048 in the longitudinal direction become equivalent. Moreover, since the soaking plate 5047 is deformed with reference to the center of the heat generating element 5481 and the soaking plate 5047 even in a case where the soaking plate 5047 causes thermal expansion, the amounts of displacement at both ends of the soaking plate 5047 in the longitudinal direction become equivalent, and both end portions of the recording material 5002 in the width direction are uniformly heated.

As described above, it is possible to uniformly heat both end portions of the recording material in the width direction by employing the configuration in which the positioning portion that determines the position of the heater in the longitudinal direction with respect to the soaking plate and the heater holder is located at the center of the heat generating portions of the heater in the longitudinal direction in the configuration in which the soaking plate is provided on the heater.

Note that although the configuration in which the heater notch portion 5048*c* is located at the center of the heat generating elements 5481, the soaking plate 5047, and the recording material 5002 in the longitudinal direction has been employed in the above example, the configuration of the present invention is not limited thereto. It is possible to obtain a more excellent thermal property as compared with the configuration in the related art even if the positioning portion such as the heater notch portion slightly deviates from the center of the heat generating portions of the heater as long as the positioning portion is located on the side further inward than the heat generating portions. When the configuration in which the positioning portion deviates from the center of the heat generating portions is employed, the positioning portion is preferably located within a range that is ¼ ahead of the entire length of the heat generating portions from the center of the heat generating portions to both end portions in the longitudinal direction as described above using Example 17.

Also, a configuration in which the heater is provided with a projecting portion and the projecting portion is fitted to a hole portion of the heater holder and a soaking plate notch portion may also be employed in another modification example. Moreover, a configuration in which the heater includes a first projection that is fitted to the heater holder and a second projection that is fitted to the soaking plate and a plurality of positioning portions for the heater are provided may also be employed. In other words, the positioning portion such as the projection, the hole portion, and the notch portion are not limited to the modes described in this example and can be modified in various manners as long as it is possible to fix the position of the heater in the longitudinal direction with respect to the heater holder and the soaking plate.

Example 20

Next, Example 20 according to the present invention will be described. A fixing device in Example 20 is different from that in Example 19 in that although a soaking plate is engaged with a heater and a heater holder, the heater holder is provided with a projecting portion, and the soaking plate is provided with a notch. Since configurations similar to those in Example 17 will be employed for the other configurations of an image forming apparatus and a fixing device in Example 20, the same reference signs will be applied, and description thereof will be omitted. Hereinafter, characteristic configurations of Example 20 will be described in detail.

Details of Configurations of Heater, Soaking Plate, and Holder

Figure 80:
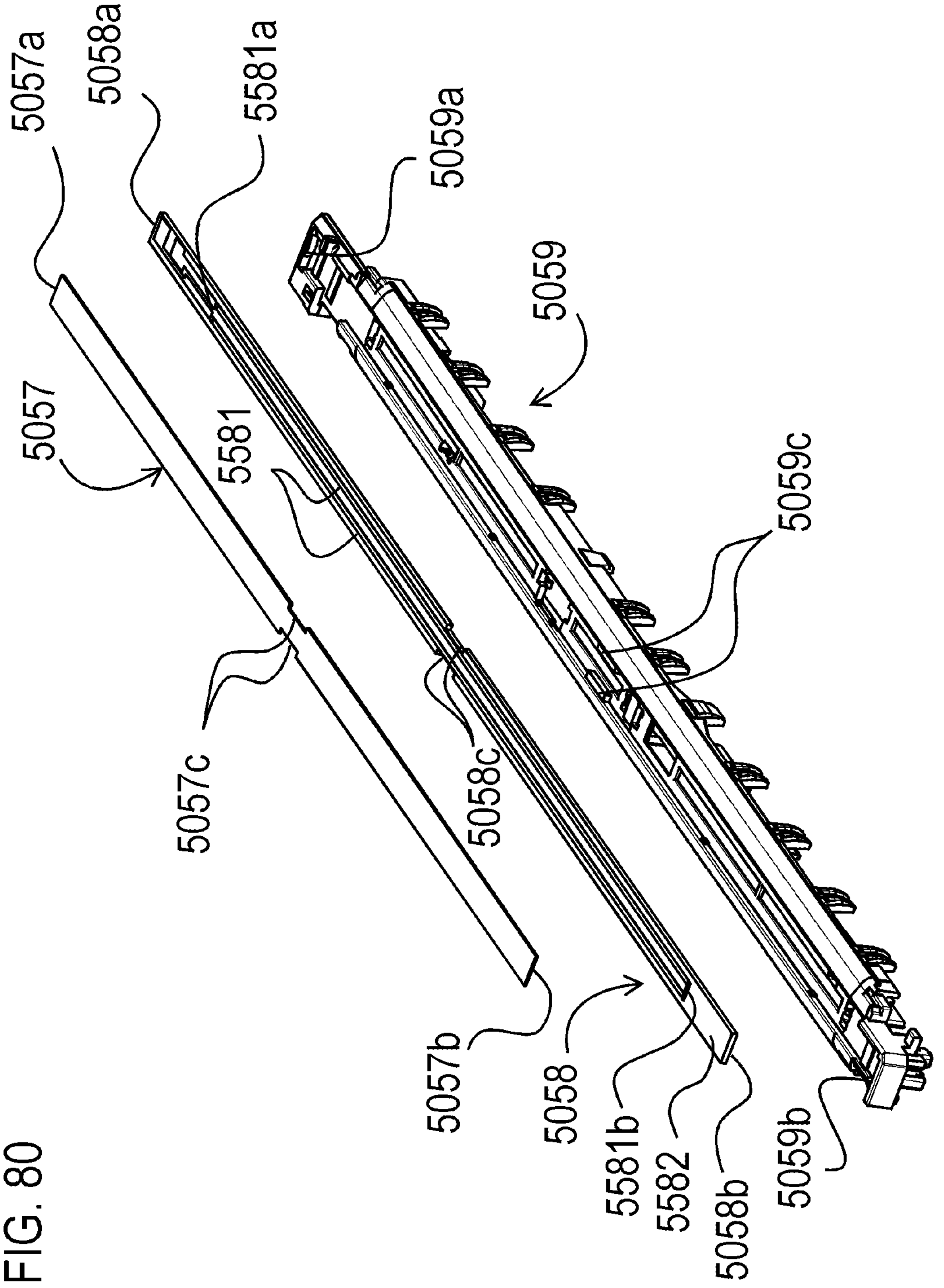
FIG. 80 is an exploded diagram of a heater, a soaking plate, and a heater holder according to Example 20.
Figure 81:
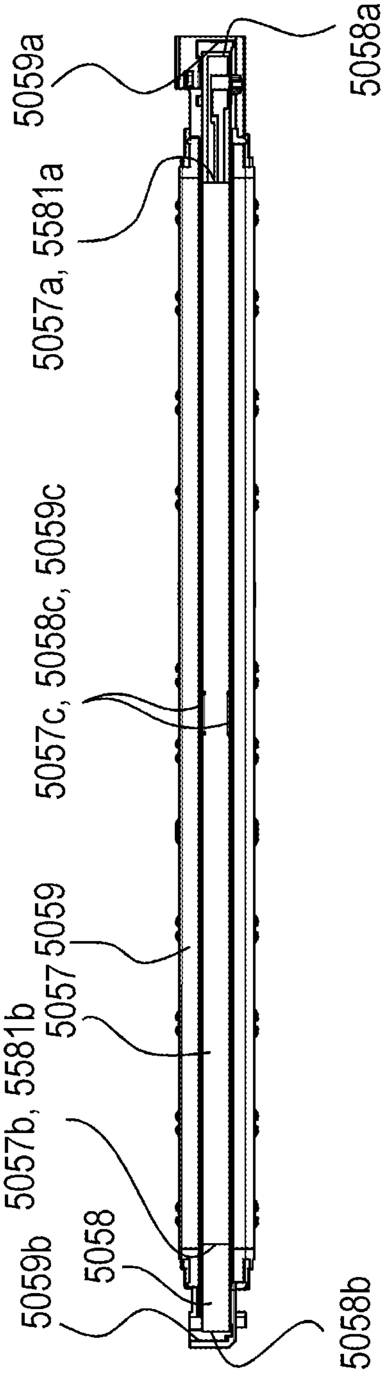
FIG. 81 is a completion diagram of the heater, the soaking plate, and the heater holder according to Example 20.

Details of configurations of a soaking plate 5057, a heater 5058, and a heater holder 5059 will be described using FIGS. 80 and 81. FIG. 80 is an exploded view of extracting only the soaking plate 5057 with excellent slidability, the heater 5058, and the heater holder 5059, and FIG. 81 is a completion diagram illustrating a state in which they are engaged with each other. The position of the heater 5058 in the transverse direction with respect to the heater holder 5059 is determined by the heater 5058 being provided in a groove portion of the heater holder 5059. A method for positioning the heater 5058 in the longitudinal direction will be described later.

The heater 5058 in this example includes two heat generating elements 5581 provided on a substrate 5582 and a heater notch portion 5058*c* at a center of the heat generating elements 5581 in the longitudinal direction. The heater notch portion 5058*c* opens in the thickness direction of the substrate 5582 and is engaged with a heater holder projecting portion 5059*c* of the heater holder 5059. The heater 5058 includes one end 5058*a* in the longitudinal direction and the other end 5058*b* on the side opposite to the one end 5058*a* provided in the heater holder 5059 with clearances from one end 5059*a* of the groove portion of the heater holder 5059 in the longitudinal direction and the other end 5059*b* on the side opposite to the one end 5058*a*. In other words, the heater 5058 is provided such that the one end 5058*a* and the other end 5058*b* in the longitudinal direction do not come into contact with the heater holder 5059 even if the heater 5058 causes thermal expansion.

The soaking plate 5057 in this example includes a soaking plate notch portion 5057*c* that is engaged with the heater notch portion 5058*c* of the heater 5058 and the heater holder projecting portion 5059*c* of the heater holder 5059. One end 5057*a* and the other end 5057*b* on the side opposite to the one end 5057*a* of the soaking plate 5057 in the longitudinal direction are disposed at the same positions as those of one end 5581*a* and the other end 5581*b* on the side opposite to the one end 5581*a* of the heat generating elements 5581. The soaking plate notch portion 5057*c* opens in the thickness direction of the soaking plate 5057. Also, the soaking plate 5057 is provided on the heater 5058, and the position of the soaking plate 5057 in the transverse direction with respect to the heater 5058 is determined by the soaking plate 5057 being provided in the groove portion of the heater holder 5059 along with the heater 5058.

The heater holder 5059 in this example includes a heater holder projecting portion 5059*c* that is engaged with the heater notch portion 5058*c* and the soaking plate notch portion 5057*c*. The heater holder projecting portion 5059*c* is fitted to the heater notch portion 5058*c* and the soaking plate notch portion 5057*c*. The heater holder projecting portion 5059*c* abuts the soaking plate notch portion 5057*c* in both directions of the longitudinal direction such that relative movement of the soaking plate notch portion 5057*c* in the longitudinal direction with respect to the heater holder projecting portion 5059*c* is restricted. Also, the heater notch portion 5058*c* also abuts on the soaking plate projecting portion 5047*c* in both directions of the longitudinal direction such that relative movement of the soaking plate notch portion 5057*c* in the longitudinal direction with respect to the heater notch portion 5058*c* is restricted. In other words, the position of the heater 5058 in the longitudinal direction with respect to the soaking plate 5057 and the heater holder 5059 is determined by the heater holder projecting portion 5059*c* being fitted to the heater notch portion 5058*c* and the soaking plate notch portion 5057*c*. With such a configuration, the heater 5058 is deformed with reference to the heater notch portion 5058*c* located at the center of the longitudinal direction of the heat generating elements 5581 and the width direction of the recording material 5002 with respect to the soaking plate 5057 and the heater holder 5059 when the heater 5058 causes thermal expansion. In other words, the amounts of deformation of the heat generating elements 5581 that are heat generating portions of the heater 5058 at the one end 5581*a* and the other end 5581*b* in the longitudinal direction become equivalent. Furthermore, since the soaking plate 5057 is deformed with reference to the center of the heat generating elements 5581 and the soaking plate 5057 even in a case where the soaking plate 5057 causes thermal expansion, the amounts of deformation of the soaking plate 5057 at both ends in the longitudinal direction become equivalent, and both end portions of the recording material 5002 in the width direction are uniformly heated.

As described above, in the configuration in which the soaking plate is provided on the heater, it is possible to uniformly heat both end portions of the recording material in the width direction by employing the configuration in which the positioning portion that determines the position of the heater in the longitudinal direction with respect to the soaking plate of the heater and the heater holder is located at the center of the heat generating portions of the heater in the longitudinal direction.

Note that although the configuration in which the heater notch portion 5058*c* is located at the center in the longitudinal direction with respect to the heat generating element 5581, the soaking plate 5057, and the recording material 5002 is employed in the aforementioned example, the configuration of the present invention is not limited thereto. It is possible to obtain a more excellent thermal property as compared with the configuration in the related art even if the positioning portion such as the heater notch portion slightly deviates from the center of the heat generating portions of the heater as long as the positioning portion is located on a side further inward than the heat generating portion. When a configuration in which the positioning portion deviates from the center of the heat generating portions is employed, the positioning portion is preferably located within a range that is ¼ ahead of the entire length of the heat generating portions from the center of the heat generating portions to both end portions in the longitudinal direction as described above using Example 17.

Hereinafter, configuration or concept examples disclosed in the aforementioned embodiment will be described below. However, these are just an example, and the disclosure of the aforementioned embodiment is not limited to the configurations or concepts described below.

Configuration E1

A heating device that heats a recording material with a nip portion includes:

- a first rotating body;
- a second rotating body that forms the nip portion between the second rotating body and the first rotating body;
- a heater that includes a heat generating portion that is longer in a rotation axis direction of the second rotating body and is provided in an internal space of the first rotating body; and
- a support member that supports the heater, comes into contact with an inner circumferential surface of the first rotating body, and guides rotation of the first rotating body,
- in which the heater includes a positioning portion that is located on a side closer to a center of the heat generating portion with respect to an end portion of the heat generating portion in a longitudinal direction, and the support member includes a positioned portion that abuts the positioning portion and restricts relative movement of the positioning portion in the longitudinal direction with respect to the support member, and the support member supports the heater such that both end portions of the heater in the longitudinal direction include clearances with the support member.

Configuration E2

In the heating device according to Configuration E1, the positioned portion abuts the positioning portion in both directions of the longitudinal direction.

Configuration E3

In the heating device according to Configuration E1 or E2, the positioning portion is a projection projecting on the side of the support member in a thickness direction that is orthogonal to the longitudinal direction and the transverse direction of the heater, and the positioned portion is a hole that is fitted to the projection.

Configuration E4

In the heating device according to Configuration E3, the projection is provided at each of both end portions of the heater in the transverse direction.

Configuration E5

In the heating device according to Configuration E3 or E4, the heating device further includes a heat conducting member that is provided on the heater and abuts an inner circumferential surface of the first rotating body, the heat conducting member includes a notch to which the projection of the heater is fitted, and the projection is fitted to the notch.

Configuration E6

In the heating device according to Configuration E5, the heater includes a first projection that is fitted to the hole and a second projection that is fitted to the notch.

Configuration E7

In the heating device according to Configuration E1 or E2, the positioning portion is a notch that opens in a thickness direction that is orthogonal to the longitudinal direction and the transverse direction of the heater, and the positioned portion is a projection projecting on the side of the heater in the thickness direction.

Configuration E8

In the heating device according to Configuration E6 or E7, the heating device further includes a heat conducting member that is provided on the heater and comes into contact with an inner circumferential surface of the first rotating body, the heat conducting member includes a notch to which the projection of the support member is fitted, and the notch abuts and fits to the projection such that the position of the heat conducting member in the longitudinal direction with respect to the support member is determined.

Configuration E9

A heating device that heats a recording material with a nip portion includes:

a first rotating body:

a second rotating body that forms the nip portion between the second rotating body and the first rotating body;

a heater that includes a heat generating portion that is longer in a rotational axis direction of the second rotating body and is provided in an internal space of the first rotating body;

a support member that holds the heater, comes into contact with an inner circumferential surface of the first rotating body, and guides rotation of the first rotating body; and a heat conducting member that is provided on the heater, comes into contact with the inner circumferential surface of the first rotating body, and transmits heat of the heater to the first rotating body, in which the heater includes a positioning portion that is located on a side closer to a center of the heat generating portion with respect to an end portion of the heat generating portion in a longitudinal direction, and the heat conducting member includes a positioned portion that abuts the positioning portion and restricts relative movement of the positioning portion in the longitudinal direction with respect to the heat conducting member.

Configuration E10

In the heating device according to Configuration E9, the positioned portion abuts the positioning portion in both directions of the longitudinal direction.

Configuration E11

In the heating device according to any one of Configurations E1 to E10, the heater includes a substrate that is made of metal and a heat generating element that is provided on the substrate, and the heat generating portion is formed by the heat generating element.

Configuration E12

In the heating device according to Configuration E11, the positioning portion is formed on the substrate.

Configuration E13

In the heating device according to any one of Configurations E1 to E12, the positioning portion is provided within a length range of ¼ of the entire length of the heat generating portion from a center of the heat generating portion toward both end sides in the longitudinal direction.

Configuration E14

In the heating device according to any one of Configurations E1 to E13, the first rotating body is a tubular film, and the second rotating body is a roller.

Configuration E15

An image forming apparatus includes:

an image forming portion that forms an image on a recording material; and the heating device portion according to any one of Configurations E1 to E14 that fixes, on the recording material, the image formed on the recording material.

Configuration E16

In the image forming apparatus according to Configuration E15, the image forming apparatus further includes side plates that are provided at both ends of the support member in the longitudinal direction, and the support member is fixed to the side plates at positions in the longitudinal direction.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-166594, filed on Oct. 11, 2021, Japanese Patent Application No. 2021-169368, filed on Oct. 15, 2021, Japanese Patent Application No. 2021-173937, filed on Oct. 25, 2021, Japanese Patent Application No. 2021-182608, filed on Nov. 9, 2021, Japanese Patent Application No. 2021-188855, filed on Nov. 19, 2021 and Japanese Patent Application No. 2022-106472, filed on Jun. 30, 2022, which are hereby incorporated by reference herein in their entireties.

What is claimed is:

1. A heater for an image forming apparatus, the heater comprising:

a substrate that is thin and long and is made of metal;
an insulating layer provided on the substrate; and
a heat generating element provided on the insulating layer,
wherein the substrate comprises:
a first region including a center of the substrate in a transverse direction that is orthogonal to a longitudinal direction of a surface of the substrate on which the insulating layer is disposed;
a second region on a side closer to one end than the first region in the transverse direction; and
a third region on a side closer to the other end than the first region in the transverse direction,
wherein the first region is a plane,
wherein the second region and the third region are bent from the first region in a thickness direction of the substrate that is orthogonal to the longitudinal direction and the transverse direction,
wherein the second region includes:
a first bent portion that is bent to approach a side of the heat generating element from the first region in the thickness direction; and
a second bent portion that is bent in the transverse direction from the first bent portion, the second bent portion including a plane that is parallel to the first region,
wherein the second region and the third region are bent from the first region along an entirety of the substrate in the longitudinal direction, and
wherein a distance from the plane of the first region to the plane of the second bent portion in the thickness direction is longer than a thickness of the insulating layer.

2. The heater according to claim 1, wherein the third region includes a third bent portion that is bent to approach a side of the heat generating element from the first region in the thickness direction.

3. The heater according to claim 2, wherein the third region includes a fourth bent portion that is bent in the transverse direction from the third bent portion.

4. The heater according to claim 3, wherein the fourth bent portion includes a plane that is parallel to the first region.

5. The heater according to claim 4, wherein a distance from a plane of the first region and a plane of the fourth bent portion in the thickness direction is longer than the thickness of the insulating layer.

6. The heater according to claim 1, wherein the insulating layer is not provided on the substrate in the second region and the third region.

7. The heater according to claim 1, wherein:

the insulating layer is provided on a first surface of the substrate,
no insulating layer is provided on a second surface of the substrate, on a side opposite to the first surface of the substrate.

8. The heater according to claim 1, wherein:

the insulating layer with the heat generating element provided thereon is a first insulating layer,
the first insulating layer is provided on a first surface of the substrate,
a second insulating layer, without the heat generating element provided thereon, is provided on a second surface of the substrate, on a side opposite to the first surface of the substrate, and
wherein the first insulating layer is thicker than the second insulating layer in the thickness direction.

9. A heating device for an image forming apparatus, the heating device comprising:

a first rotating body;
a heater provided in an internal space of the first rotating body, and comprising:
a substrate that is thin and long and is made of metal;
an insulating layer provided on the substrate; and
a heat generating element provided on the insulating layer,
wherein the substrate comprises:
a first region including a center of the substrate in a transverse direction that is orthogonal to a longitudinal direction of a surface of the substrate on which the insulating layer is disposed;
a second region on a side closer to one end than the first region in the transverse direction; and
a third region on a side closer to the other end than the first region in the transverse direction,
wherein the first region is a plane,
wherein the second region and the third region are bent from the first region in a thickness direction of the substrate that is orthogonal to the longitudinal direction and the transverse direction,
wherein the second region includes:
a first bent portion that is bent to approach a side of the heat generating element from the first region in the thickness direction; and
a second bent portion that is bent in the transverse direction from the first bent portion, the second bent portion including a plane that is parallel to the first region,
wherein the second region and the third region are bent from the first region along an entirety of the substrate in the longitudinal direction, and
wherein a distance from the plane of the first region to the plane of the second bent portion in the thickness direction is longer than a thickness of the insulating layer;
a second rotating body that forms a nip portion with the heater via the first rotating body; and
a temperature detection unit that detects a temperature of the heater,
wherein the insulating layer is provided on a first surface of the substrate, and
wherein the temperature detection unit is provided on a second surface of the substrate, on a side opposite to the first surface of the substrate.

10. The heating device according to claim 9, wherein the second region and the third region abut the first rotating body.

11. The heating device according to claim 9, wherein:

the first rotating body is a tubular film, and
the second rotating body is a roller.

12. A heating device comprising:
a first rotating body;
a heater provided in an internal space of the first rotating body, and including:
a substrate that is thin and long and is made of metal;
an insulating layer provided on the substrate; and
a heat generating element provided on the insulating layer; and
a second rotating body that forms a nip portion with the heater via the first rotating body,
wherein the substrate comprises:
a first region including a center of the substrate in a transverse direction that is orthogonal to a longitudinal direction of the first surface of the substrate on which the insulating layer is provided;
a second region on a side closer to one end than the first region; and
a third region on a side closer to the other end than the first region in the transverse direction,
wherein the second region and the third region are bent to be located closer to a side of the nip portion than the first region in a thickness direction of the substrate that is orthogonal to the longitudinal direction and the transverse direction,
wherein the second region includes:
a first bent portion that is bent to approach a side of the heat generating element from the first region in the thickness direction; and
a second bent portion that is bent in the transverse direction from the first bent portion, the second bent portion including a plane that is parallel to the first region,
wherein the second region and the third region are bent from the first region along an entirety of the substrate in the longitudinal direction, and
wherein a distance from the plane of the first region to the plane of the second bent portion in the thickness direction is longer than a thickness of the insulating layer.

13. The heating device according to claim 12, wherein the third region includes a third bent portion that is bent to approach a side of the heat generating element from the first region in the thickness direction.

14. The heating device according to claim 13, wherein the third region includes a fourth bent portion that is bent in the transverse direction from the third bent portion.

15. The heating device according to claim 14, wherein:
the first region includes a plane, and
the fourth bent portion includes a plane that is parallel with the first region.

16. The heating device according to claim 15, wherein a distance from the plane of the first region to the plane of the fourth bent portion in the thickness direction is longer than the thickness of the insulating layer.

17. The heating device according to claim 12, wherein the insulating layer is not provided on the substrate in the second region and the third region.

18. The heating device according to claim 12, wherein:
the insulating layer is provided on a first surface of the substrate, and
no insulating layer is provided on a second surface of the substrate, on a side opposite to the first surface of the substrate.

19. The heating device according to claim 12, wherein:
the insulating layer with the heat generating element provided thereon is a first insulating layer,
the first insulating layer is provided on a first surface of the substrate,
a second insulating layer, without the heat generating element provided thereon, is provided on a second surface of the substrate, on a side opposite to the first surface of the substrate, and
the first insulating layer is thicker than the second insulating layer in the thickness direction.

20. An image forming apparatus comprising:
an image forming portion that forms an image on a recording material; and
the heating device according to claim 12 that fixes, on the recording material, the image formed on the recording material.

* * * * *